US007050813B1

(12) United States Patent
Paiz

(10) Patent No.: US 7,050,813 B1
(45) Date of Patent: May 23, 2006

(54) PARALLEL COMPUTER NETWORK AND METHOD FOR TELECOMMUNICATIONS NETWORK SIMULATION TO ROUTE CALLS AND CONTINUOUSLY ESTIMATE CALL BILLING IN REAL TIME

(76) Inventor: Richard S. Paiz, 16558 NE. 26th Ave., Apt. 2-F, North Miami Beach, FL (US) 33160

( * ) Notice: Subject to any disclaimer, the term of this patent is extended or adjusted under 35 U.S.C. 154(b) by 126 days.

(21) Appl. No.: 10/926,446

(22) Filed: Aug. 25, 2004

Related U.S. Application Data

(63) Continuation-in-part of application No. 10/603,963, filed on Jun. 25, 2003, now Pat. No. 6,842,511, which is a continuation-in-part of application No. 09/544,238, filed on Apr. 7, 2000, now Pat. No. 6,614,893.

(60) Provisional application No. 60/184,537, filed on Feb. 24, 2000.

(51) Int. Cl.
*H04Q 7/20* (2006.01)
(52) U.S. Cl. ............... 455/446; 455/406; 379/220.01; 379/114.01

(58) Field of Classification Search ................ 455/446, 455/405–409, 426.1, 424, 428; 379/220.01, 379/114.01, 126
See application file for complete search history.

(56) References Cited

U.S. PATENT DOCUMENTS

| 6,345,182 B1 * | 2/2002 | Fabritius et al. ............ 455/408 |
| 6,363,253 B1 * | 3/2002 | Valentine et al. ........... 455/445 |
| 6,463,275 B1 * | 10/2002 | Deakin ....................... 455/406 |
| 6,529,592 B1 * | 3/2003 | Khan ..................... 379/114.01 |
| 6,947,540 B1 * | 9/2005 | Madoch et al. ........ 379/220.01 |

* cited by examiner

*Primary Examiner*—Charles N. Appiah
*Assistant Examiner*—Nghi H. Ly
(74) *Attorney, Agent, or Firm*—Gold & Rizvi, P.A.; Glenn E. Gold; H. John Rizvi

(57) ABSTRACT

An expert system supercomputer that incorporates a plurality of independent nodes, or intelligent components, which work together in an organized and hierarchical manner to represent network platform components, the human resources of an organization, and consumer interactions with the plurality of concurrently working sovereign telecommunication organizations that form the system.

19 Claims, 128 Drawing Sheets

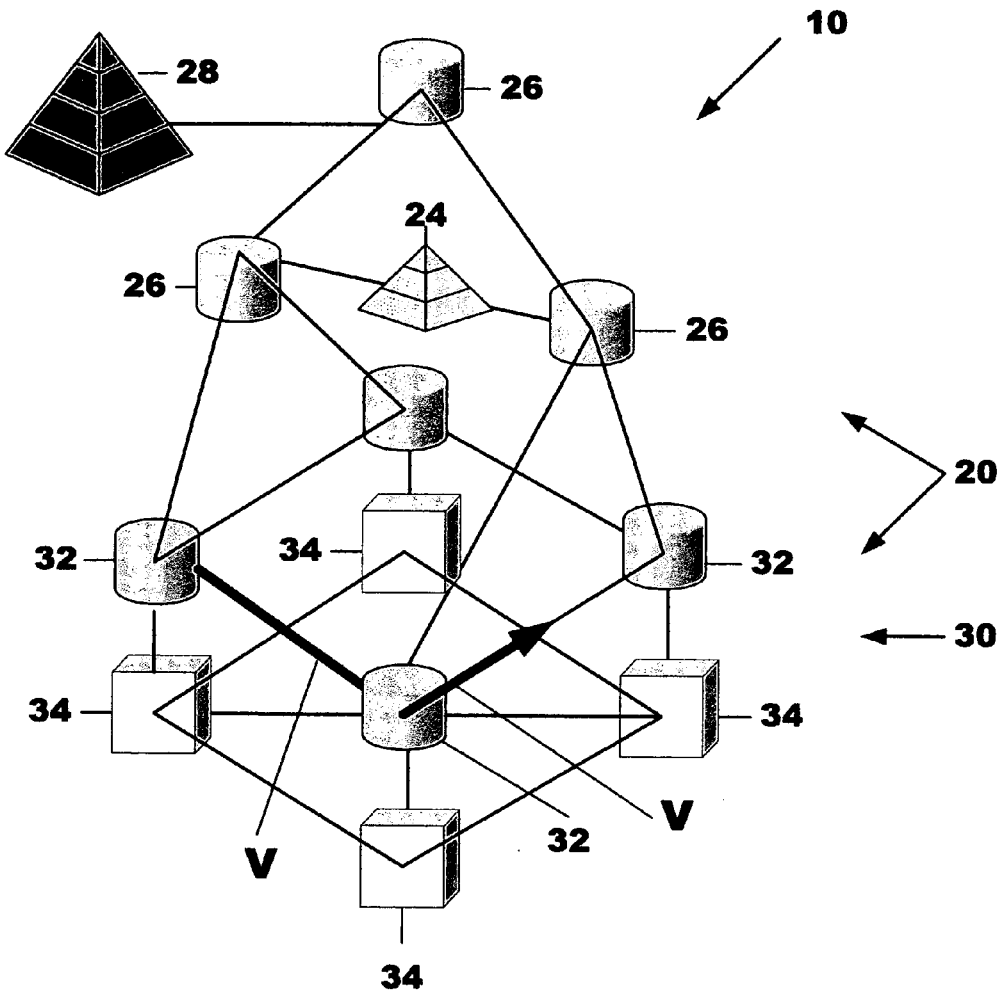
FIG 1. Parallel Telecommunications and Simulation Networks
Legend
V: Vector.
10: System.
20: Simulation Network.
24: Process power support computers.
26: Parent simulation computers.
28: User interface computers.
30: Telecommunications Network.
32: Junction point simulation computers.
34: Telecommunication Network junction point computers.
prior art

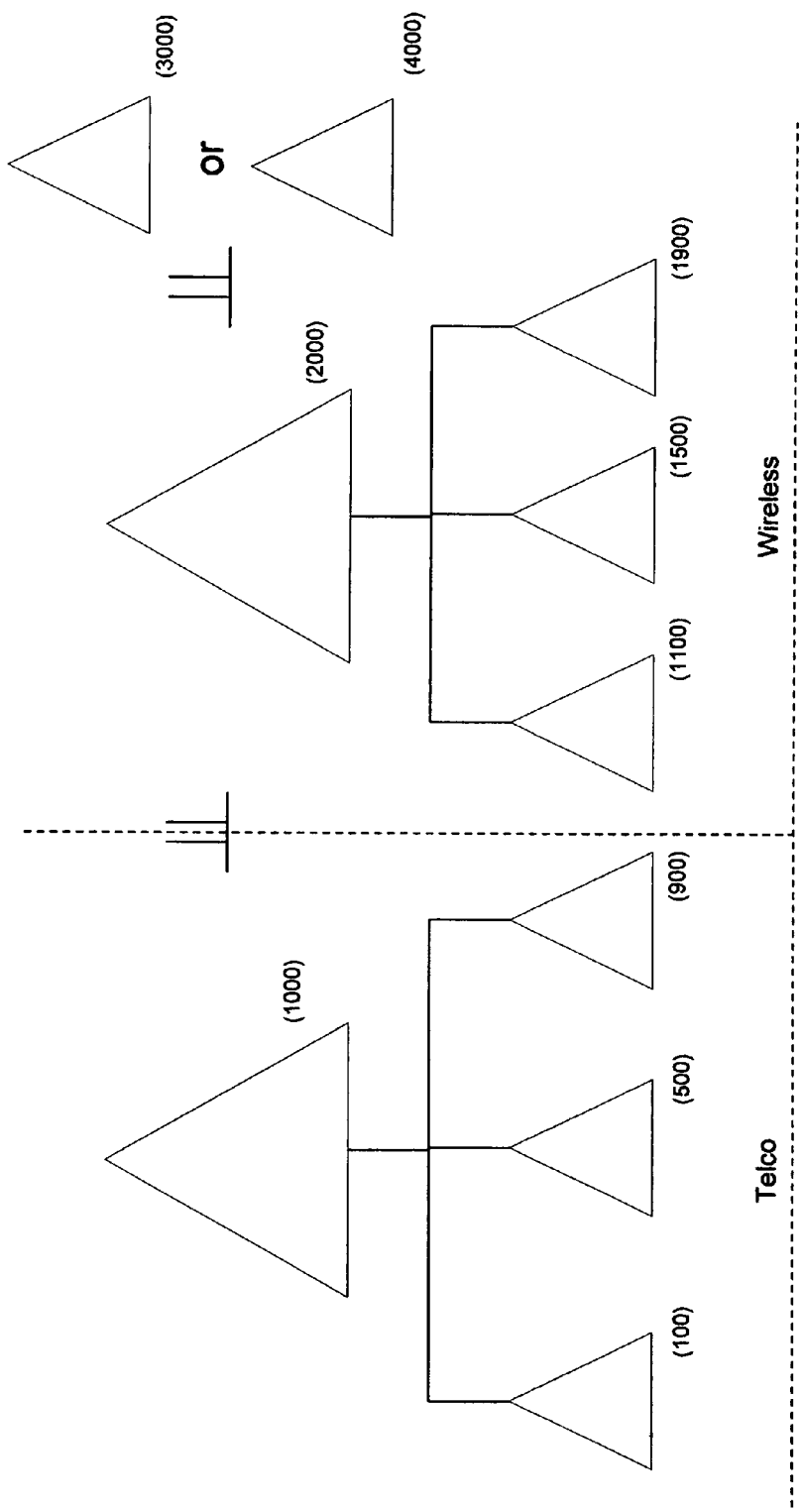

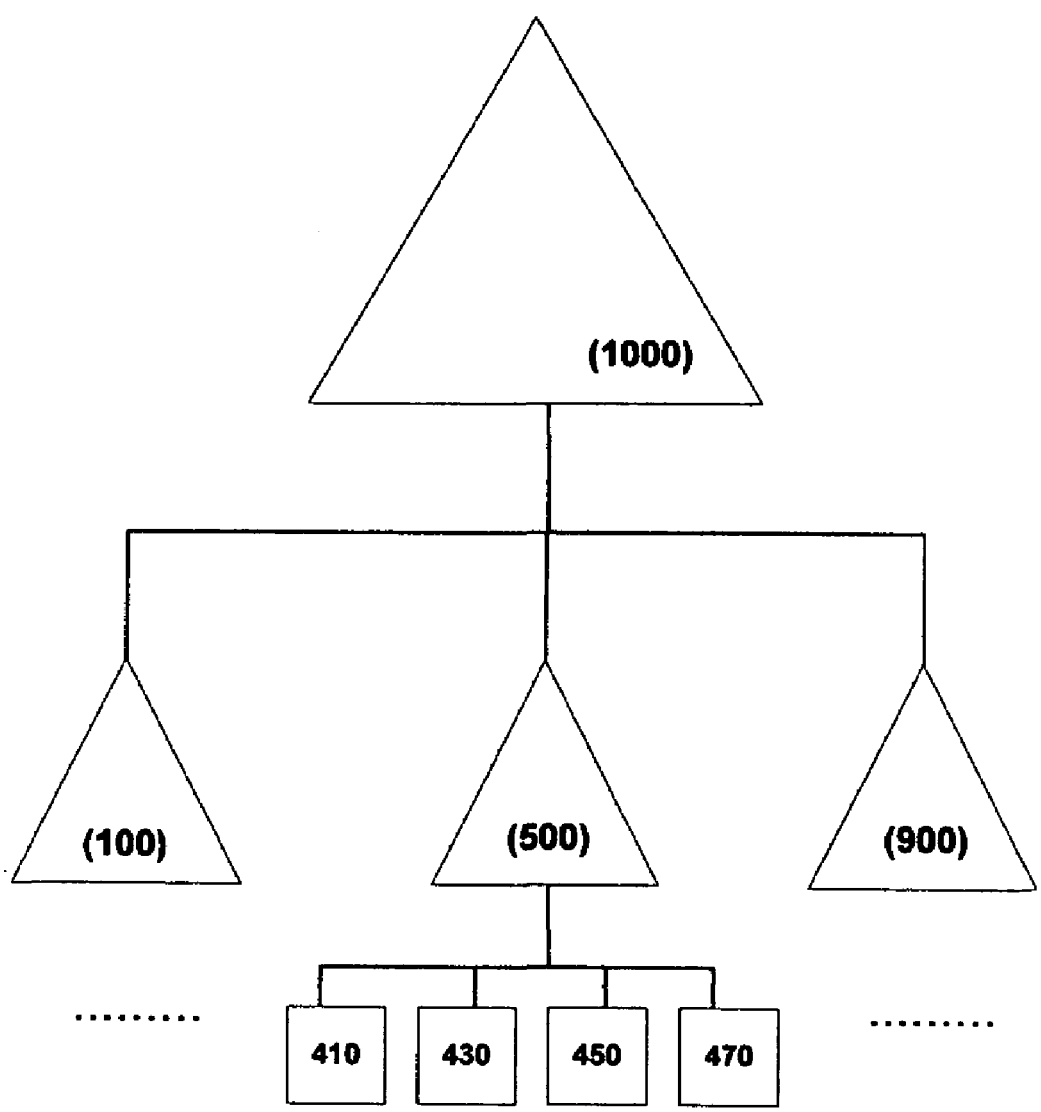

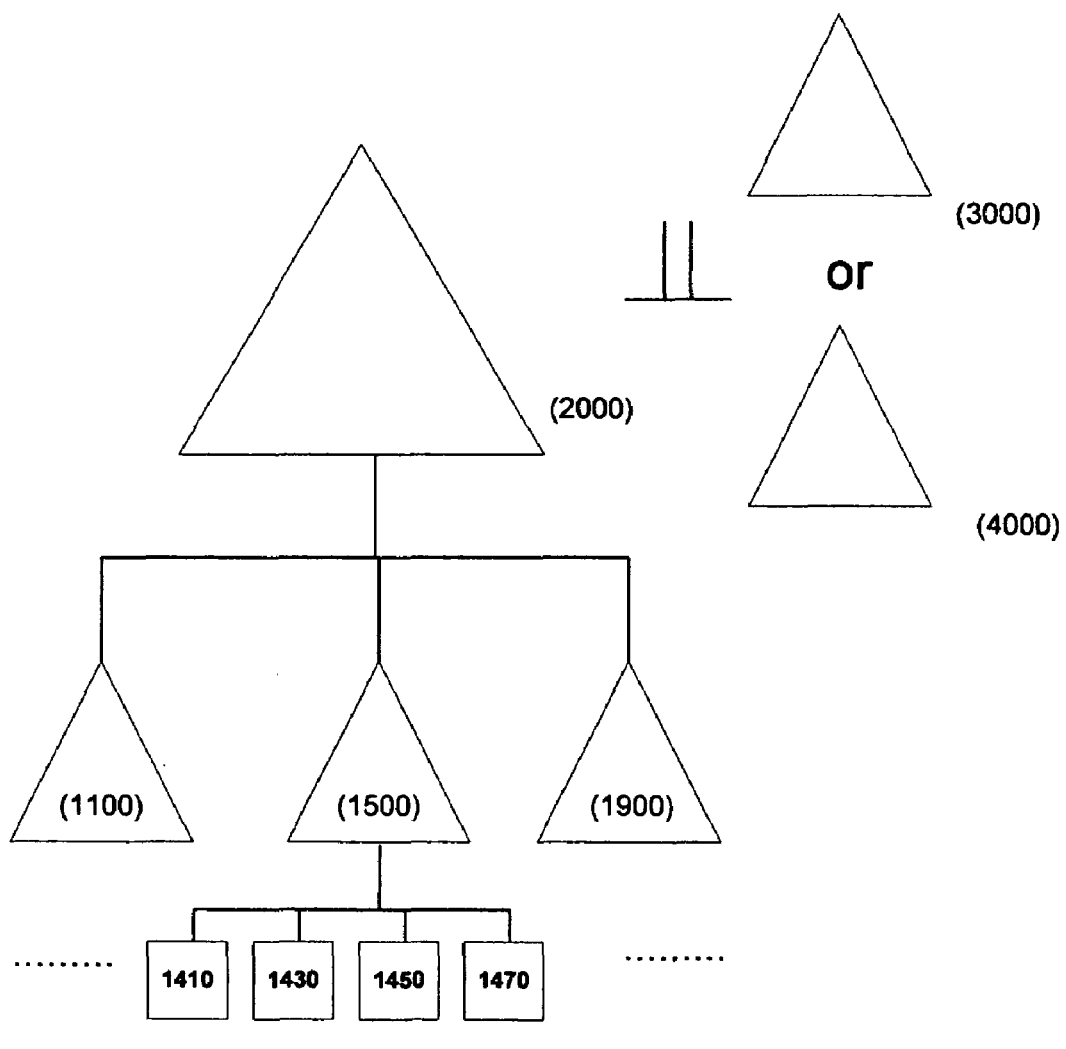
FIG. 4 USA Scope Wireless
Wireless

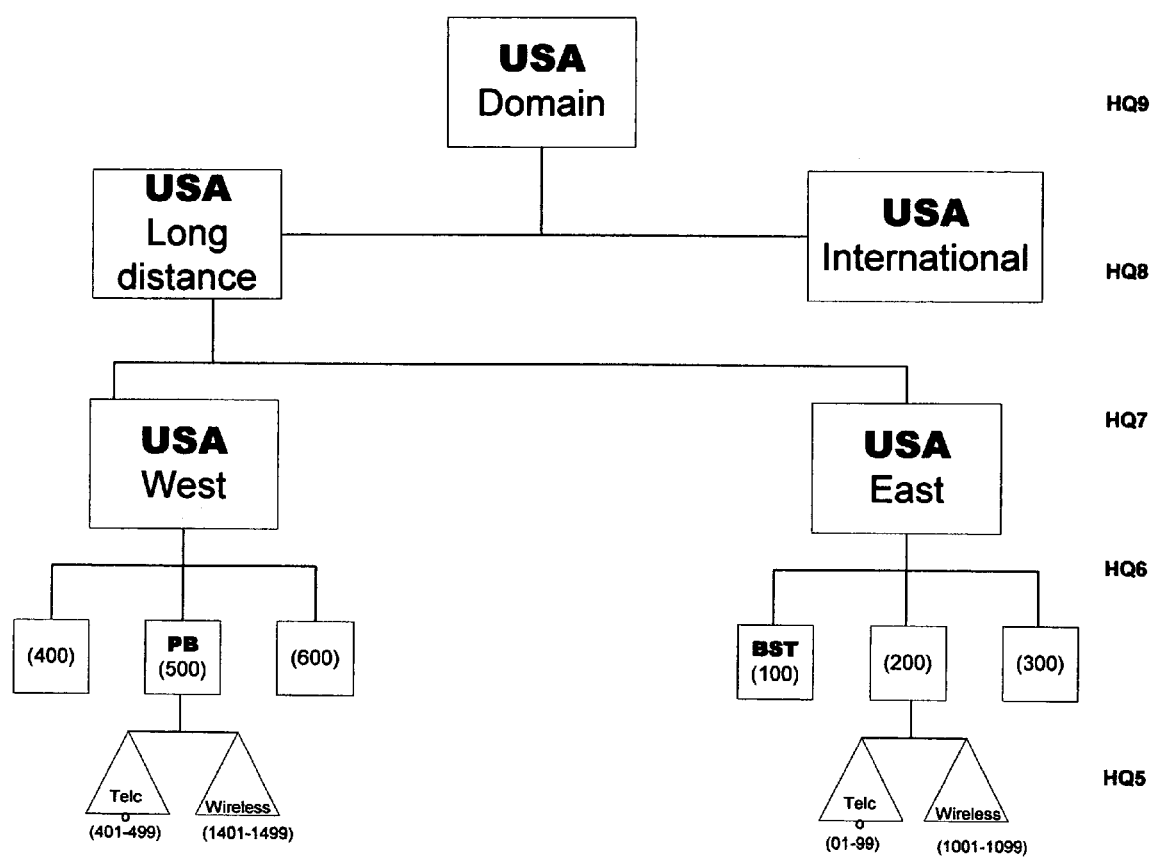

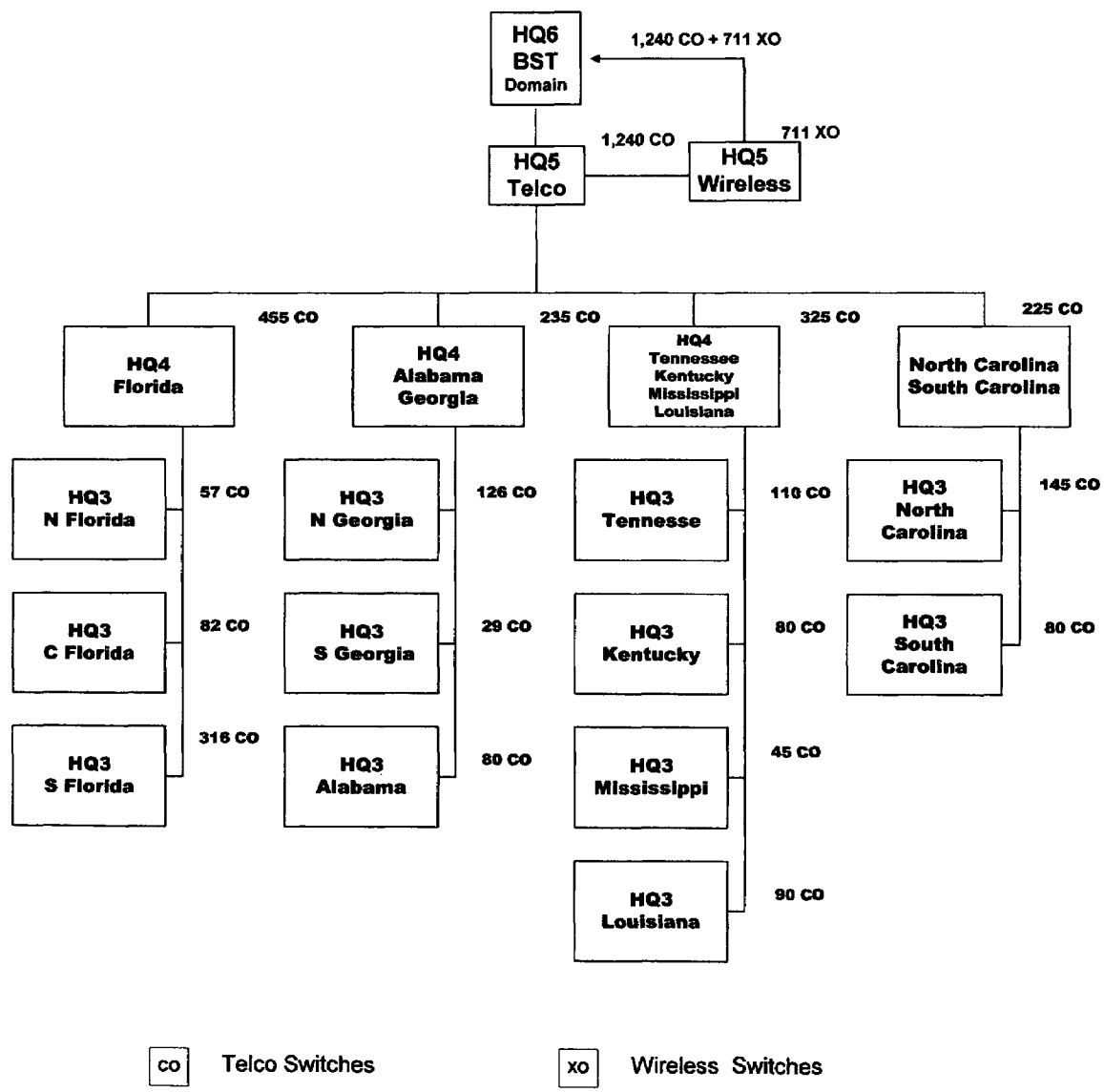

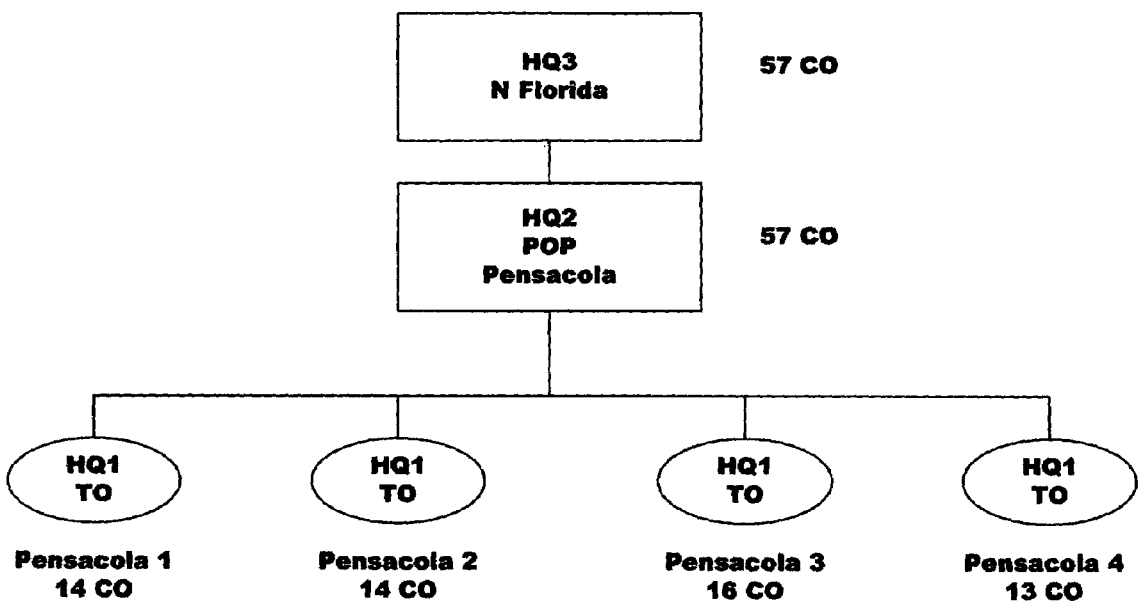

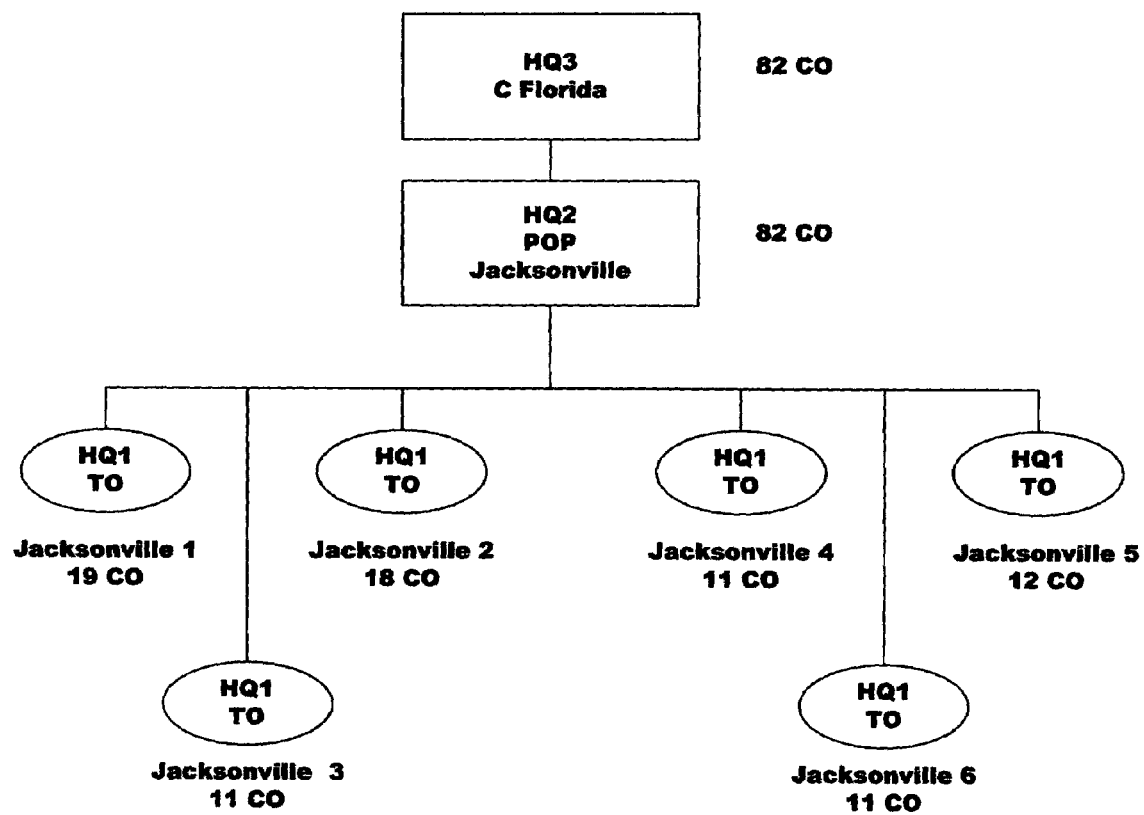

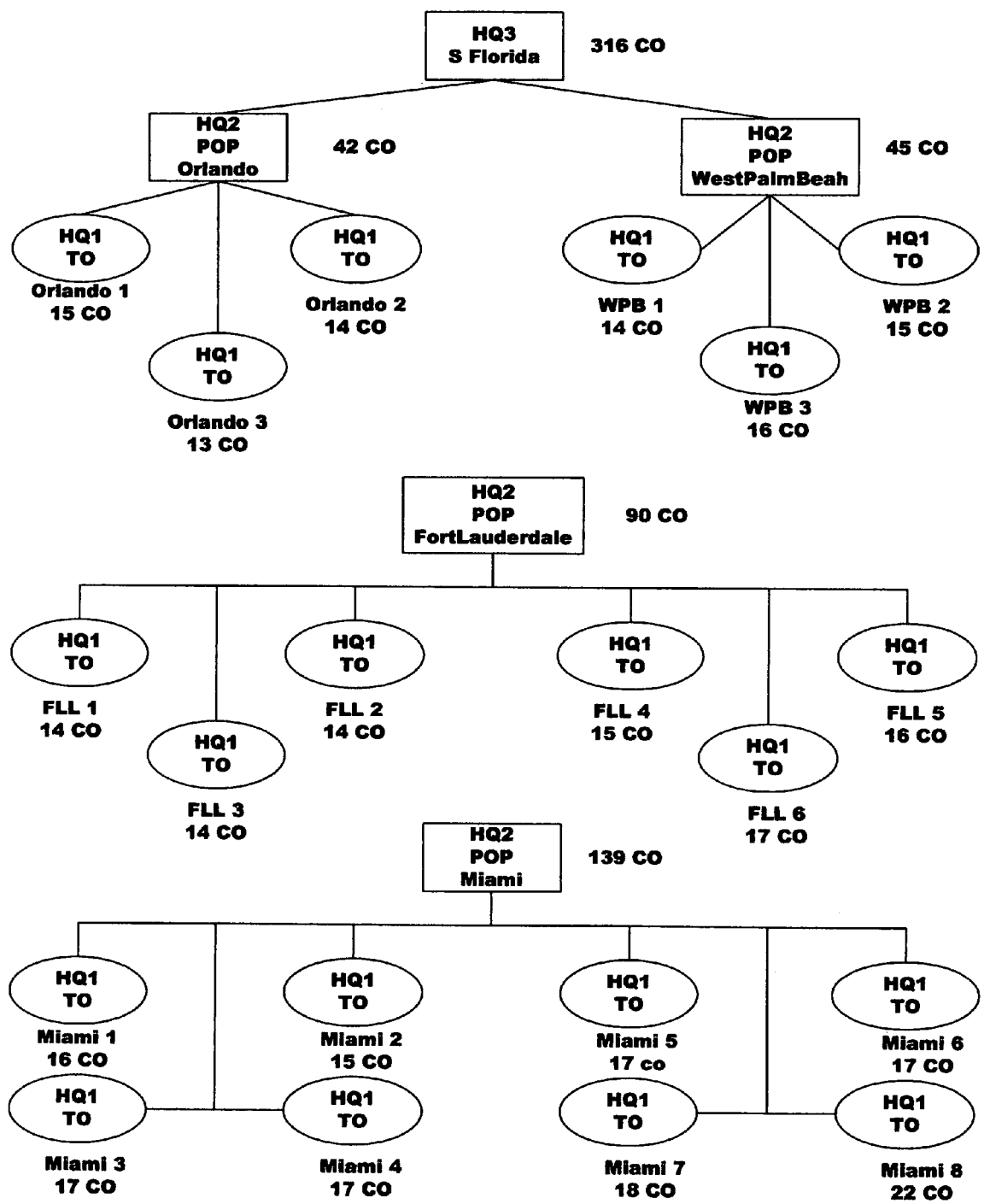

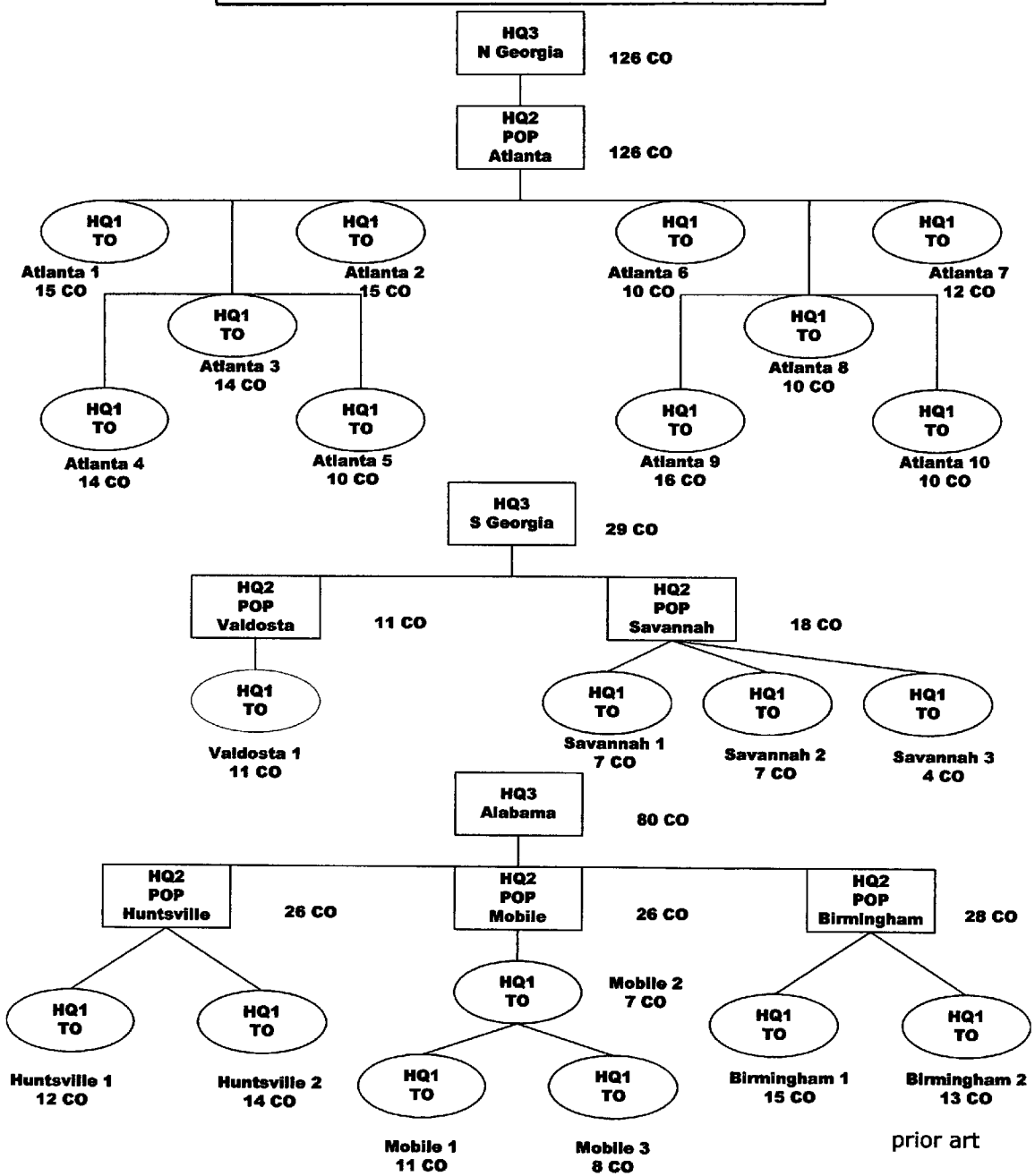

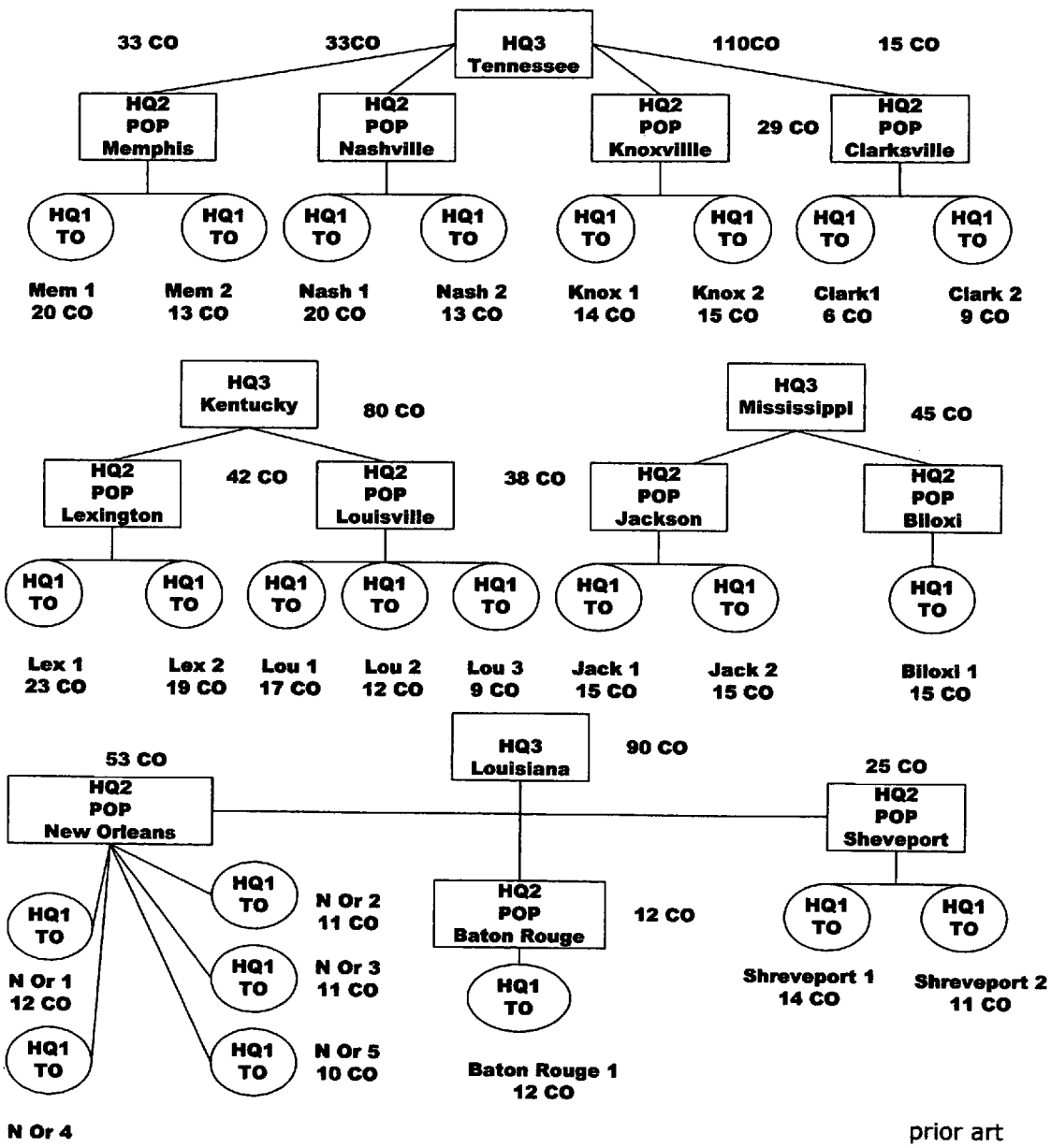
FIG. 11 Tennessee-Kentucky-Mississippi-Louisiana Region.
prior art

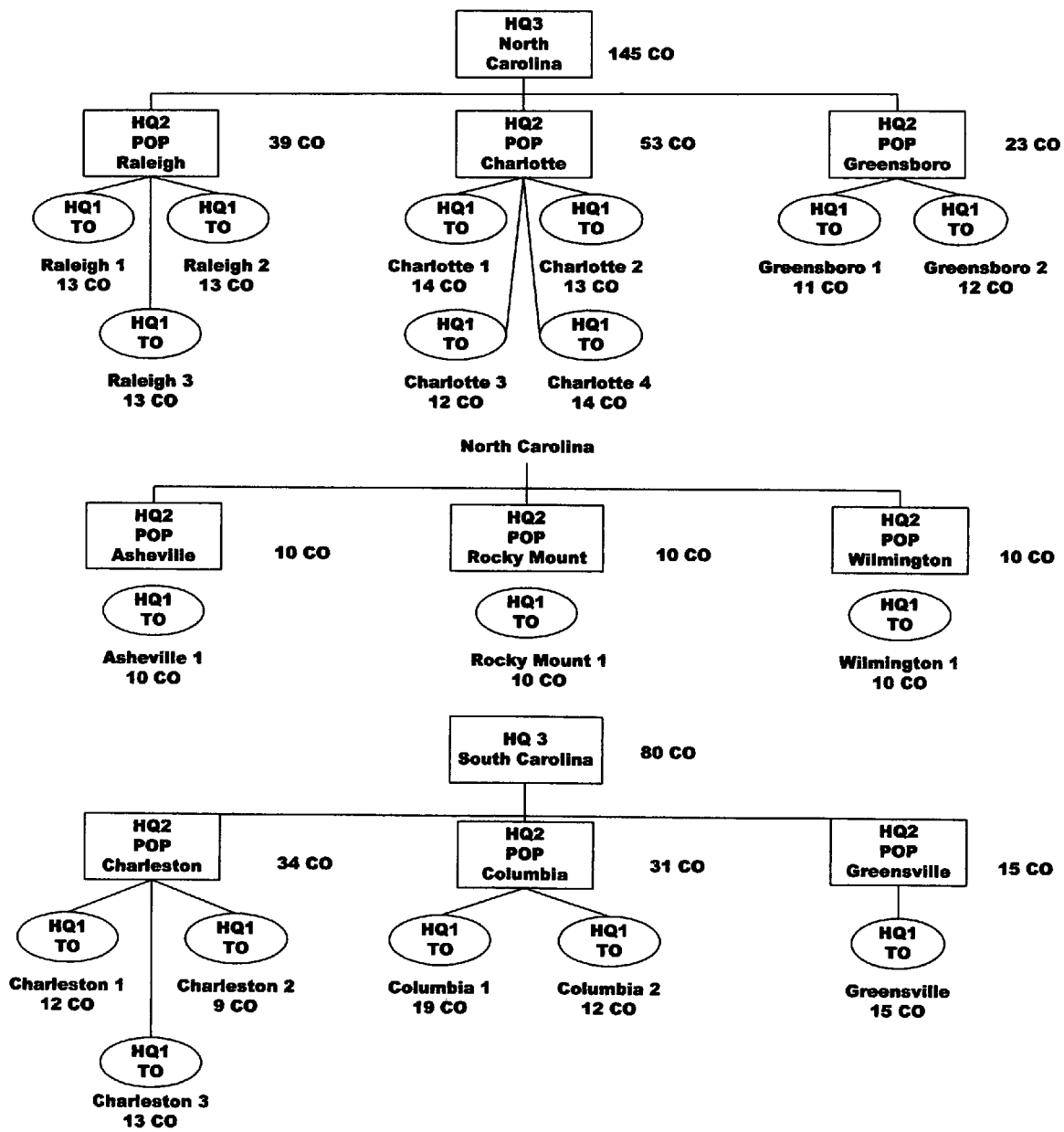
FIG. 12 South Carolina-North Carolina Network.
prior art

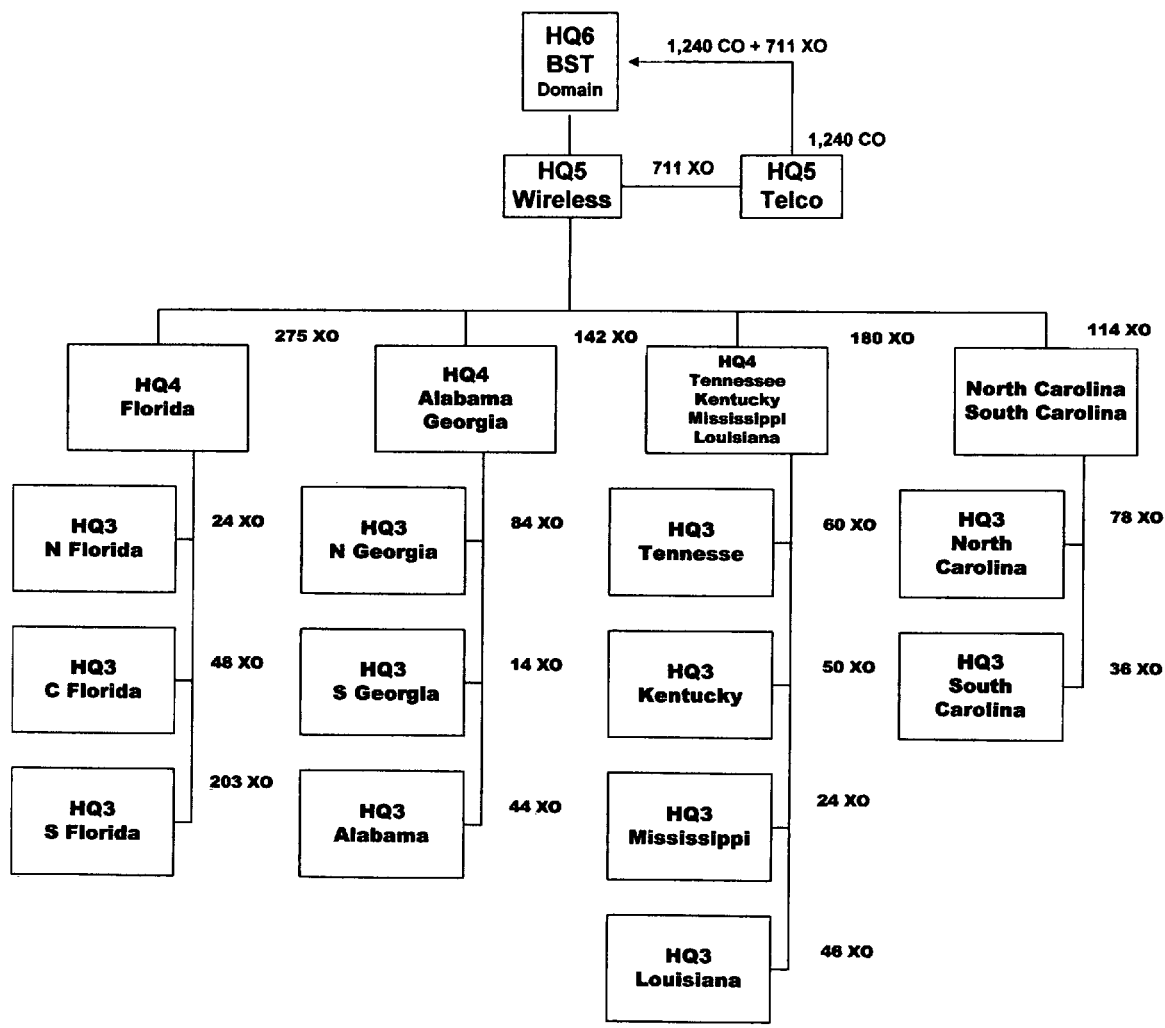
FIG. 13 BST Organizational Hierarchy Structure-Wireless
prior art

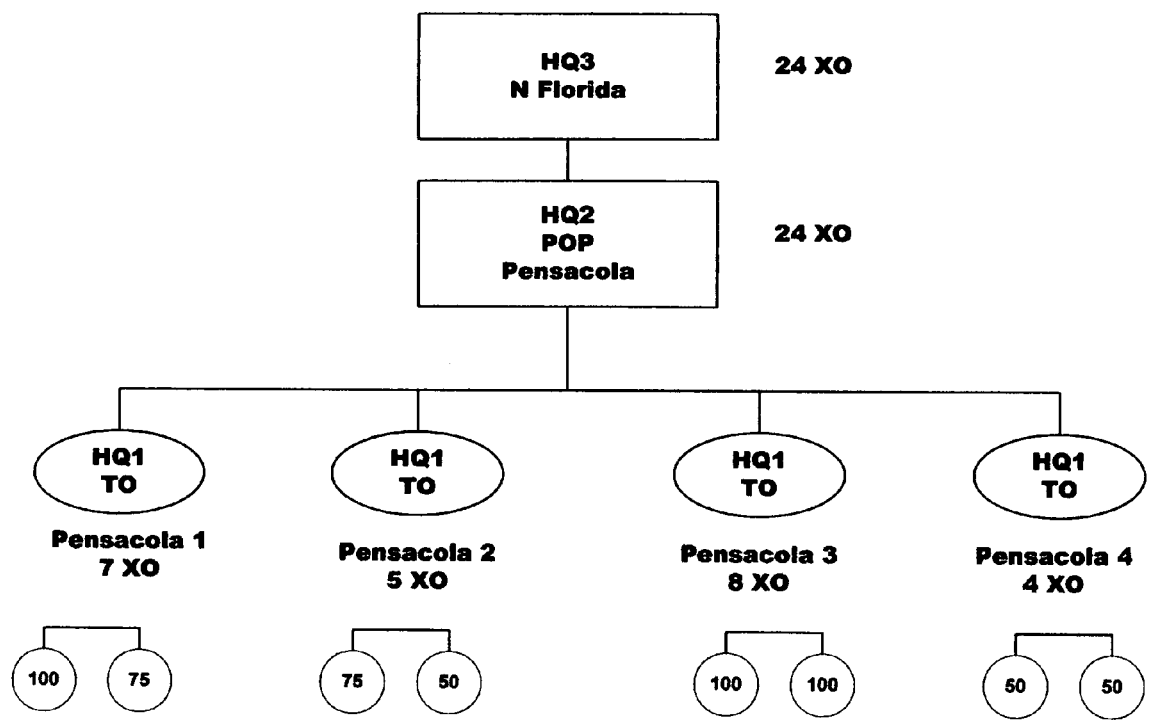

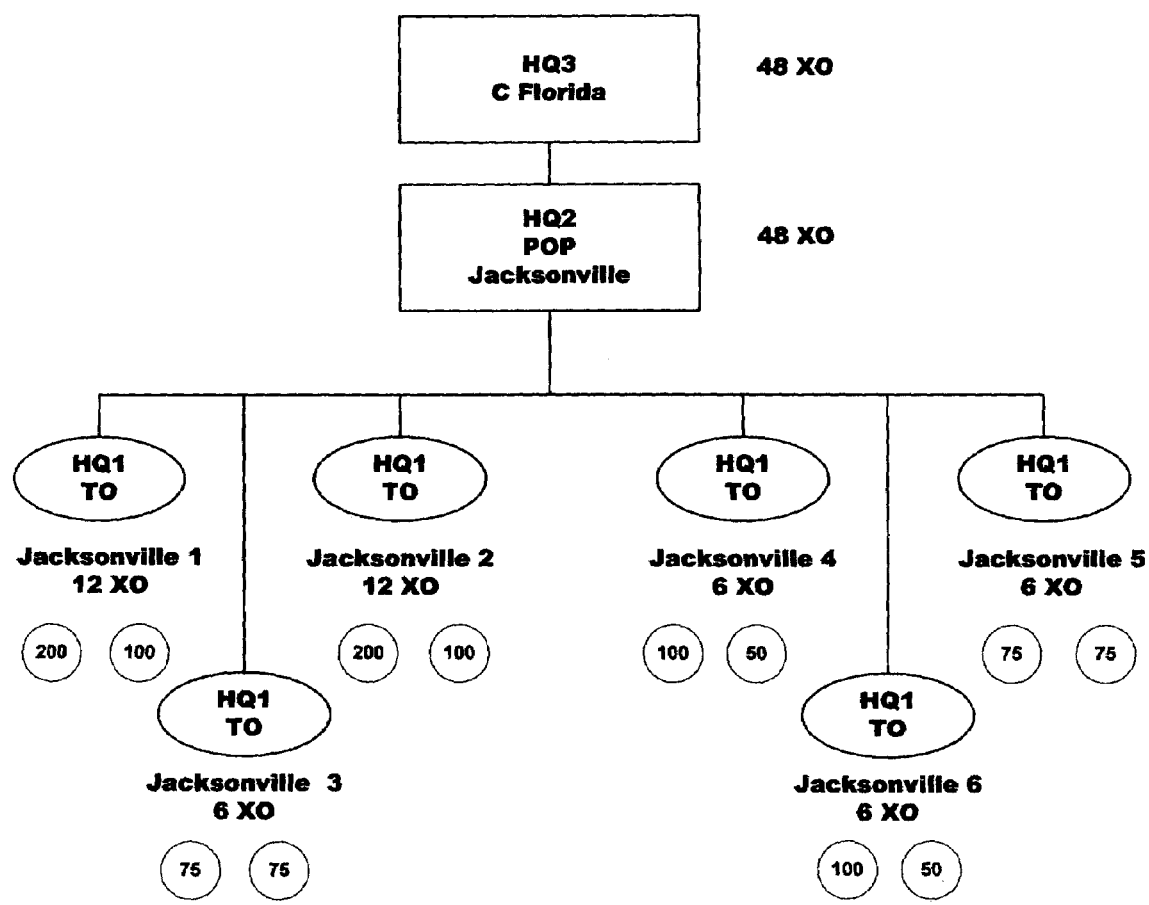

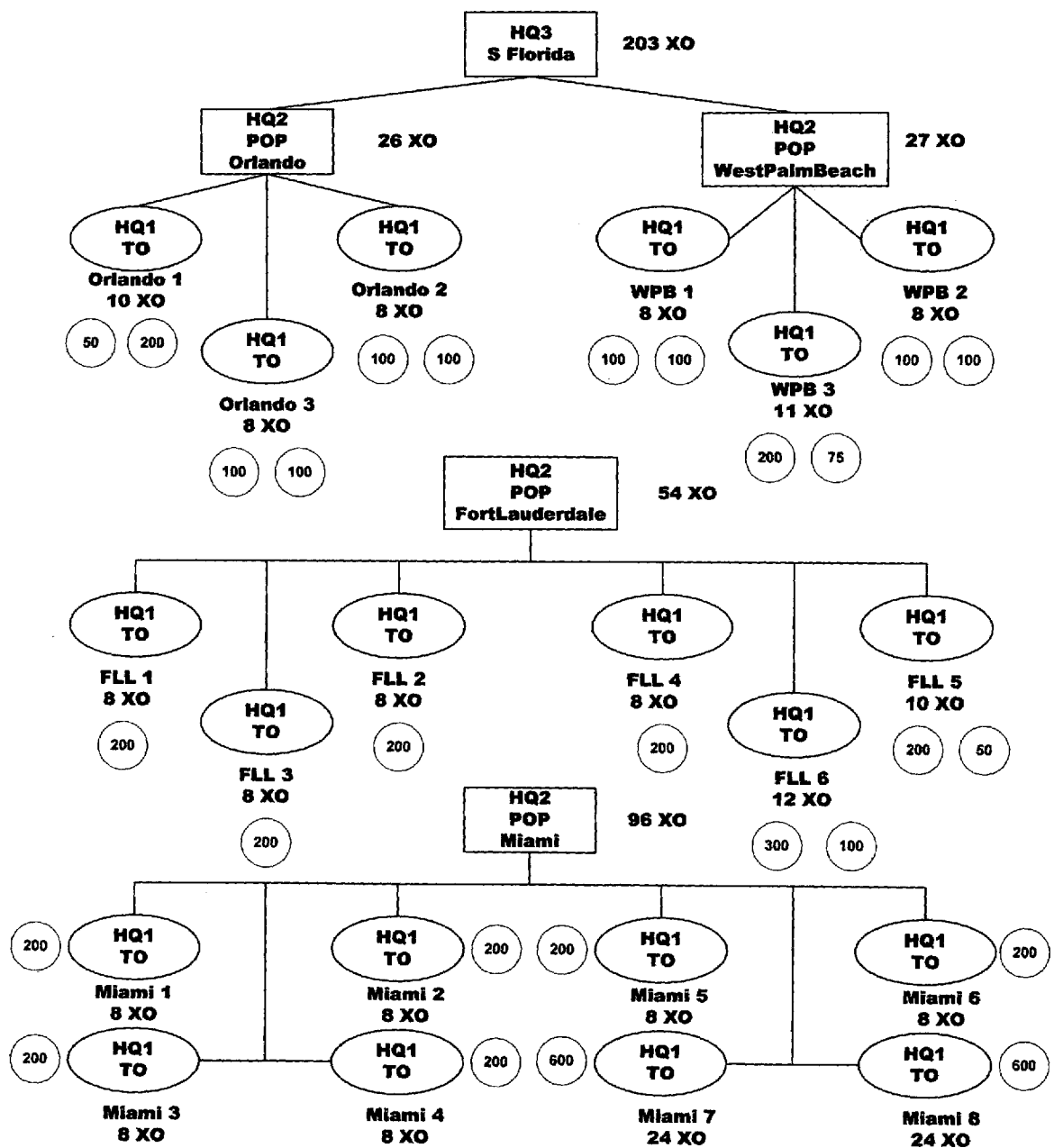

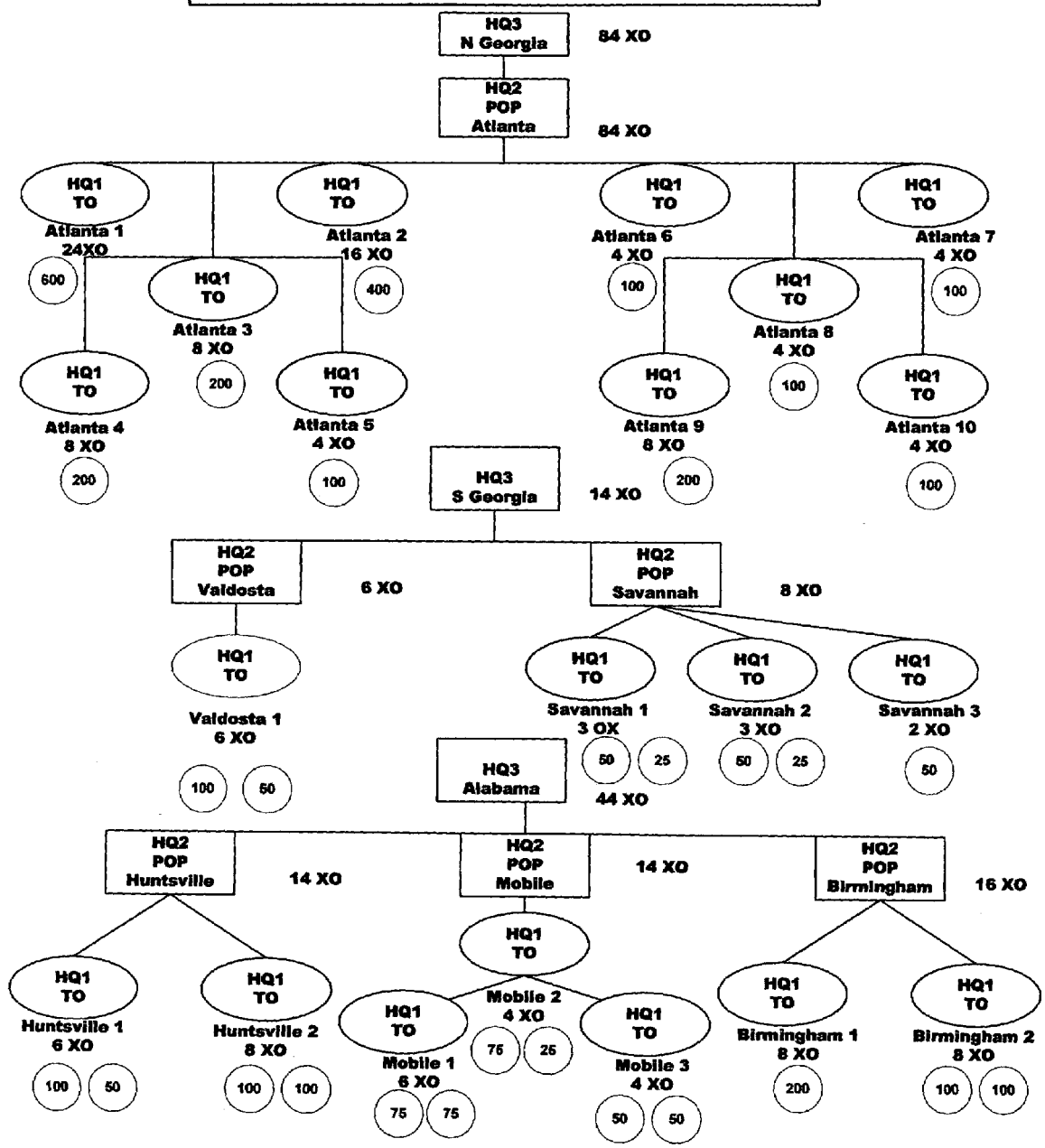

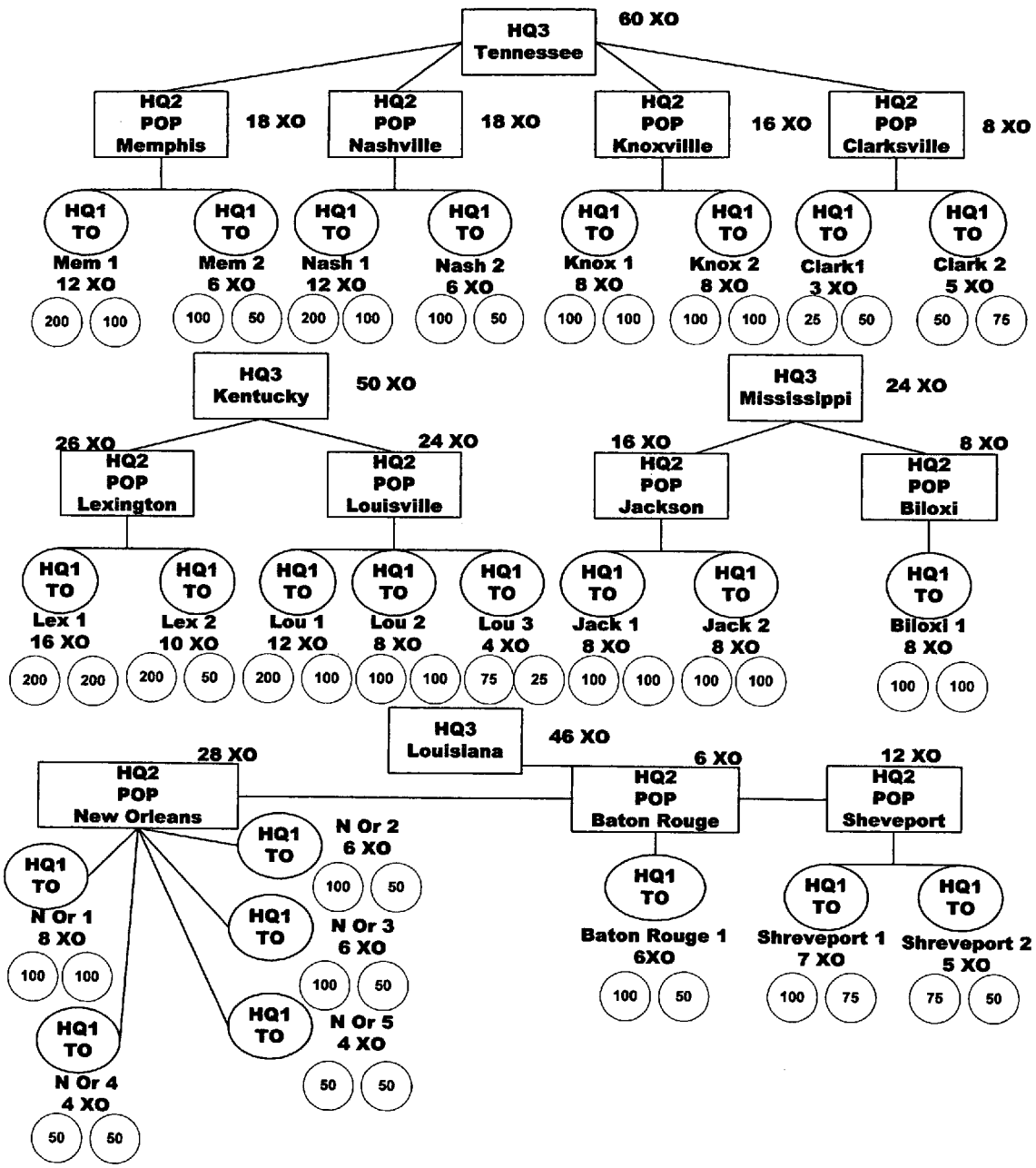

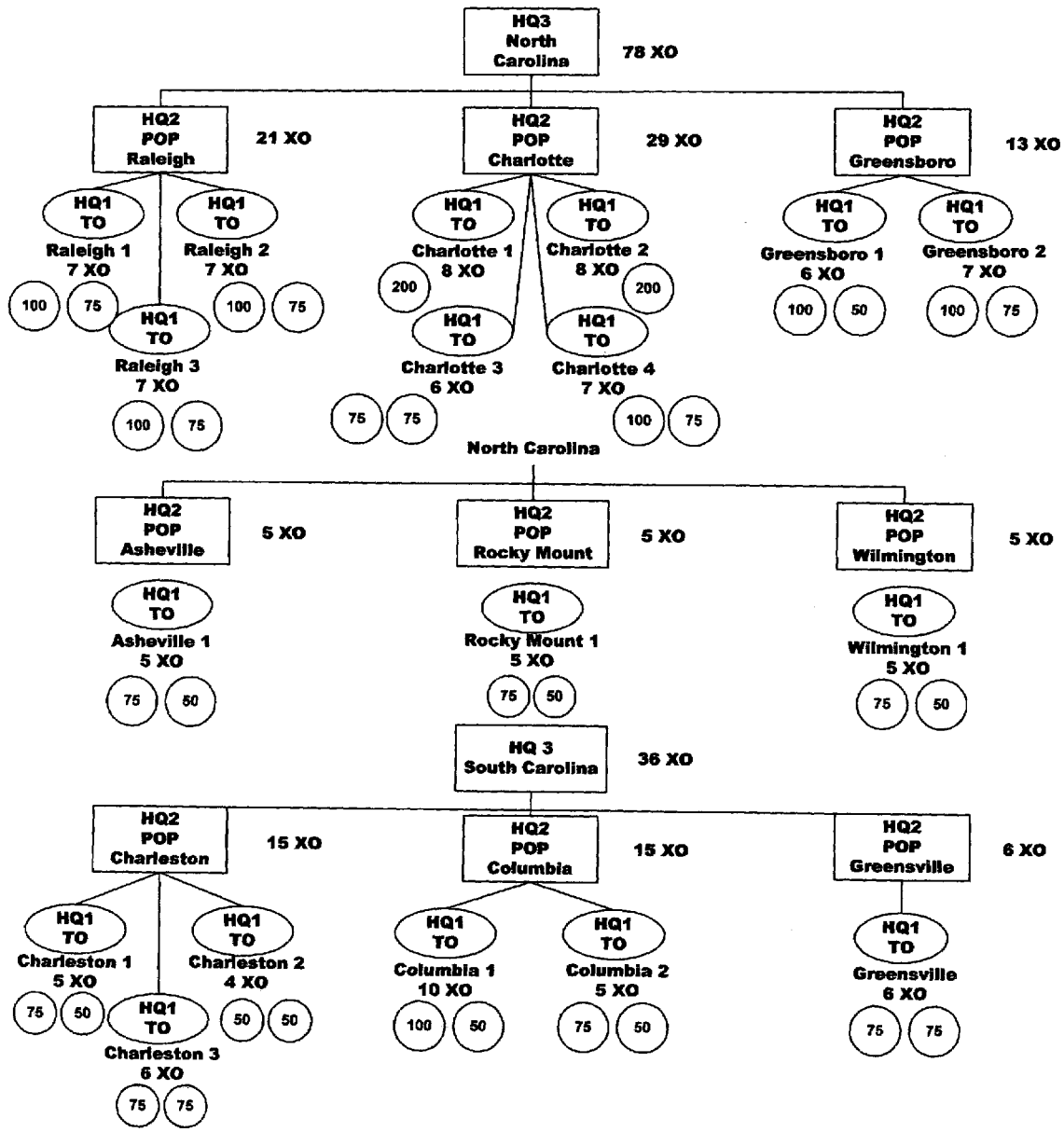

FIG. 20 2004 Bitmap guidelines

ILEC domains are limited to HQ6 knowledge.
Wireless domains are limited to HQ8 knowledge
Telco calls start with 1
Wireless calls start with 2
Roaming calls start with 3
CLEC calls starts with 4

HQ9 is assigned as a call owner when the call is not within a Wireless domain.
HQ8 is assigned for long distance that travels through East-West USA domains.
HQ7 is assigned for a long distance that is within East or West USA domains.

For calls that are local, local long distance and long distance that travels through an ILEC domain the first three digits are 111.

Calls that begin outside of all national networks start with 1.

**Telco calls (*US Patent 6,614,893 upgrades)**
Calls controlled by BST start with *1111 instead of 1
Calls controlled by PB start with *1114 instead of 4.
Calls controlled by AT&T start with 12.
Calls controlled by Sprint start with 13.

Wireless calls
Calls controlled by Cingular Wireless start with 22.
Calls controlled by Verizon start with 23.

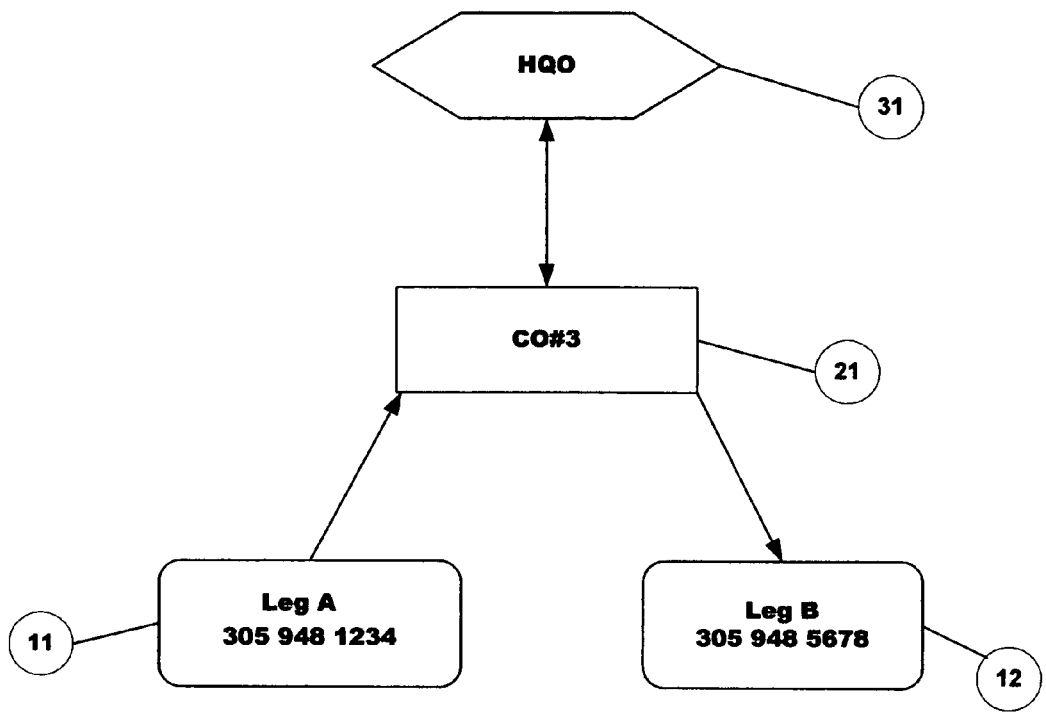

FIG. 21 Intra CO Telco Call

| HQ6 to HQ9 BST | 1111 | "Bellsouth Stamp" | |
|---|---|---|---|
| HQ5 BST | 1 | HQ5 | 1 |
| HQ4 Florida | 1 | HQ4 | 1 |
| HQ3 S. Fla | 3 | HQ3 | 3 |
| HQ2 | 4 | HQ2 Miami | 4 |
| HQ1 | 8 | HQ1 Miami | 8 |
| Leg A is 11111134803 | | Leg B is 11111134803 | |

CO 11111134803 initiates the call.
CO 11111134803 Owns and generates the Vector CDR.
1 CDR must be correlated to make the billing entity.
Vector Magnitude looks like this 11111134803 (Owner)
N/A (Leg A CO) N/A (Leg B CO) 11111134803
The unique ID for the call would be 11111134803########

11111134803aaaa0000000000. Four letters and 0-16,777,216 range.
This would be the first call this specific switch could possibly perform.

prior art

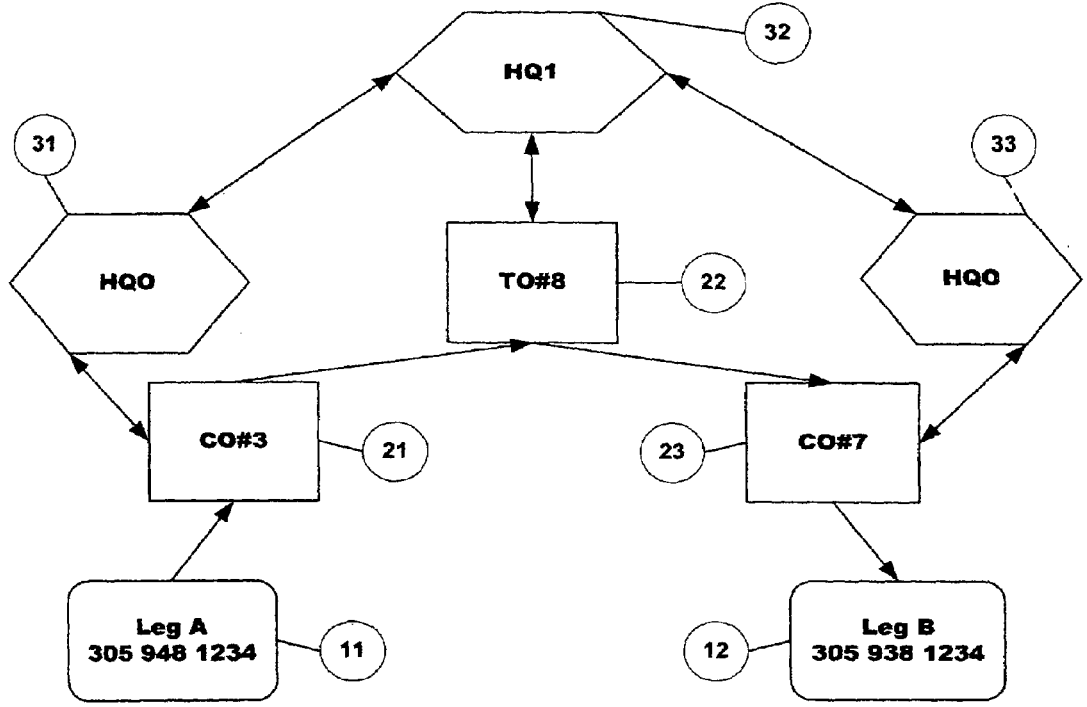
FIG. 22 Intra NXX Telco Call
| | | | | |
|---|---|---|---|---|
| HQ6 to HQ9 | 1111 | " Bellsouth Stamp" | | |
| HQ5 BST | 1 | HQ5 | 1 | |
| HQ4 Florida | 1 | HQ4 | 1 | |
| HQ3 S. Fla | 3 | HQ3 | 3 | |
| HQ2 | 4 | HQ2 Miami | 4 | |
| HQ1 | 8 | HQ1 Miami | 8 | |
| Leg A is 11111134803 | | Leg B is 11111134807 | | |
CO 11111134803 initiates the call. CO 111111348 owns the call
And generates the Vector CDR. 3 CDR must be
Correlated to make the billing entity.
Vector Magnitude looks like this 111111348 (Owner)
03 (Leg A CO ) 07 (Leg B CO) 111111348-03- 07

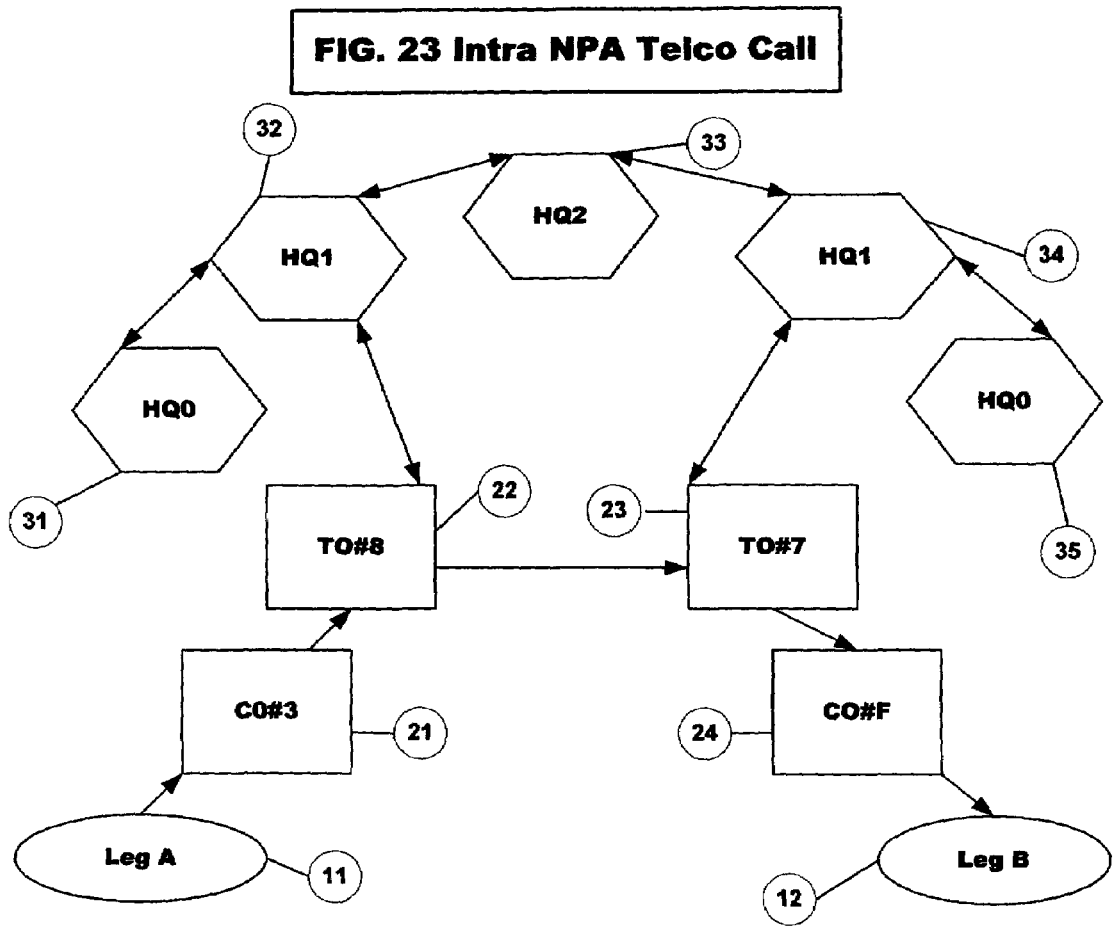
FIG. 23 Intra NPA Telco Call
305-9490001
North Miami Beach
HQ6 to HQ9           1111
HQ5  BST             1
HQ4 Florida          1
HQ3 S. Fla           3
HQ2 Miami            4
HQ1                  8
Leg A is 11111134803
305 443 2354
Coral Gables
"Bellsouth Stamp"
HQ5                  1
HQ4                  1
HQ3                  3
HQ2 Leg A            4
HQ1 Leg B            7
Leg B is 1111113470F
CO 11111134803 initiates the call. CO 11111134 owns the call and generates the Vector CDR. HQ2. At least 4 CDR must be correlated to make the billing entity.
Vector Magnitude looks like this: 11111134 (Owner) 803 (Leg A CO) 70F (Leg B CO) 11111134-803-70F

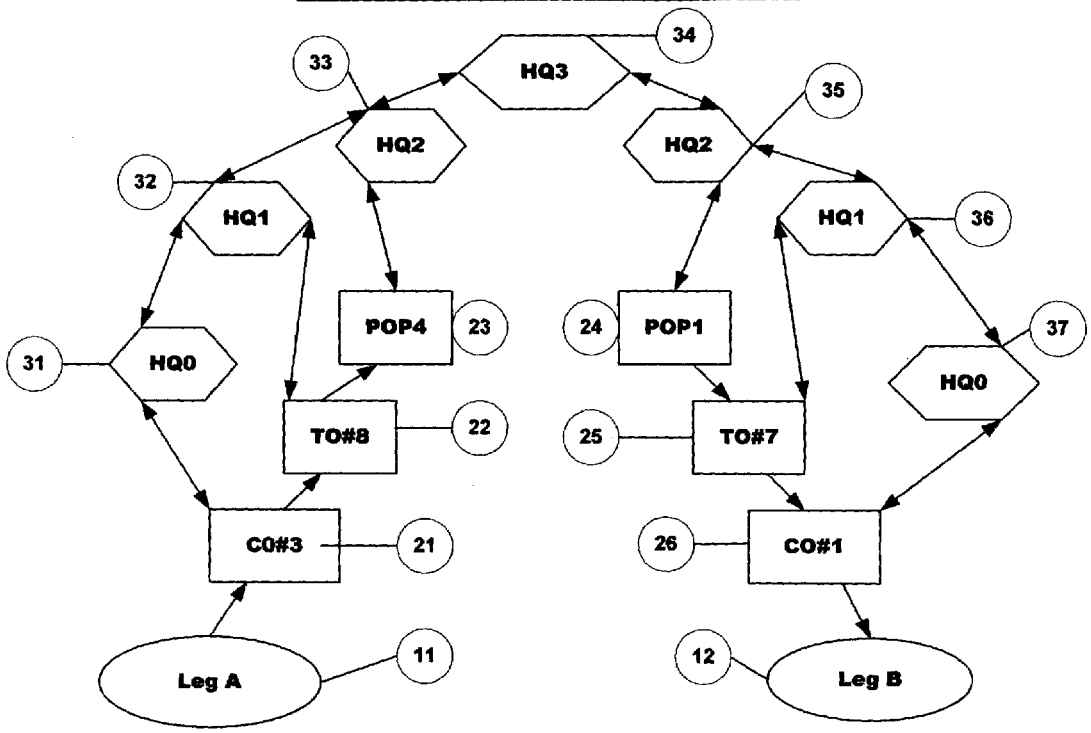
FIG. 24 Intra LATA Telco Call
| | | | |
|---|---|---|---|
| 305-9490001 | | 407 671 9999 | |
| Miami | | Orlando | |
| HQ6 to HQ9 | 1111 | "Bellsouth Stamp" | |
| HQ5 BST | 1 | HQ5 | 1 |
| HQ4 Florida | 1 | HQ4 | 1 |
| HQ3 S. Fla | 3 | HQ3 | 3 |
| HQ2 | 4 | HQ2 | 1 |
| HQ1 | 8 | HQ1 | 7 |
| Leg A is 11111134803 | | Leg B is 11111131701 | |
CO 11111134803 Initiates the call. CO 1111113 owns the call and generates the Vector CDR. HQ3. At least 6 CDR must be correlated to make the billing entity.
Vector Magnitude looks like this: 1111113 (Owner) 4803 (Leg A CO) 1701 (Leg B CO) 1111113-4803-1701

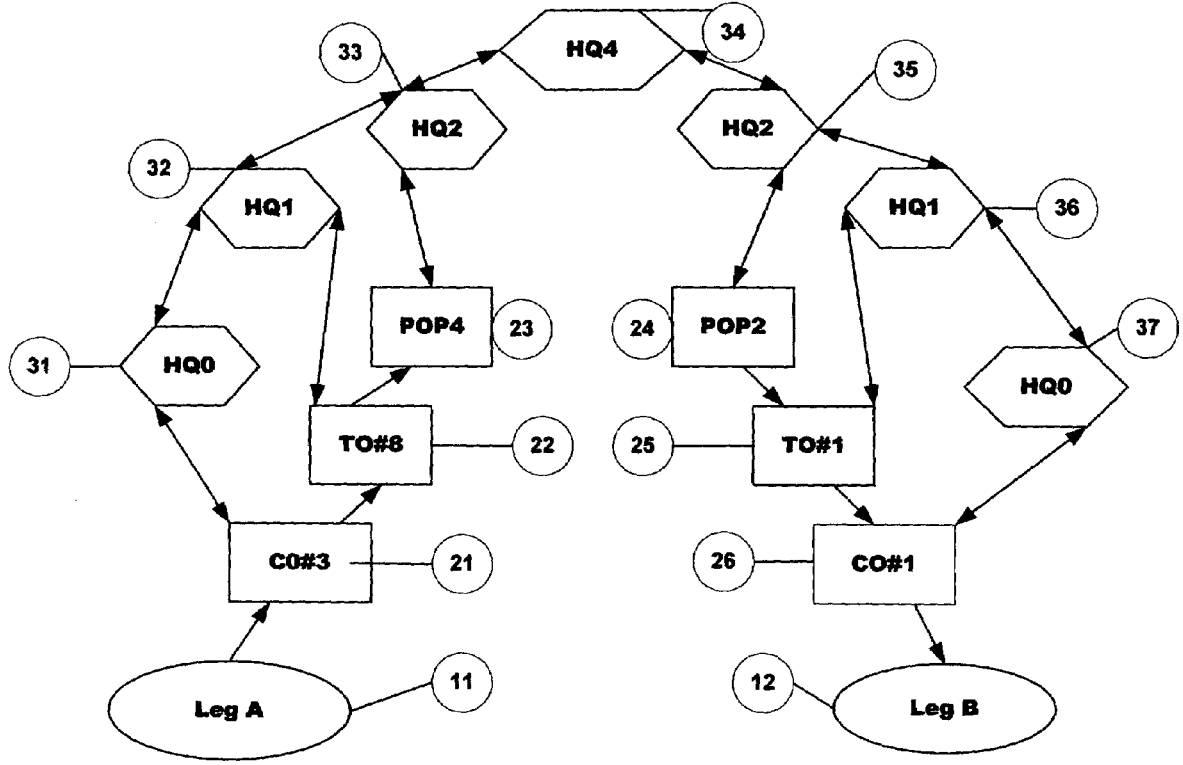
FIG. 25 Intra Regional Telco Call
| 305-949-0001 | | 904- 671-9999 | |
|---|---|---|---|
| Miami | | Jacksonville | |
| HQ6 to HQ9 | 1111 | "Bellsouth stamp" | |
| HQ5 BST | 1 | HQ5 | 1 |
| HQ4 Florida | 1 | HQ4 | 1 |
| HQ3 Leg A | 3 | HQ3 | 2 |
| HQ2 Leg B | 4 | HQ2 | 1 |
| HQ1 | 8 | HQ1 | 1 |
| Leg A is 111111134803 | | Leg B is 11111121105 | |
CO 11111134803 initiates the call. CO 11 owns the call and generates the Vector CDR. HQ4. At least 6 CDR must be correlated to make the billing entity.
Vector Magnitude looks like this: 111111 (Owner) 34803 (Leg A CO) 21105 (Leg B CO) 111111-34803-21105

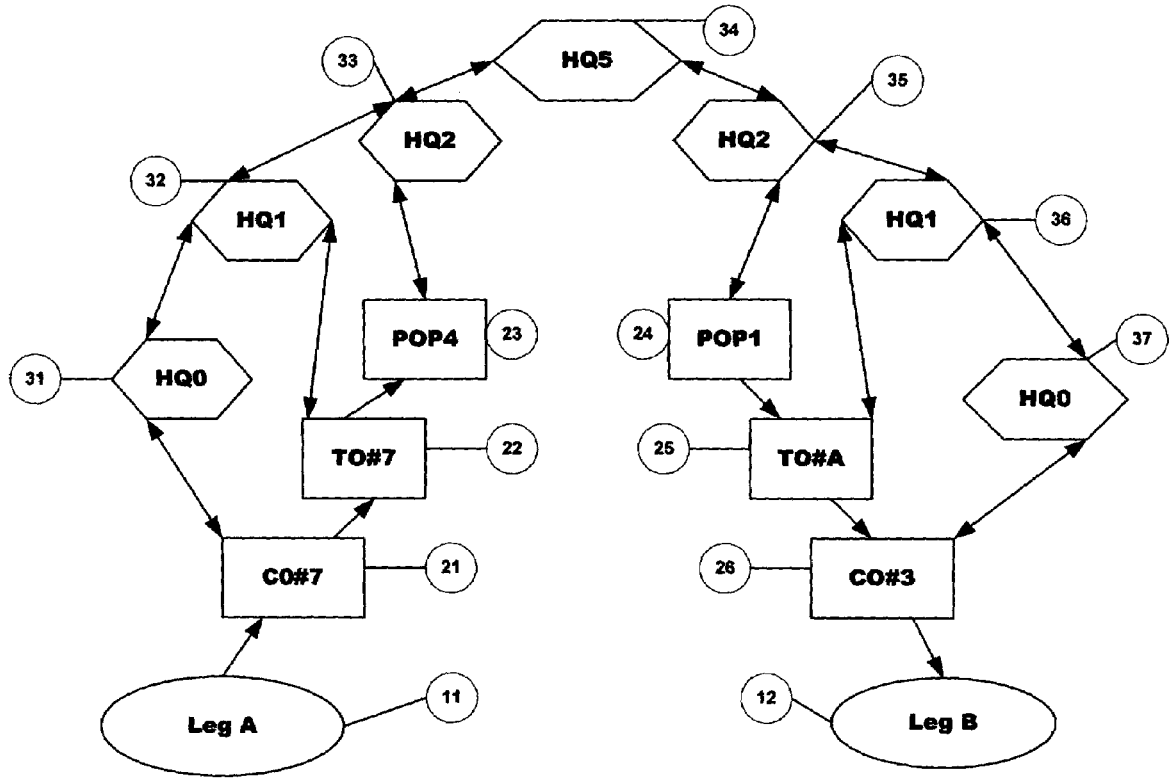
FIG. 26 Inter Regional Telco Call
305-525-0001
Miami
HQ6 to HQ9        1111
HQ5 BST           1
HQ4 Florida       1
HQ3SFla           3
HQ2               4
HQ1               7
Leg A is <u>11111</u>134707
904-777-1234
Atlanta
"Bellsouth stamp"
HQ5 BST           1
HQ4 Georgia       2
HQ3 N Geo         1
HQ2               1
HQ1               A
Leg B is <u>11111</u>211A03
Vector CDR 1-134707-211A03 or <u>11111</u>-134707-211A03

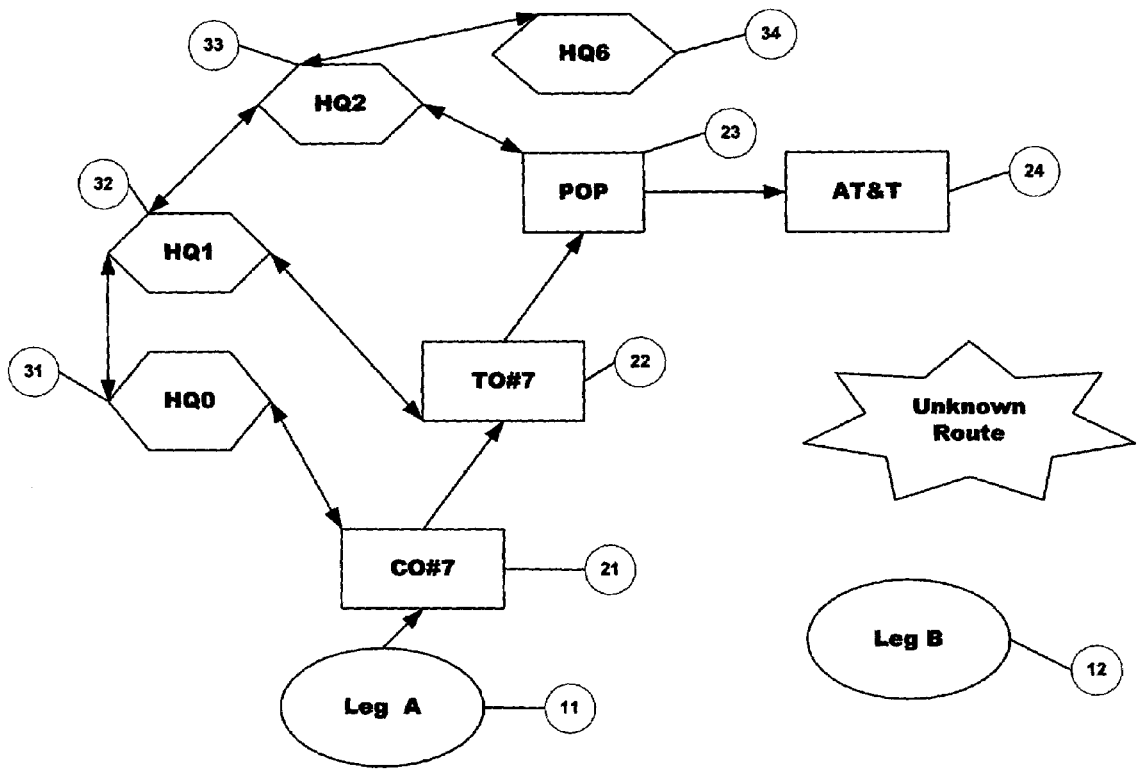

FIG. 27 International Telco Call

305 525 0001
Miami
| HQ6 to HQ9 | 1111 |
| HQ5 BST | 1 |
| HQ4 Florida | 1 |
| HQ3 S. Fla | 3 |
| HQ2 | 4 |
| HQ1 | 7 |

Leg A is 11111134707

011502261324
Guatemala
"Bellsouth stamp"
HQ5   AT&T   1

Leg B is out of the domain.

CO 11111134807 initiates the call. HQ6* owns the call and Generates the Vector CDR. At least 3 CDR must be correlated to make the billing entity.##### International ### Regional (CLEC) # Local (CLEC). CLEC the subscriber belongs to another network.
Vector Magnitude looks like this: 1 (Owner) 1111~1134707

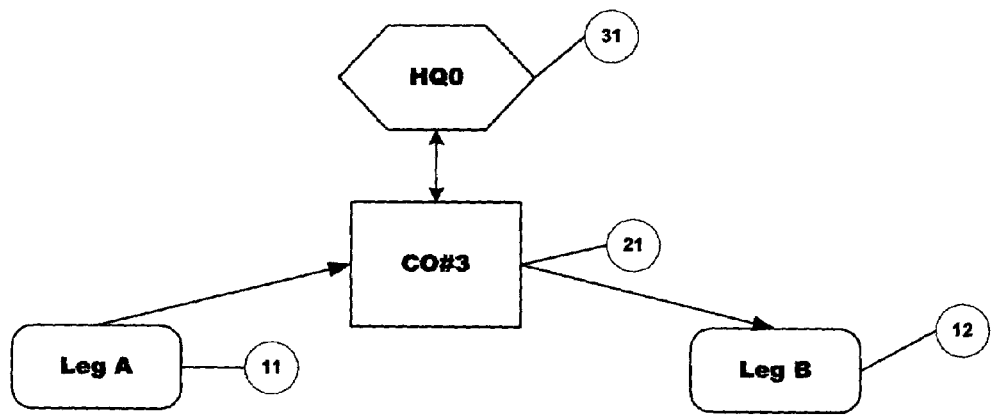
FIG. 28 Intra CO Telco Call
Calling Party Leg A
305 948 1234
NPA-NXX-EXTN
Called Party Leg B
305 948 5678
NPA-NXX-EXTN
Calling Party request dial tone and then the subscriber dials
305 948 5678#
| HQ6 to HQ9 | 1111 | "Bellsouth stamp" | |
|---|---|---|---|
| HQ5 BST | 1 | HQ5 | 1 |
| HQ4 Florida | 1 | HQ4 | 1 |
| HQ3 S. Fla | 3 | HQ3 | 3 |
| HQ2 | 4 | HQ2 Miami | 4 |
| HQ1 | 8 | HQ1 Miami | 8 |
| Leg A is <u>1111</u>1134803 | | Leg B is <u>1111</u>1134803 | |
Vector CDR 1134803 or <u>1111</u>1134803

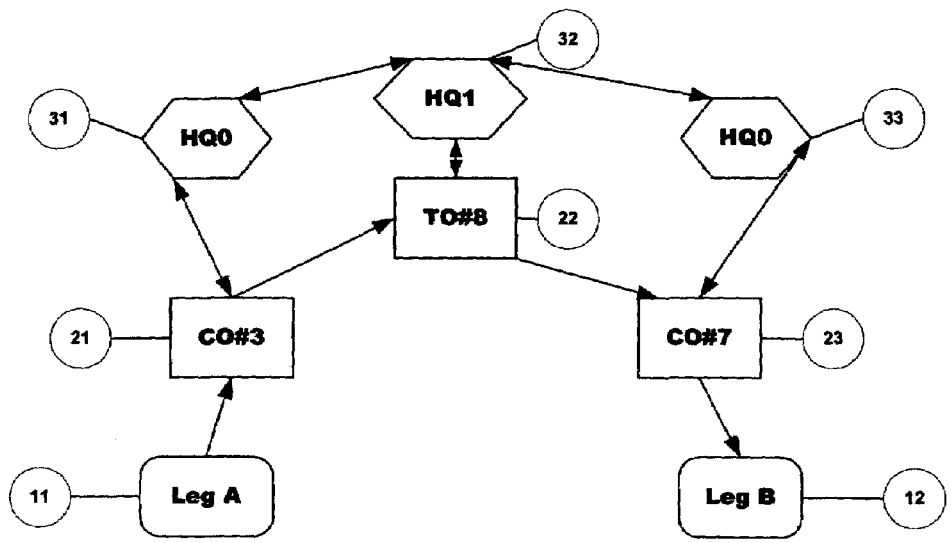

Calling Party Leg A
305 948 1234
NPA-NXX-EXTN

Called Party Leg B
305 938 5678
NPA-NXX-EXTN

Calling Party request dial tone and then the subscriber dials
305 938 5678

An (IAM) messages is sent as the CO determines that 305 938 5678 is doesn't belong to its own domain. The HQO searches and determines that HQ1 is the most probable owner. HQO upon receiving the IAM messages creates a SSN and then send a Vector CDR message to TO#8 IC. When the ANM or ACM message is received an Update_Vector_CDR message is generated and the Vector CDR is futher updated. Then a REL_A or REL_B message is received an a Release_Vector_CDR message is generated and Vector_CDR is futher updated. No Tandem data. EX <u>111111348-03-07</u>.
VectorTrajectory Update
CO#3 <u>11111134#-03-##</u> via forward chaining (FC) IAM message
TO#8 <u>111111348-03-##</u> via forward chaining(FC) IAM Message
CO#7 <u>111111348-03-07</u> via backward chaining (BC) ACM message

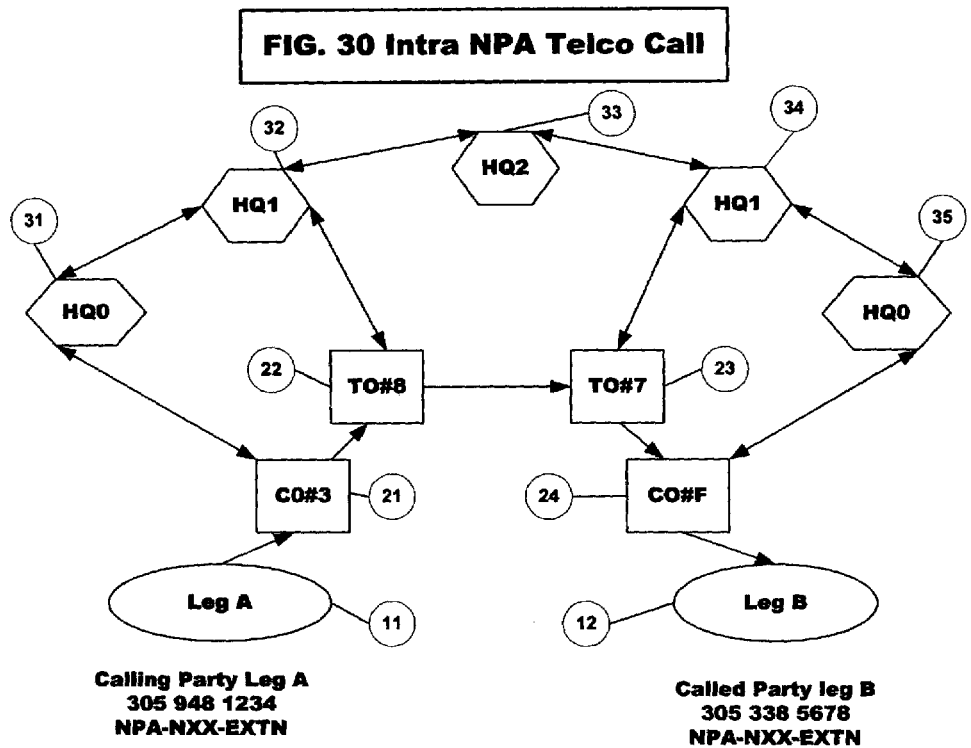

Calling Party request dial tone and then the subscriber dials 305 338 5678#

An (IAM) messages is sent as the CO determines that 305 338 5678 is doesn't belong to its own domain. The HQ0 searches and determines that HQ2 is the most probable owner.
HQ0 upon receiving the IAM messages creates a SSN and then send a Vector_CDR message to TO#8 IC, POP #4 IC, TO#7 IC, CO#OF IC. When the ANM or ACM message is received an Update_Vector_CDR message is generated and the Vector CDR is further updated. Then a REL_A or REL_B message is received an a Release_Vector CDR message is generated and Vector _CDR is futher updated. No Tandem data. Ex 11111134 -###-### Vector Trajectory Update.

| | | |
|---|---|---|
| CO#3 | 11111134-#03-##- | IAM(FC) Calling Party (Leg A ) Owner |
| TO#8 | 11111134-803-##- | IAM (FC) |
| POP# 4 | 11111134-803-##- | IAM (FC)HQ2 Miami, FLA(Dade County NPA) Vector Owner |
| TO#7 | 11111134-803-7-##- | IAM (FC) |
| CO#F | 11111134-803-7OF- | ACN (BC) Called Party (Leg B) Owner. |

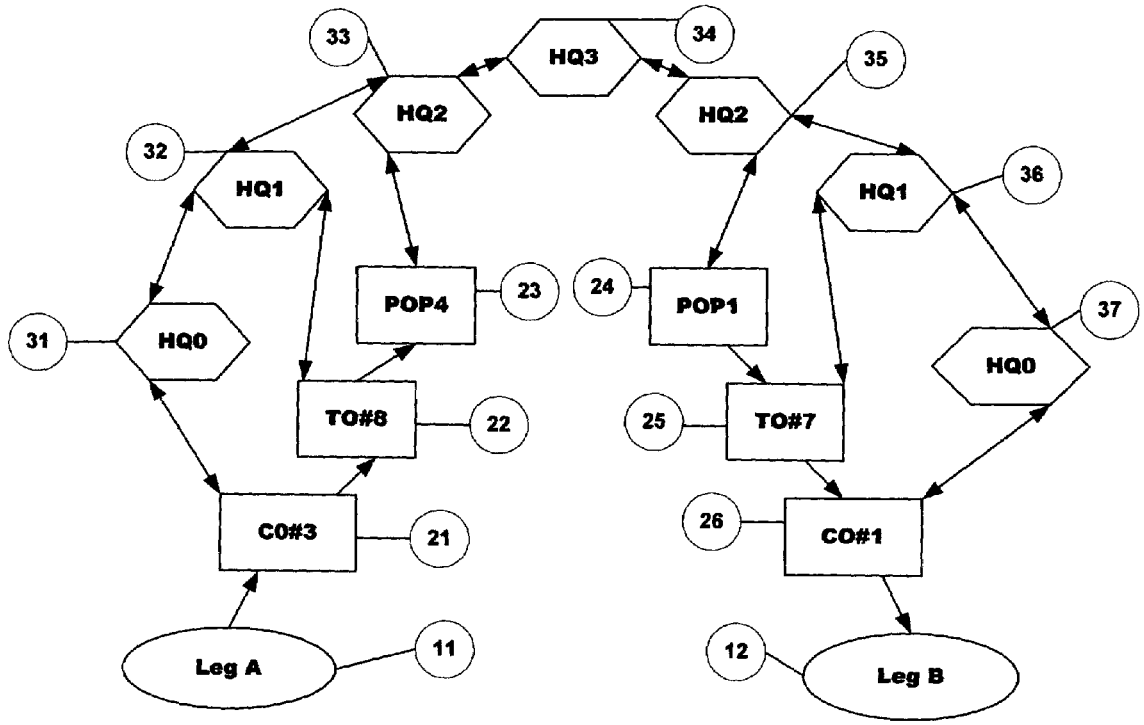
FIG. 31 Intra LATA Telco Call
Calling Party Leg A
305-948-1234
NPA-NXX-EXTN
Called Party Leg B
954-338-5678
NPA-NXX-EXTN
305-9490001
Miami
HQ6 to HQ9     1111
HQ5 BST        1
HQ4 Florida    1
HQ3 S. Fla     3
HQ2            4
HQ1            8
Leg A is 11111134803
407 671 9999
Orlando
"Bellsouth stamp"
HQ5            1
HQ4            1
HQ3            3
HQ2            1
HQ1            7
Leg B is 11111131701
Vector CDR 113-4803-1701 or 1111113-4803-1701

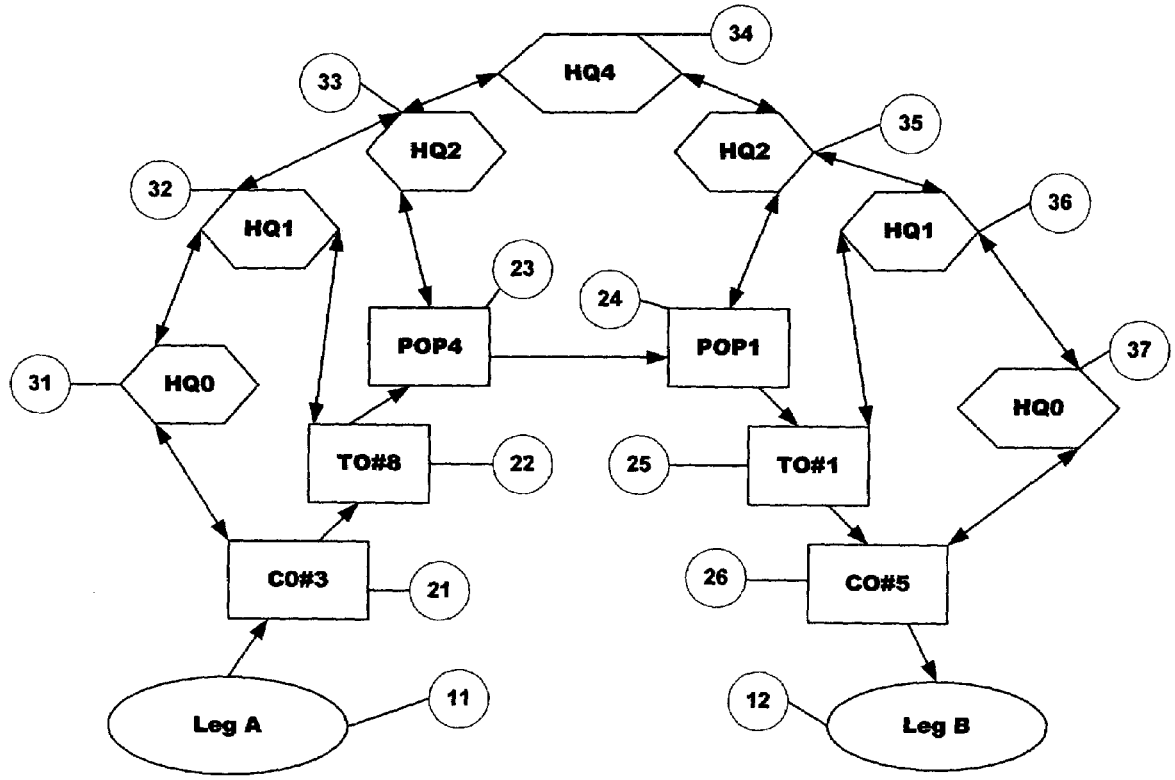
FIG. 32 Intra Regional Telco Call

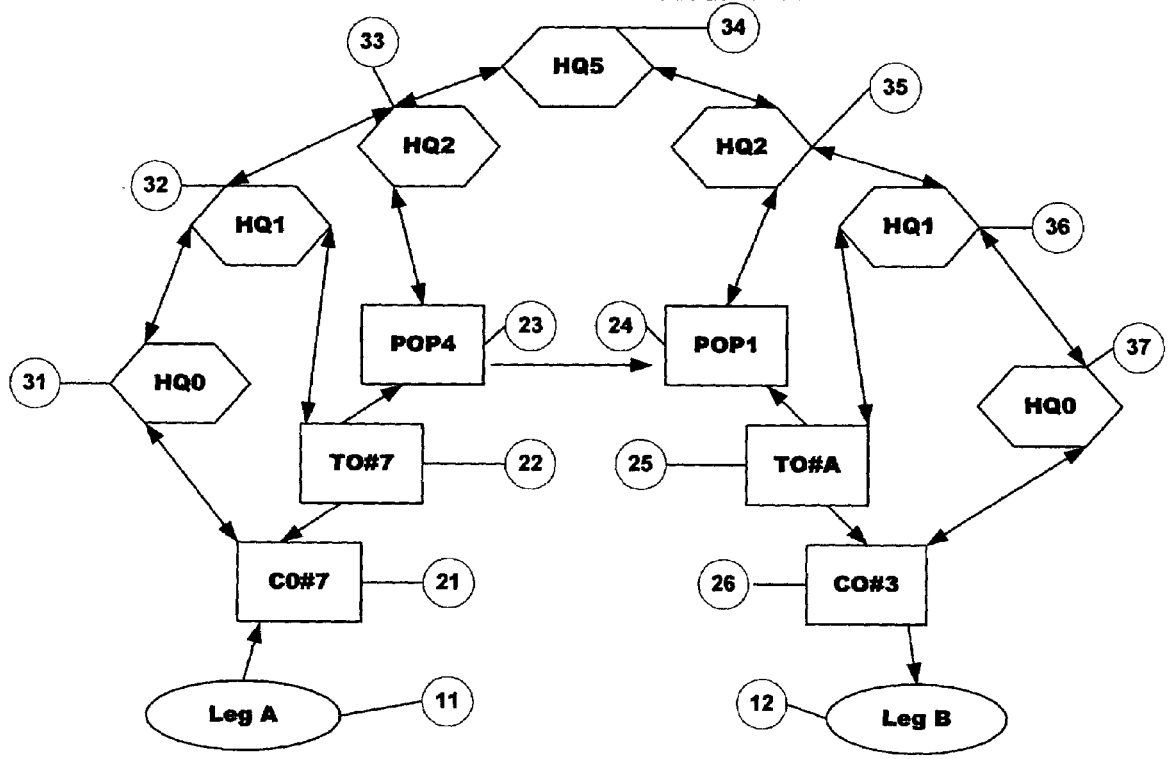
FIG. 33 Inter Regional Telco Call
305-525-0001
Miami
| | |
|---|---|
| HQ6 to HQ9 | 1111 |
| HQ5 BST | 1 |
| HQ4 Florida | 1 |
| HQ3SFla | 3 |
| HQ2 | 4 |
| HQ1 | 7 |
Leg A is <u>11111</u>134707
904-777-1234
Atlanta
"Bellsouth stamp"
| | |
|---|---|
| HQ5 BST | 1 |
| HQ4 Georgia | 2 |
| HQ3 N Geo | 1 |
| HQ2 | 1 |
| HQ1 | A |
Leg B is <u>11111</u>211A03
Vector CDR 1-134707-211A03 or <u>11111</u>-134707-211A03

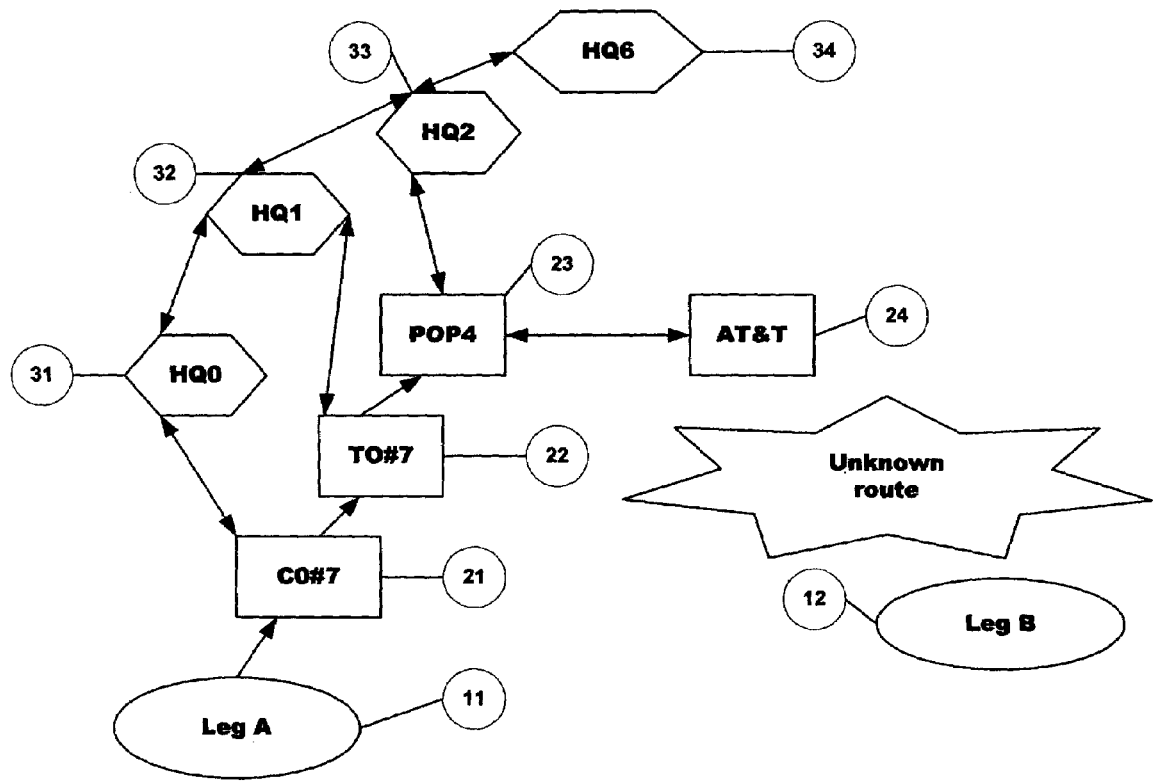
FIG. 34 International Telco Call
Calling Party Leg A
305-948-1234
NPA-NXX-EXTN
305 525 0001
Miami
HQ6 to HQ9    1111
HQ5 BST       1
HQ4 Florida   1
HQ3 S. Fla    3
HQ2           4
HQ1           7
Leg A is 11111134707
Vector CRD 11111134707
Called Party Leg B
011-5022-1324
INT-CC-EXTN
011502261324
Guatemala
"Bellsouth stamp"
HQ6   AT&T    1
Leg B is out of the domain.

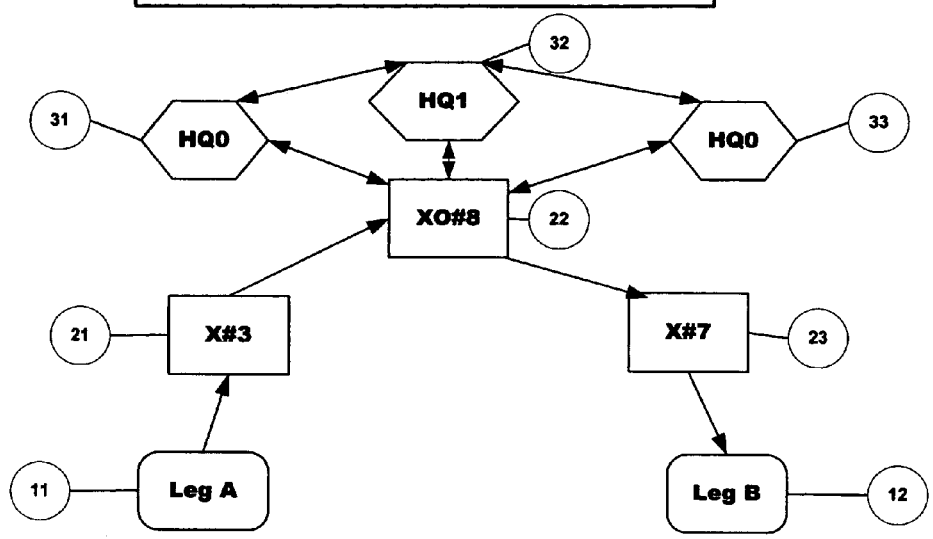
FIG. 35 Intra NXX Wireless Call
786-949-0001
HQ6 to HQ9                    2212
HQ5 BST                       1
HQ4 Florida                   1
HQ3 S. Fla                    3
HQ2                           4
HQ1                           8
Leg A is 22121134803
786-939-0001
"Cingular Wireless"
HQ5                           1
HQ4                           1
HQ3                           3
HQ2                           4
HQ1                           8
Leg B is 22121134807
CO 22121134803 initiates the call. CO 221211348 owns the call and generates the Vector CDR. 3 CDR must be correlated to make the billing entity.
Vector Magnitude looks like this 221211348 (Owner)
03 (Leg A CO ) 07 (Leg B CO) 221211348-03-07

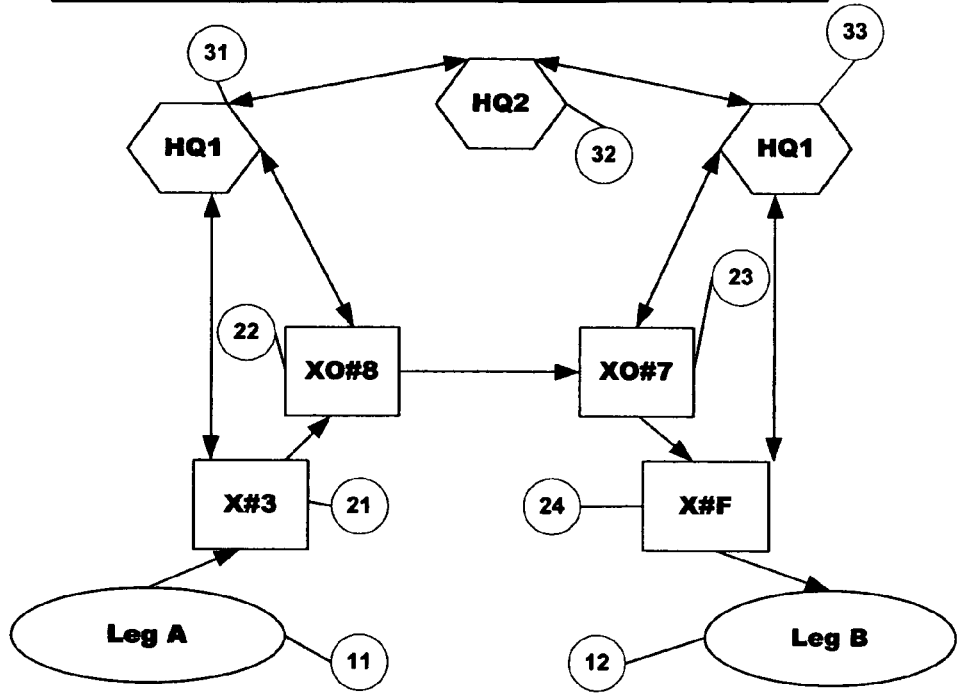
FIG. 36 Intra NPA Wireless Call
| 786-949-0001 | | 786-443-2354 | |
|---|---|---|---|
| North Miami Beach | | Coral Gables | |
| HQ6 to HQ9 | 2212 | "Cingular Wireless" | |
| HQ5 BST | 1 | HQ5 | 1 |
| HQ4 Florida | 1 | HQ4 | 1 |
| HQ3 S. Fla | 3 | HQ3 | 3 |
| HQ2 Miami | 4 | HQ2 | 4 |
| HQ1 | 8 | HQ1 | 7 |
| Leg A is 22121134803 | | Leg B is 2212113470F | |
CO 22121134803 initiates the call. CO 22121134 owns the call and generates the Vector CDR. HQ2. At least 4 CDR must be correlated to make the billing entity.
Vector Magnitude looks like this: 22121134 (Owner) 803 (Leg A CO) 70F (Leg B CO) 22121134-803-70F

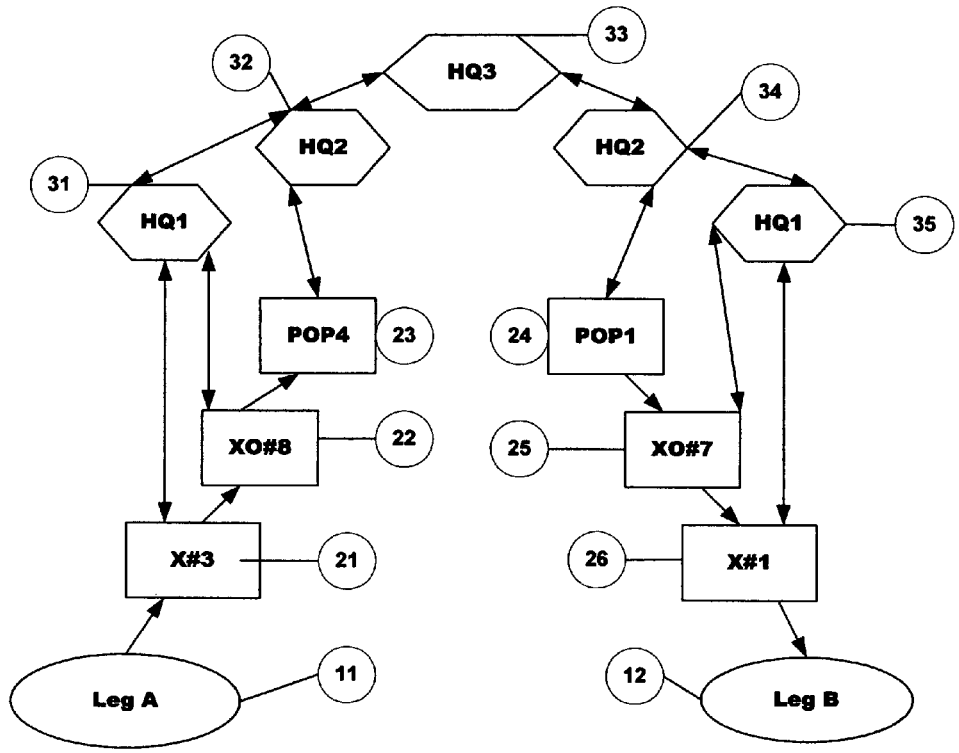
FIG. 37 Intra LATA Wireless Call
786-9490001
Miami
HQ6 to HQ9    2212
HQ5 BST       1
HQ4 Florida   1
HQ3 S. Fla    3
HQ2           4
HQ1           8
Leg A is 22121134803
407 671 9999
Orlando
"Cingular Wireless"
HQ5           1
HQ4           1
HQ3           3
HQ2           1
HQ1           7
Leg B is 22121131701
CO 22121134803 initiates the call. CO 2212113 owns the call and generates the Vector CDR. HQ3. At least 6 CDR must be correlated to make the billing entity.
Vector Magnitude looks like this: 2212113 (Owner) 4803 (Leg A CO) 1701 (Leg B CO) 2212113-4803-1701

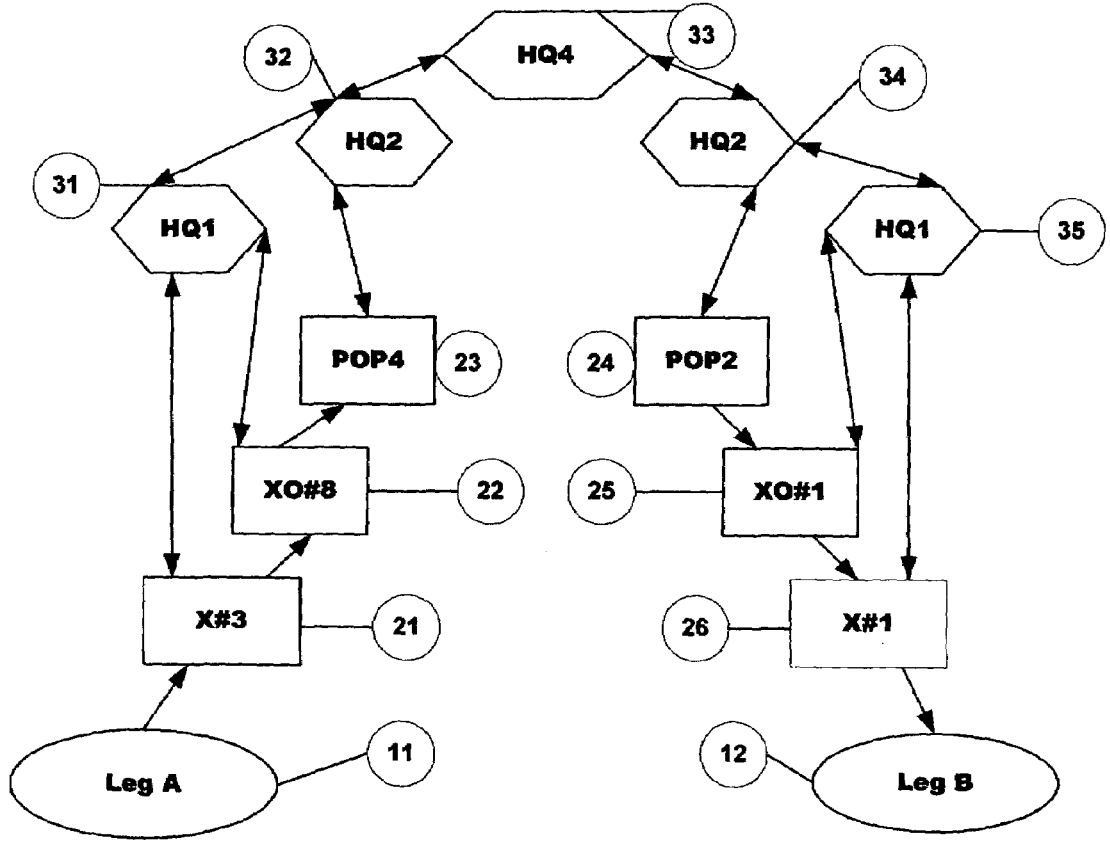
FIG. 38 Intra Regional Wireless Call
786-949-0001
Miami
| | |
|---|---|
| HQ6 to HQ9 | 2212 |
| HQ5 BST | 1 |
| HQ4 Florida | 1 |
| HQ3 | 3 |
| HQ2 | 4 |
| HQ1 | 8 |
Leg A is <u>22121</u>134803
904-671-9999
Jacksonville
"Cingular Wireless"
| | |
|---|---|
| HQ5 | 1 |
| HQ4 | 1 |
| HQ3 | 2 |
| HQ2 | 1 |
| HQ1 | 1 |
Leg B is <u>22121</u>121105
CO <u>22121</u>134803 initiates the call. CO 11 owns the call and generates the Vector CDR. HQ4. At least 6 CDR must be correlated to make the billing entity.
Vector Magnitude looks like this: <u>221211</u> (Owner) 34803 (Leg A CO) 21105 (Leg B CO) <u>22121</u>1-34803-21105

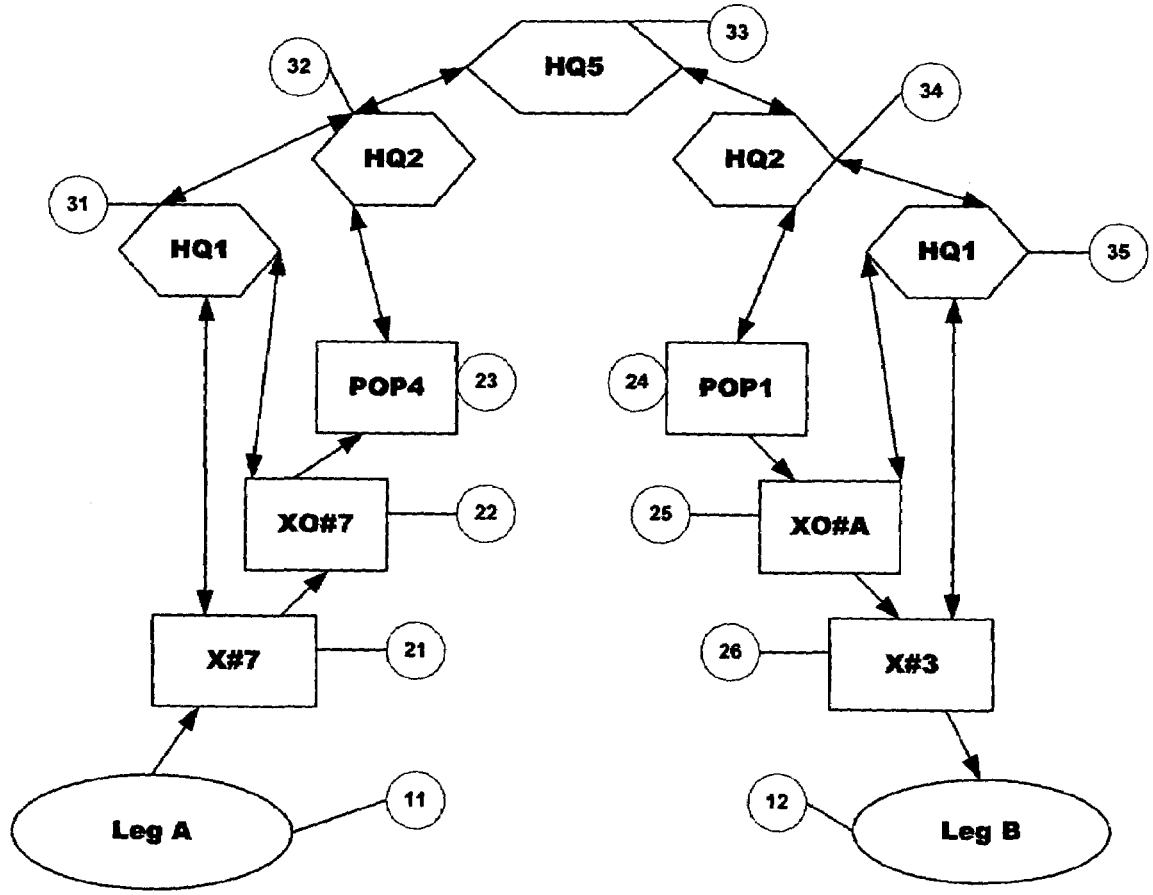
FIG. 39 Inter Regional Wireless Call
| 786-525-0001 | | 404-777-1234 | |
|---|---|---|---|
| Miami | | Atlanta | |
| HQ6 to HQ9 | 2212 | "Cingular" | |
| HQ5 BST | 1 | HQ5 BST | 1 |
| HQ4 Florida | 1 | HQ4 Georgia | 2 |
| HQ3SFla | 3 | HQ3 N Geo | 1 |
| HQ2 | 4 | HQ2 | 1 |
| HQ1 | 7 | HQ1 | A |
| Leg A is 22121134707 | | Leg B is 22121211A03 | |
Vector CDR 1-134707-211A03 or 22121-134707-211A03

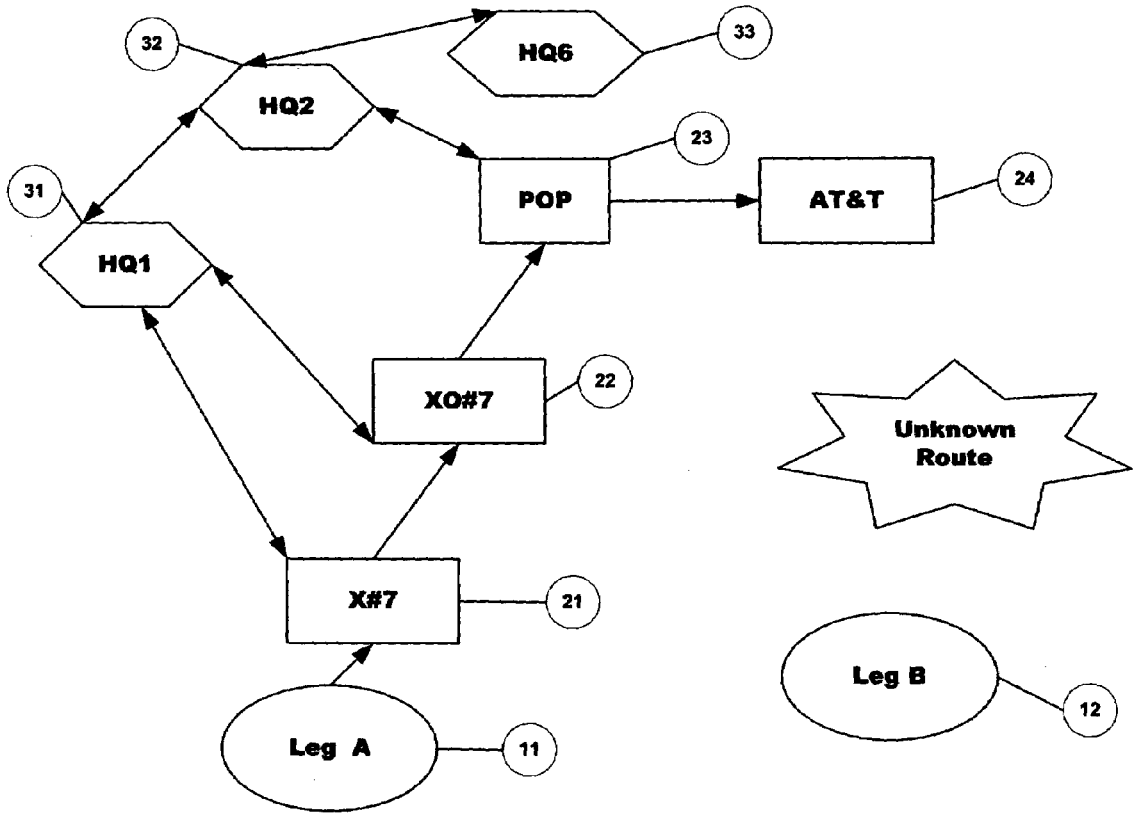

FIG. 40 International Wireless Call

| | | | |
|---|---|---|---|
| 786 525 0001 | | 011502261324 | |
| Miami | | Guatemala | |
| HQ6 to HQ9 | 2212 | "Cingular Wireless" | |
| HQ5 BST | 1 | HQ6 AT&T | 1 |
| HQ4 Florida | 1 | | |
| HQ3 S. Fla | 3 | | |
| HQ2 | 4 | | |
| HQ1 | 7 | | |

Leg A is 22121134707          Leg B is out of the domain.

CO 22121134707 initiates the call. HQ6* owns the call and Generates the Vector CDR. At least 3 CDR must be correlated to make the billing entity.##### International ### Regional (CLEC) # Local (CLEC). CLEC the subscriber belongs to another network.
Vector Magnitude looks like this: 1 (Owner) 2212~1134707

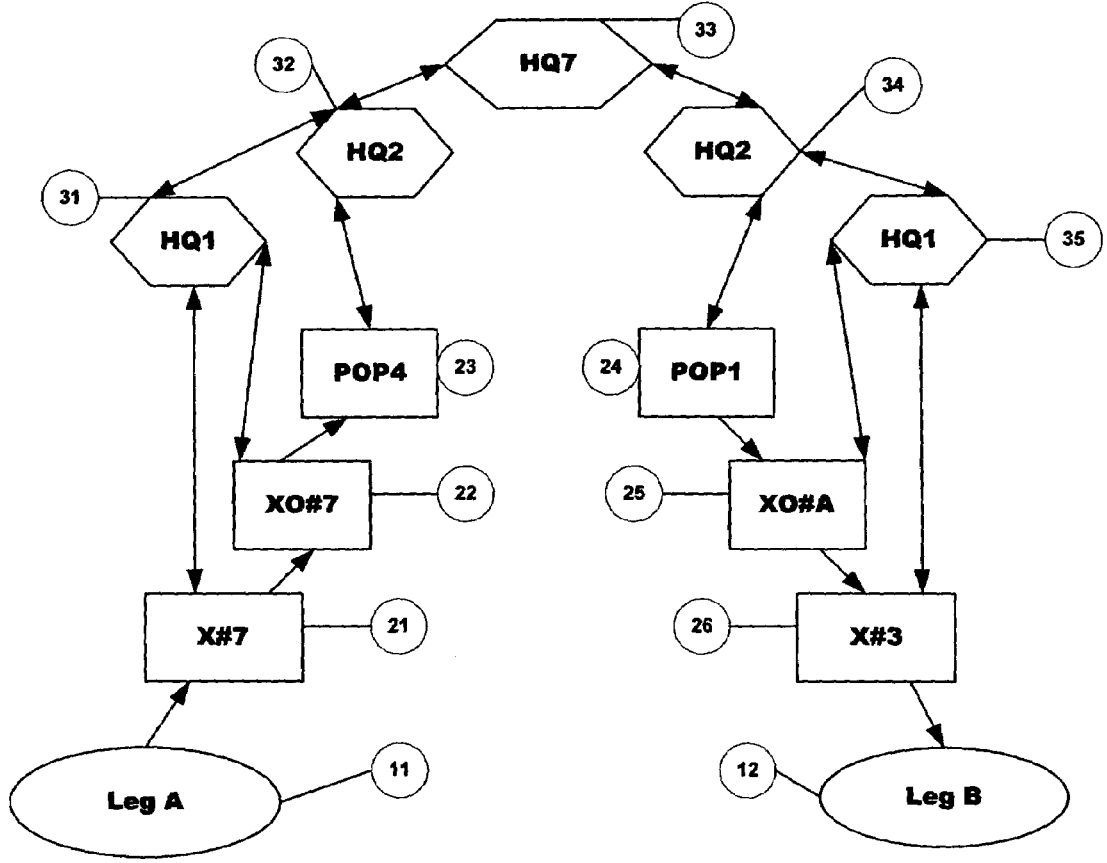
FIG. 41 Inter ILEC Wireless Call
| | | | |
|---|---|---|---|
| 786-525-0001 | | 212-777-1234 | |
| Miami | | NYC | |
| HQ6 to HQ9 | 2212 | "Cingular Wireless-BST" | |
| HQ6 to HQ9 | 2214 | "Cingular Wireless-BA" | |
| HQ5 | 1 | HQ5 | 3 |
| HQ4 Florida | 1 | HQ4 NY | 2 |
| HQ3SFla | 3 | HQ3 NYC | 1 |
| HQ2 | 4 | HQ2 | 1 |
| HQ1 | 7 | HQ1 | A |
| Leg A is 22121134707 | | Leg B is 2214 3211A03 | |
Vector CDR 221-21134707-43211A03

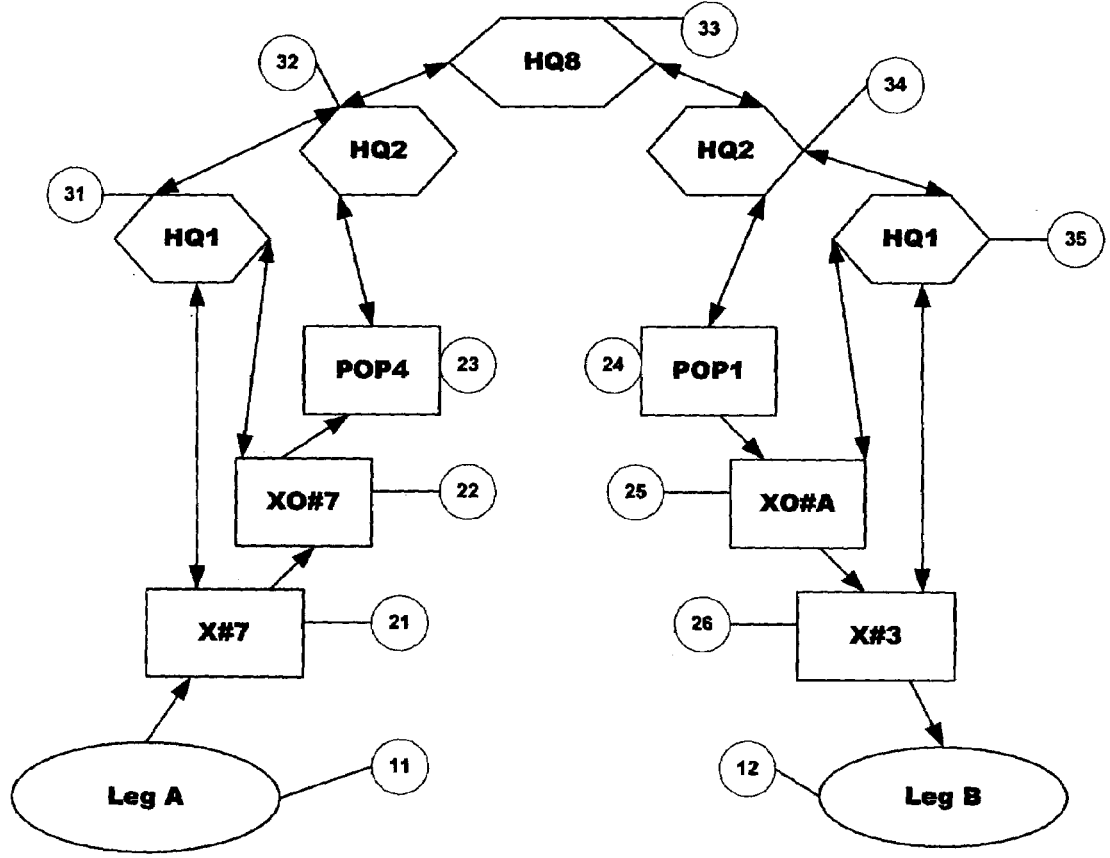
FIG. 42 Intra USA Wireless Call
768-525-0001
Miami
| HQ6 to HQ9 | 2212 |
| HQ6 to HQ9 | 2284 |
| HQ5 to HQ7 BST | 1 |
| HQ4 Florida | 1 |
| HQ3 SFla | 3 |
| HQ2 | 4 |
| HQ1 | 7 |
Leg A is <u>2212</u>1134707
405-555-1234
Los Angeles
     "Cingular Wireless-BST"
     "Cingular Wireless-PB"
| HQ5 | 3 |
| HQ4 California | 2 |
| HQ3 LAX | 1 |
| HQ2 | 1 |
| HQ1 | A |
Leg B is <u>2284</u>3211A03
Vector CDR <u>22</u>-<u>121134707</u>- <u>843211A03</u>

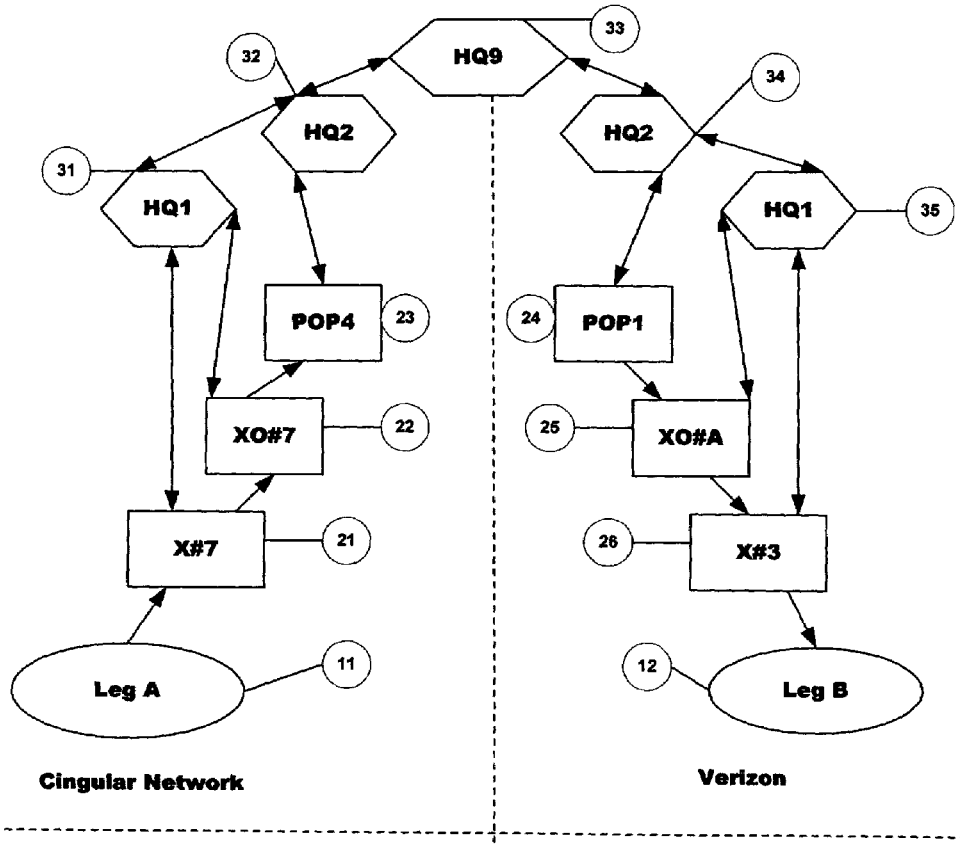
FIG. 43 Inter USA Wireless Call
| 786-525-0001 | | 405-555-1234 | |
|---|---|---|---|
| Miami | | LAX | |
| HQ6 to HQ9 | 2212 | "Cingular Wireless-BST" | |
| HQ6 to HQ9 | 2384 | "Verizon-PB" | |
| HQ5 | 1 | HQ5 to HQ7 PB | 3 |
| HQ4 Florida | 1 | HQ4 California | 2 |
| HQ3SFla | 3 | HQ3 LAX | 1 |
| HQ2 | 4 | HQ2 | 1 |
| HQ1 | 7 | HQ1 | A |
| Leg A is <u>2212</u>1134707 | | Leg B is <u>2384</u>3211A03 | |
Vector CDR 2-2121134707- 3843211A03

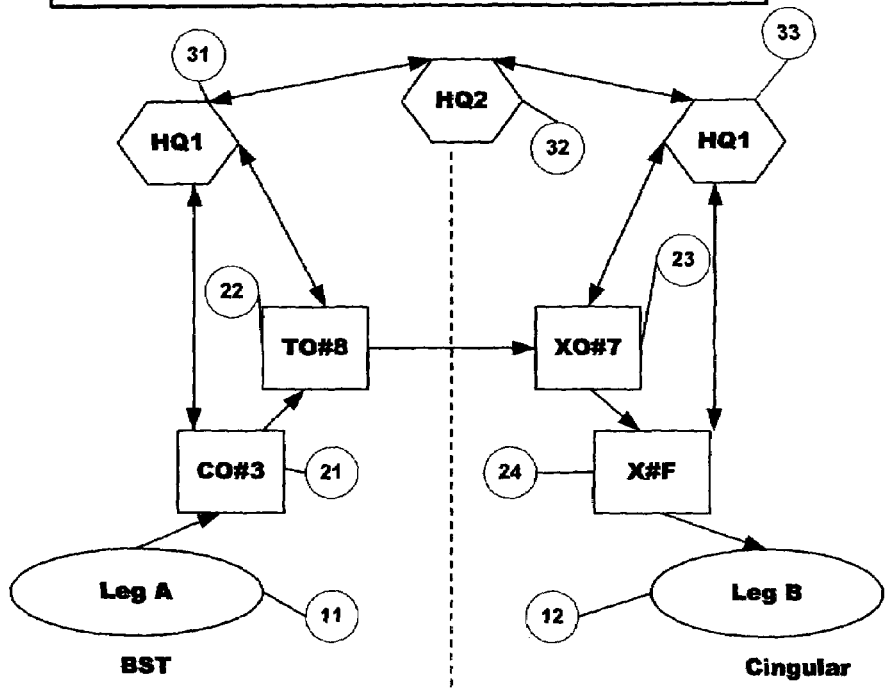
FIG. 44 Intra NPA Telco / Wireless Call
```
305-949-0001                        786- 443-2354
North Miami Beach                   Coral Gables
HQ6 to HQ6         2211             Cingular-BST
HQ6 to HQ9         1112             Bellsouth
HQ5                1                HQ5           1
HQ4 Florida        1                HQ4           1
HQ3SFla            3                HQ3           3
HQ2                4                HQ2           4
HQ1                8                HQ1           7
Leg A is 11121134803                Leg B is 2211113470F
```
CO 11121134803 initiates the call. CO 11121134 owns the call and generates the Vector CDR. HQ2. At least 4 CDR must be correlated to make the billing entity.
Vector Magnitude looks like this: 11121134 (Owner) 803 (Leg A CO) 70F (Leg B CO) 11121134-803-70F

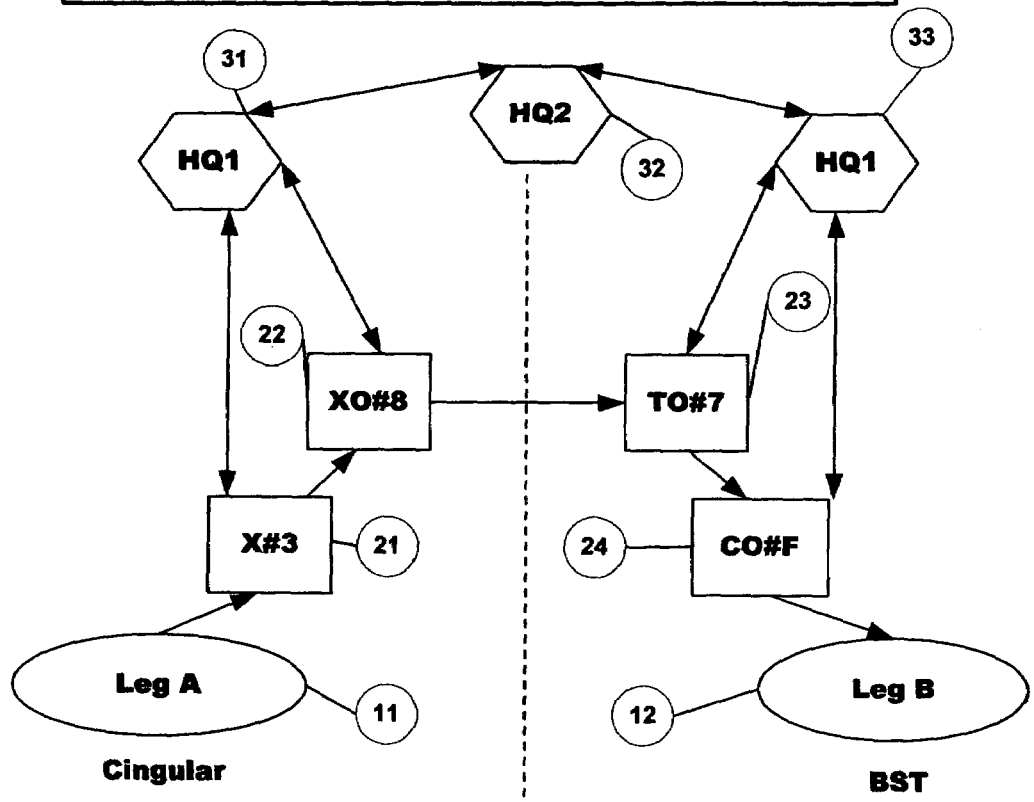
FIG. 45 Intra NPA Wireless / Telco Call
| 786-949-0001 | | 305- 443-2354 | |
|---|---|---|---|
| North Miami Beach | | Coral Gables | |
| HQ6 to HQ9 | 2211 | "Cingular Wireless" | |
| HQ5 BST | 1 | HQ5 | 1 |
| HQ4 Florida | 1 | HQ4 | 1 |
| HQ3 S. Fla | 3 | HQ3 | 3 |
| HQ2 Miami | 4 | HQ2 | 4 |
| HQ1 | 8 | HQ1 | 7 |
| Leg A is 22111134803 | | Leg B is 2211113470F | |
CO 22111134803 initiates the call. CO 22111134 owns the call and generates the Vector CDR. HQ2. At least 4 CDR must be correlated to make the billing entity.
Vector Magnitude looks like this: 22111134 (Owner) 803 (Leg A CO) 70F (Leg B CO) 22111134-803-70F

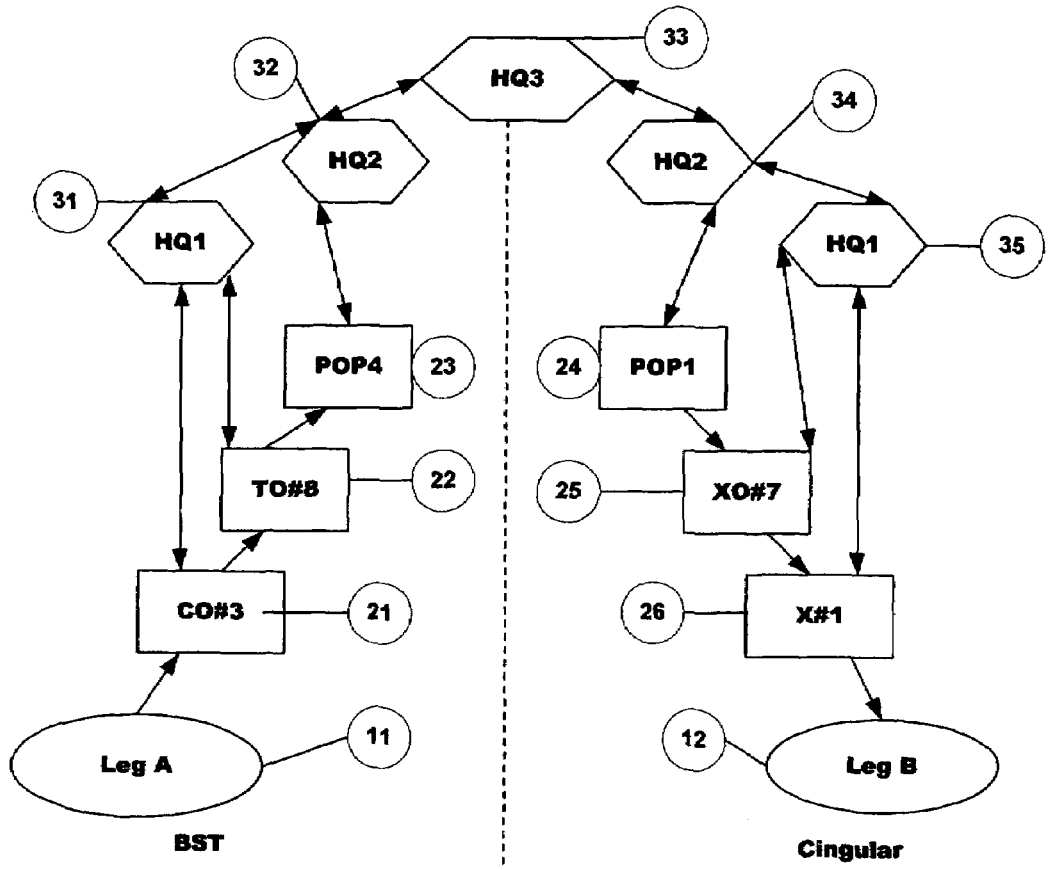
FIG. 46 Intra LATA Telco / Wireless Call
305-9490001
Miami
| HQ6 to HQ9 | 1112 |
| --- | --- |
| HQ5 BST | 1 |
| HQ4 Florida | 1 |
| HQ3 S. Fla | 3 |
| HQ2 | 4 |
| HQ1 | 8 |
Leg A is 11121134803
407 671 9999
Orlando
"BST"
| HQ5 | 1 |
| --- | --- |
| HQ4 | 1 |
| HQ3 | 3 |
| HQ2 | 1 |
| HQ1 | 7 |
Leg B is 11121131701
CO 11121134803 initiates the call. CO 1112113 owns the call and generates the Vector CDR. HQ3. At least 6 CDR must be correlated to make the billing entity.
Vector Magnitude looks like this: 1112113 (Owner) 4803 (Leg A CO) 1701 (Leg B CO) 1112113-4803-1701

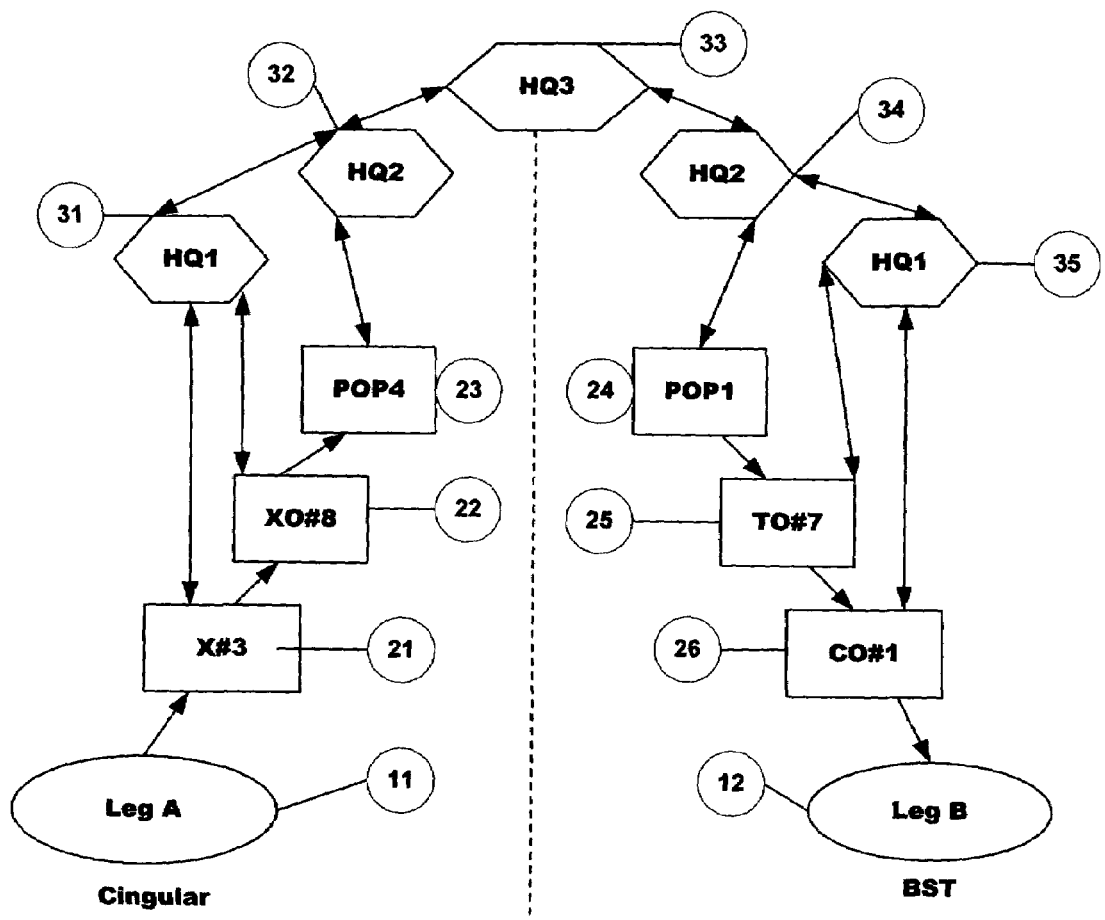
FIG. 47 Intra LATA Wireless / Telco Call
| Cingular | | BST | |
|---|---|---|---|
| 786-9490001 | | 407 671 9999 | |
| Miami | | Orlando | |
| HQ6 to HQ9 | 2211 | "Cingular" | |
| HQ5 BST | 1 | HQ5 | 1 |
| HQ4 Florida | 1 | HQ4 | 1 |
| HQ3 S. Fla | 3 | HQ3 | 3 |
| HQ2 | 4 | HQ2 | 1 |
| HQ1 | 8 | HQ1 | 7 |
| Leg A is 22111134803 | | Leg B is 22111131701 | |
CO 22111134803 initiates the call. CO 2211113 owns the call and generates the Vector CDR. HQ3. At least 6 CDR must be correlated to make the billing entity.
Vector Magnitude looks like this: 2211113 (Owner) 4803
(Leg A CO) 1701 (Leg B CO) 2211113-4803-1701

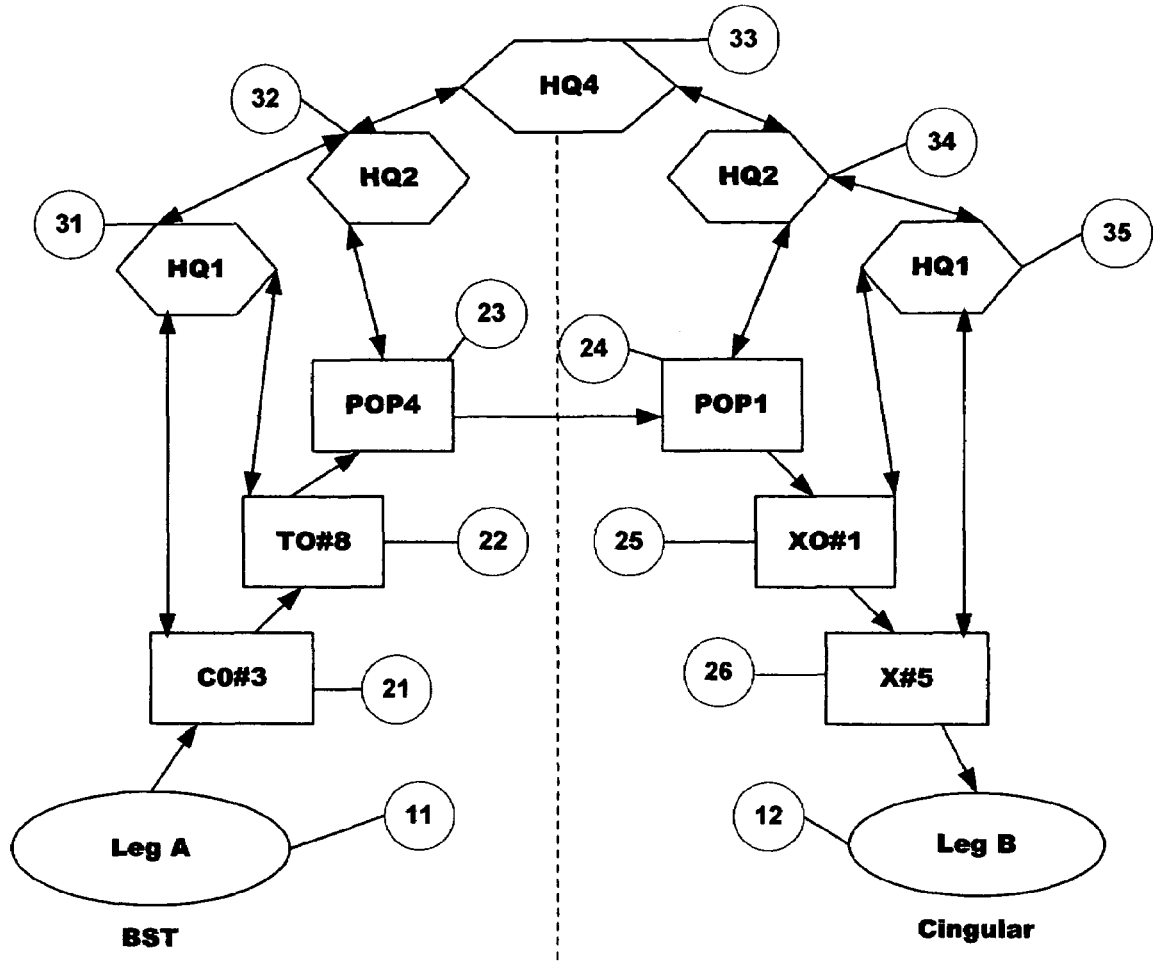
FIG. 48 Intra Regional Telco / Wireless Call
```
305-949-0001                904-671-9999
Miami                       Jacksonville
HQ6 to HQ9    1112          "Bellsouth"
HQ5 BST       1             HQ5              1
HQ4 Florida   1             HQ4              1
HQ3 S FL      3             HQ3 N FL         2
HQ2           4             HQ2              1
HQ1           8             HQ1              1
Leg A is 11121134803        Leg B is 11121121105
```
Vector CDR 111211-34803-21105 or 11-34803-21105

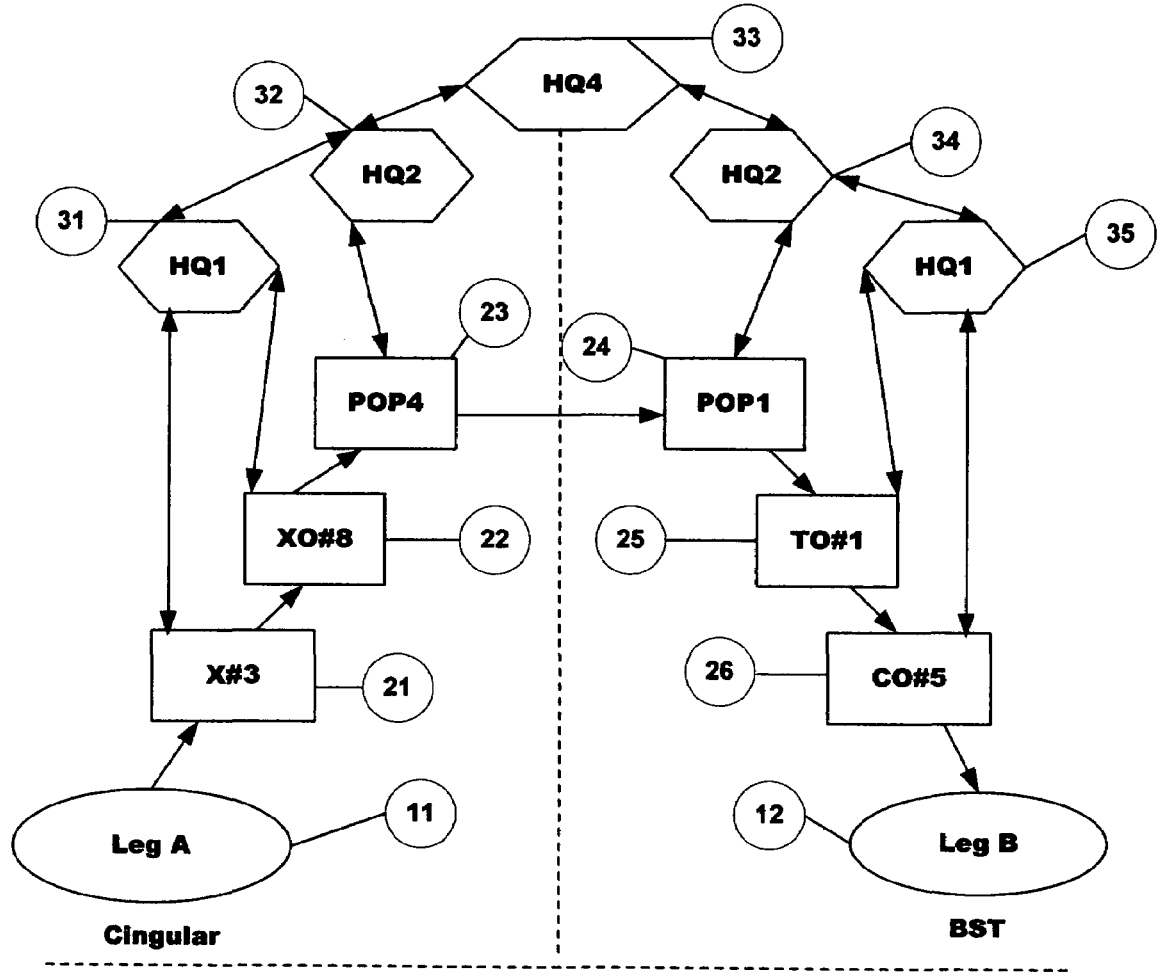
FIG. 49 Intra Regional Wireless / Telco Call
| | | | |
|---|---|---|---|
| 786-949-0001 | | 904-671-9999 | |
| Miami | | Jacksonville | |
| HQ6 to HQ9 | 2211 | "Cingular" | |
| HQ5 BST | 1 | HQ5 | 1 |
| HQ4 Florida | 1 | HQ4 | 1 |
| HQ3 | 3 | HQ3 | 2 |
| HQ2 | 4 | HQ2 | 1 |
| HQ1 | 8 | HQ1 | 1 |
| Leg A is 22111134803 | | Leg B is 22111121105 | |
Vector CDR 11-34803-21105 or 221111-34803-21105

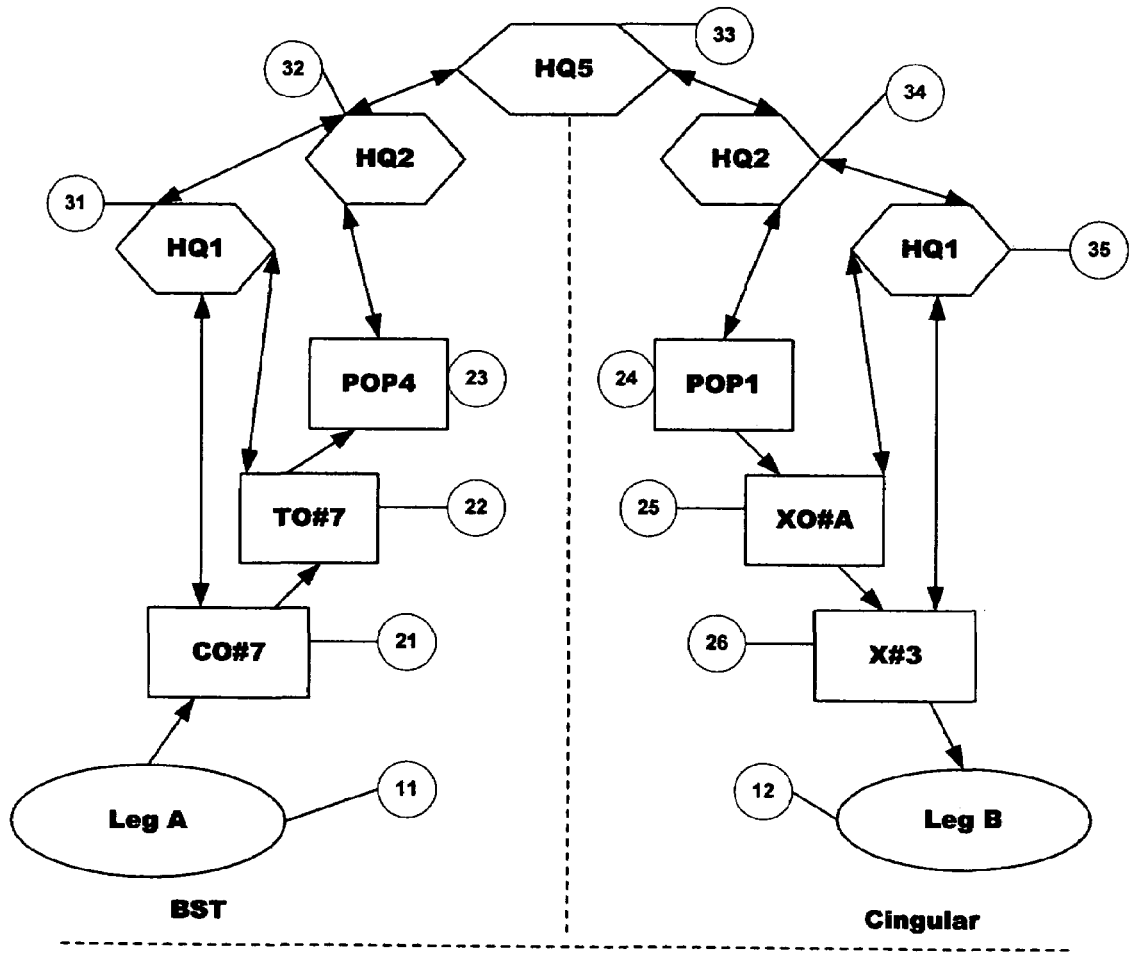
FIG. 50 Inter Regional Telco / Wireless Call
| 305-525-0001 | | 404-777-1234 | |
| --- | --- | --- | --- |
| Miami | | Atlanta | |
| HQ6 to HQ9 | 1112 | "Bellsouth" | |
| HQ5 BST | 1 | HQ5 BST | 1 |
| HQ4 Florida | 1 | HQ4 Georgia | 2 |
| HQ3 SFla | 3 | HQ3 N Geo | 1 |
| HQ2 | 4 | HQ2 | 1 |
| HQ1 | 7 | HQ1 | A |
| Leg A is 11121134707 | | Leg B is 11121211A03 | |
Vector CDR 1-134707-1211A03 or 11121-134707-1211A03

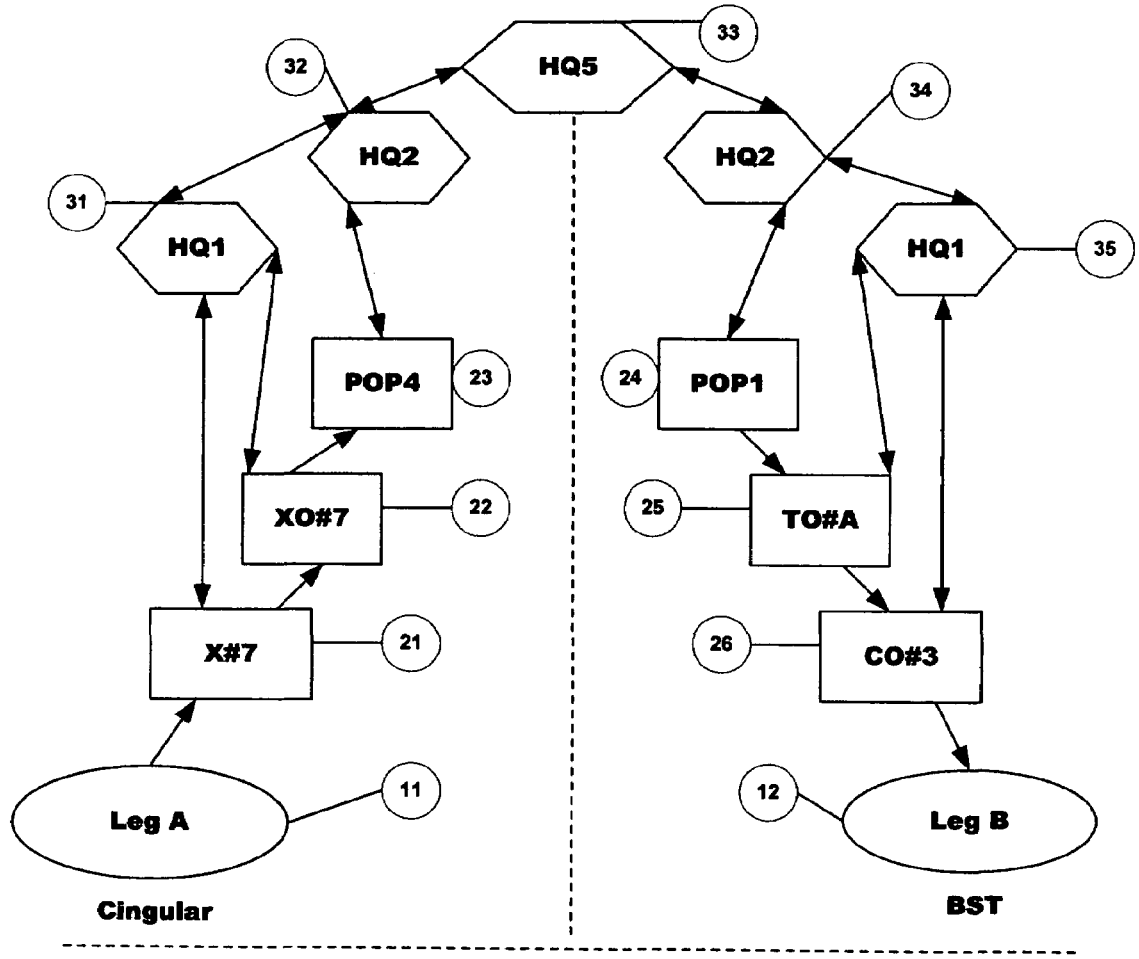
FIG. 51 Inter Regional Wireless / Telco Call
| 786-525-0001 | | 404-777-1234 | |
|---|---|---|---|
| Miami | | Atlanta | |
| HQ6 to HQ9 | 2211 | "Cingular" | |
| HQ5 BST | 1 | HQ5 BST | 1 |
| HQ4 Florida | 1 | HQ4 Georgia | 2 |
| HQ3SFla | 3 | HQ3 N Geo | 1 |
| HQ2 | 4 | HQ2 | 1 |
| HQ1 | 7 | HQ1 | A |
| Leg A is 22111134707 | | Leg B is 22111211A03 | |
Vector CDR 1-134707-211A03 or 22111-134707-211A03

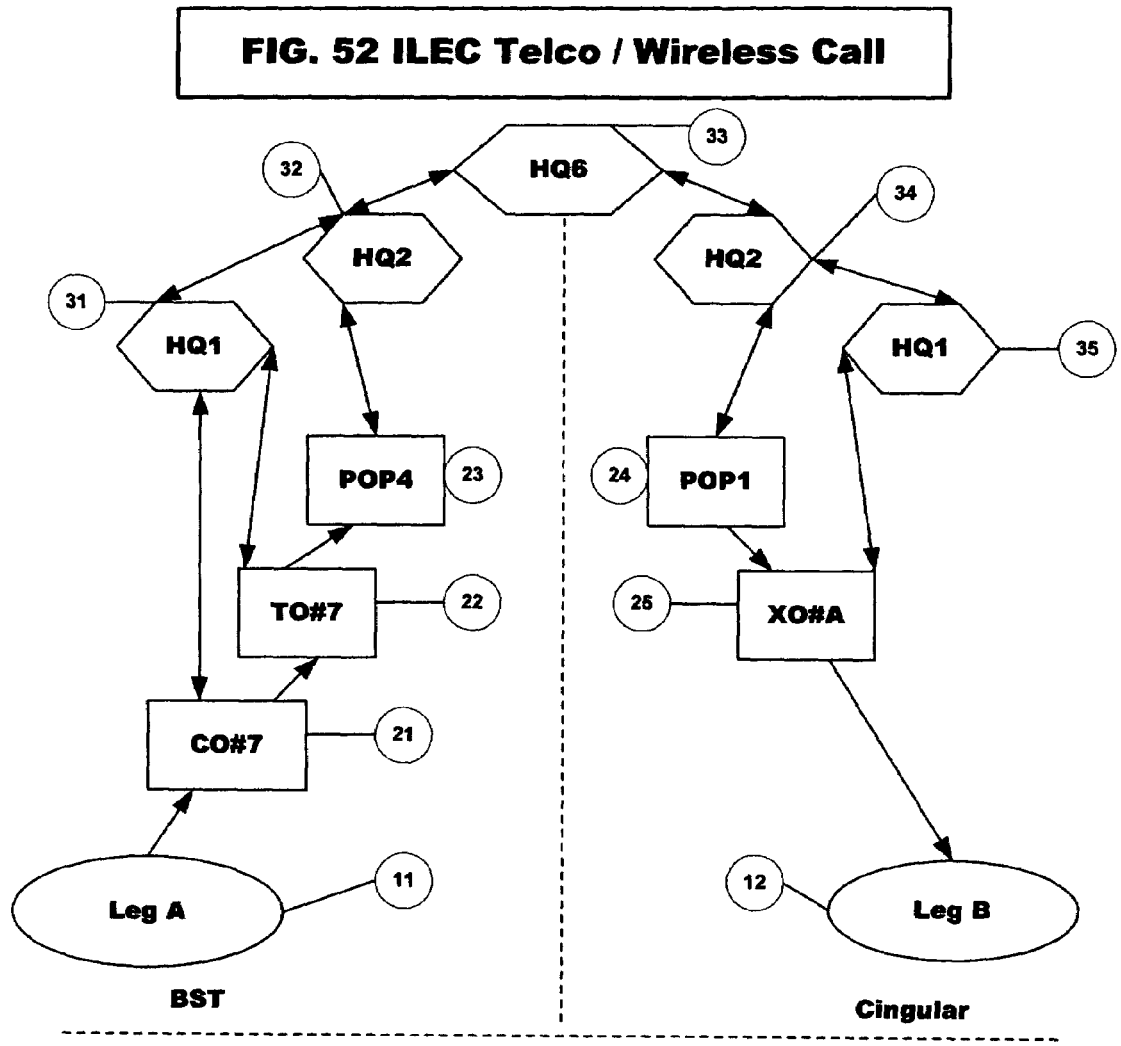
FIG. 52 ILEC Telco / Wireless Call
| | | | Roaming | |
|---|---|---|---|---|
| 305-525-0001 | | | 404-777-1234 | |
| Miami | | | Atlanta | |
| HQ6 to HQ9 | 2211 | | "Cingular" | |
| HQ6 to HQ9 | 1112 | | "Bellsouth" | |
| HQ5 BST | 1 | | HQ5 BST | 1 |
| HQ4 Florida | 1 | | HQ4 Georgia | 2 |
| HQ3SFla | 3 | | HQ3 N Geo | 1 |
| HQ2 | 4 | | HQ2 | 1 |
| HQ1 | 7 | | HQ1 | A |
| Leg A is <u>1112</u>1134707 | | | Leg B is <u>2211</u>1211A03 | |
Vector CDR <u>1112</u>-1134707-1211A03

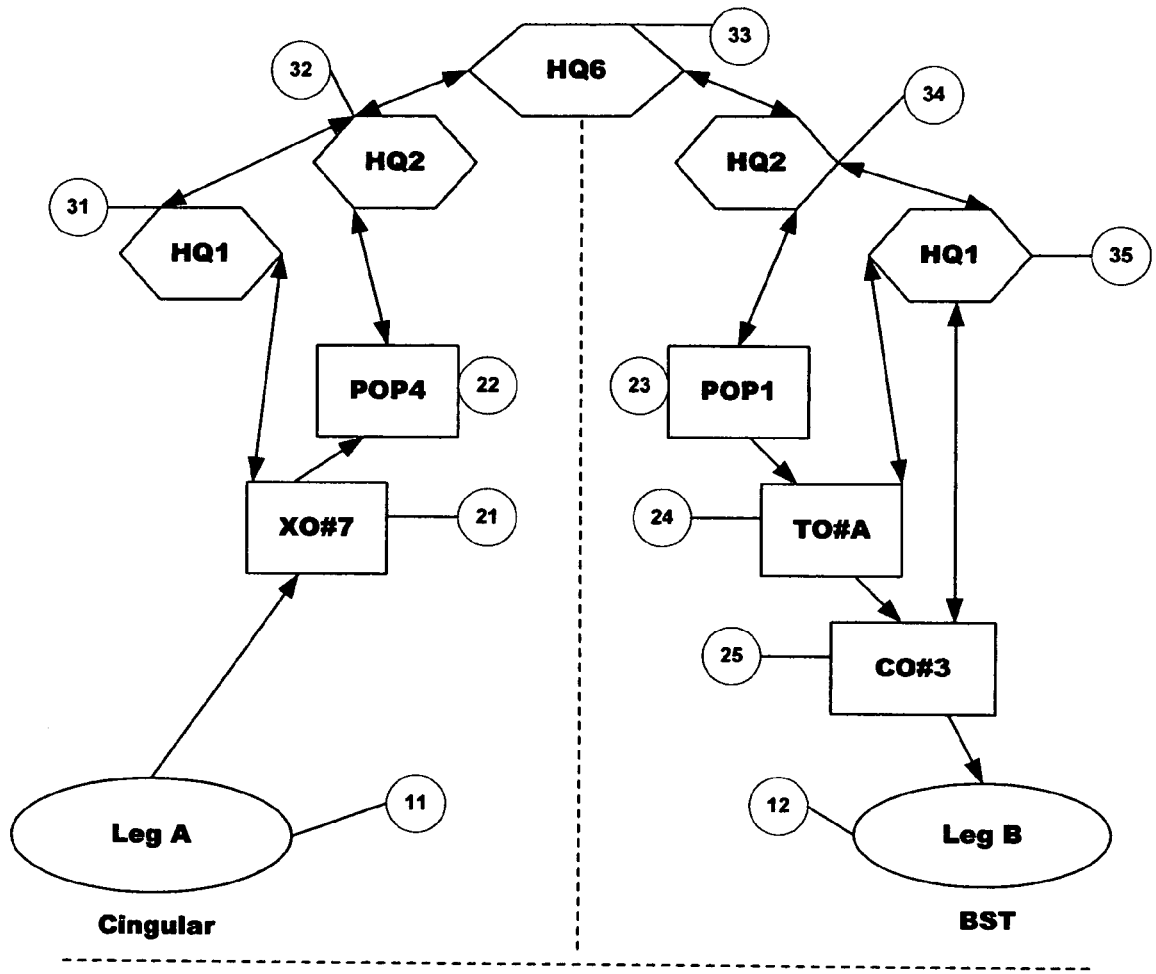
FIG. 53 ILEC Wireless / Telco Call
Cingular
BST
Roaming
786-525-0001
Miami
| | |
|---|---|
| HQ6 to HQ9 | 2211 |
| HQ5 BST | 1 |
| HQ4 Florida | 1 |
| HQ3SFla | 3 |
| HQ2 | 4 |
| HQ1 | 7 |
| Leg A is | 22111134707 |
404-777-1234
Atlanta
"Cingular"
| | |
|---|---|
| HQ5 BST | 1 |
| HQ4 Georgia | 2 |
| HQ3 N Geo | 1 |
| HQ2 | 1 |
| HQ1 | A |
| Leg B is | 22111211A03 |
Vector CDR 2211-1134707-1211A03

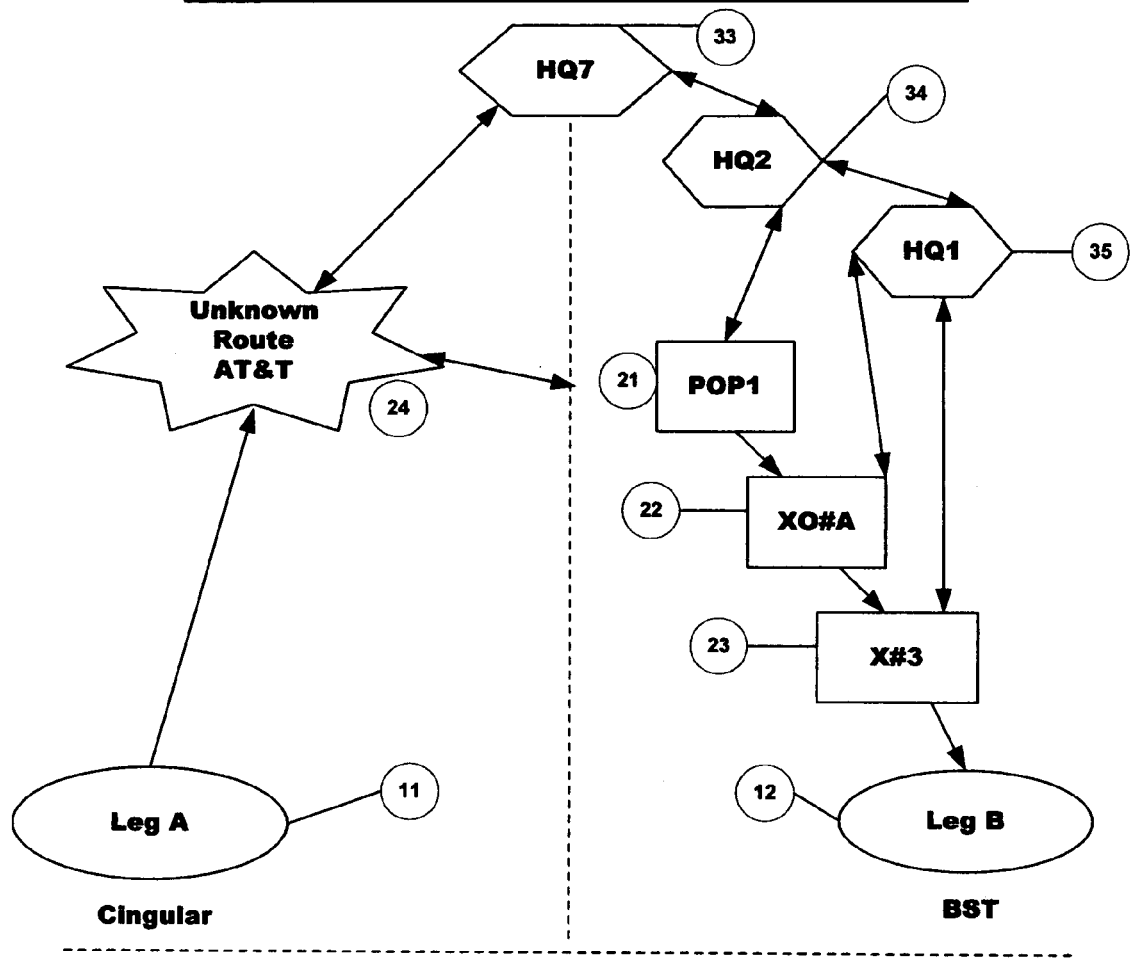
FIG. 54 Inter ILEC Telco / Wireless Call
| | | | |
|---|---|---|---|
| 305-525-0001 | | 212-777-1234 | |
| Miami | | NYC | |
| HQ6 to HQ9 | 1112 | BST | |
| HQ6 to HQ9 | 2214 | "Cingular-BA" | |
| HQ5 | 1 | HQ5 | 3 |
| HQ4 Florida | 1 | HQ4 NY | 2 |
| HQ3SFla | 3 | HQ3 NYC | 1 |
| HQ2 | 4 | HQ2 | 1 |
| HQ1 | 7 | HQ1 | A |
| Leg A is 11121134707 | | Leg B is 22143211A03 | |
Vector CDR 111/221-21134707- 43211A03

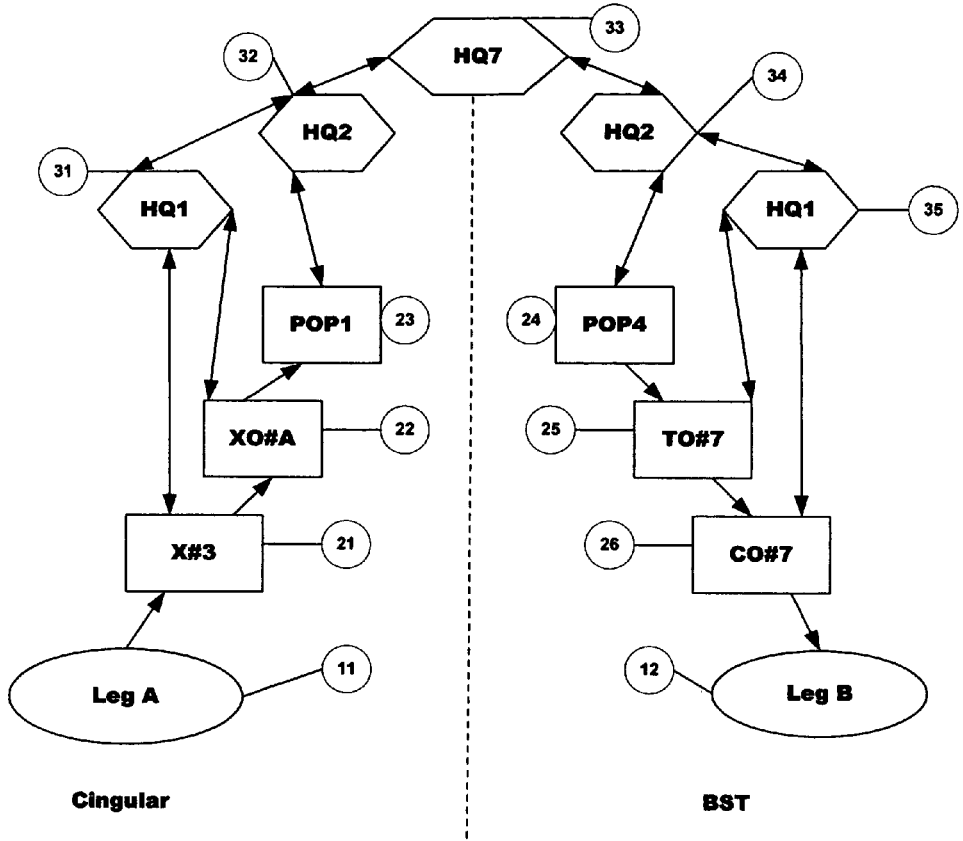
FIG. 55 Inter ILEC Wireless Call
212-777-1234
New York
HQ6 to HQ9    2213
HQ6 to HQ9    1112
HQ5 BA        3
HQ4 NY        2
HQ3 NYC       1
HQ2           1
HQ1           A
Leg A is 22133211A03
305-525-0001
Miami
"Cingular Wireless-BA"
"BST"
HQ5           1
HQ4 Florida   1
HQ3 SFla      3
HQ2           4
HQ1           7
Leg B is 11121134707
Vector CDR 221/111-33211A03-21134707

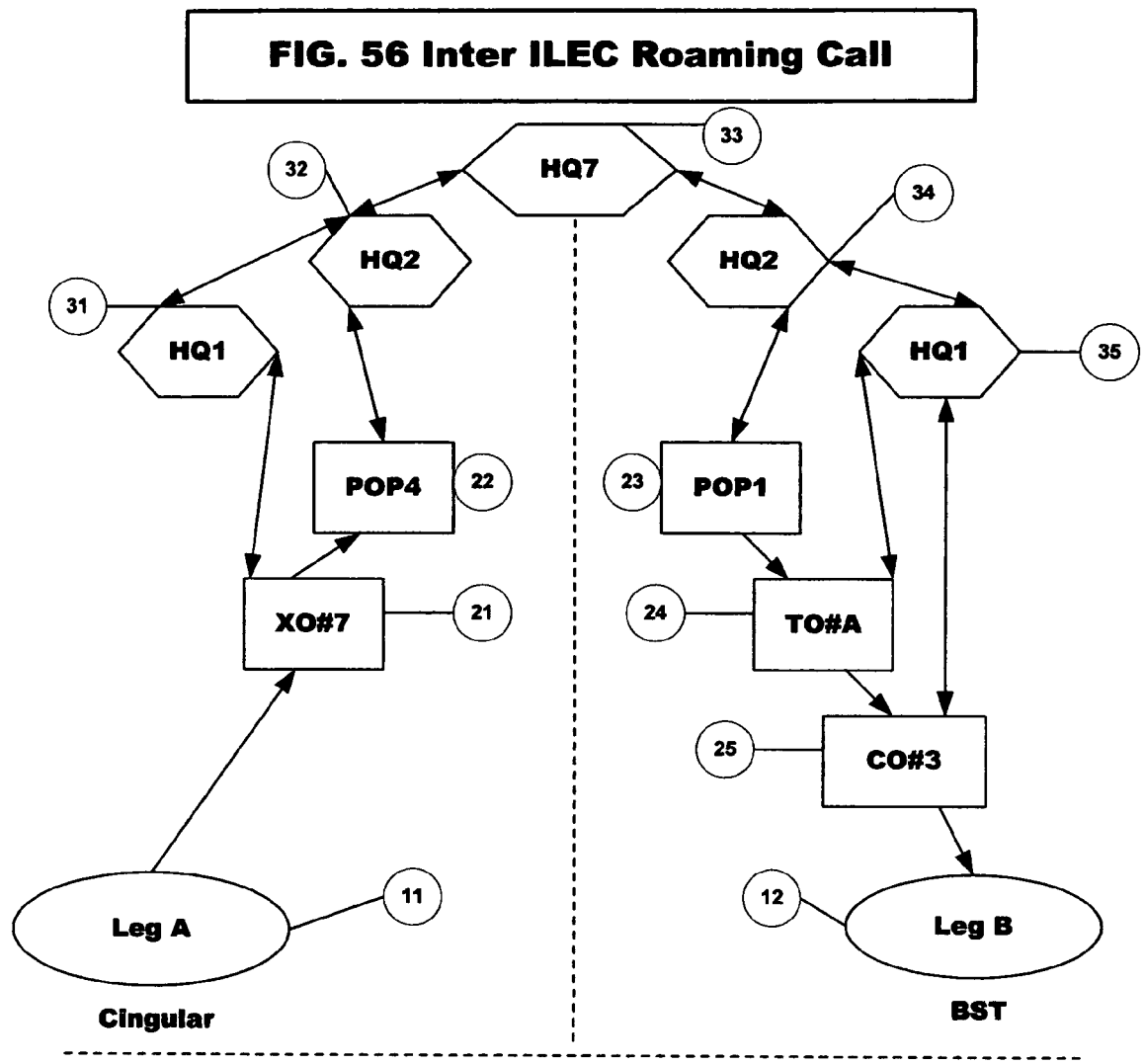
FIG. 56 Inter ILEC Roaming Call
Roaming
212-777-1234
New York
HQ6 to HQ9     3213
HQ6 to HQ9     1112
HQ5            3
HQ4 NY         2
HQ3 NYC        1
HQ2            1
HQ1            A
Leg A is 32133211A03
305-525-0001
Miami
Cingular Wireless Roaming
BST
HQ5            1
HQ4 Florida    1
HQ3 SFla       3
HQ2            4
HQ1            7
Leg B is 11121134707
Vector CDR 321/111-33211A03-21134707

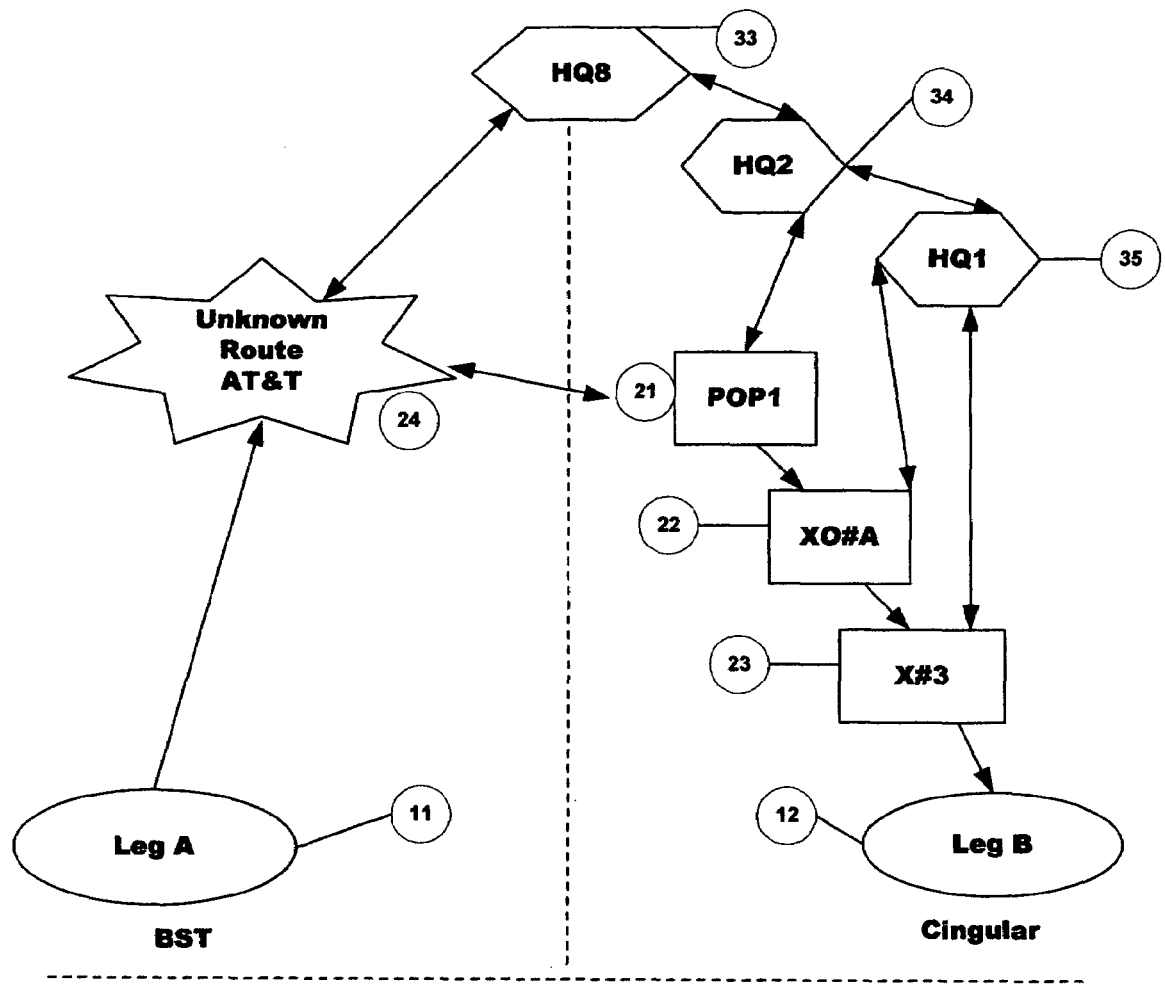
FIG. 57 Intra USA Telco / Wireless Call
| | | | |
|---|---|---|---|
| 305-525-0001 | | 405-555-1234 | |
| Miami | | Los Angeles | |
| HQ7 to HQ9 | 2384 | "Cingular" | |
| HQ7 to HQ9 | 1112 | "BST" | |
| HQ5 BST | 1 | HQ5 BA | 3 |
| HQ4 Florida | 1 | HQ4 California | 2 |
| HQ3SFla | 3 | HQ3LAX | 1 |
| HQ2 | 4 | HQ2 | 1 |
| HQ1 | 7 | HQ1 | A |
| Leg A is <u>11121134707</u> | | Leg B is <u>23843211A03</u> | |
Vector CDR <u>11/23</u>-<u>121134707</u>-<u>843211A03</u>

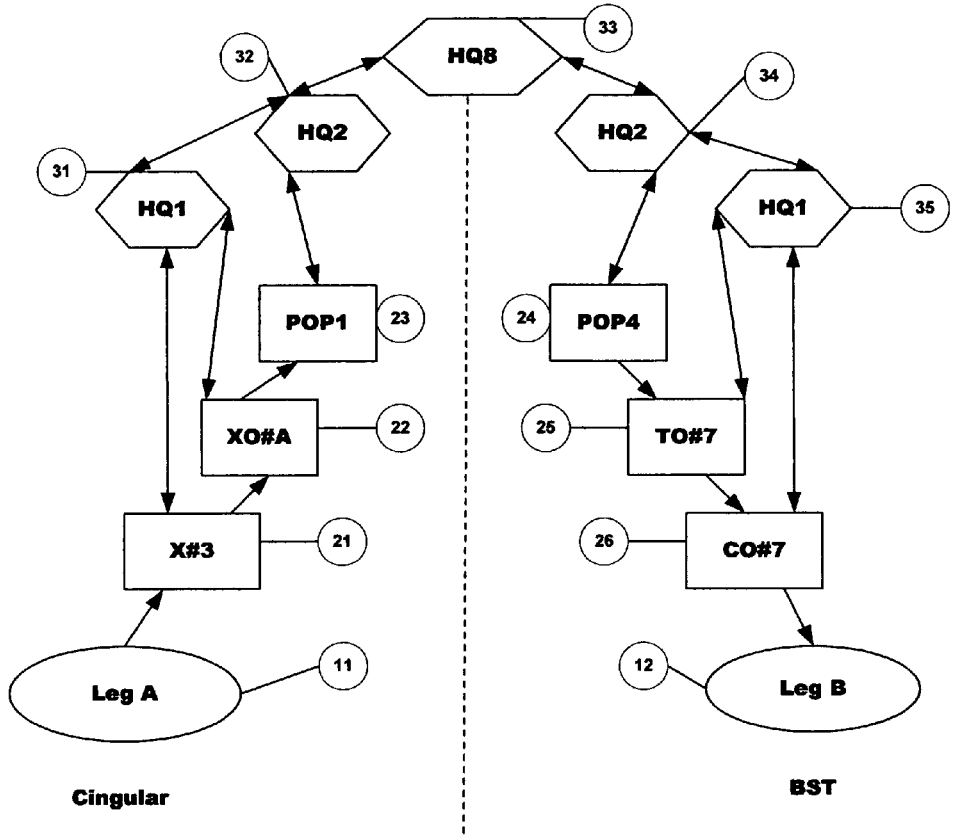
FIG. 58 Inter USA Wireless Call
405-555-1234
Los Angeles
HQ6 to HQ9    2384
HQ6 to HQ9    1112
HQ5           3
HQ4 California  2
HQ3 LAX       1
HQ2           1
HQ1           A
Leg A is 23843211A03
305-525-0001
Miami
"Cingular Wireless"
"BST"
HQ5 to HQ6 BST    1
HQ4 Florida       1
HQ3 SFla          3
HQ2               4
HQ1               7
Leg B is 11121134707
Vector CDR 23/11-843211A03-121134707

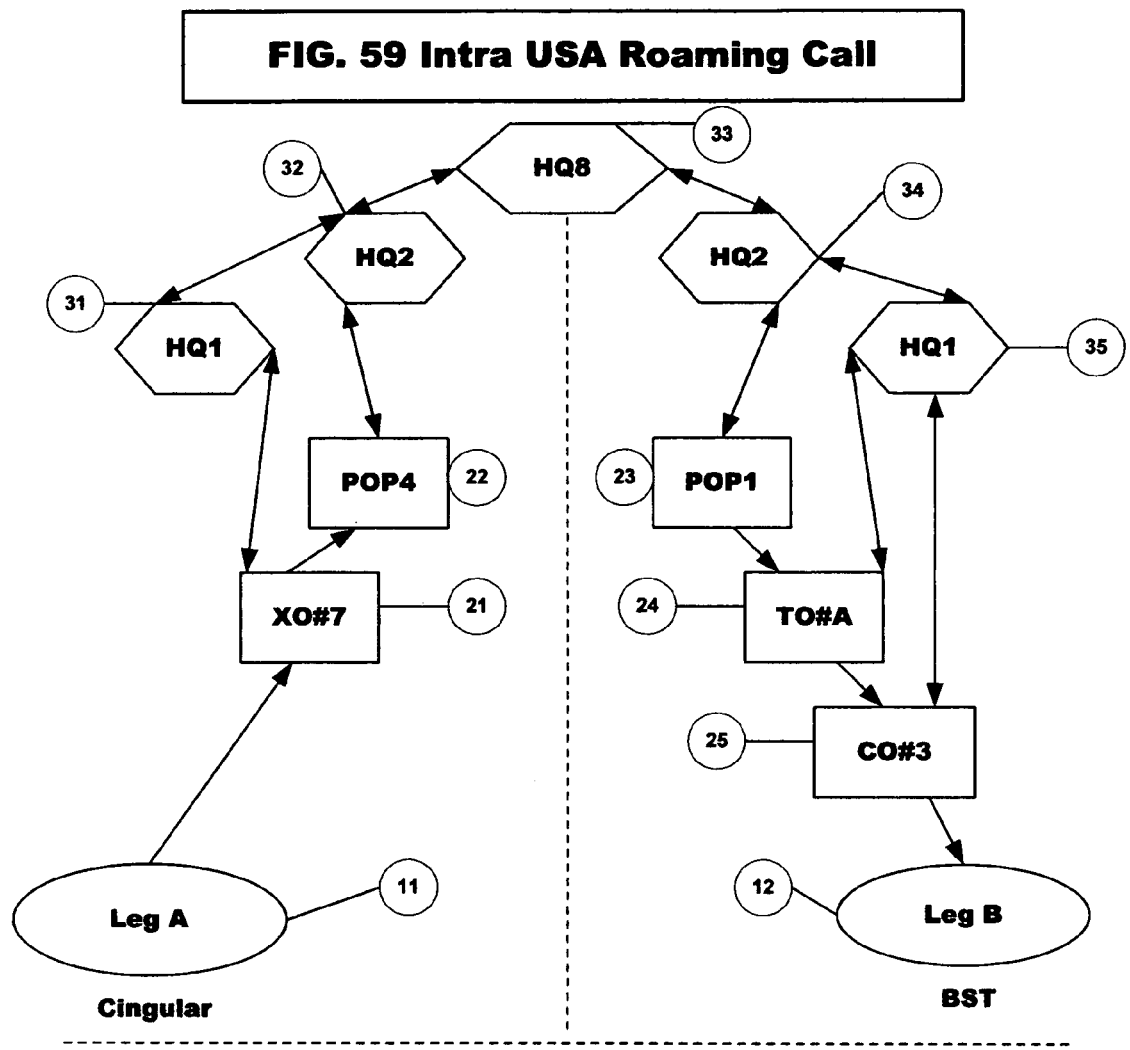
FIG. 59 Intra USA Roaming Call
| 405-555-1234 | | 305-525-0001 | |
|---|---|---|---|
| Los Angeles | | Miami | |
| HQ6 to HQ9 | 3384 | "Cingular Wireless" | |
| HQ6 to HQ9 | 1112 | "BST" | |
| HQ5 | 1 | HQ5 | 1 |
| HQ4 NY | 1 | HQ4 Florida | 1 |
| HQ3 NYC | 2 | HQ3 SFla | 3 |
| HQ2 | 5 | HQ2 | 4 |
| HQ1 | 8 | HQ1 | 7 |
| Leg A is 33841125807 | | Leg B is 11121134707 | |
Vector CDR 33/11-841125807-121134707

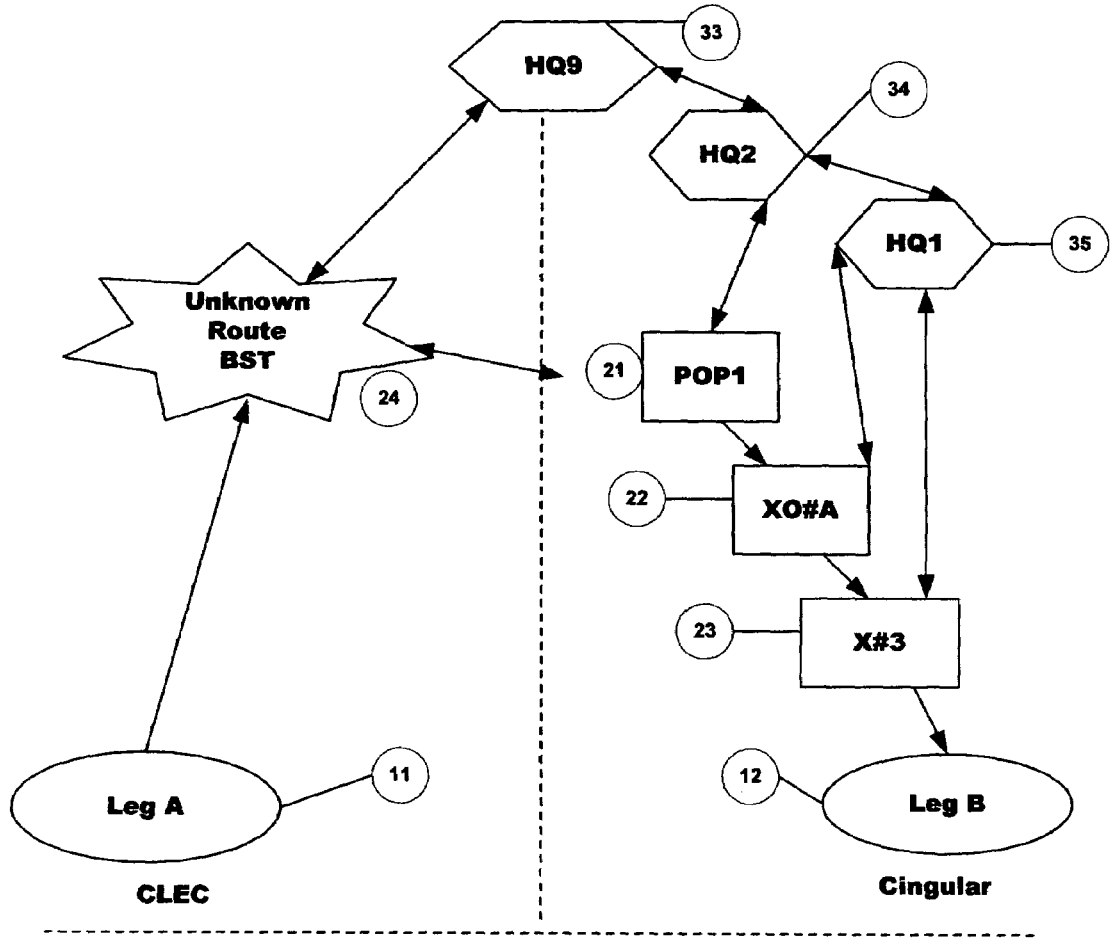
FIG. 60 Inter USA Telco / Wireless Call
| 305-525-0001 | | 405-555-1234 | |
|---|---|---|---|
| Miami | | Los Angeles | |
| HQ9 to HQ6 | 4112 | "CLEC" | |
| HQ9 to HQ6 | 2384 | "Cingular -PB" | |
| HQ5 BST | 1 | HQ5 PB | 3 |
| HQ4 Florida | 1 | HQ4 California | 2 |
| HQ3SFla | 3 | HQ3LAX | 1 |
| HQ2 | 4 | HQ2 | 1 |
| HQ1 | 7 | HQ1 | A |
| Leg A is 41121134707 | | Leg B is 23843211A03 | |
Vector CDR 4/2-1121134707-3843211A03

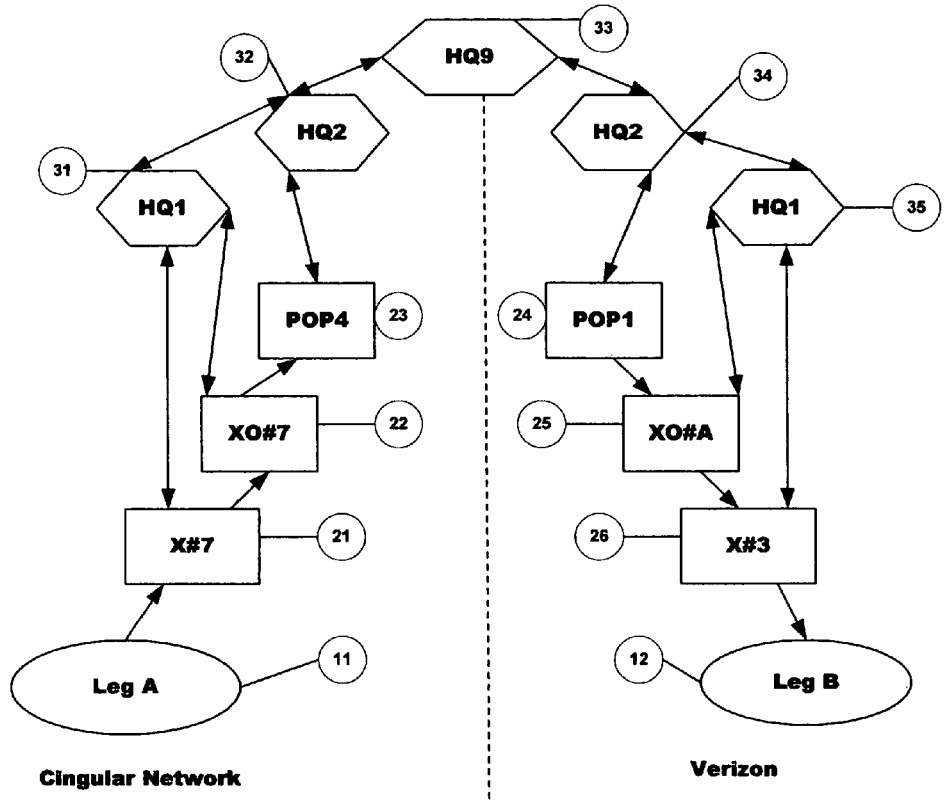
FIG. 61 Inter USA Roaming Call
Roaming
786-525-0001
Miami
| HQ6 to HQ9 | 3212 |
| HQ6 to HQ9 | 2384 |
| HQ5 BST | 1 |
| HQ4 Florida | 1 |
| HQ3SFla | 3 |
| HQ2 | 4 |
| HQ1 | 7 |
Leg A is <u>3212</u>1134707
405-555-1234
LAX
"Cingular Wireless-BST"
Verizon-PB
| HQ5 PB | 3 |
| HQ4 California | 2 |
| HQ3 LAX | 1 |
| HQ2 | 1 |
| HQ1 | A |
Leg B is <u>2384</u>3211A03
Vector <u>3/2</u>-<u>2121134707</u>-<u>3843211A03</u>

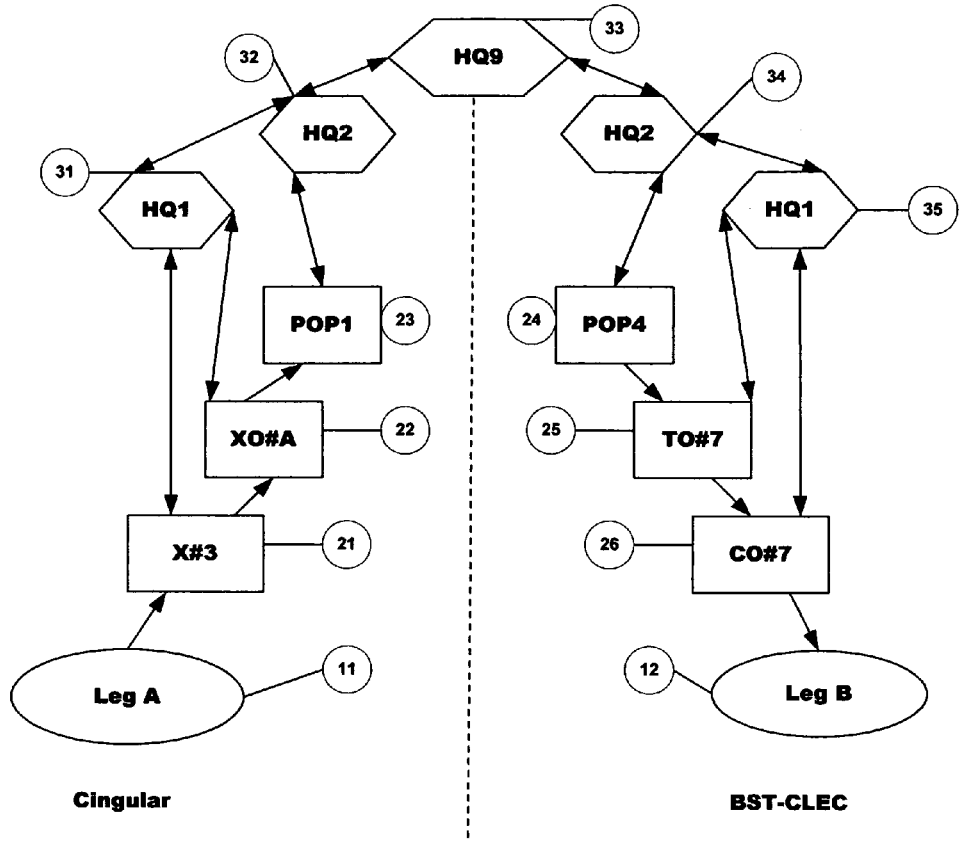
FIG. 62 Inter USA Wireless / Telco Call
| | |
|---|---|
| 405-555-1234 | 305-525-0001 |
| Los Angeles | Miami |
| HQ6 to HQ9   2384 | "Cingular Wireless" |
| HQ6 to HQ9   1114 | "BST- CLEC" |
| HQ5   3 | HQ5 to HQ6 BST1 |
| HQ4 California   2 | HQ4 Florida   1 |
| HQ3 LAX   1 | HQ3 SFla   3 |
| HQ2   1 | HQ2   4 |
| HQ1   A | HQ1   7 |
| Leg A is 23843211A03 | Leg B is 11141134707 |
Vector CDR   2/1-3843211A03-1141134707

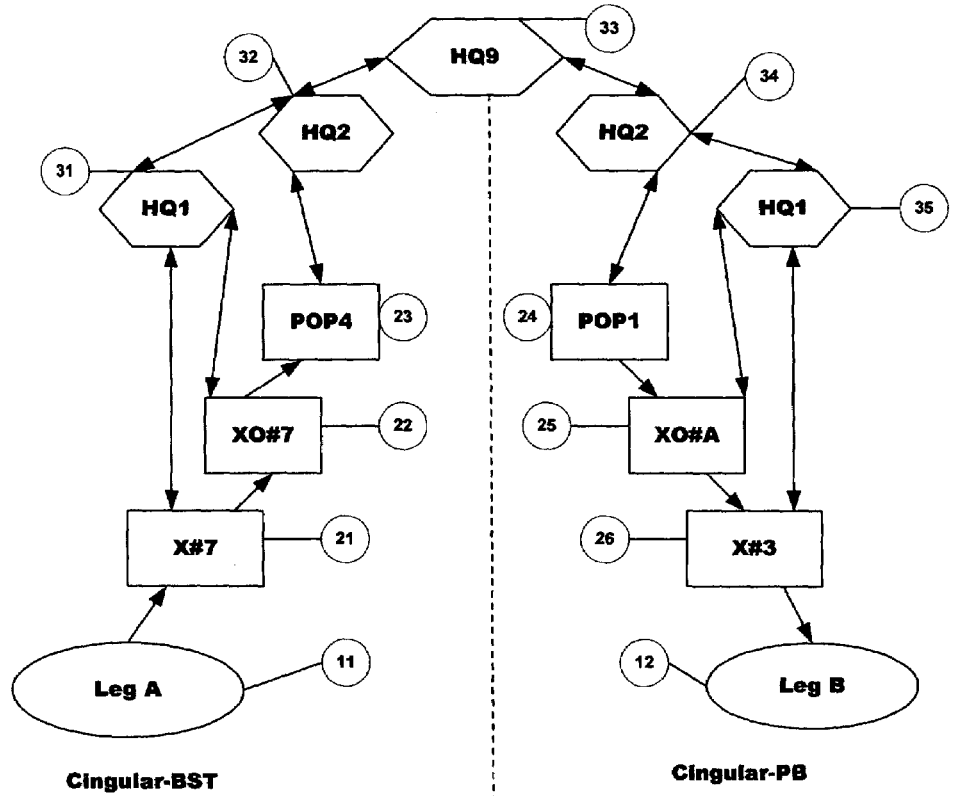
FIG. 63 Inter USA Roaming Call
Cingular-BST
Cingular-PB
Roaming
786-525-0001
Miami
| | | | |
|---|---|---|---|
| HQ6 to HQ9 | 3212 | 405-555-1234 | |
| HQ6 to HQ9 | 3384 | LAX | |
| HQ5 BST | 1 | "Cingular-BST" | |
| HQ4 Florida | 1 | "Cingular PB" | |
| HQ3SFla | 3 | HQ5 PB | 3 |
| HQ2 | 4 | HQ4 California | 2 |
| HQ1 | 7 | HQ3 LAX | 1 |
| Leg A is 32121134707 | | HQ2 | 1 |
| | | HQ1 | A |
| | | Leg B is 33843211A03 | |
Vector CDR 3-2121134707-3843211A03

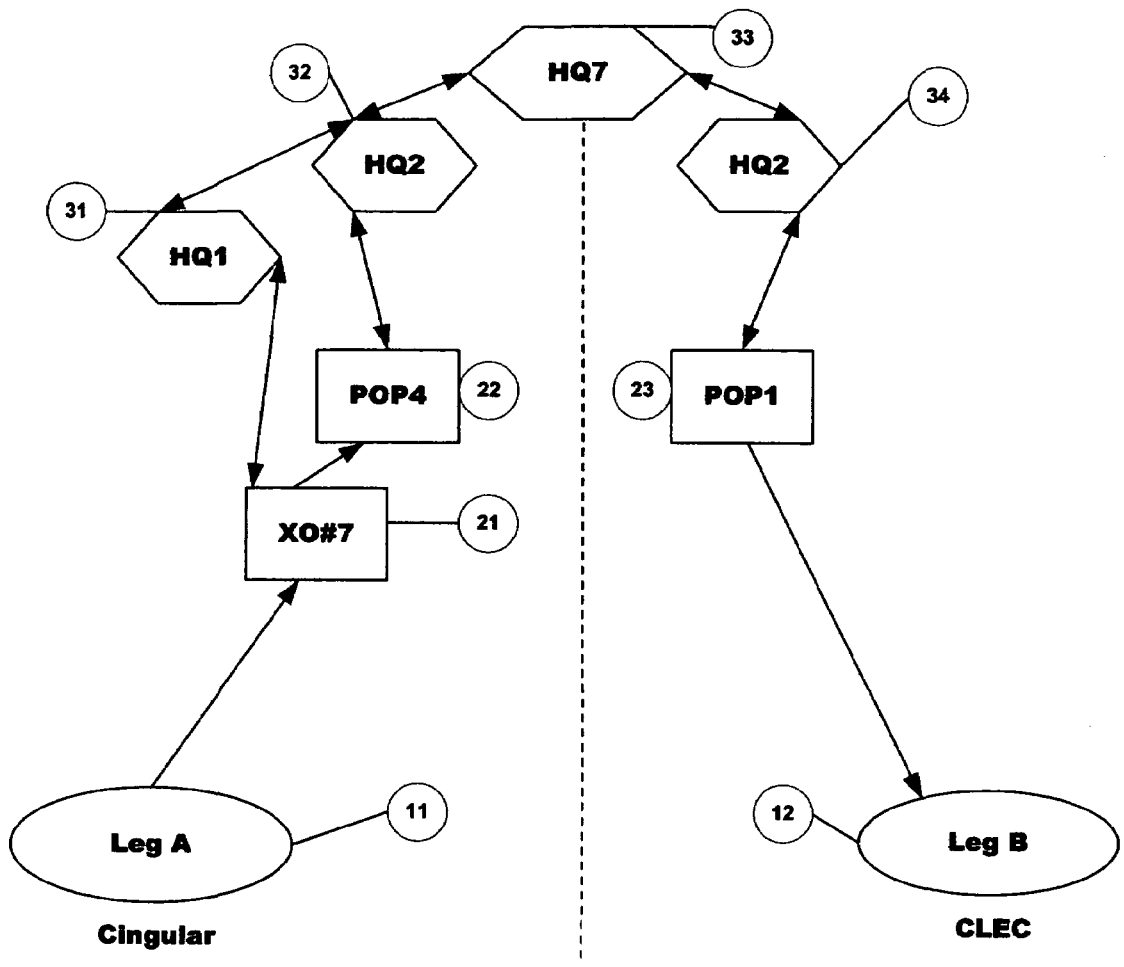
FIG. 64 Inter ILEC Wireless / Telco Call
Roaming
786-525-0001
Miami
| | |
|---|---|
| HQ6 to HQ9 | 4111 |
| HQ6 to HQ9 | 3213 |
| HQ5 BST | 1 |
| HQ4 Florida | 1 |
| HQ3SFla | 3 |
| HQ2 | 4 |
| HQ1 | 7 |
Leg A is <u>32131</u>134707
404-777-1234
Atlanta
"CLEC"
"Cingular"
| | |
|---|---|
| HQ5 BST | 1 |
| HQ4 Georgia | 2 |
| HQ3 N Geo | 1 |
| HQ2 | 1 |
| HQ1 | A |
Leg B is <u>41111</u>211A03
Vector CDR <u>321</u>/<u>411</u>-<u>3</u>1134707-<u>1</u>1211A03

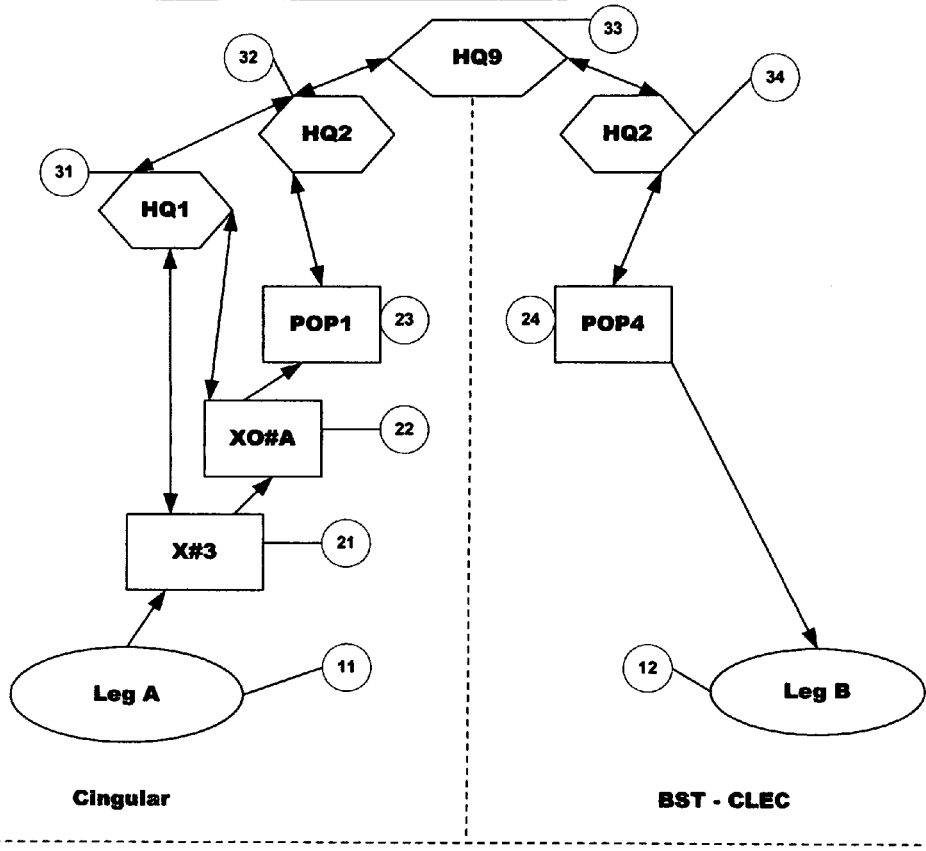
FIG. 65 Inter USA Wireless / Telco Call
| | | | |
|---|---|---|---|
| 405-555-1234 | | 305-525-0001 | |
| Los Angeles | | Miami | |
| HQ6 to HQ9 | 2384 | "Cingular Wireless" | |
| HQ6 to HQ9 | 1112 | BST - CLEC | |
| HQ5 PB | 3 | HQ5 BST | 1 |
| HQ4 California | 2 | HQ4 Florida | 1 |
| HQ3 LAX | 1 | HQ3 SFla | 3 |
| HQ2 | 1 | HQ2 | 4 |
| HQ1 | A | HQ1 | 7 |
| Leg A is 23843211A03 | | Leg B is 11121134707 | |
Vector CDR 2/1-3843211A03-1121134707

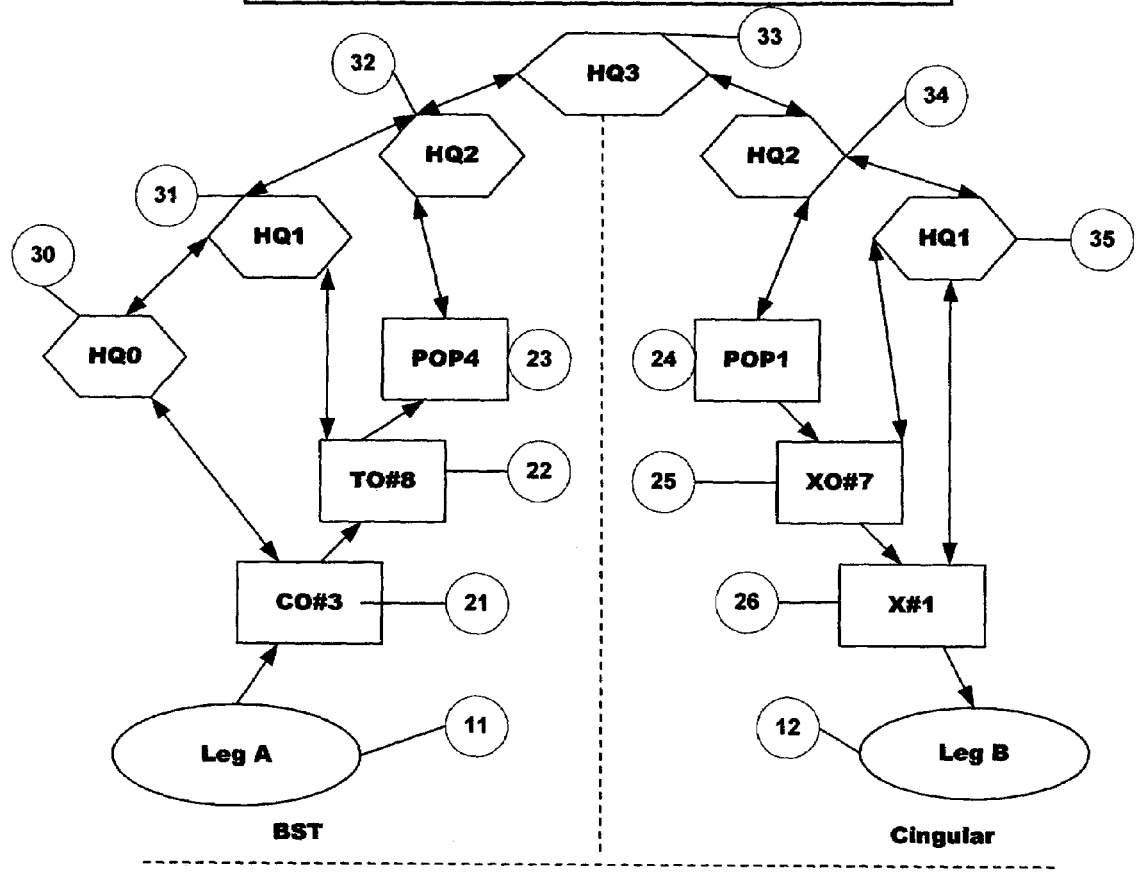
FIG. 66 Hybrid LATA Roaming Call
305-525-0001
Miami
| | |
|---|---|
| HQ6 to HQ9 | 1113 |
| HQ6 to HQ9 | 3211 |
| HQ5 BST | 1 |
| HQ4 Florida | 1 |
| HQ3 S. Fla | 3 |
| HQ2 | 4 |
| HQ1 | 8 |
Leg A is 11131134803
Roaming
786-737-0002
Orlando
"BST"
"Cingular"
| | |
|---|---|
| HQ5 | 1 |
| HQ4 | 1 |
| HQ3 | 3 |
| HQ2 Leg | 1 |
| HQ1 Leg A | 7 |
Leg B is 32111131701
Vector CDR 1113113-4803-1701 or 113-4803-1701

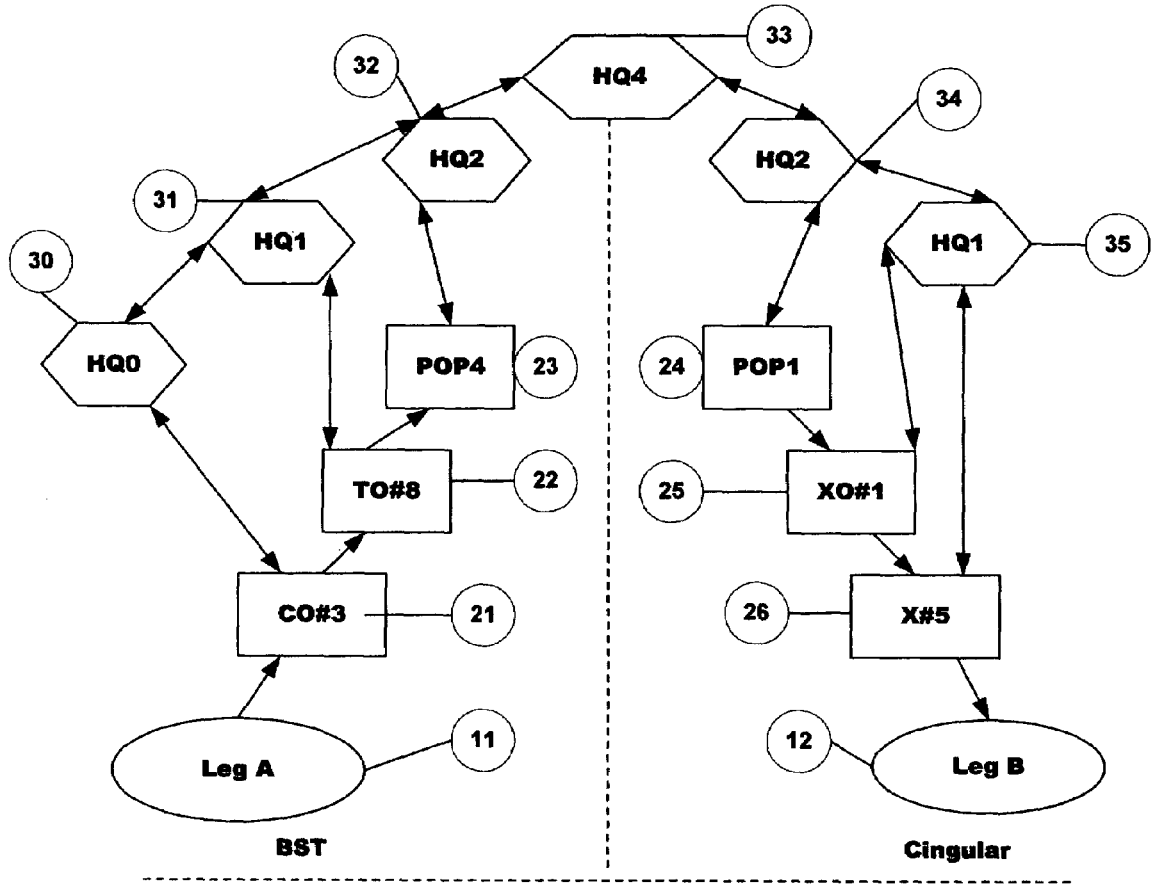
FIG. 67 Hybrid Intra Regional Roaming Call
| 305-949-0001 | | Roaming 786-737-0002 | |
|---|---|---|---|
| Miami | | Jacksonville | |
| HQ6 to HQ9 | <u>1113</u> | "BST" | |
| HQ6 to HQ9 | <u>3211</u> | "Cingular" | |
| HQ5 BST | 1 | HQ5 | 1 |
| HQ4 Florida | 1 | HQ4 | 1 |
| HQ3 | 3 | HQ3 | 2 |
| HQ2 | 4 | HQ2 | 1 |
| HQ1 | 8 | HQ1 | 1 |
| Leg A is <u>11131</u>134803 | | Leg B is <u>32111</u>121105 | |
Vector CDR <u>111311</u>-34803-21105 or 11-34803-21105

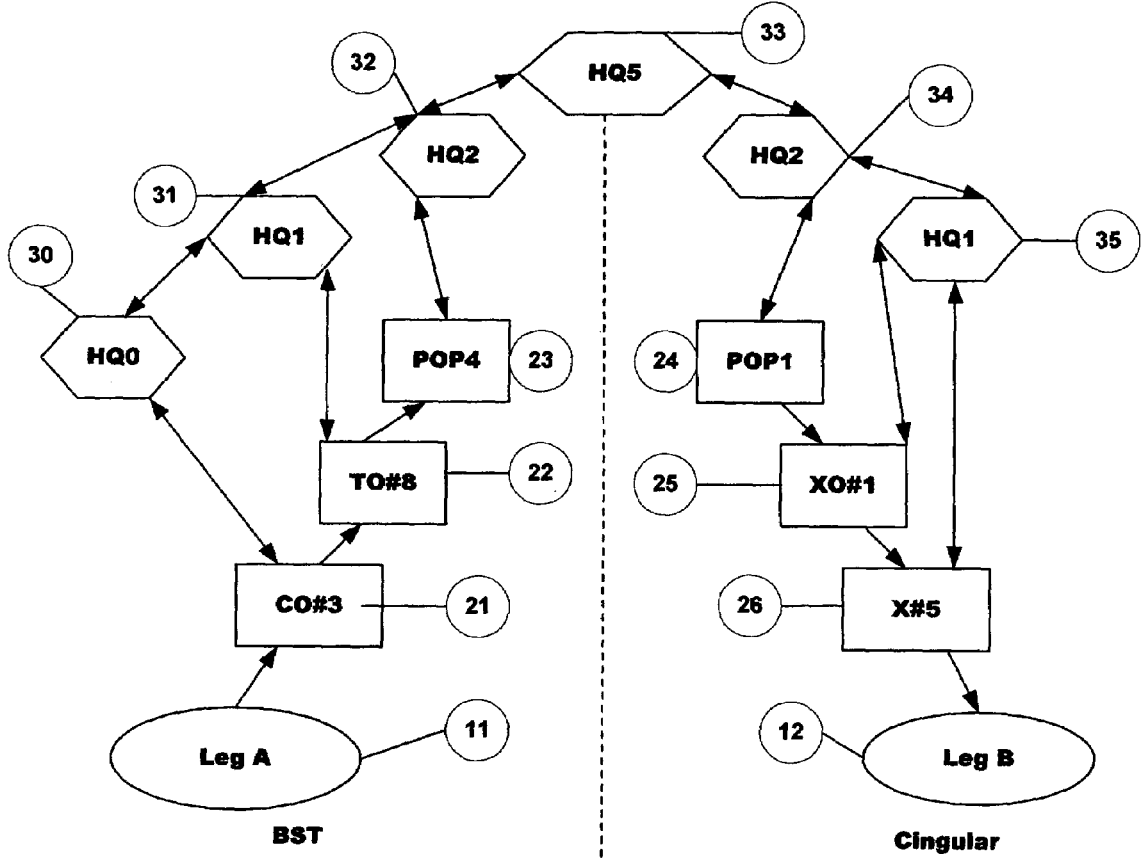

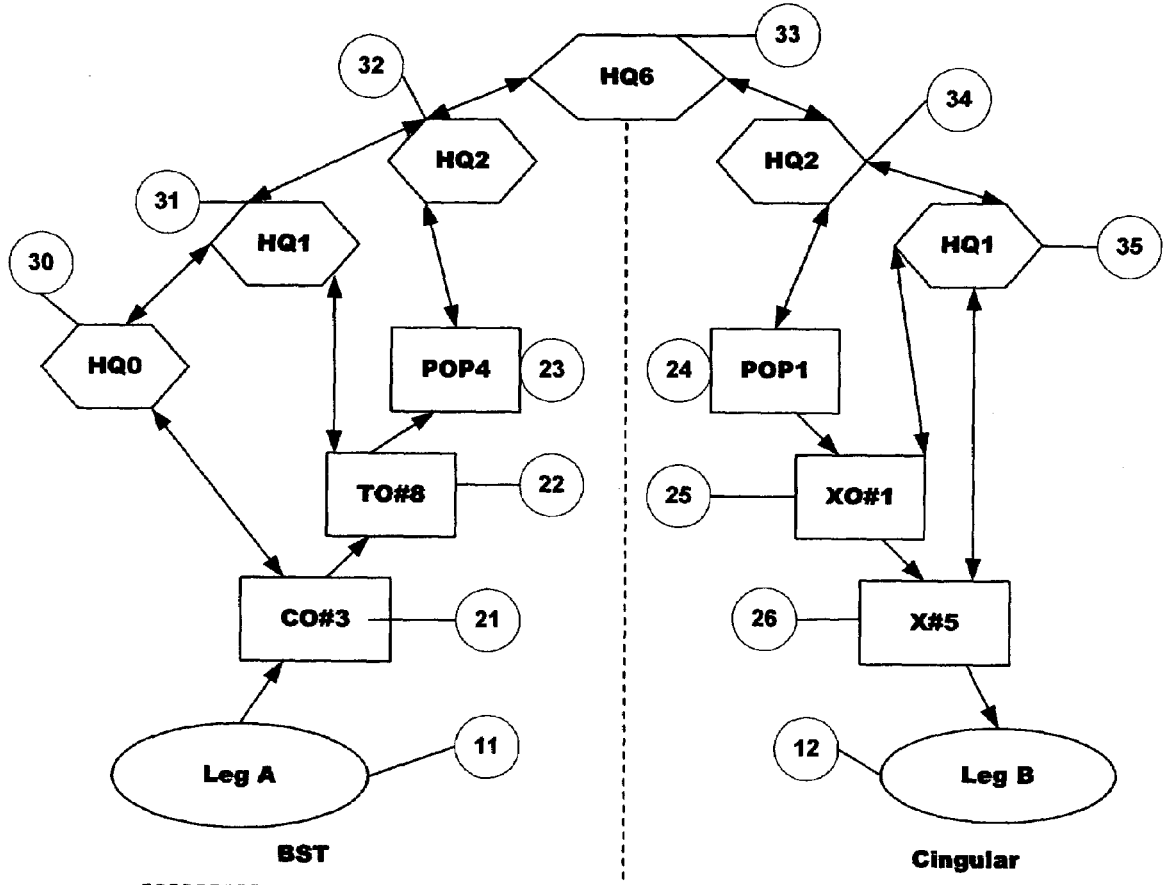

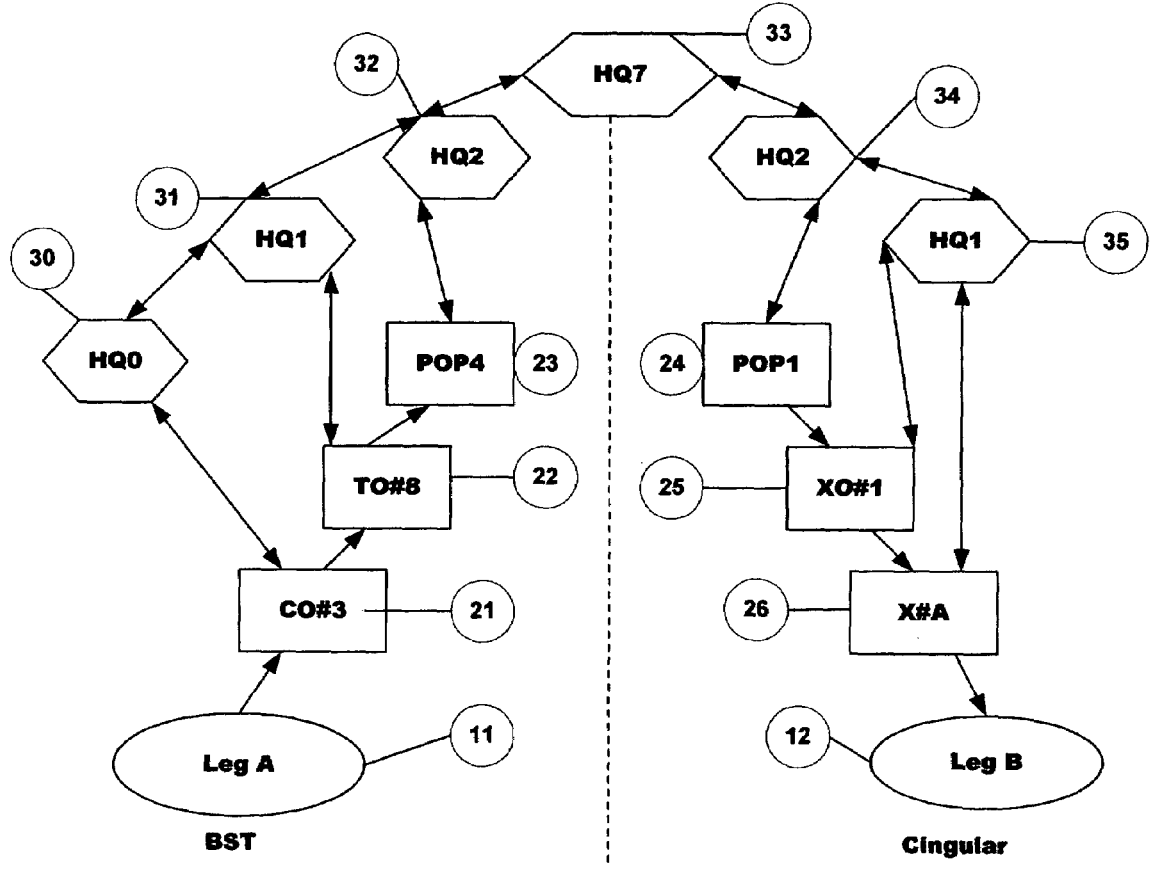
FIG. 70 Hybrid Intra USA Roaming Call
| 305-525-0001 | | Roaming<br>786-777-1234 | |
|---|---|---|---|
| Miami | | NYC | |
| HQ6 to HQ9 | 1113 | "BST" | |
| HQ6 to HQ9 | 3213 | "Cingular" | |
| HQ5 BST | 1 | HQ5 BA | 3 |
| HQ4 Florida | 1 | HQ4 NY | 2 |
| HQ3SFla | 3 | HQ3 NYC | 1 |
| HQ2 | 4 | HQ2 | 1 |
| HQ1 | 7 | HQ1 | A |
| Leg A is 11131134707 | | Leg B is 32133211A03 | |
Vector CDR 111/321-31134707-33211A03

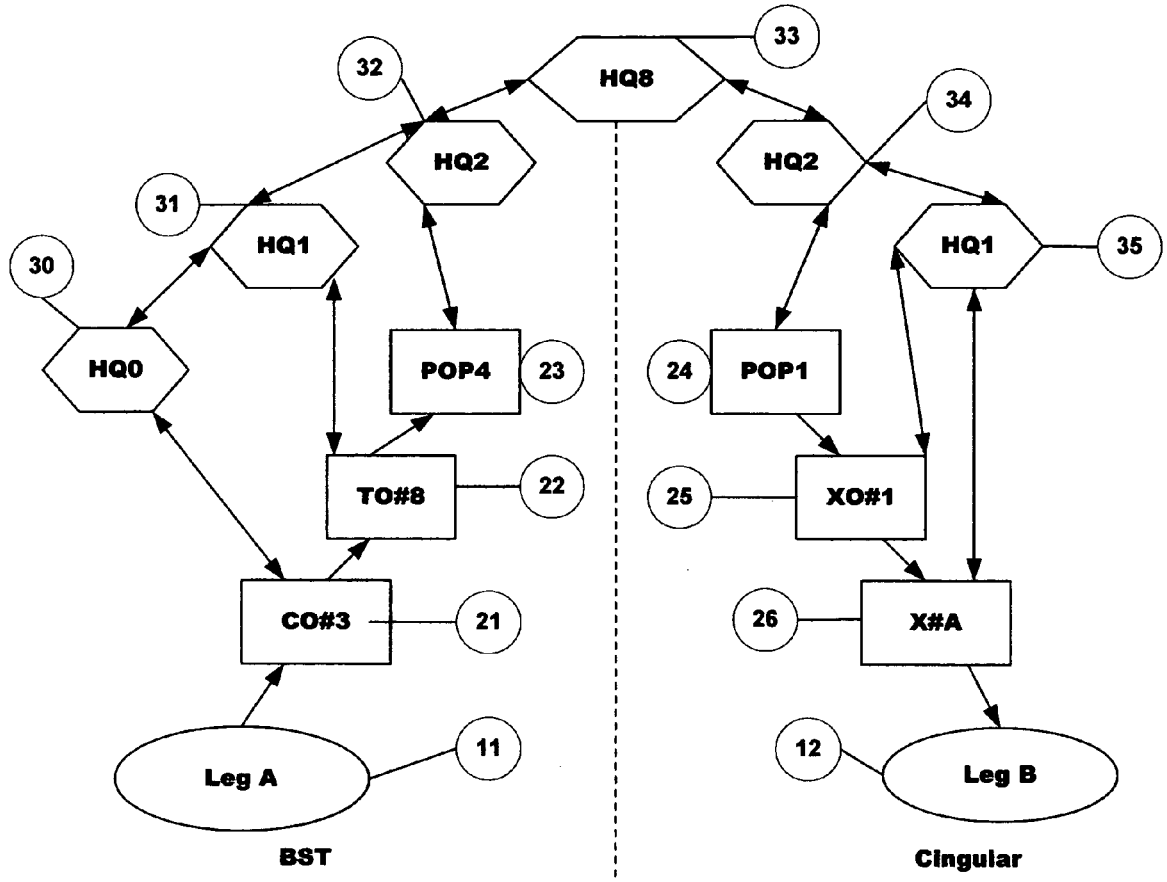
FIG. 71 Hybrid Intra USA Roaming Call
| | | | |
|---|---|---|---|
| 305-525-0001 | | Roaming | |
| Miami | | 786-555-1234 | |
| HQ7 to HQ9 | 3384 | Los Angeles | |
| HQ7 to HQ9 | 1113 | "Cingular BST" | |
| HQ5 BST | 1 | "BST" | |
| HQ4 Florida | 1 | HQ5 BA | 3 |
| HQ3SFla | 3 | HQ4 California | 2 |
| HQ2 | 4 | HQ3LAX | 1 |
| HQ1 | 7 | HQ2 | 1 |
| Leg A is 11131134707 | | HQ1 | A |
| | | Leg B is 33843211A03 | |
Vector CDR 11/33-131134707-843211A03

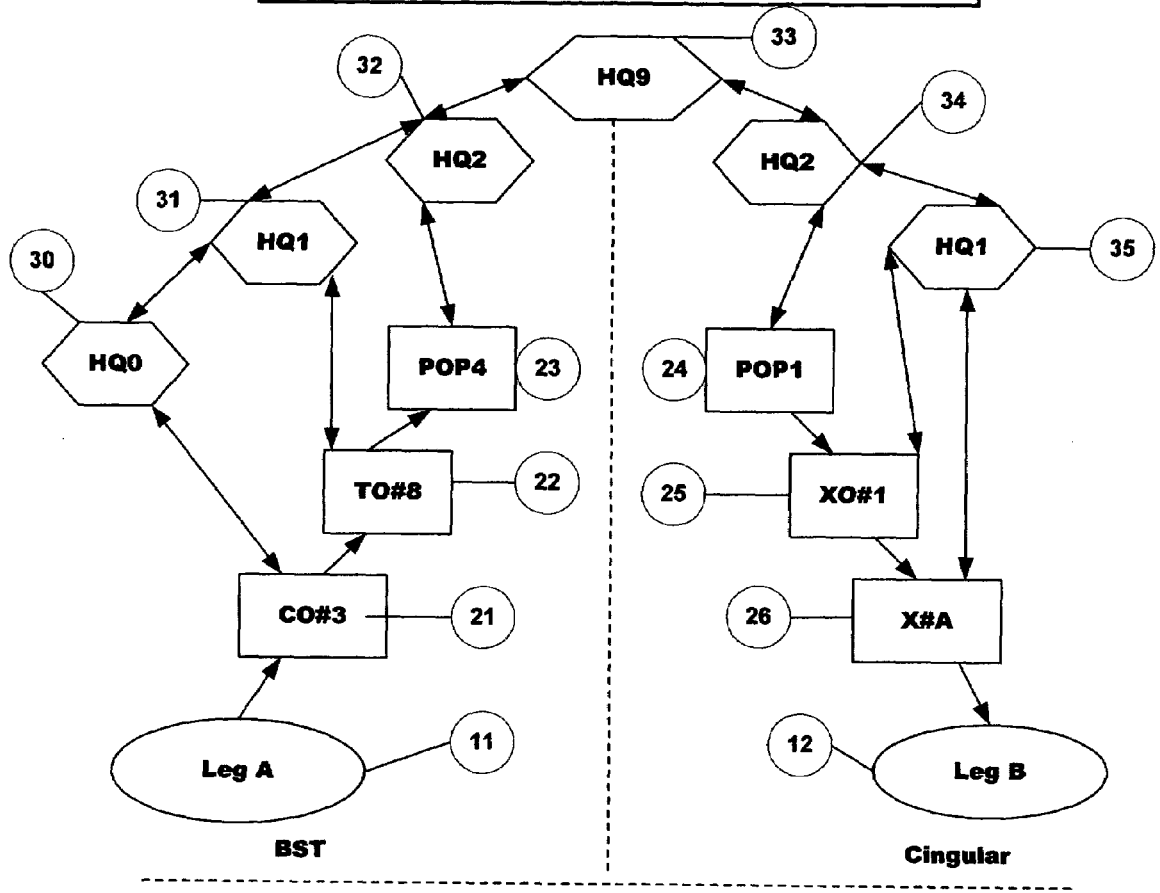

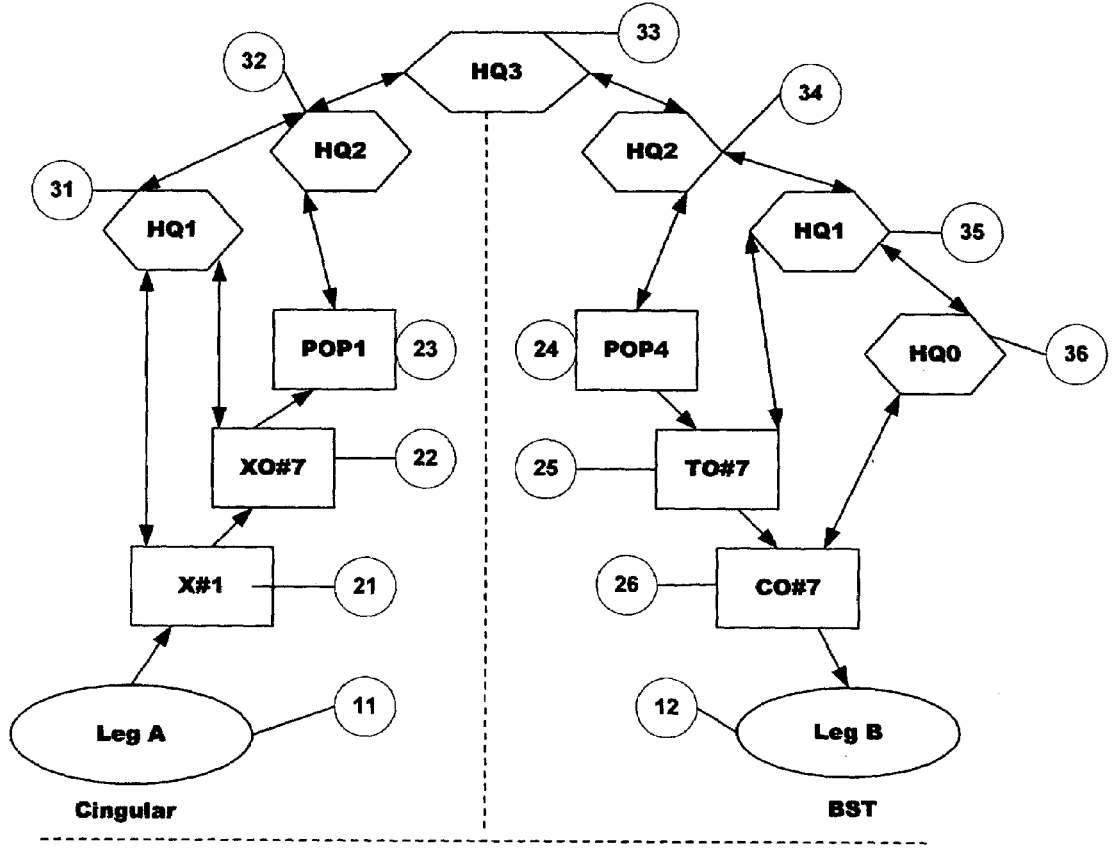
FIG. 73 Hybrid LATA Wireless / Telco Call
| 407-593-1234 | | 305-949-1234 | |
|---|---|---|---|
| Miami | | Miami | |
| HQ6 to HQ9 | 2211 | "Cingular" | |
| HQ6 to HQ9 | 1112 | "BST" | |
| HQ5 | 1 | HQ5 | 1 |
| HQ4 | 1 | HQ4 | 1 |
| HQ3 | 3 | HQ3 | 3 |
| HQ2 | 1 | HQ2 | 4 |
| HQ1 | 7 | HQ1 | 7 |
| Leg A is 22111131701 | | Leg B is 11121134707 | |
Vector CDR 2211113-1701-4707

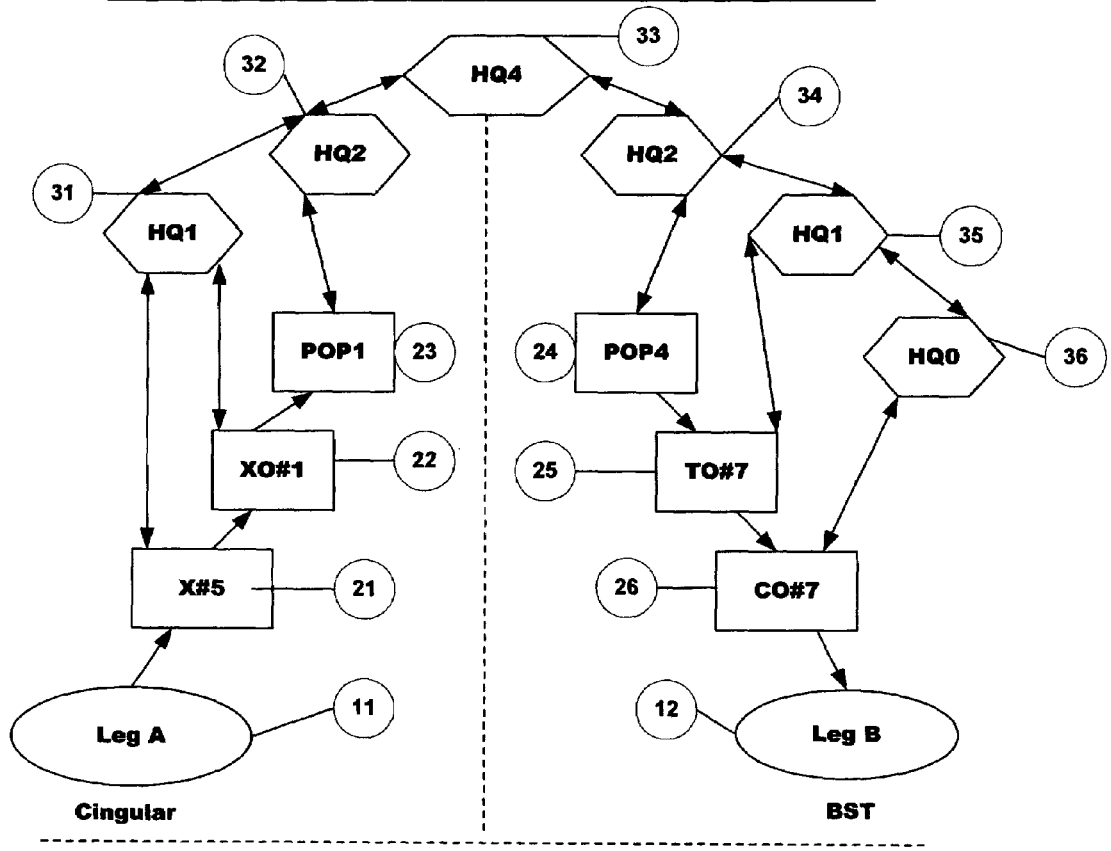
FIG. 74 Hybrid Intra Regional Roaming Call
Roaming
904-757-1248
Miami
| | |
|---|---|
| HQ6 to HQ9 | <u>3211</u> |
| HQ6 to HQ9 | <u>1113</u> |
| HQ5 | 1 |
| HQ4 | 1 |
| HQ3 | 2 |
| HQ2 | 1 |
| HQ1 | 1 |
Leg A is <u>32111121105</u>
305-949-1234
Miami
"Cingular"
"BST"
| | |
|---|---|
| HQ5 | 1 |
| HQ4 | 1 |
| HQ3 | 3 |
| HQ2 | 4 |
| HQ1 | 7 |
Leg B is <u>11131134707</u>
Vector CDR 11-21105-34707 or <u>111311-21105-34707</u>

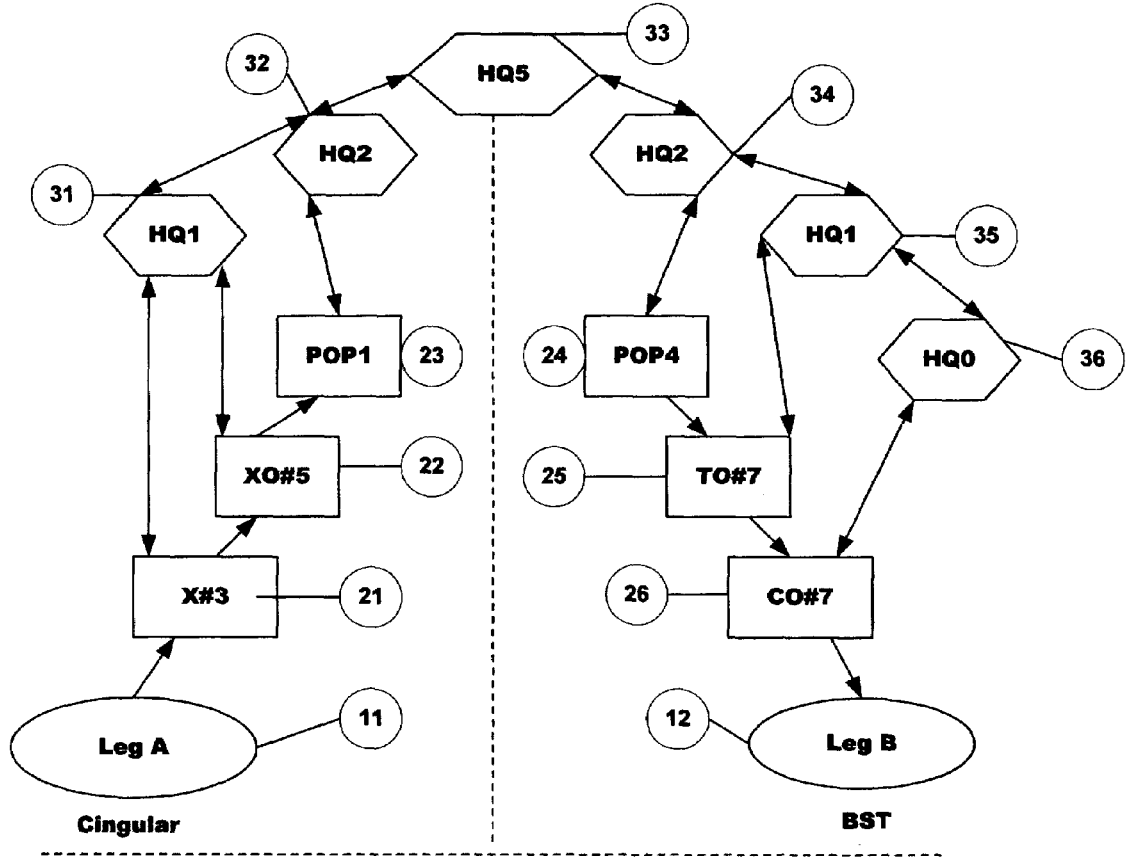
FIG. 75 Hybrid Inter Regional Roaming Call
```
Roaming
404-231-1125                        305-949-1234
Miami                               Miami
HQ6 to HQ9      3211                "Cingular"
HQ6 to HQ9      1113                "BST"
HQ5             1                   HQ5              1
HQ4             2                   HQ4              1
HQ3             1                   HQ3              3
HQ2             1                   HQ2              4
HQ1             5                   HQ1              7
Leg A is 32111211503                Leg B is 11131134707
```
Vector CDR 1-211503-134707 or 11131-211503-134707

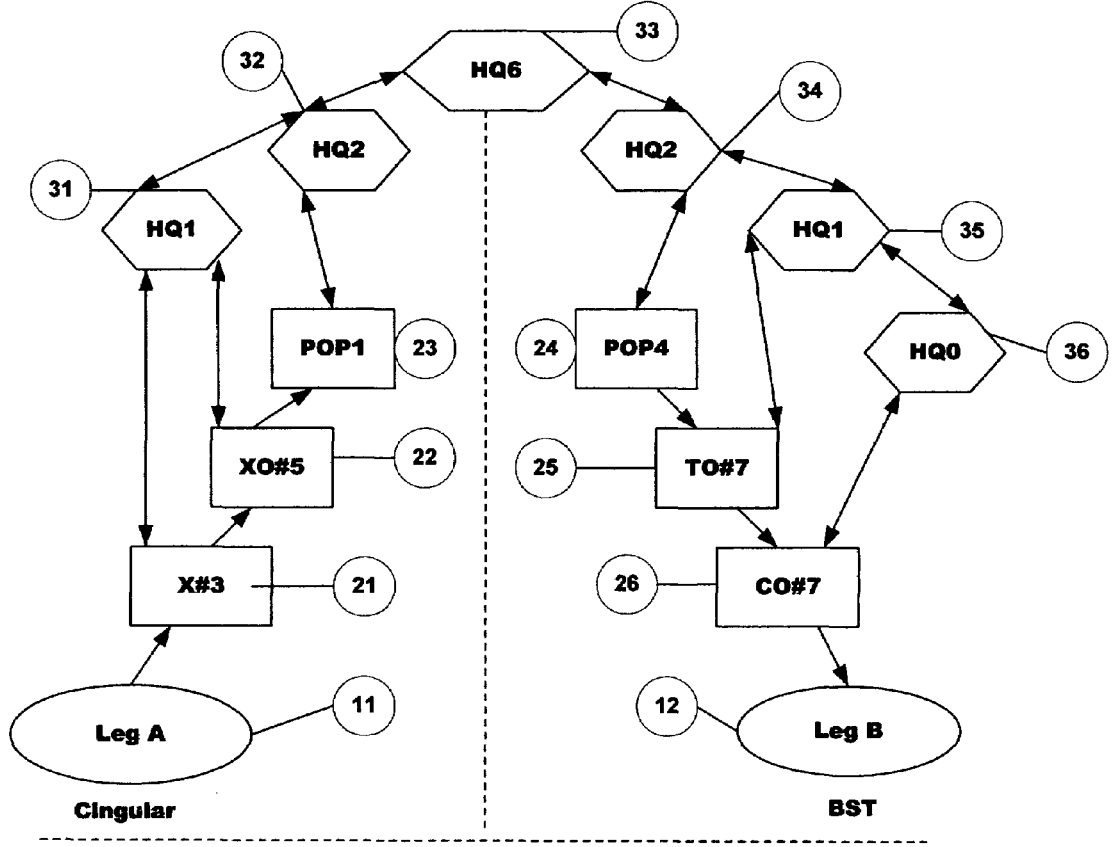
FIG. 76 Hybrid ILEC Roaming Call
Roaming
404-231-1125
Miami
| | |
|---|---|
| HQ6 to HQ9 | 3211 |
| HQ6 to HQ9 | 1113 |
| HQ5 | 1 |
| HQ4 | 2 |
| HQ3 | 1 |
| HQ2 | 1 |
| HQ1 | 5 |
Leg A is <u>3211</u>1211503
305-949-1234
Miami
"Cingular"
"BST"
| | |
|---|---|
| HQ5 | 1 |
| HQ4 | 1 |
| HQ3 | 3 |
| HQ2 | 4 |
| HQ1 | 7 |
Leg B is <u>1113</u>1134707
Vector CDR <u>3211</u>-1211503-1134707

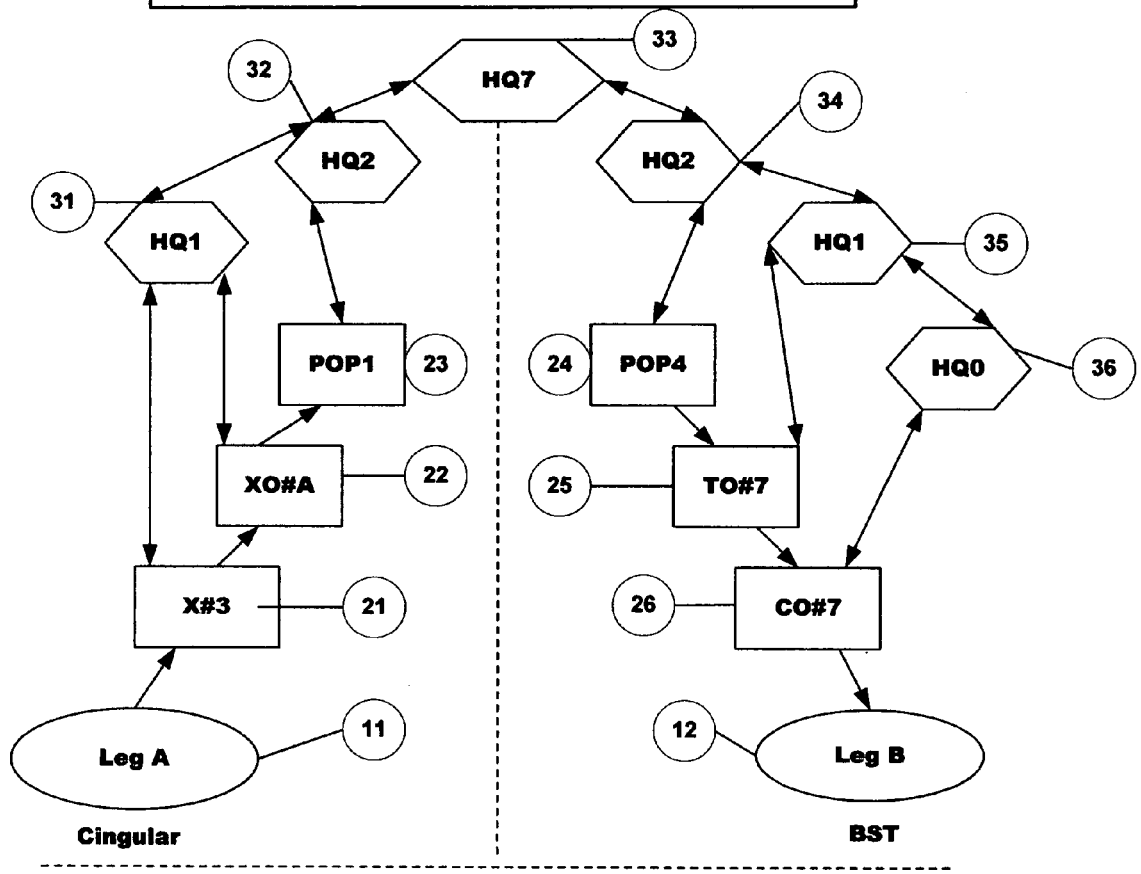
FIG. 77 Hybrid Intra USA Roaming Call
Roaming
212-317-9912
Miami
| | | | |
|---|---|---|---|
| HQ6 to HQ9 | 3213 | 305-949-1234 | |
| HQ6 to HQ9 | 1113 | Miami | |
| HQ5 | 3 | "Cingular" | |
| HQ4 | 2 | "BST" | |
| HQ3 | 1 | HQ5 | 1 |
| HQ2 | 1 | HQ4 | 1 |
| HQ1 | A | HQ3 | 3 |
| | | HQ2 | 4 |
| | | HQ1 | 7 |
Leg A is <u>32133211A03</u>    Leg B is <u>11131134707</u>
Vector CDR <u>321</u>/<u>111</u>-<u>33211A03</u> -<u>3</u>1134707

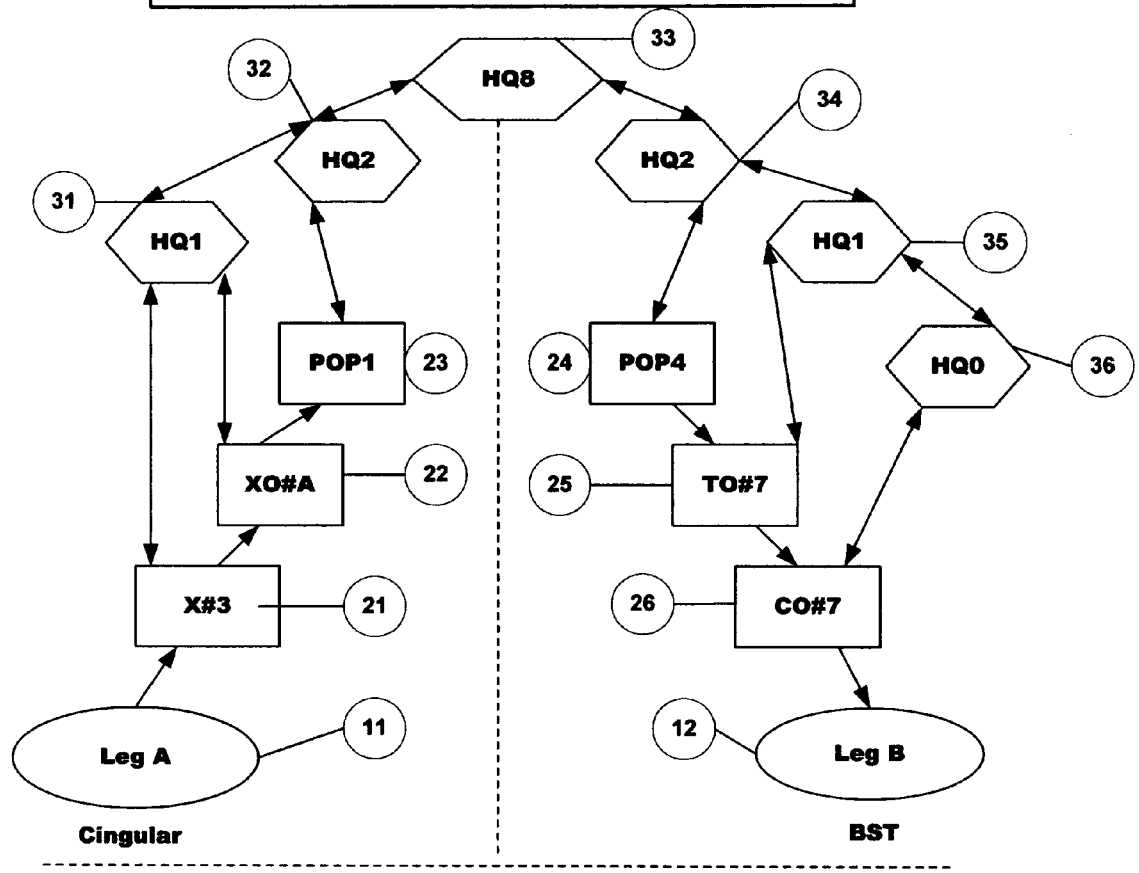
FIG. 78 Hybrid Inter USA Roaming Call
```
Roaming
212-317-9912                        305-949-1234
Miami                               Miami
HQ6 to HQ9    3213                  "Cingular-BA"
HQ6 to HQ9    1113                  "BST"
HQ5           3                     HQ5              1
HQ4           2                     HQ4              1
HQ3           1                     HQ3              3
HQ2           1                     HQ2              4
HQ1           A                     HQ1              7
Leg A is 32133211A03                Leg B is 11131134707
Vector CDR 32/11-133211A03-131134707
```

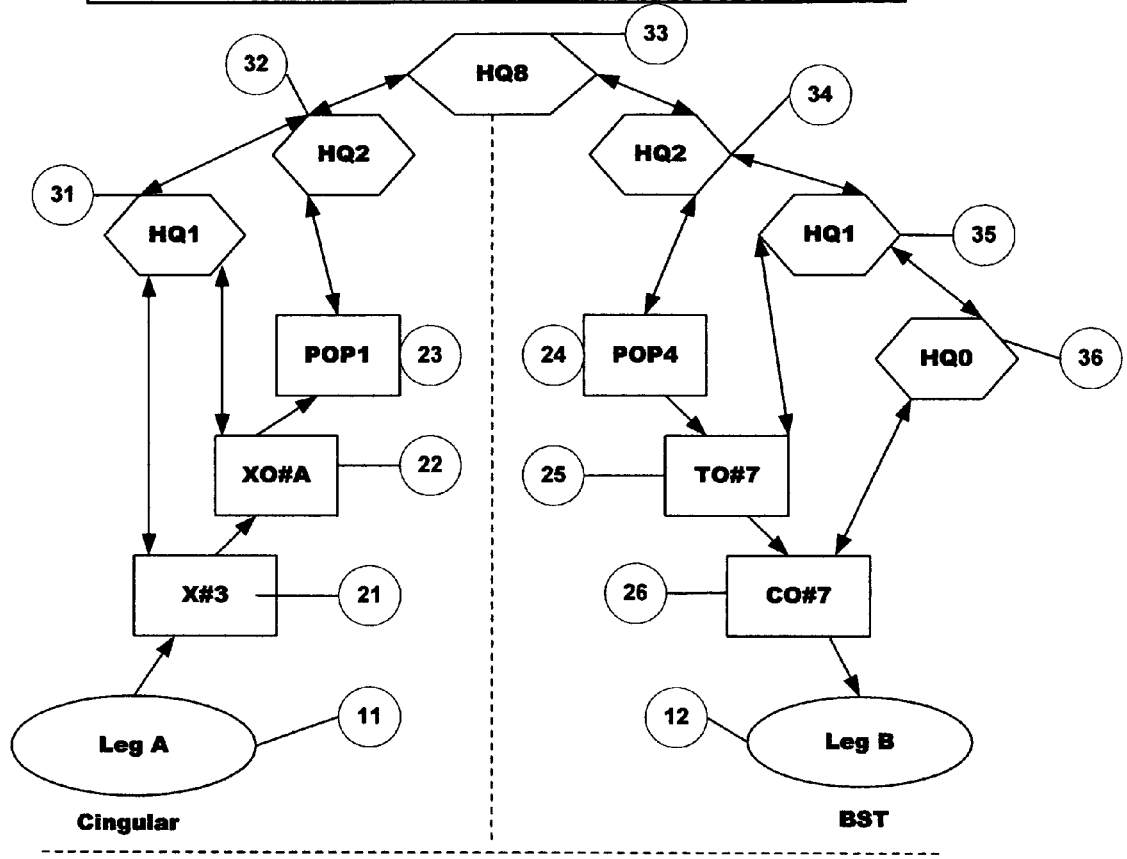
FIG. 79 Hybrid Inter USA Wireless / Telco Call
| 212-317-9912 | | 305-949-1234 | |
|---|---|---|---|
| Miami | | Miami | |
| HQ6 to HQ9 | 2384 | "Cingular" | |
| HQ6 to HQ9 | 1112 | "BST" | |
| HQ5 | 3 | HQ5 | 1 |
| HQ4 | 2 | HQ4 | 1 |
| HQ3 | 1 | HQ3 | 3 |
| HQ2 | 1 | HQ2 | 4 |
| HQ1 | A | HQ1 | 7 |
| Leg A is <u>23843211A03</u> | | Leg B is <u>11121134707</u> | |
Vector CDR <u>23</u>/<u>11</u>-<u>8</u>43211A03-<u>12</u>1134707

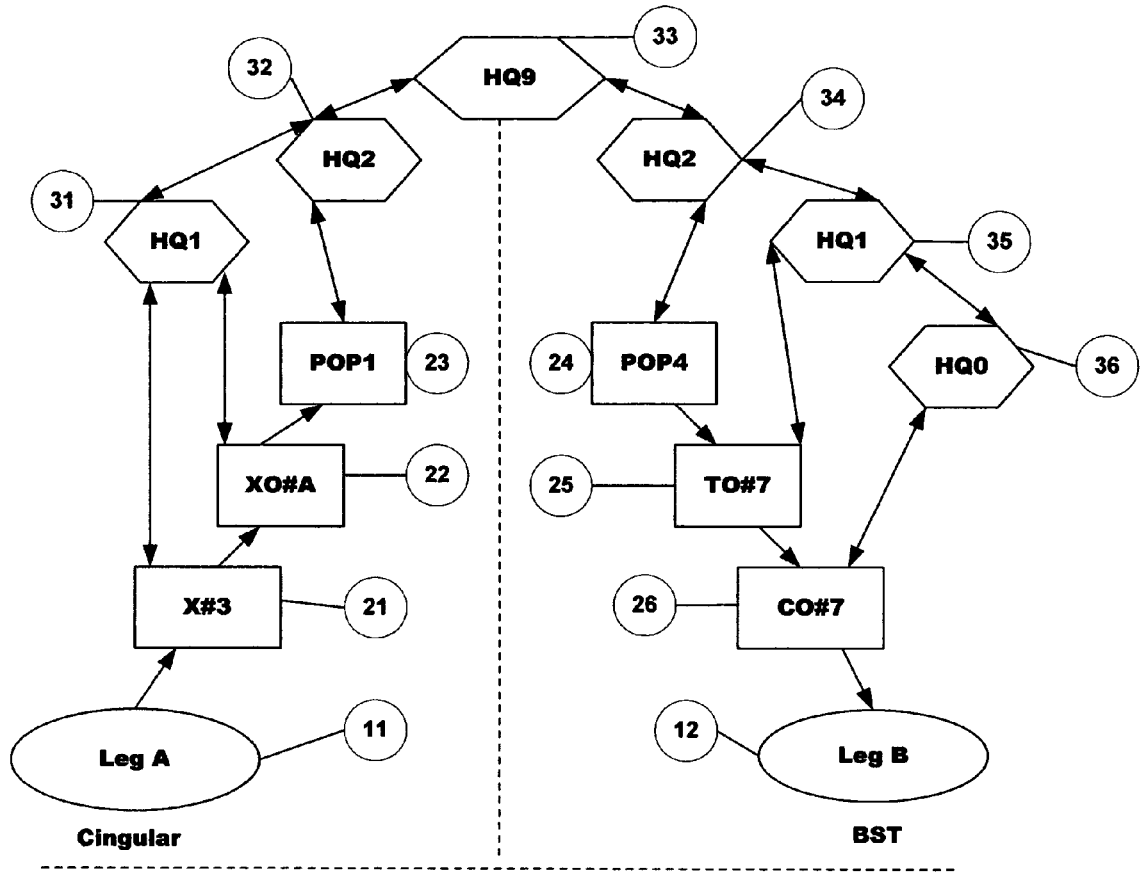
Roaming
212-317-9912
Miami
HQ6 to HQ9    3384
HQ6 to HQ9    1113
HQ5    3
HQ4    2
HQ3    1
HQ2    1
HQ1    A
Leg A is 33843211A03
305-949-1234
Miami
"Cingular"
"BST"
HQ5    1
HQ4    1
HQ3    3
HQ2    4
HQ1    7
Leg B is 11131134707
Vector CDR 3/1-3843211A03-1131134707

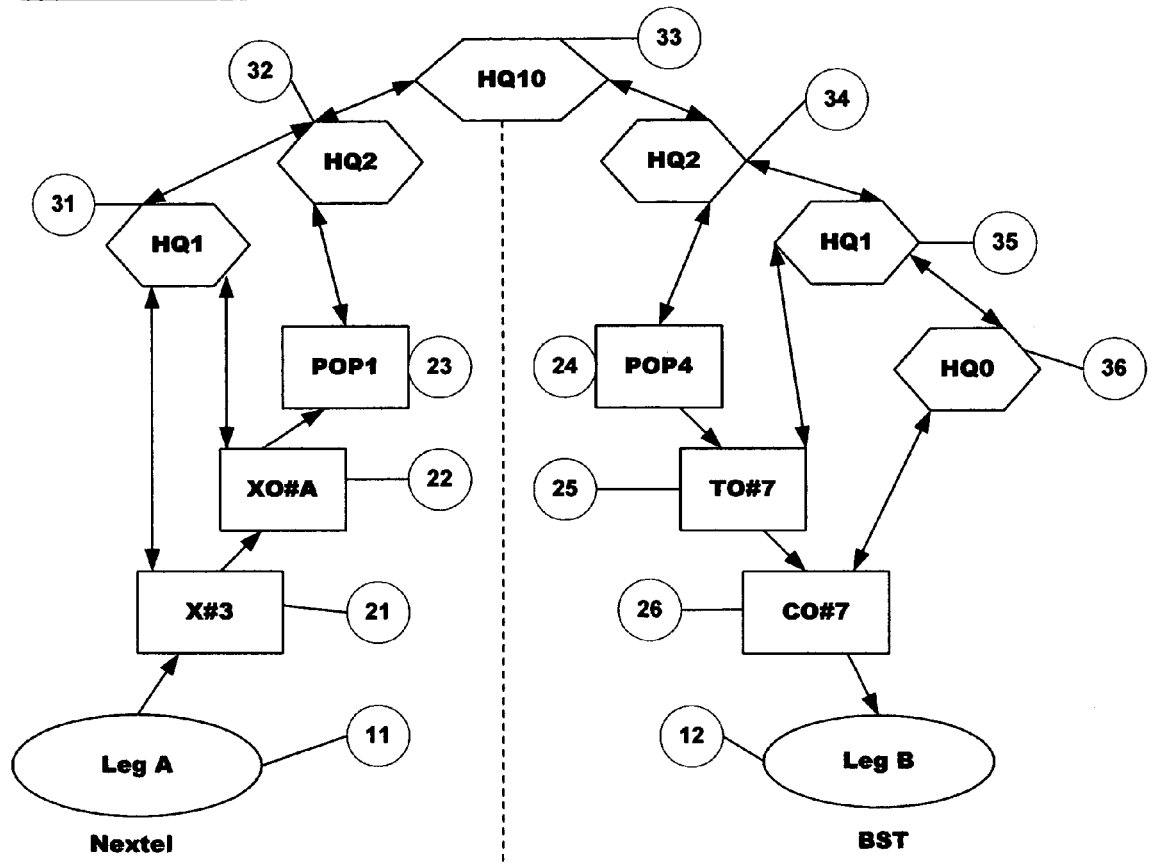
FIG. 81 Hybrid Intra Continental Wireless / Telco Call
| 416-842-1257 | | 305-949-1234 | |
|---|---|---|---|
| Miami | | Miami | |
| HQ12 to HQ10 | AAA | "Nextel" | |
| HQ9 to HQ6 | 1112 | BST, USA | |
| HQ9 to HQ6 | 5211 | Bell Canada | |
| HQ5  BC | 3 | HQ5 | 1 |
| HQ4 Ontario | 2 | HQ4 | 1 |
| HQ3 Toronto | 1 | HQ3 | 3 |
| HQ2 | 1 | HQ2 | 4 |
| HQ1 | A | HQ1 | 7 |
| Leg A is AAA52113211A03 | | Leg B is AAA11121134707 | |
Vector CDR AAA-52113211A03-11121134707

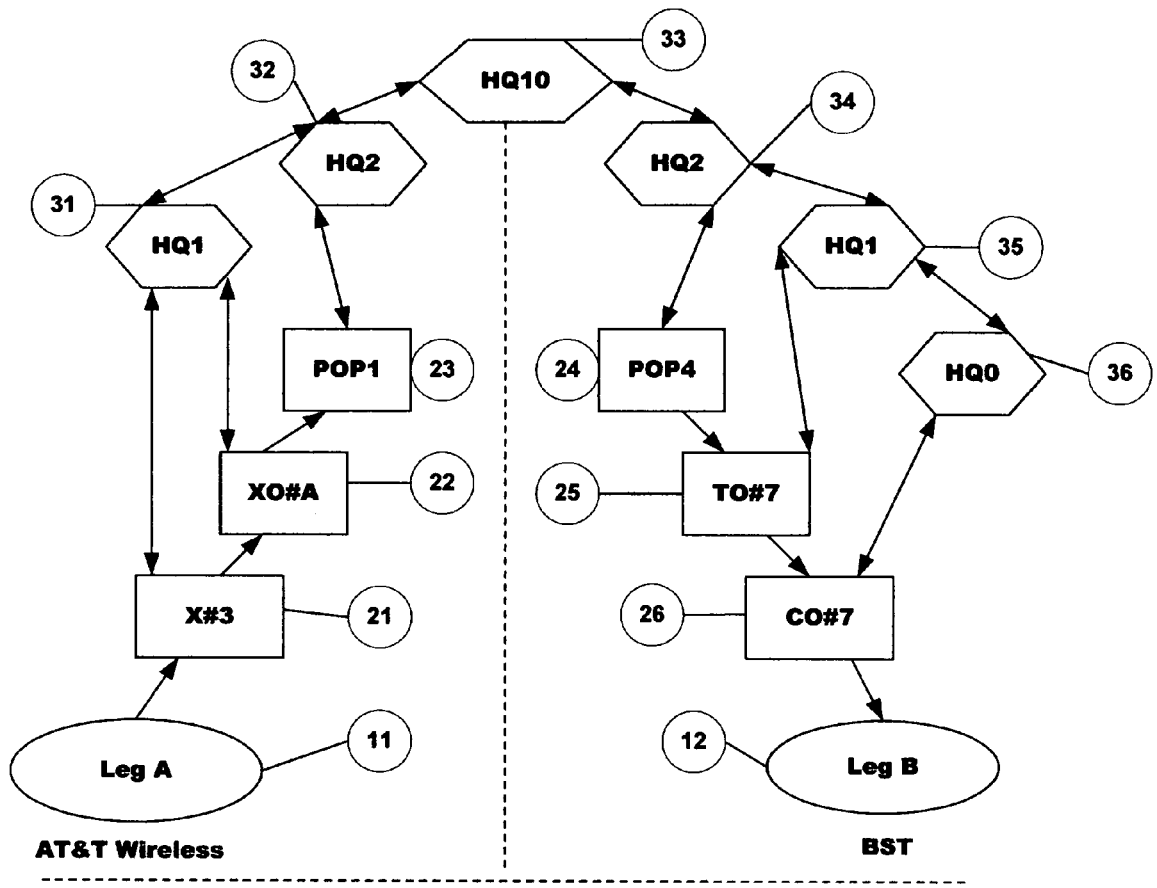
FIG. 82 Hybrid Intra Continental Wireless / Telco Call
AT&T Wireless │ BST
| 416-842-1257 | | 305-949-1234 | |
|---|---|---|---|
| Miami | | Miami | |
| HQ12 to HQ10 | ADA | "AT&T Wireless" | |
| HQ9 to HQ6 | 1112 | BST, USA | |
| HQ9 to HQ6 | 5211 | Bell Canada | |
| HQ5 BC | 3 | HQ5 | 1 |
| HQ4 Ontario | 2 | HQ4 | 1 |
| HQ3 Toronto | 1 | HQ3 | 3 |
| HQ2 | 1 | HQ2 | 4 |
| HQ1 | A | HQ1 | 7 |
| Leg A is ADA52113211A03 | | Leg B is ADA11121134707 | |
Vector CDR ADA-52113211A03-11121134707

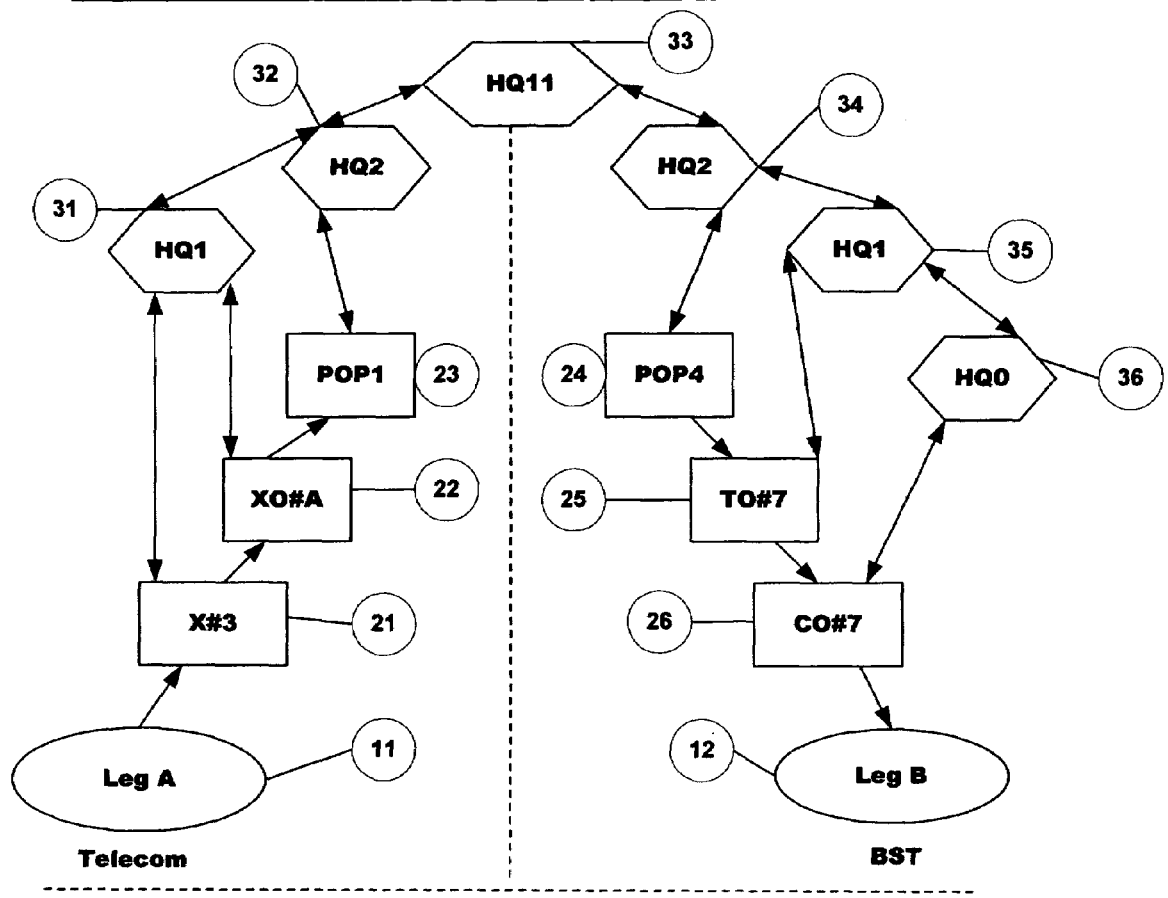
FIG. 83 Hybrid Continental Wireless / Telco Call
| 5411-842-1257 | | 305-949-1234 | |
| --- | --- | --- | --- |
| Buenos Aires | | Miami | |
| HQ12 to HQ10 | AGB | Verizon | |
| HQ9 to HQ6 | 7324 | Telecom, Argentina | |
| HQ9 to HQ6 | 1112 | BST | |
| HQ5 Telecom | 1 | HQ5 | 1 |
| HQ4 Buenos Aires | 4 | HQ4 | 1 |
| HQ3 La Plata | 2 | HQ3 | 3 |
| HQ2 | 1 | HQ2 | 4 |
| HQ1 | A | HQ1 | 7 |
| Leg A is AGB73241421A03 | | Leg B is AGA11121134707 | |
Vector CDR AG-B73241421A03-A11121134707

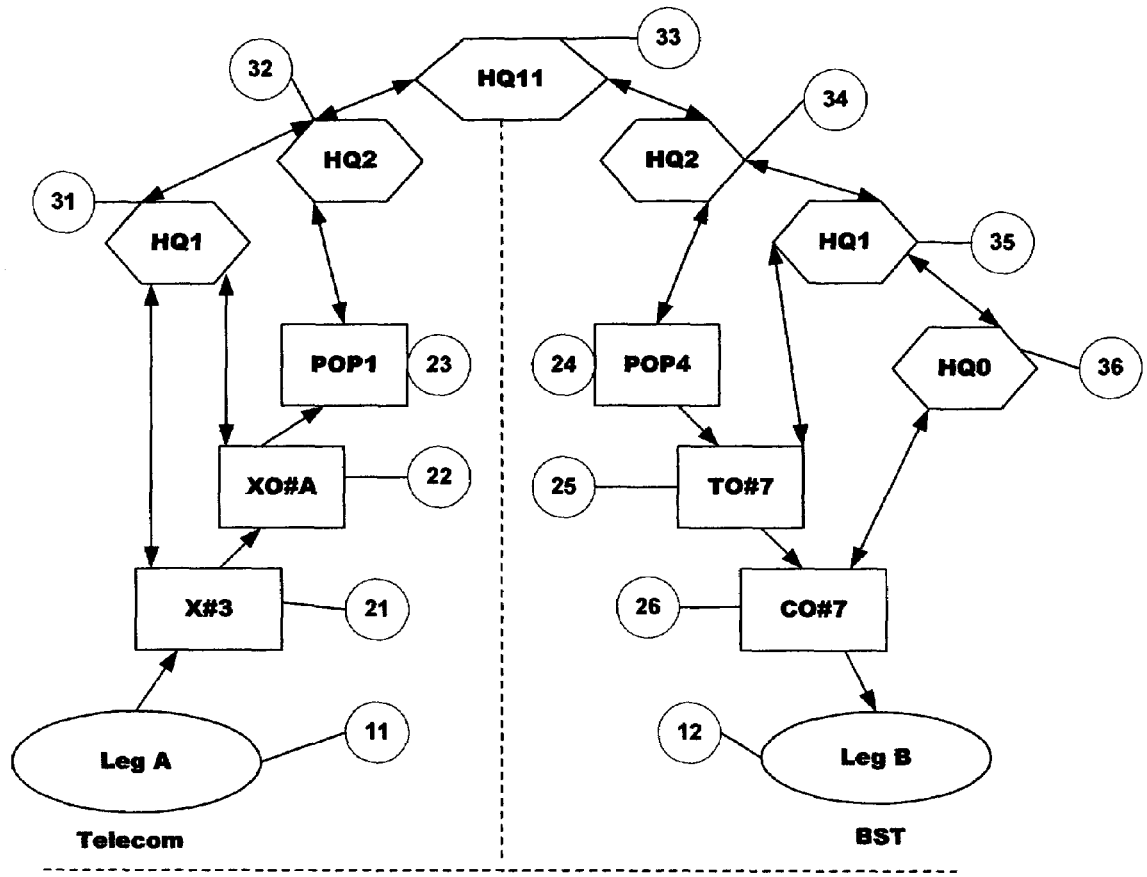
FIG. 84 Hybrid Continental Wireless / Telco Call
5411-842-1257
Buenos Aires
HQ12 to HQ10    AAB
HQ9 to HQ6      7324
HQ9 to HQ6      1112
HQ5  Telecom    1
HQ4 Buenos Aires 4
HQ3 La Plata    2
HQ2             1
HQ1             A
Leg A is AAB73241421A03
305-949-1234
Miami
Nextel
Telecom, Argentina
BST
HQ5             1
HQ4             1
HQ3             3
HQ2             4
HQ1             7
Leg B is AAA11121134707
Vector CDR AA-B73241421A03-A11121134707

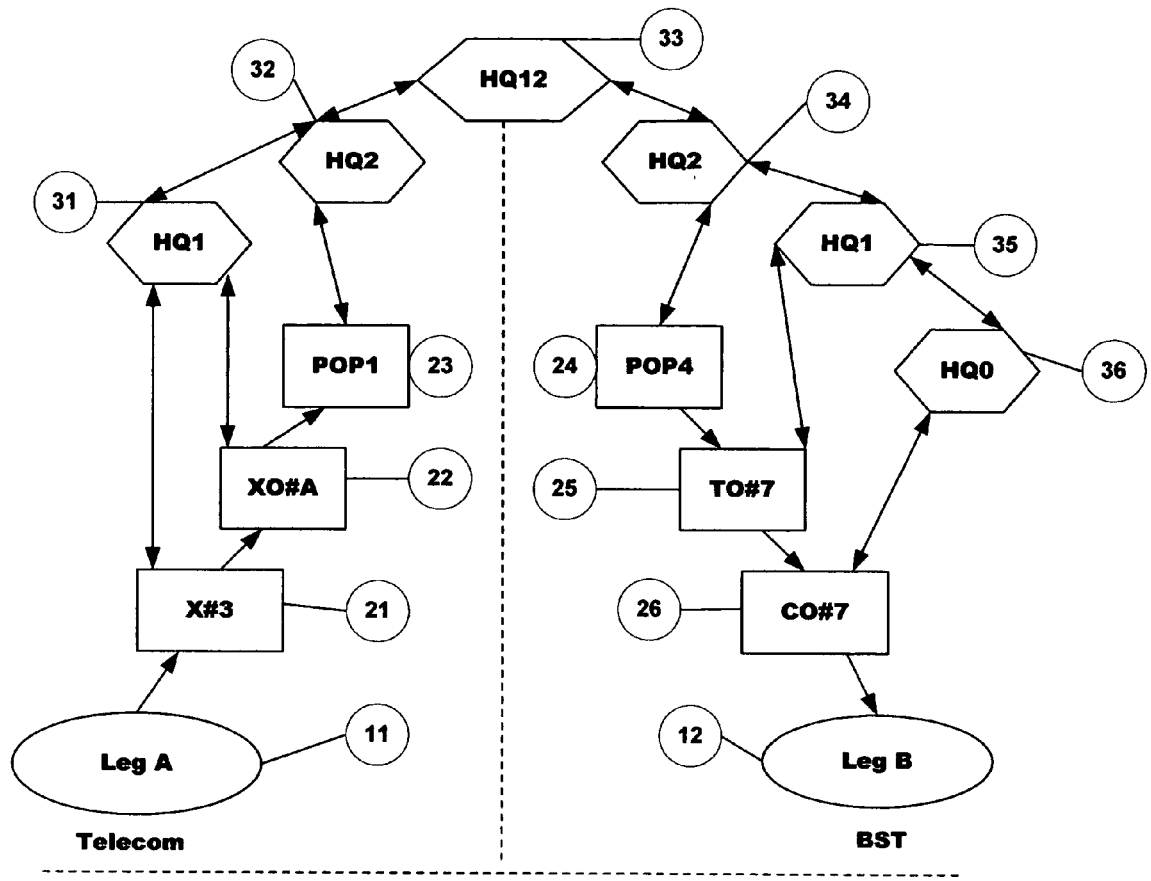
FIG. 85 Hybrid Inter Continental Wireless / Telco Call
| 3917-24-1234 | | 305-949-1234 | |
|---|---|---|---|
| Roma | | Miami | |
| HQ12 to HQ10 | AHA | Verizon | |
| HQ9 to HQ6 | 7117 | Telecom, Italia | |
| HQ9 to HQ6 | 1112 | BST | |
| HQ5 Telecom | 3 | HQ5 | 1 |
| HQ4 Latina | 2 | HQ4 | 1 |
| HQ3 Roma | 1 | HQ3 | 3 |
| HQ2 | 1 | HQ2 | 4 |
| HQ1 | A | HQ1 | 7 |
| Leg A is AHA71173211A03 | | Leg B is AGA11121134707 | |
Vector CDR A-HA 71173211A03-GA11121134707

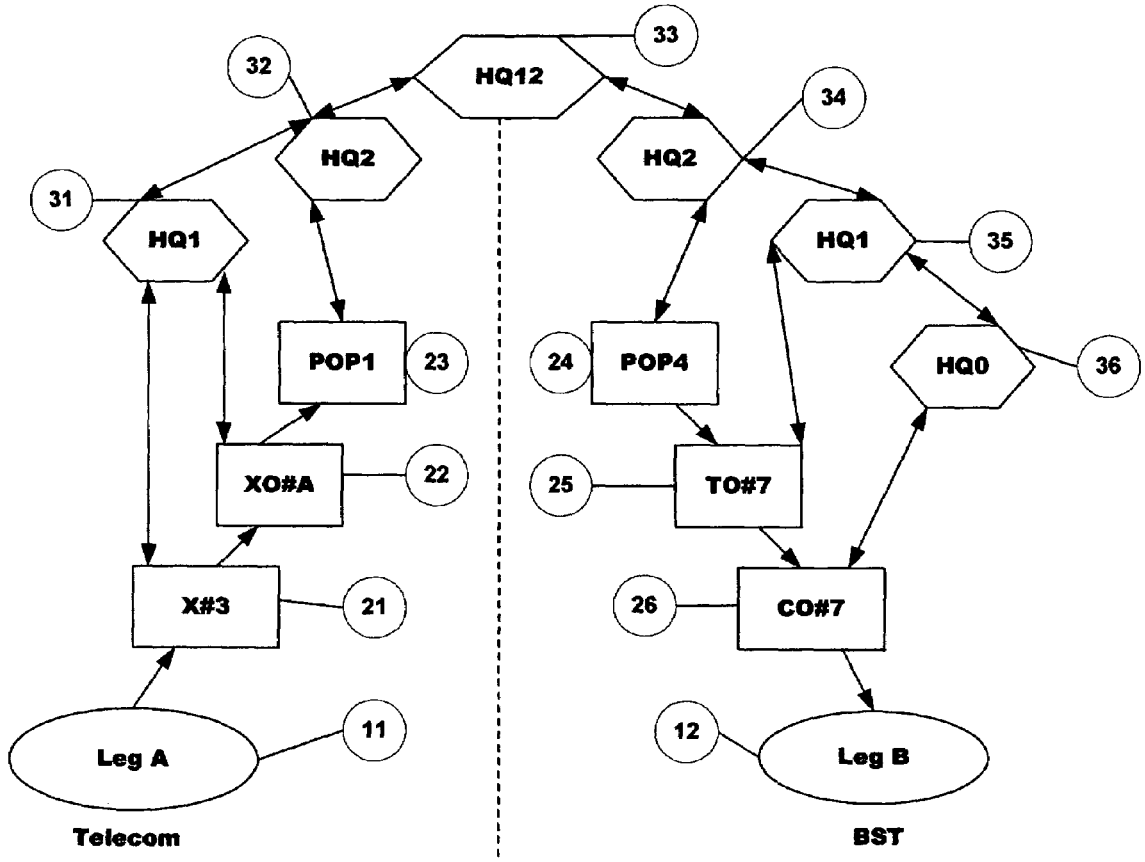
FIG. 86 Hybrid Continental Roaming Call
```
Roaming
5411-842-1257                          305-949-1234
Miami                                  Miami
HQ12 to HQ10      AAB                  Nextel
HQ9 to HQ6        7324                 Telecom, Argentina
HQ9 to HQ6        1112                 BST
HQ5  Telecom      1                    HQ5                    1
HQ4 Buenos Aires  4                    HQ4                    1
HQ3 La Plata      2                    HQ3                    3
HQ2               1                    HQ2                    4
HQ1               A                    HQ1                    7
Leg A is AAB73241421A03                Leg B is AAA11121134707
```
Vector CDR A - AB73241421A03- AA 11121134707

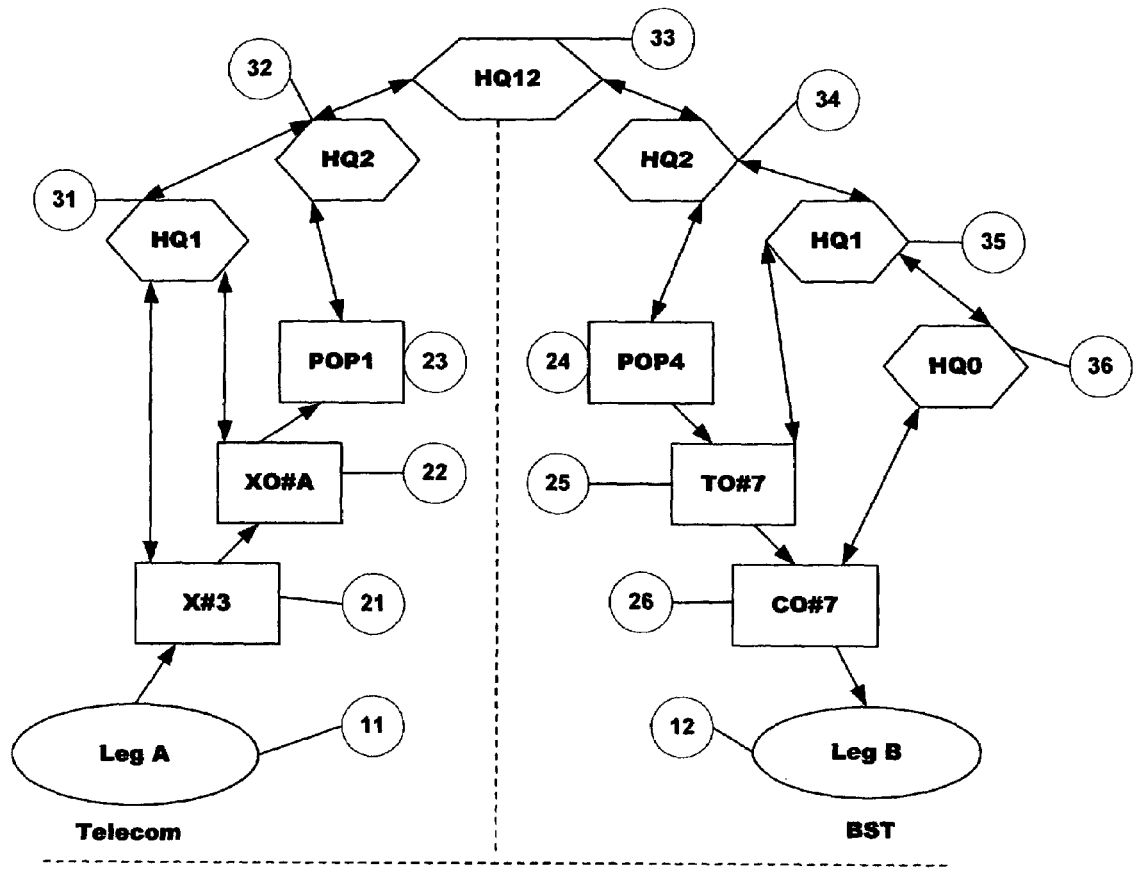
FIG. 87 Hybrid Inter Continental Roaming Call
Roaming
3917-24-1234
Roma
| HQ12 to HQ10 | AHA |
| HQ9 to HQ6 | 7117 |
| HQ9 to HQ6 | 1112 |
| HQ5 Telecom | 3 |
| HQ4 Latina | 2 |
| HQ3 Roma | 1 |
| HQ2 | 1 |
| HQ1 | A |
Leg A is AHA71173211A03
305-949-1234
Miami
Verizon
Telecom, Italia
BST
| HQ5 | 1 |
| HQ4 | 1 |
| HQ3 | 3 |
| HQ2 | 4 |
| HQ1 | 7 |
Leg B is AGA11121134707
Vector CRD A - HA71173211A03- GA 11121134707

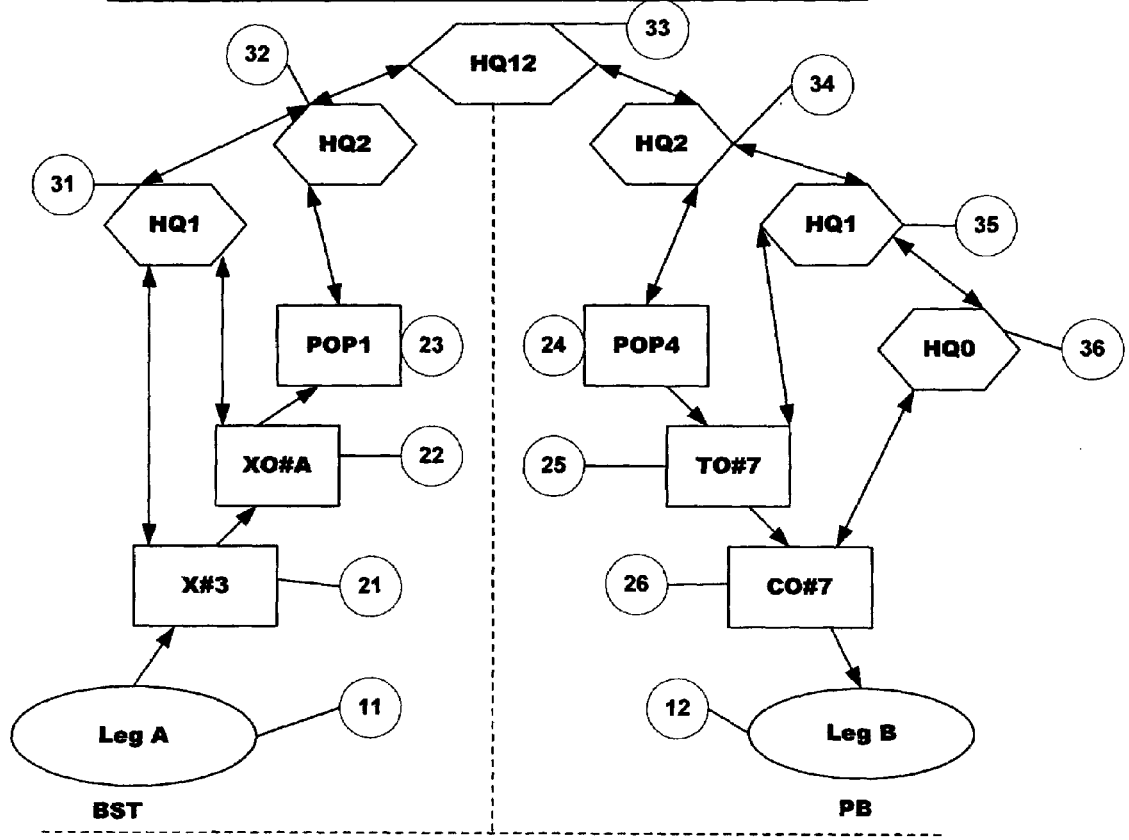

FIG. 88 Hybrid Inter Continental Complex

Verizon - Telcom Italia
Complex Roaming
3917-24-1234
Miami

| | |
|---|---|
| HQ12 to HQ10 | AHA |
| HQ12 to HQ10 | AAB |
| HQ9 to HQ6 | 7117 |
| HQ9 to HQ6 | 7324 |
| HQ9 to HQ6 | 2312 |
| HQ9 to HQ6 | 2584 |
| HQ5  BST | 1 |
| HQ4 Florida | 1 |
| HQ3 SFla | 3 |
| HQ2 | 5 |
| HQ1 | 9 |

Leg A is AHA71173211A03
Leg X is AAA2312113590F

Nextel - Telcom Argentina 5411-842-1257
LAX
Verizon - Europe
Nextel - S. America
Telcom, Italia
Telcom, Argentina
Verizon - BST
Nextel - PB

| | |
|---|---|
| HQ5 | 1 |
| HQ4 | 1 |
| HQ3 | 3 |
| HQ2 | 1 |
| HQ1 | 2 |

Leg B is AAB73241134707
Leg Y is AAA25841131201

Vector CDR A- HA71173211A03- AB 73241134707- AA 2312113590F- AA 25841131201

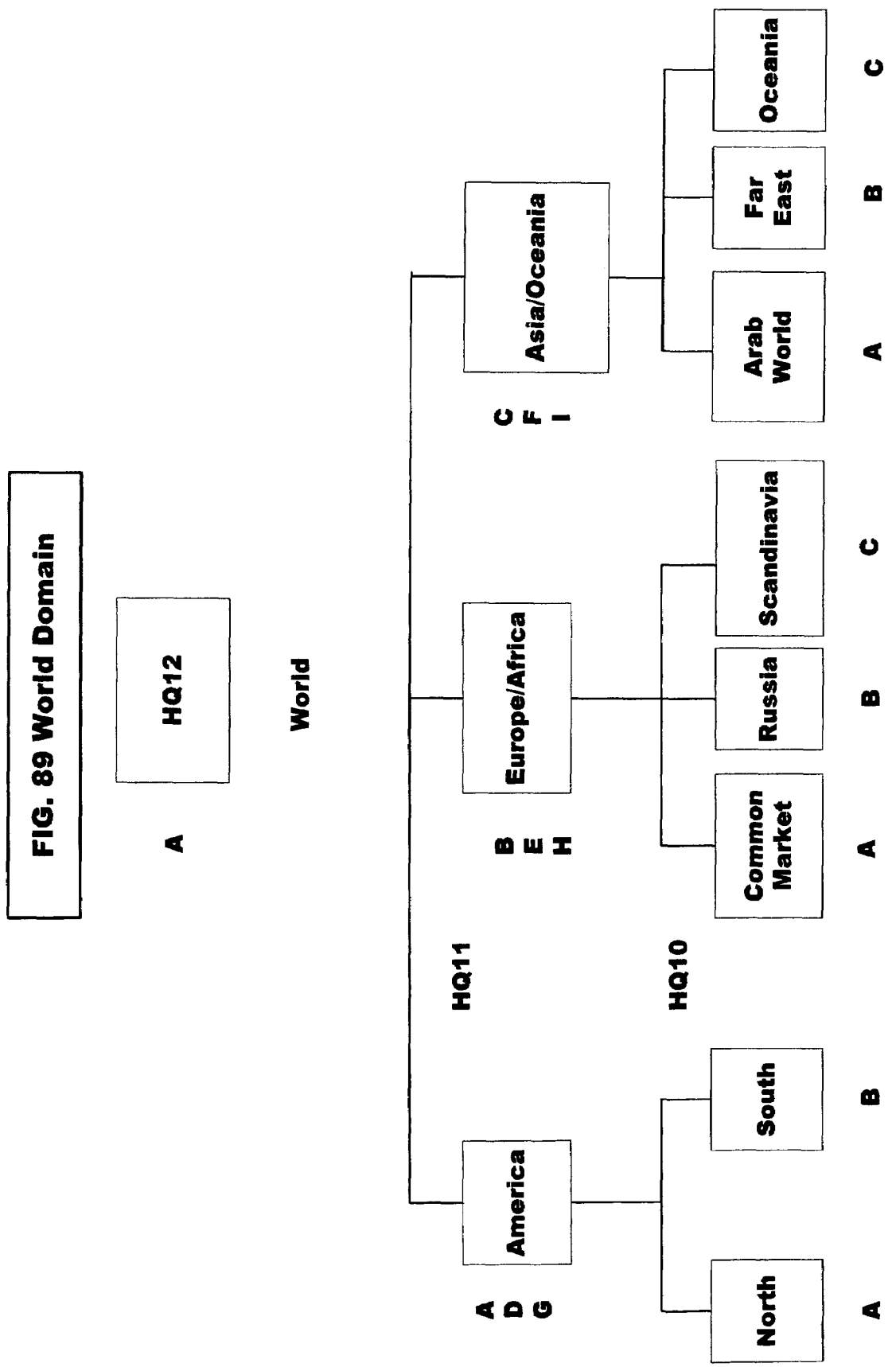
FIG. 89 World Domain

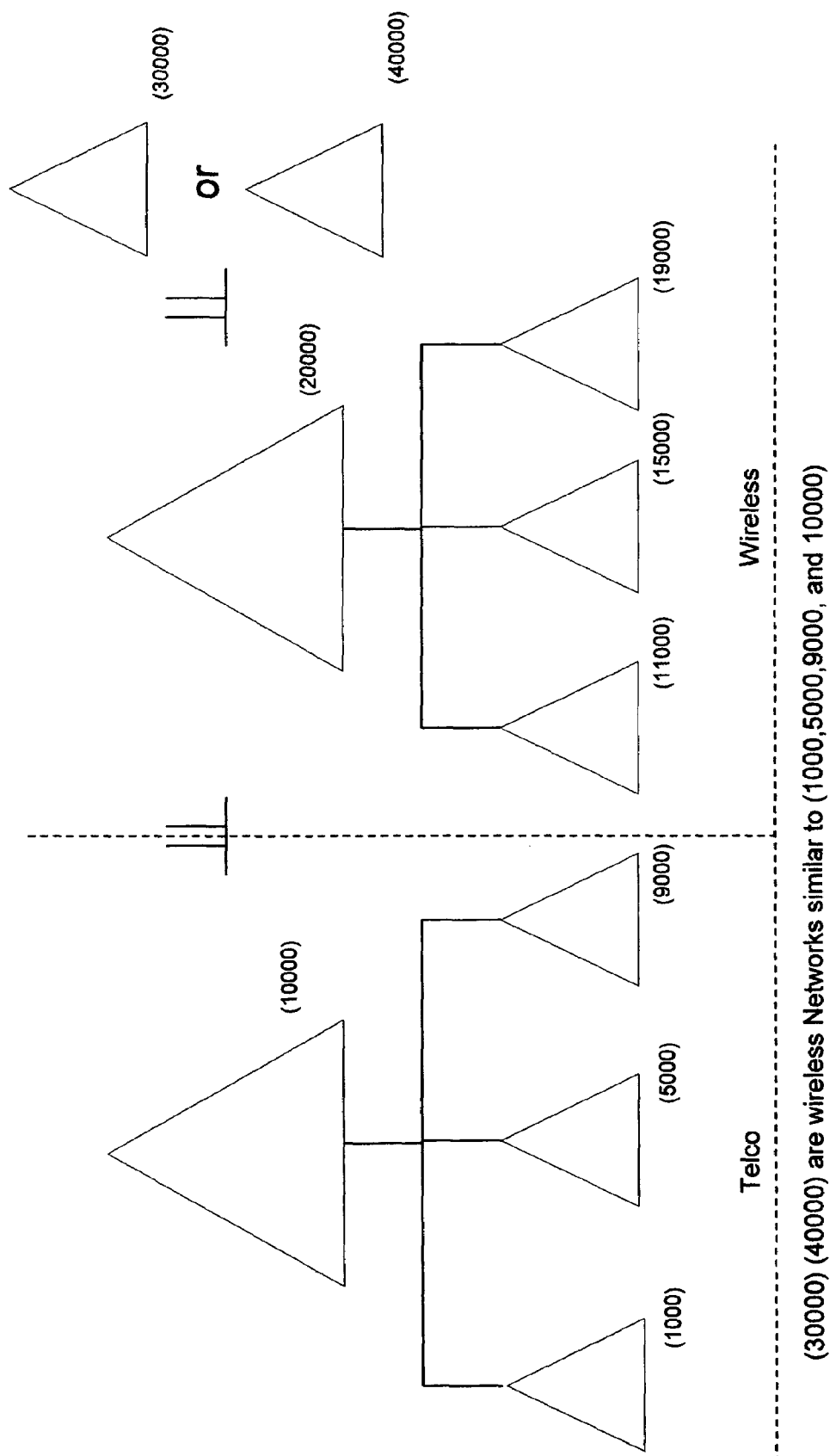
FIG. 90 World Scope Networks

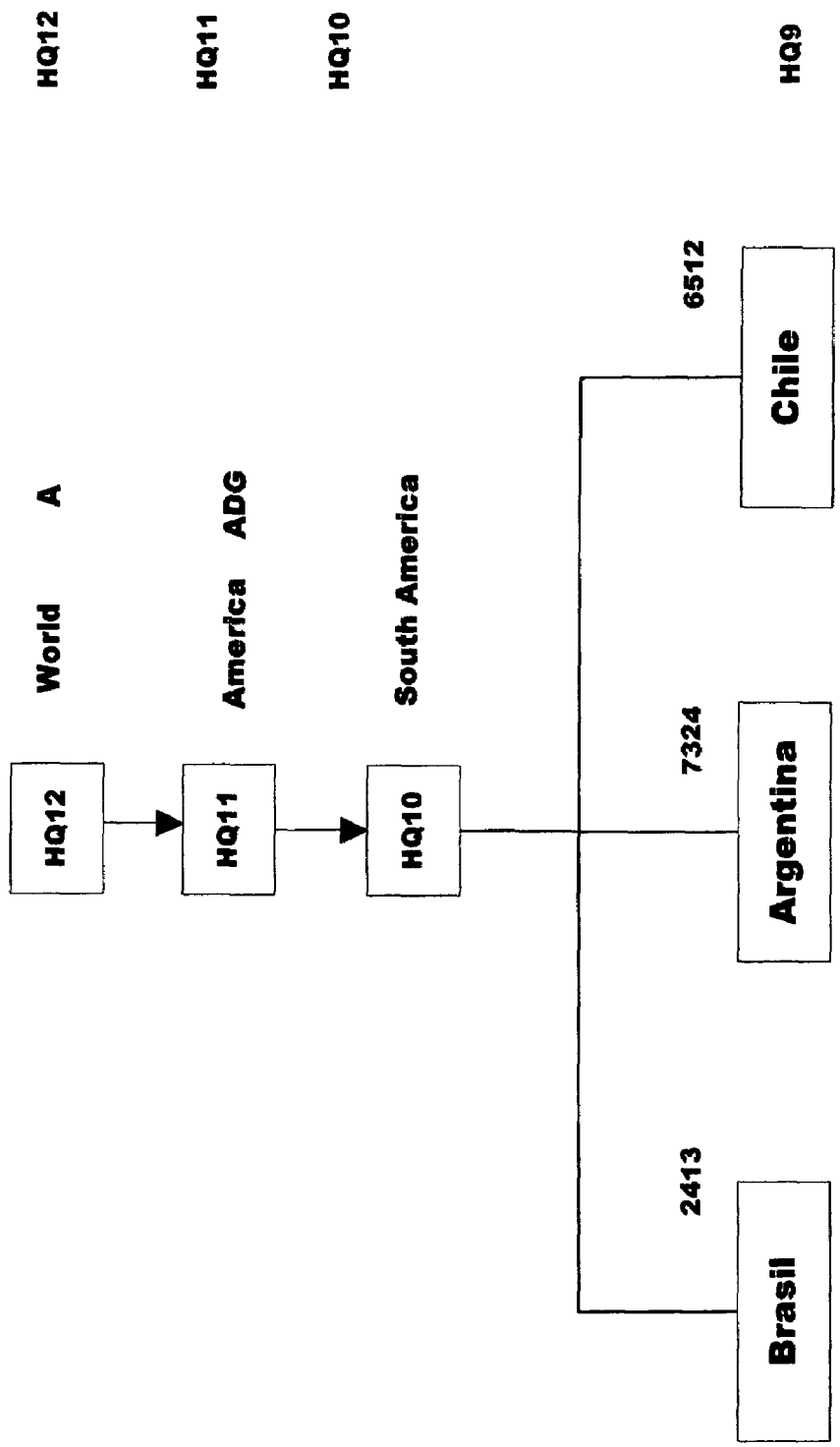
FIG. 91 South America Scope Networks

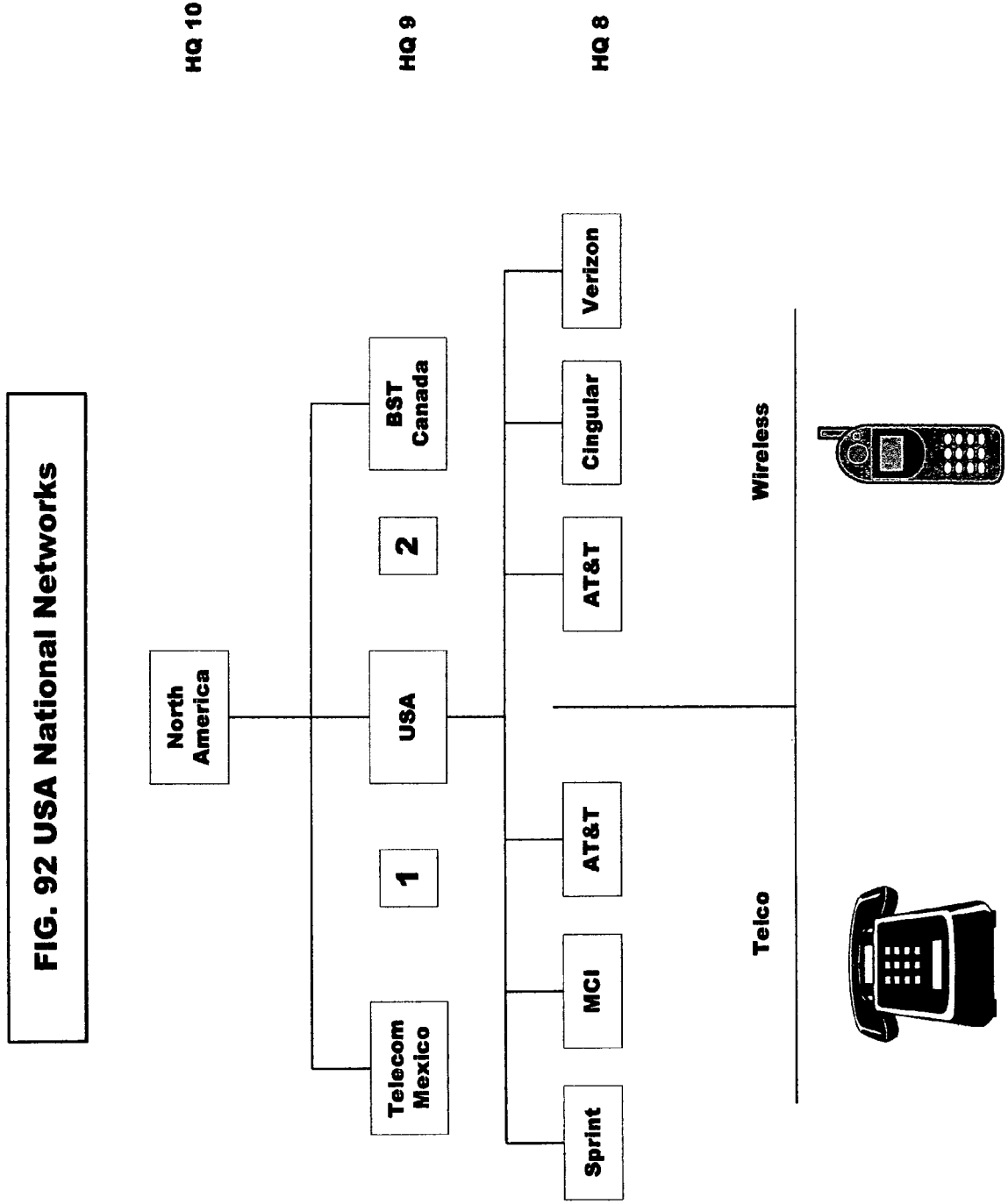

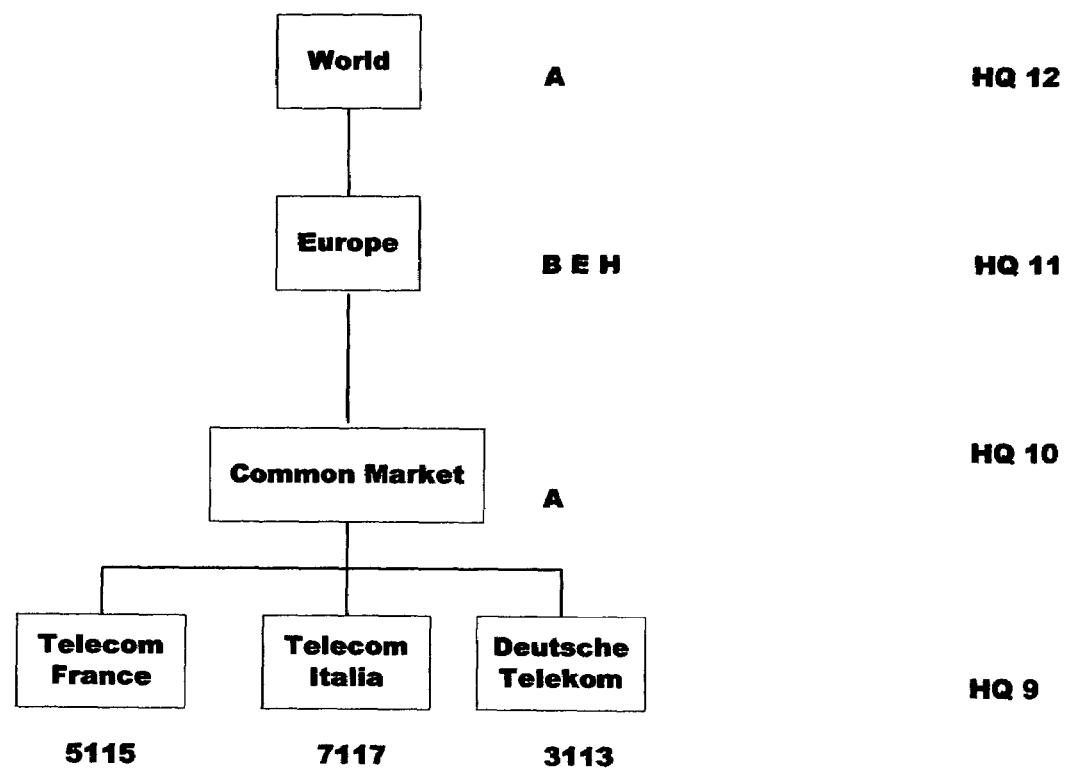

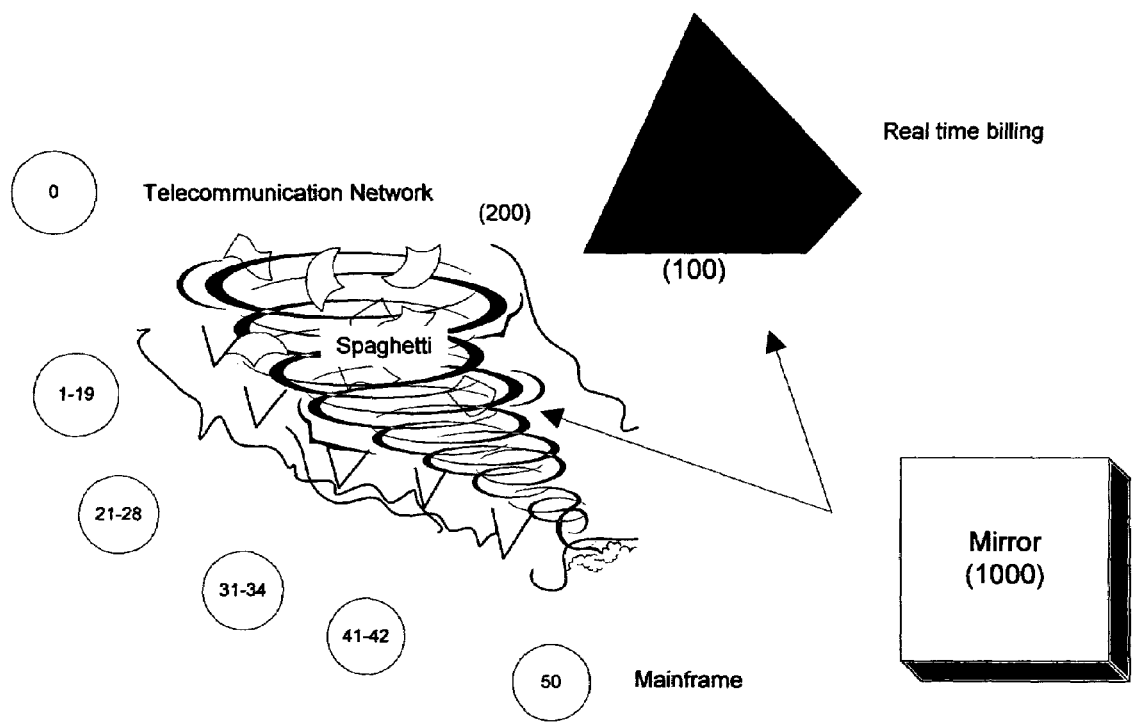
Telecom Italia takes up 60 days to process its billing

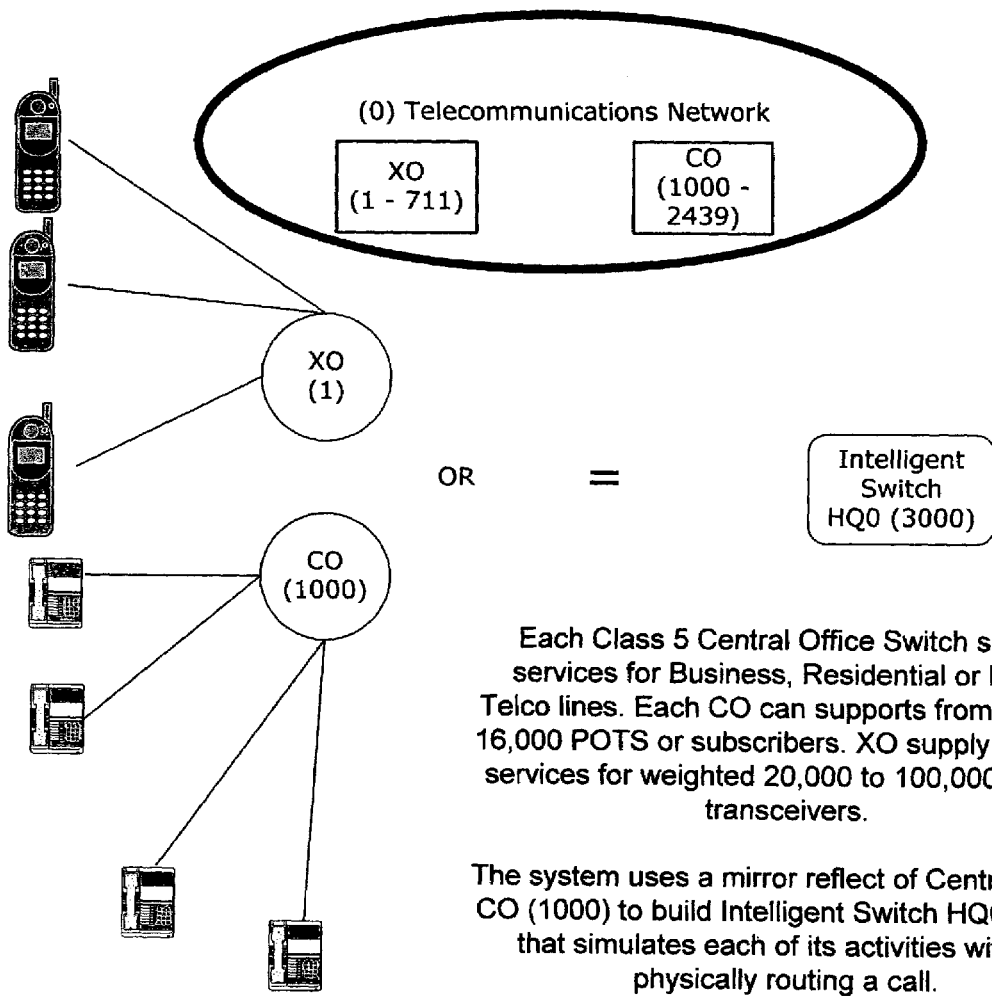

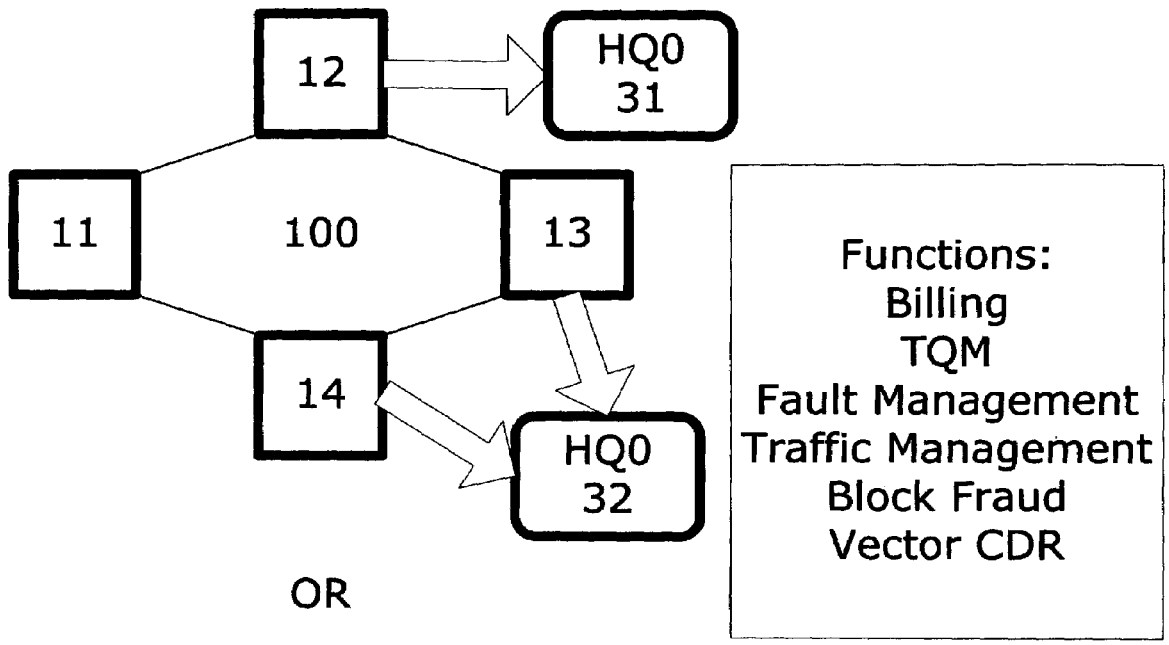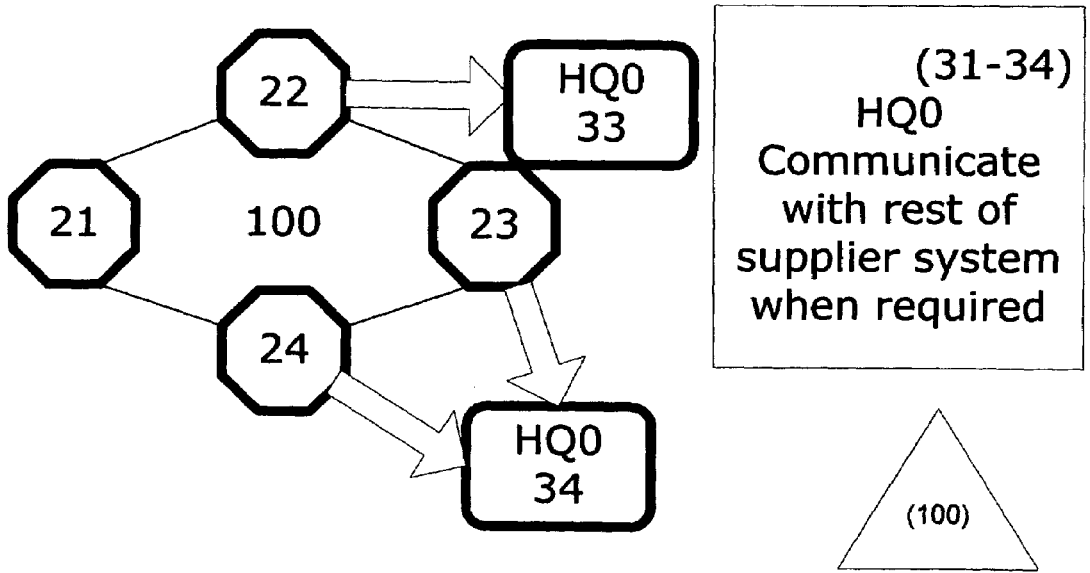

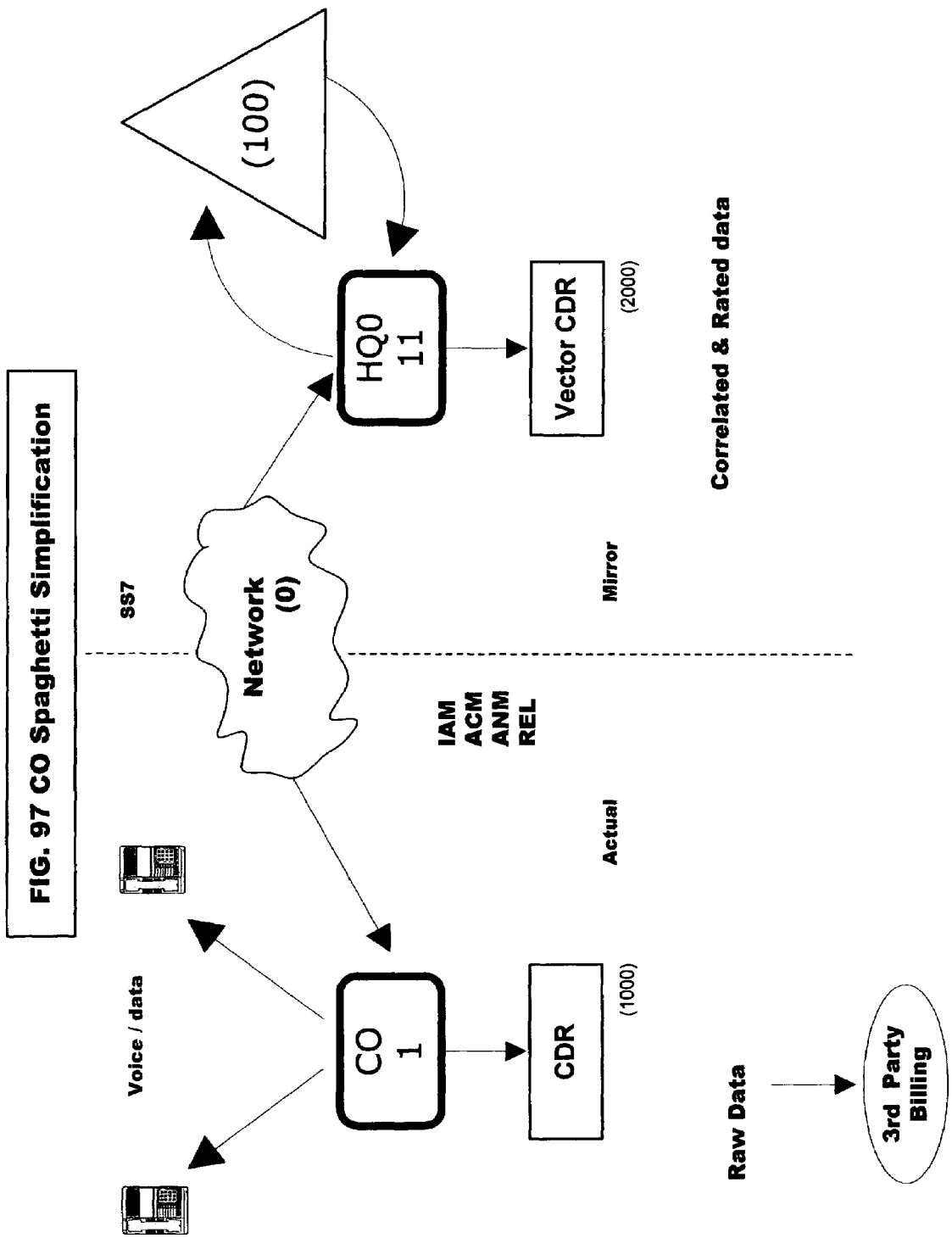
FIG. 97 CO Spaghetti Simplification

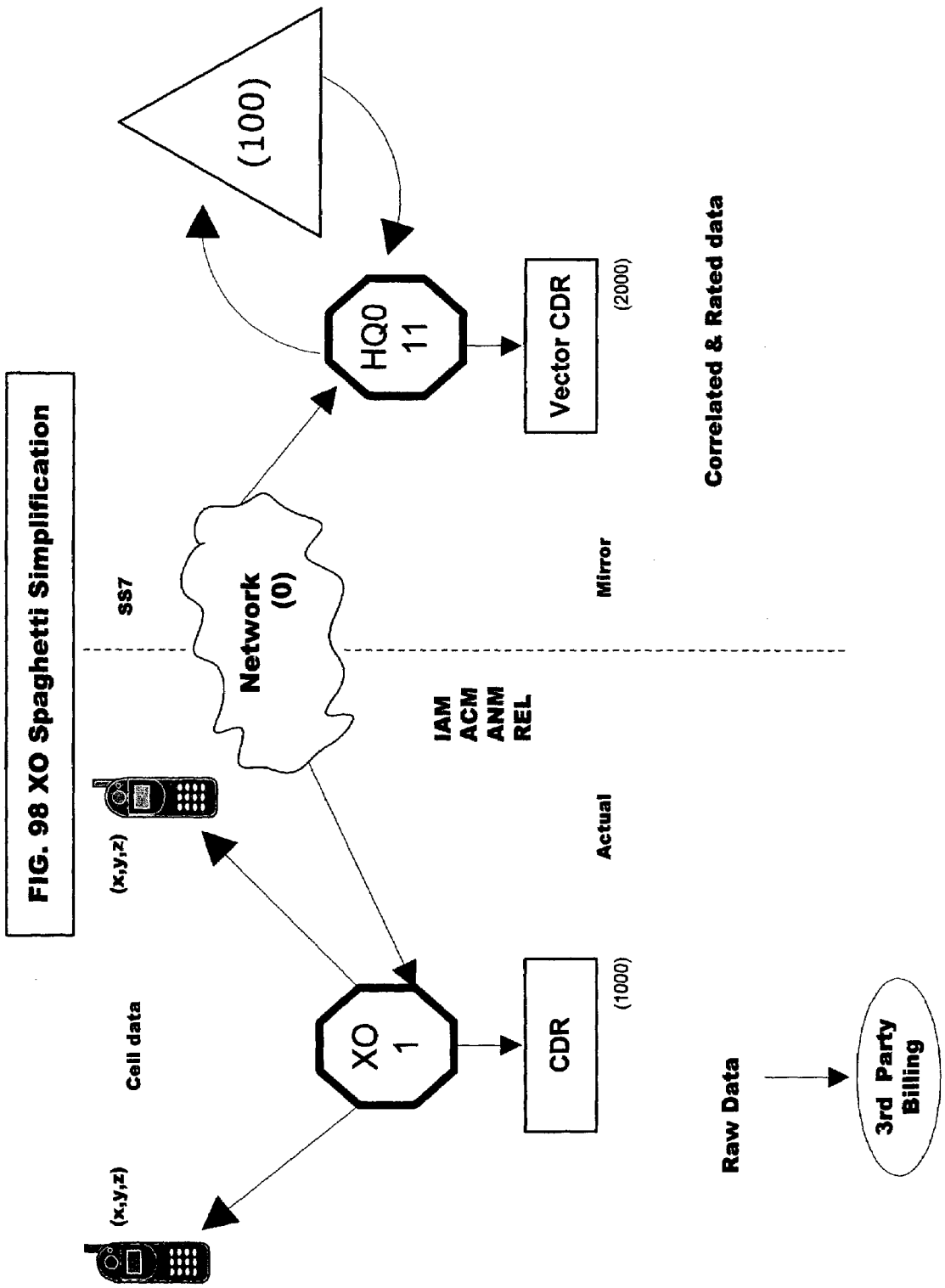
FIG. 98 XO Spaghetti Simplification

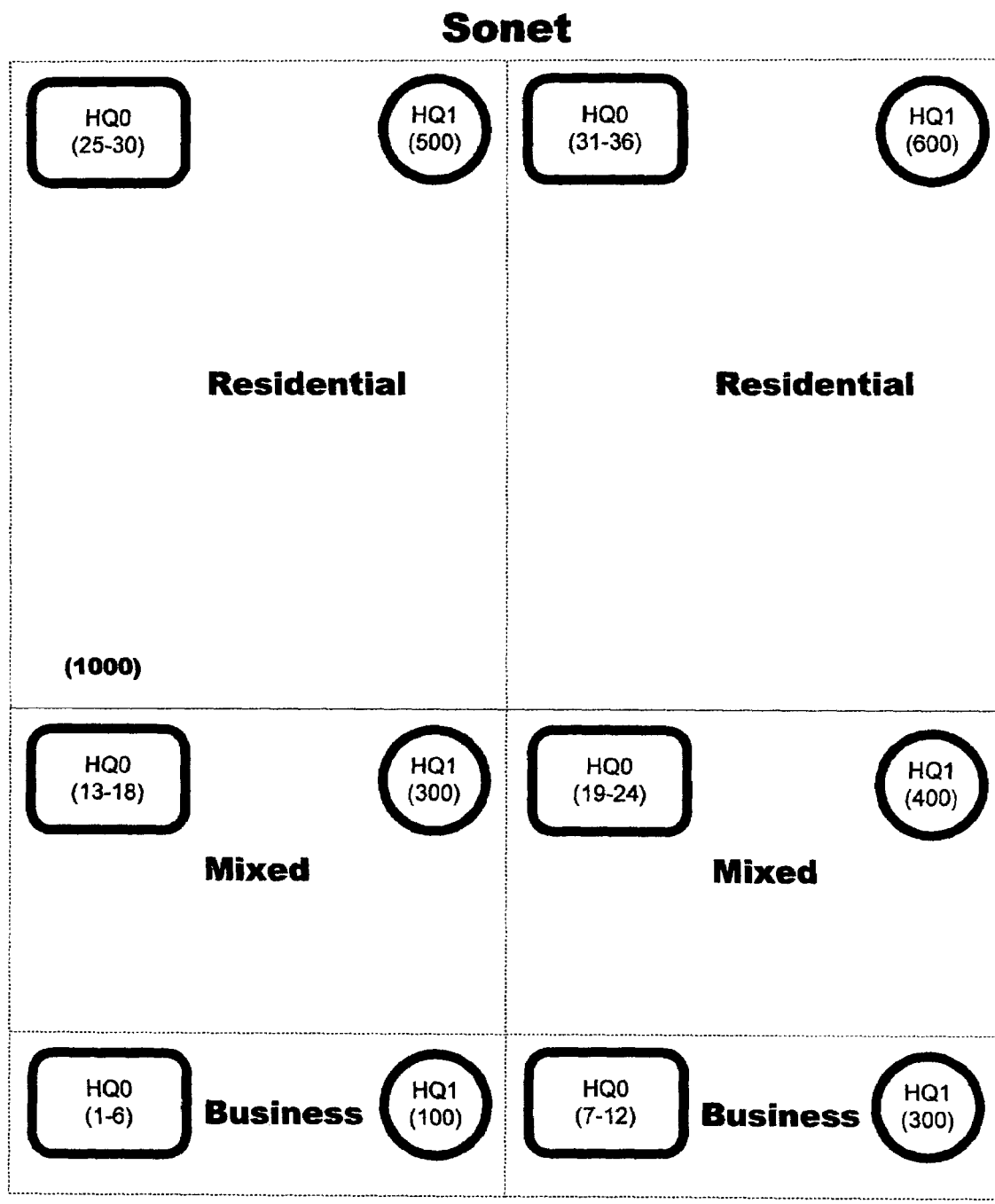

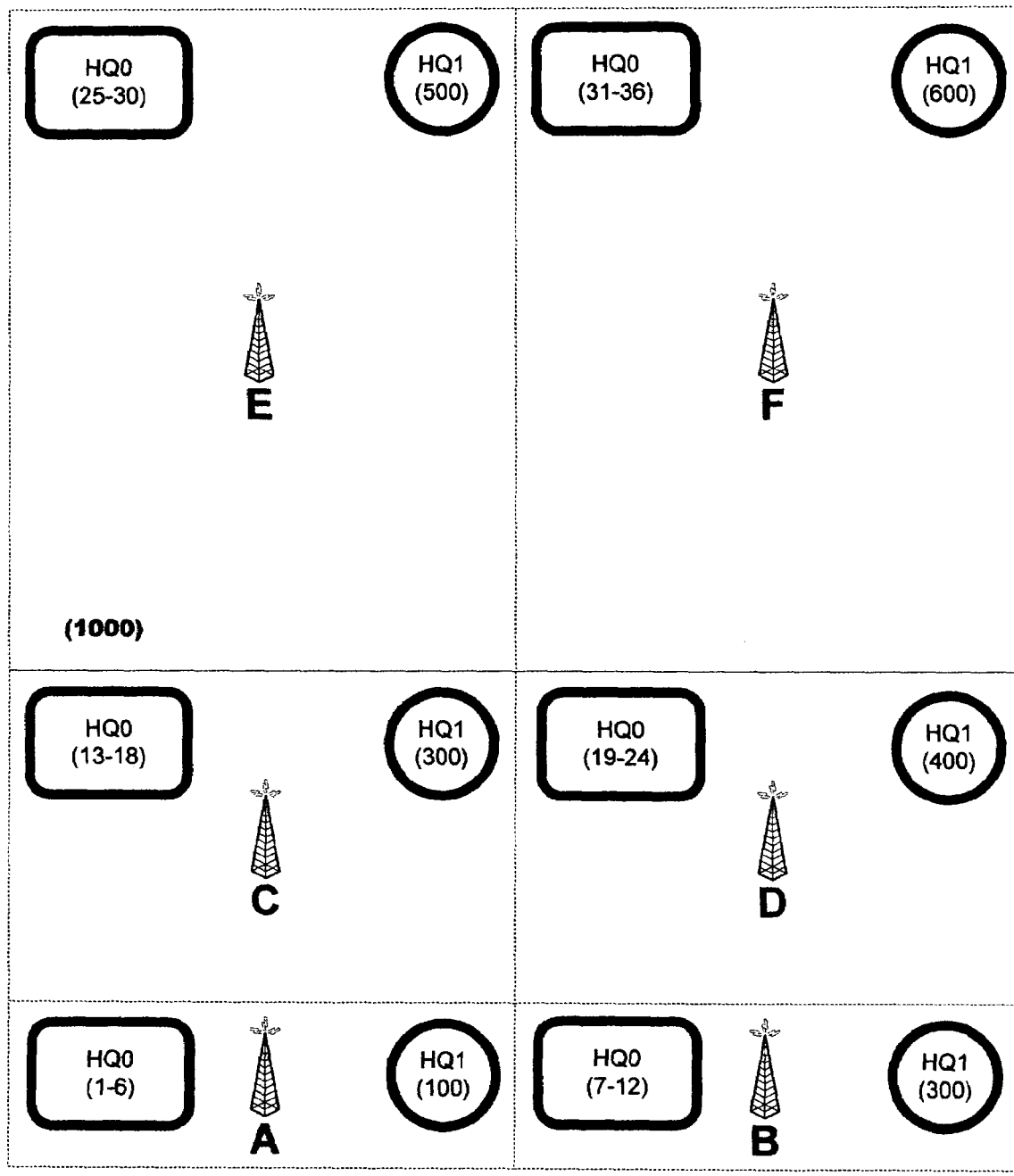
FIG. 100 Simplifying a Wireless NPA

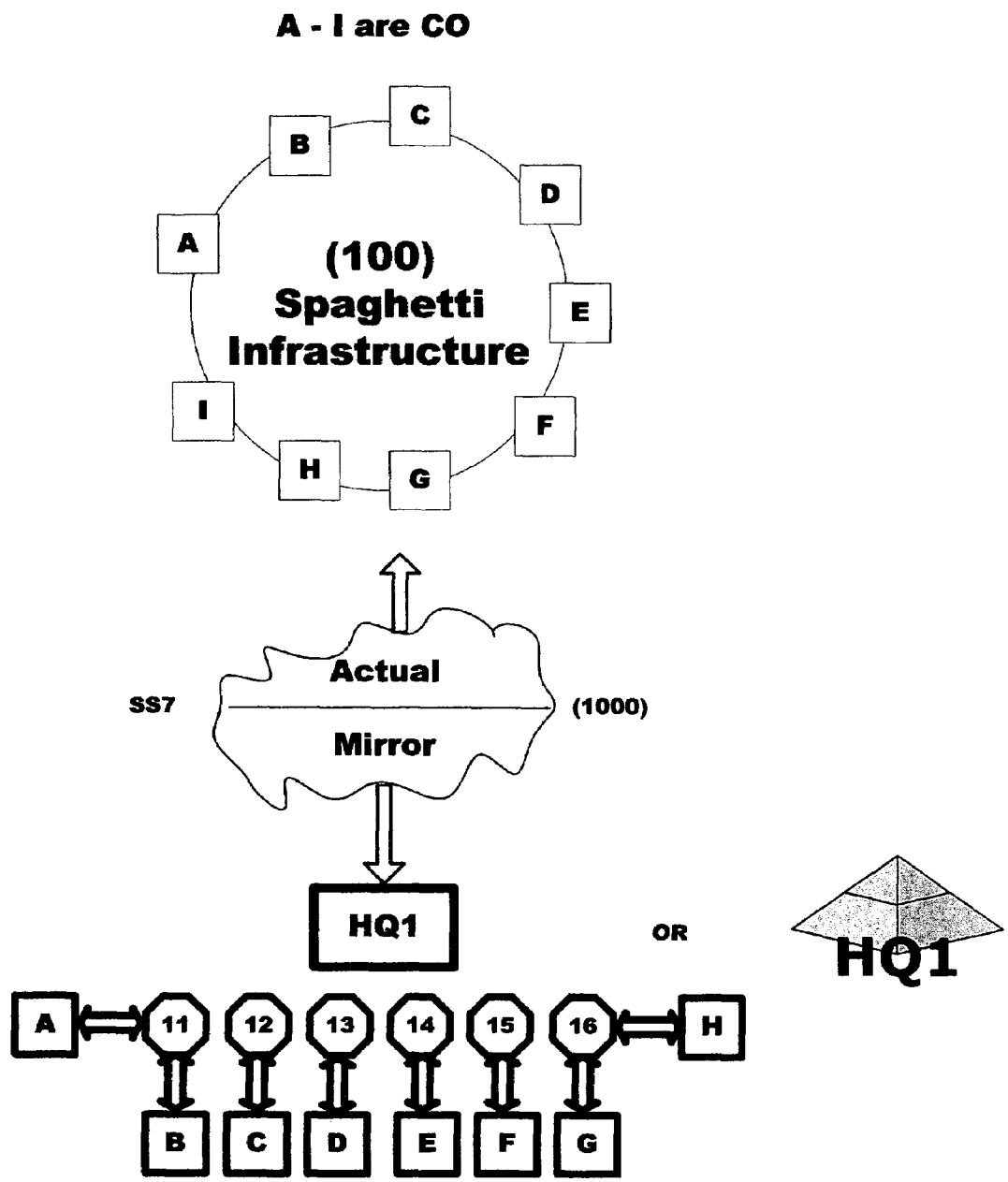
FIG. 101 Organizing NXX Spaghetti Infrastructure

FIG. 102 Organizing NPA Spaghetti Infrastructure
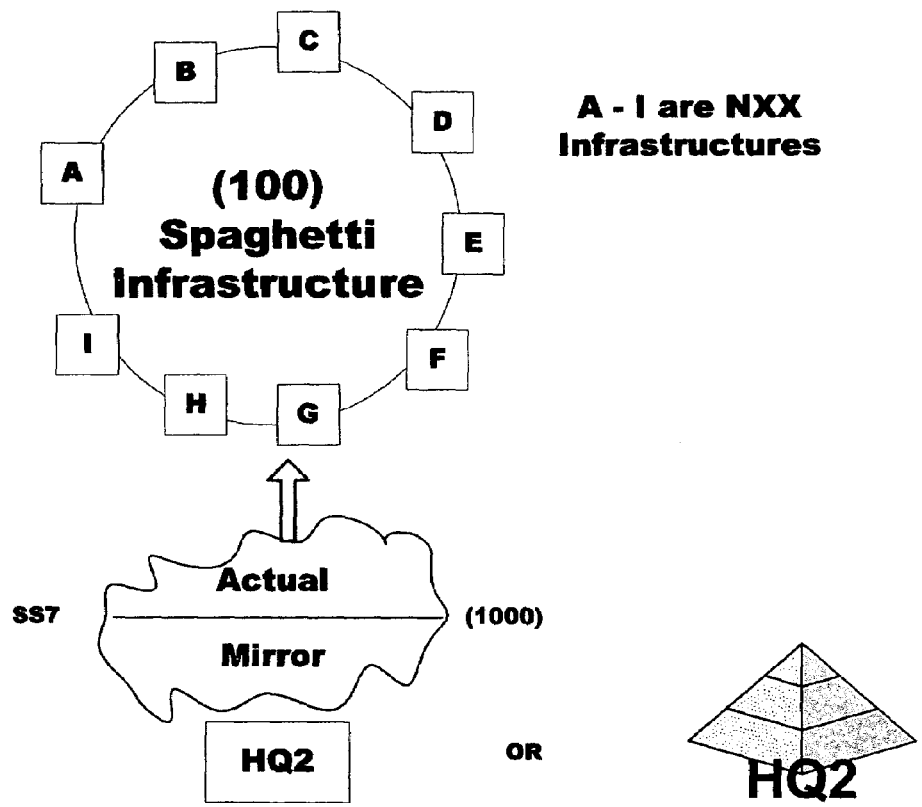
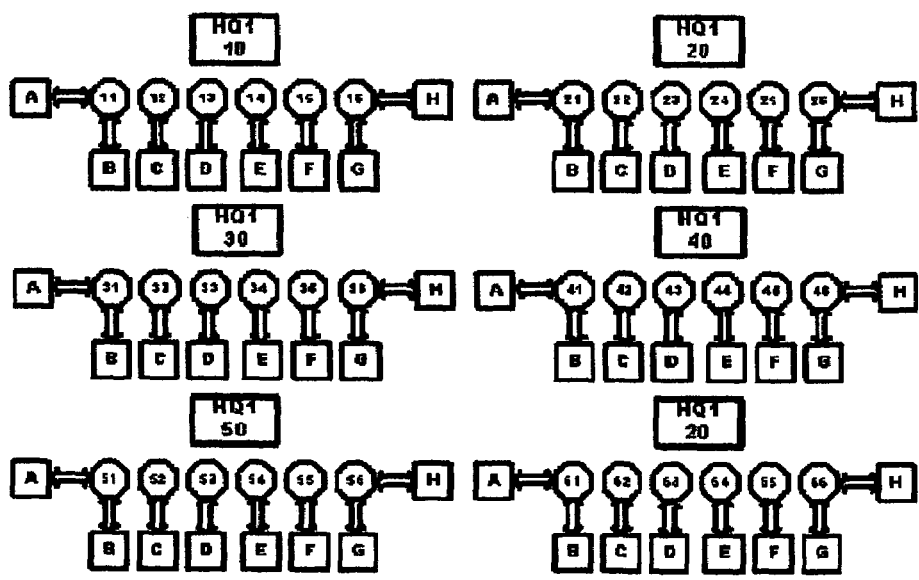

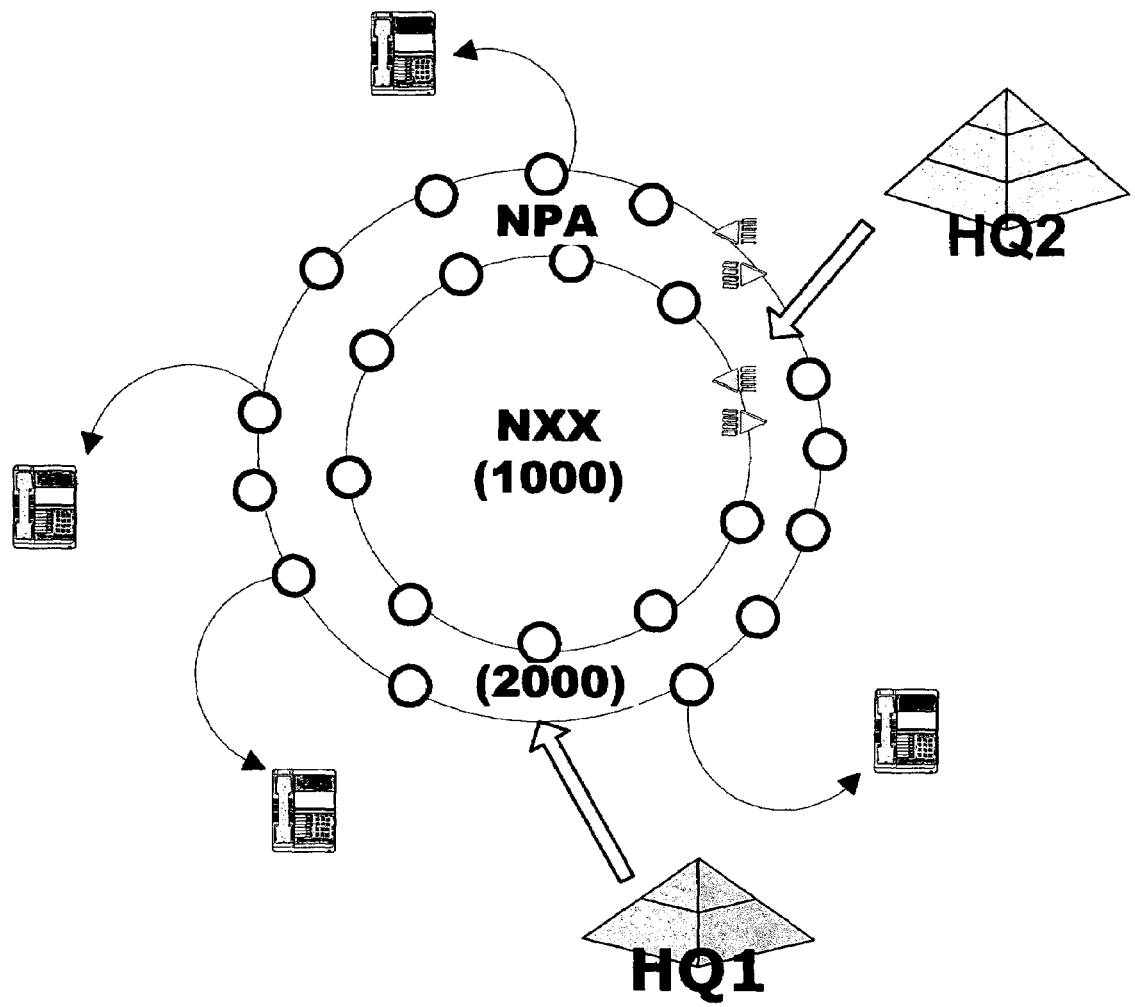

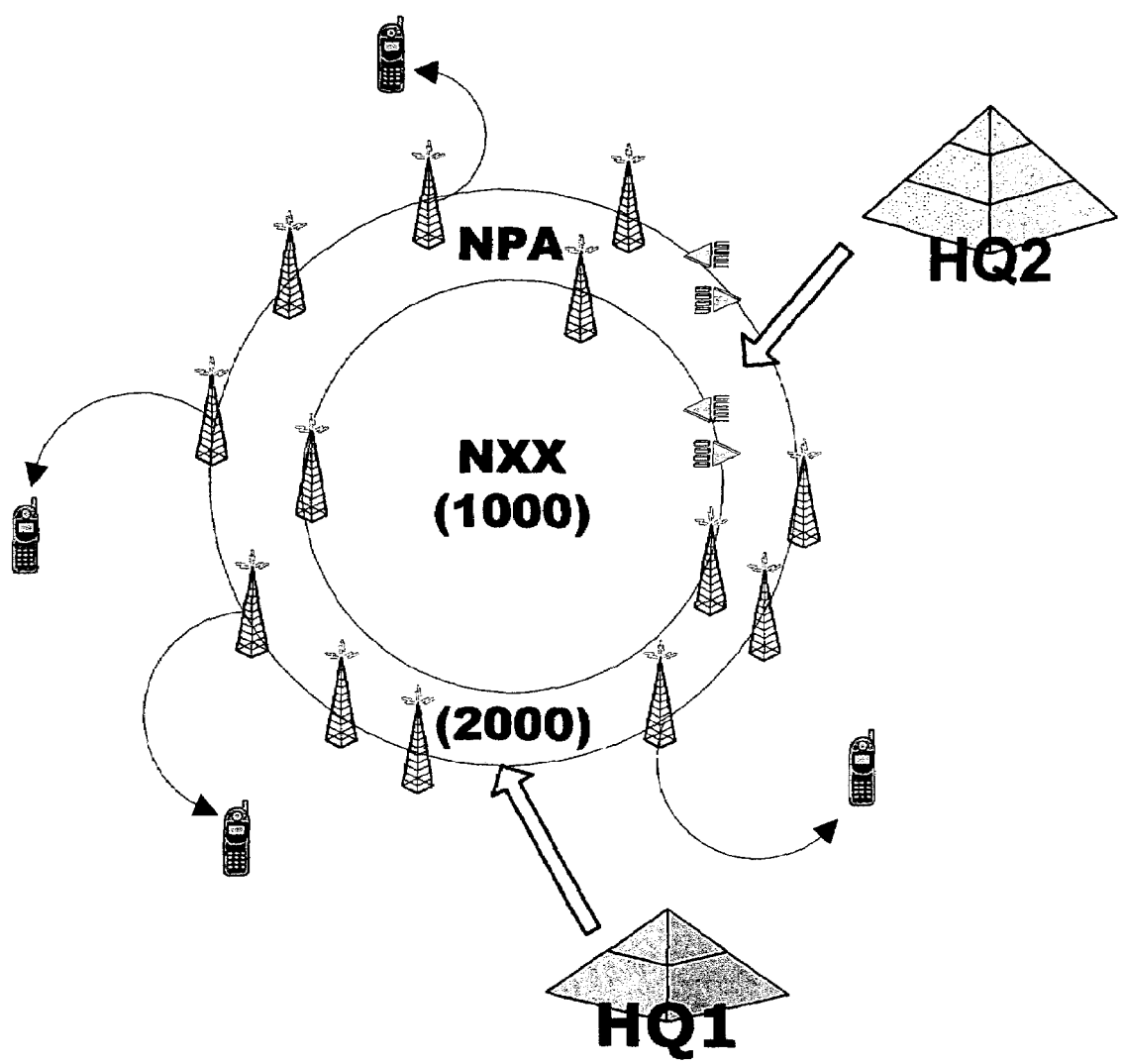

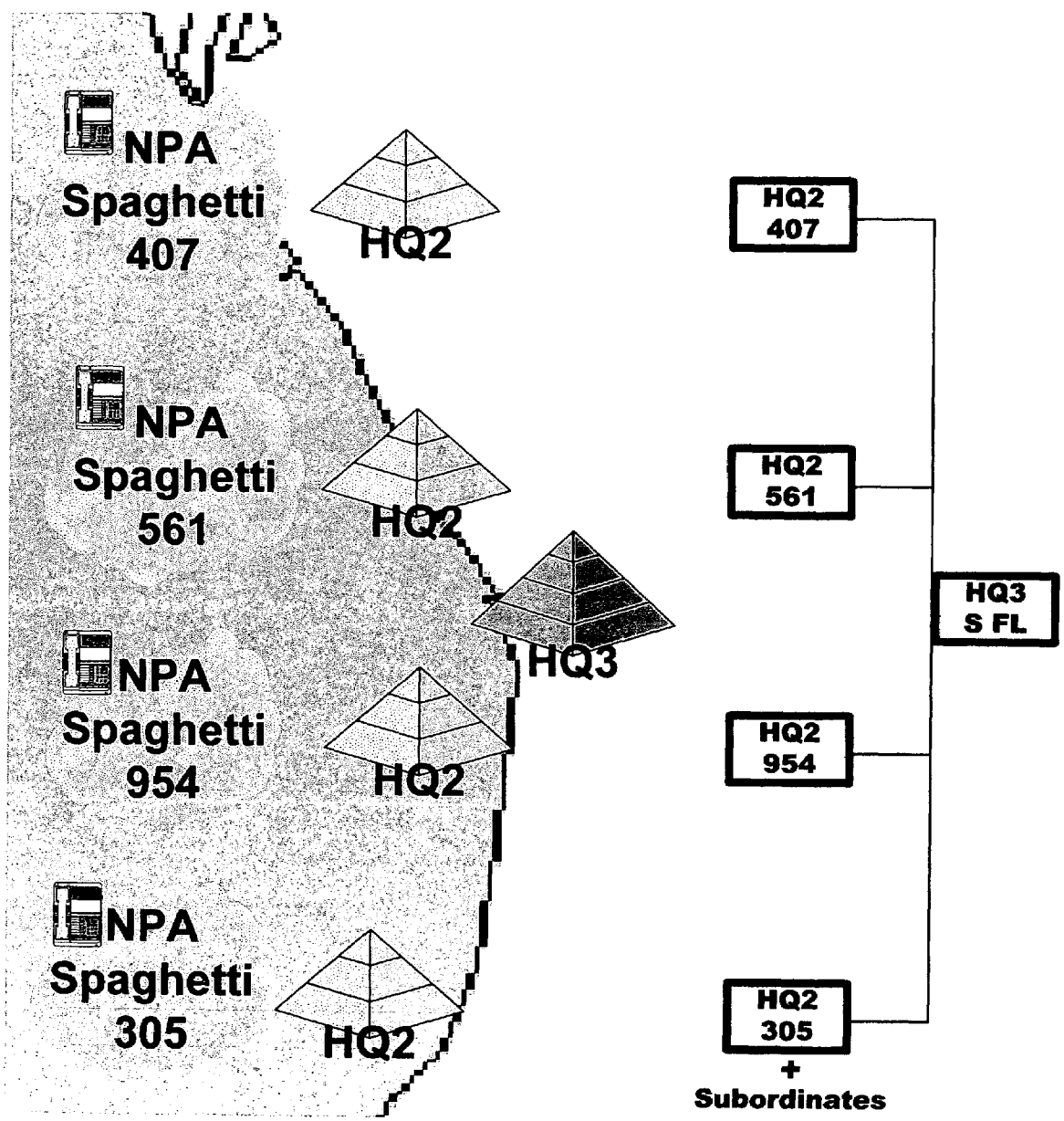

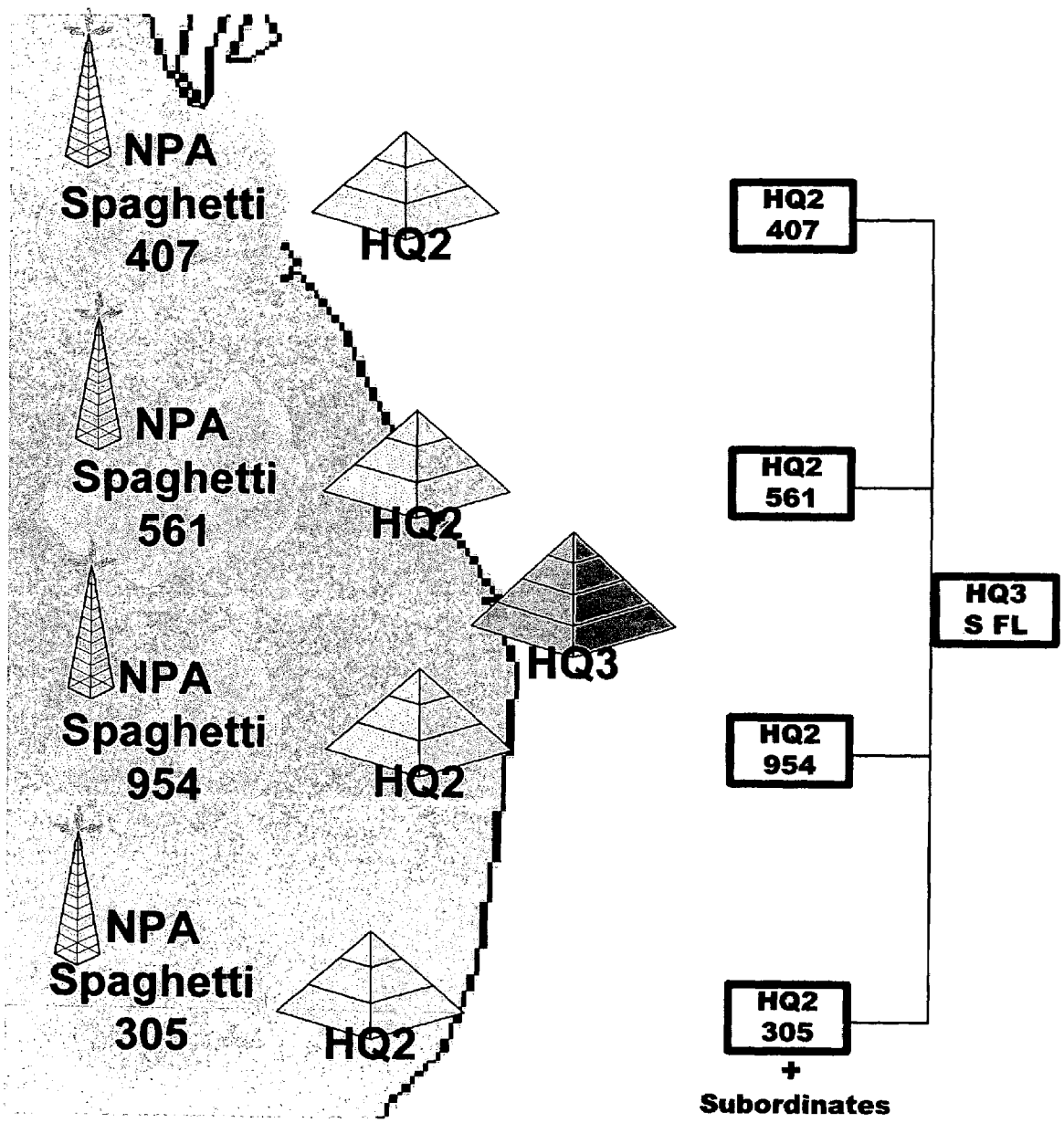

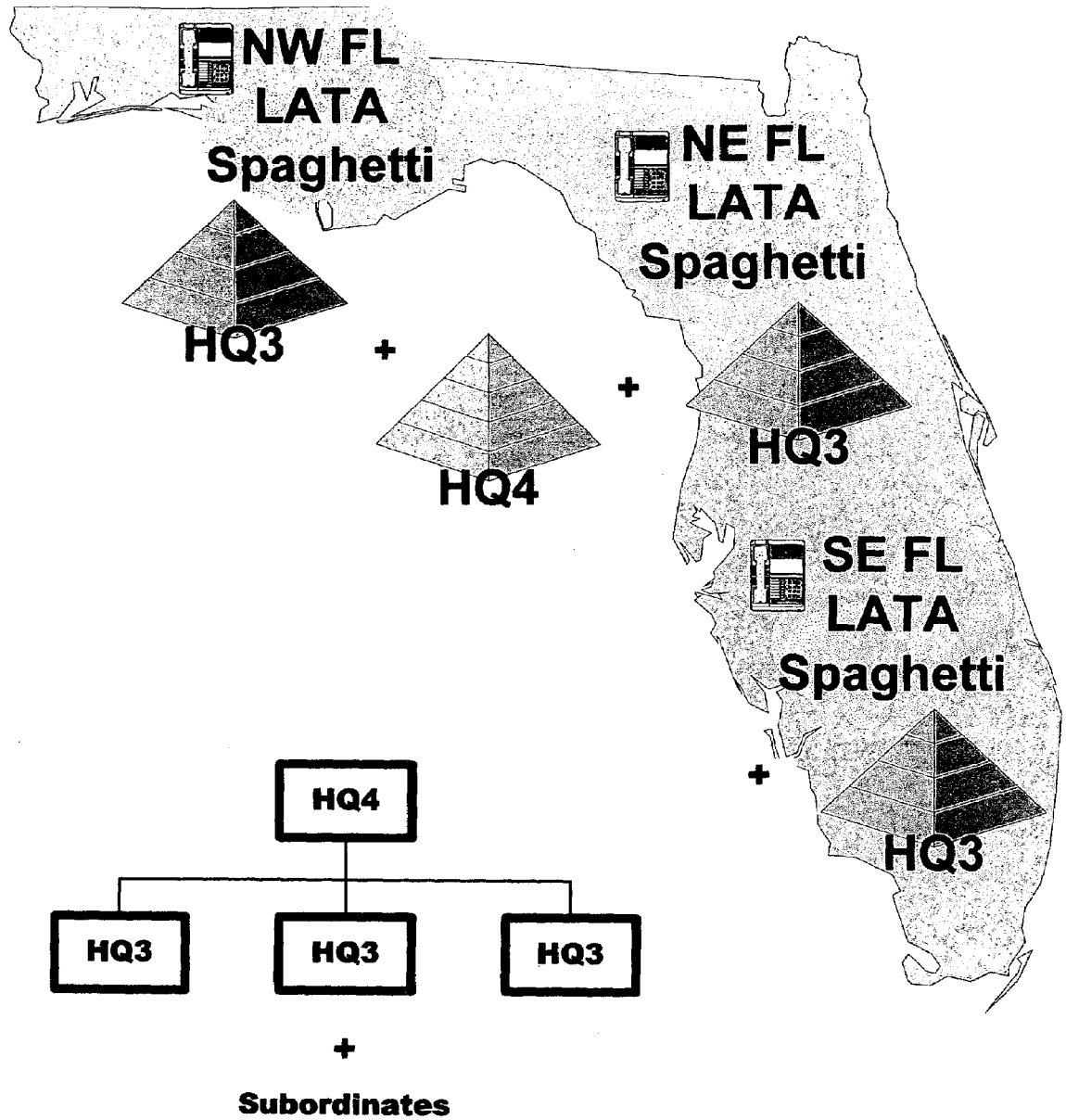

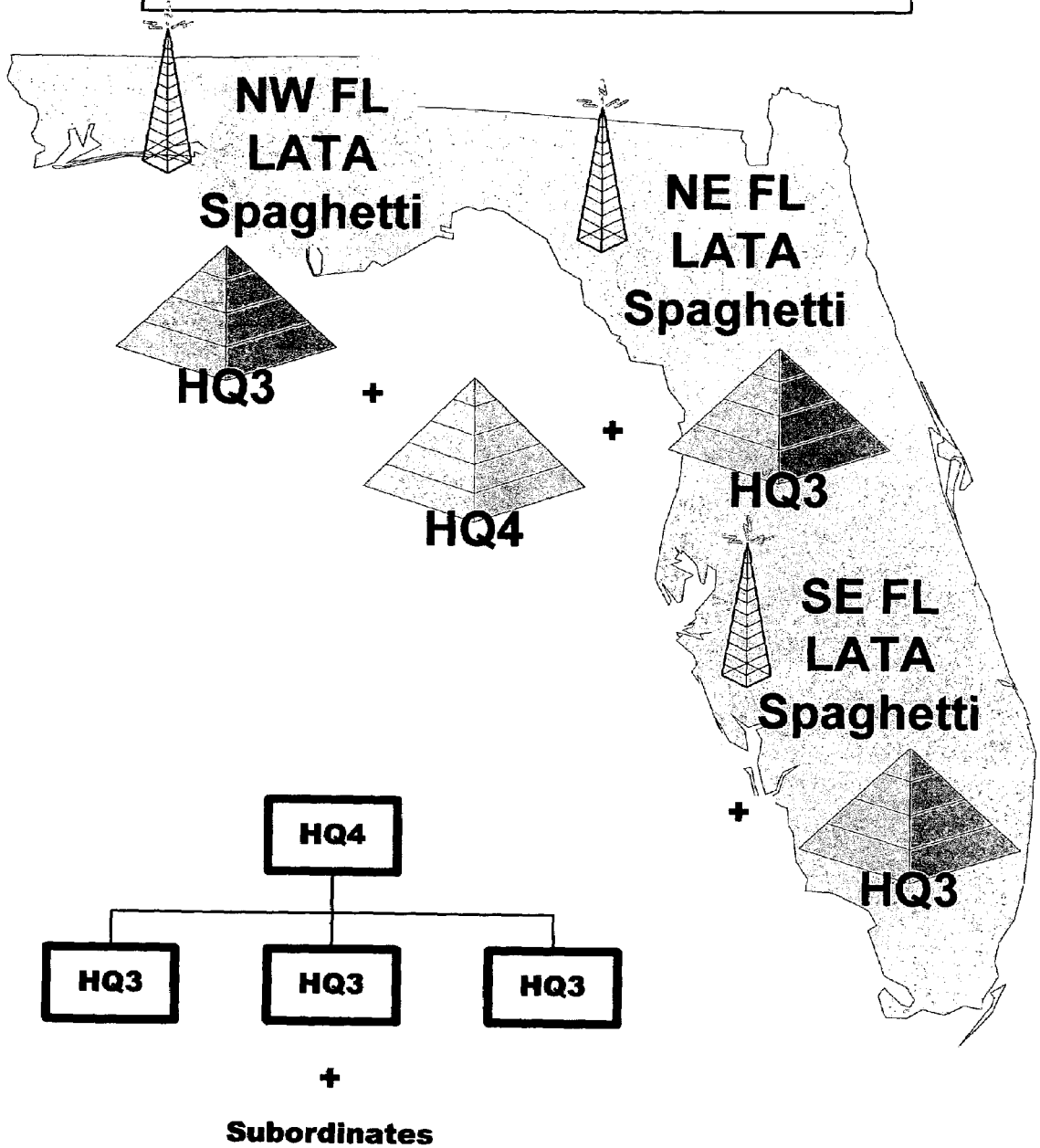

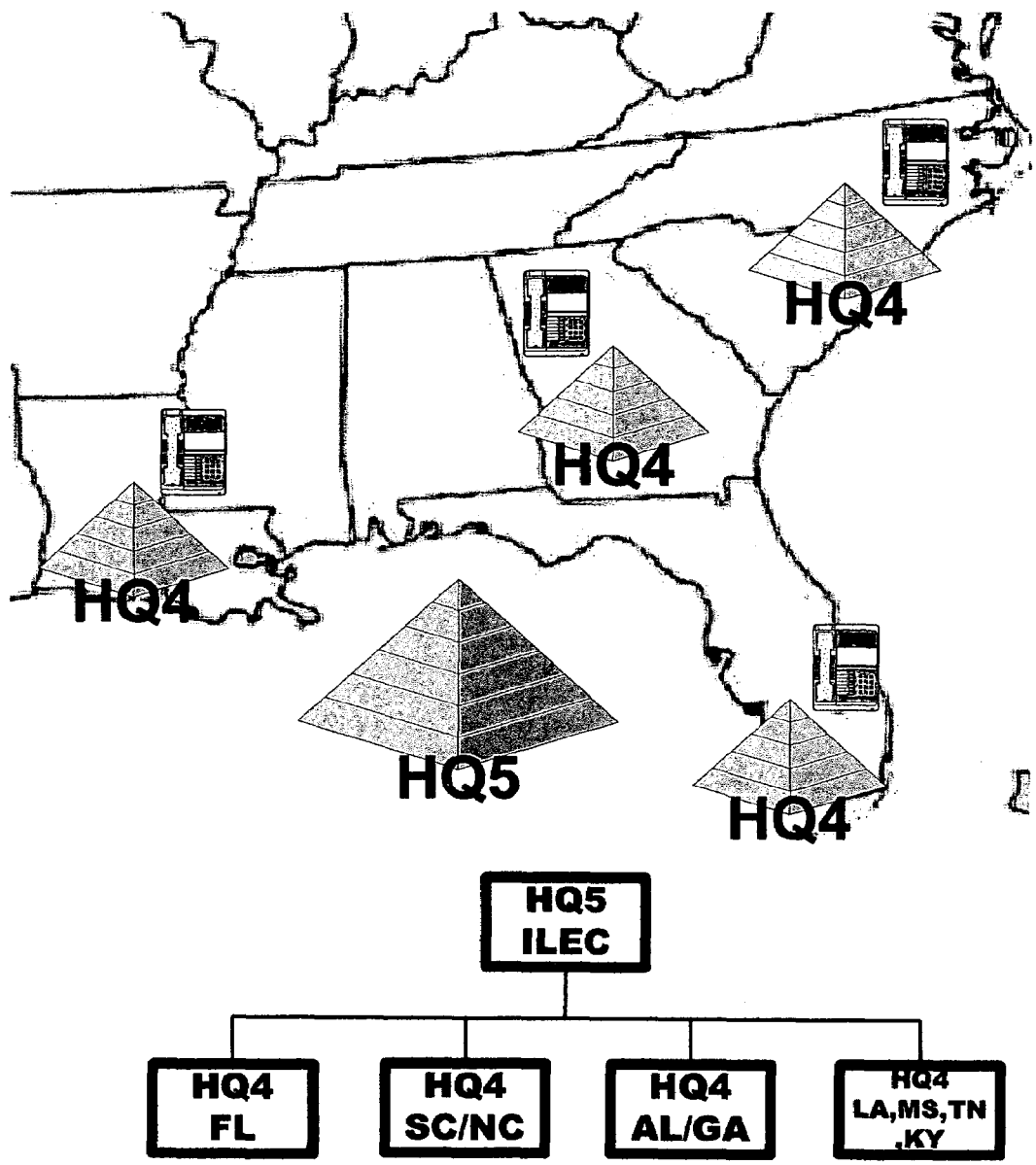
FIG. 109 ILEC Intelligent Swith Telco

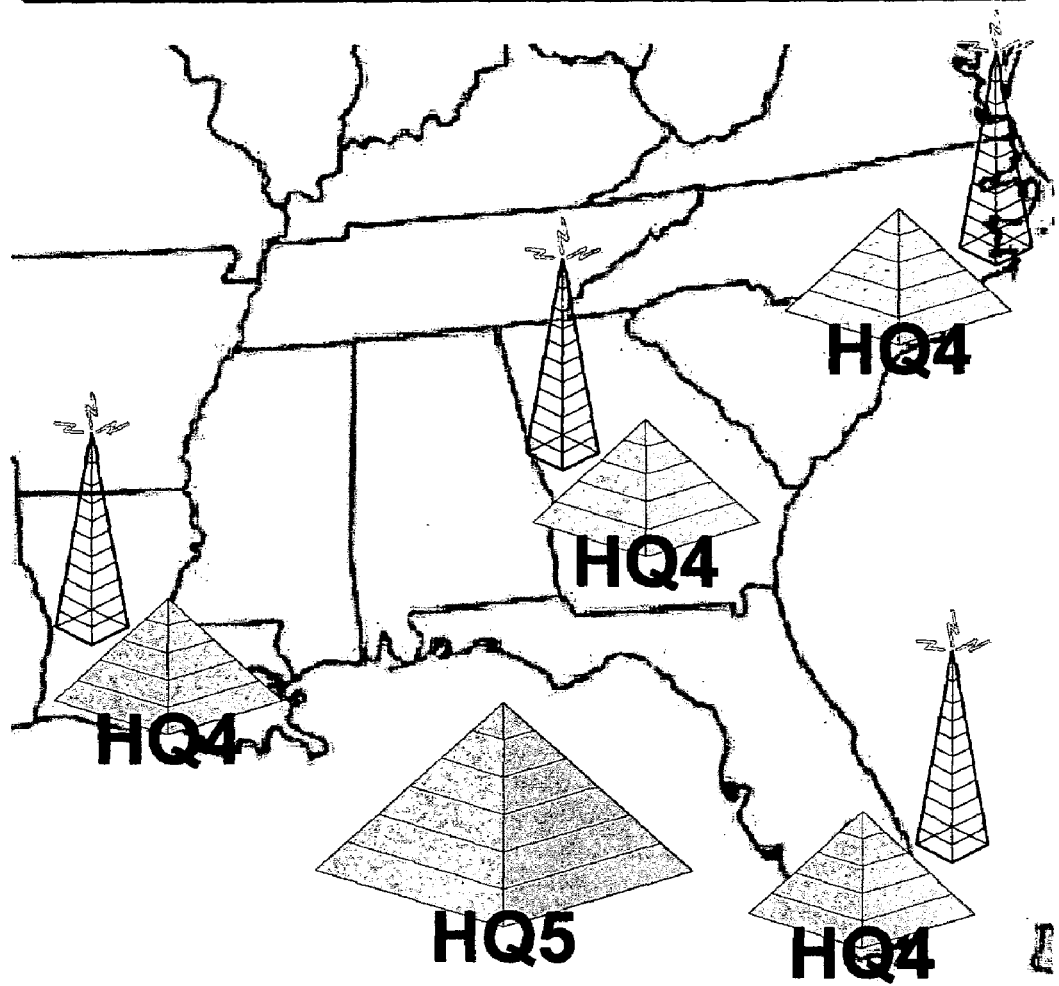
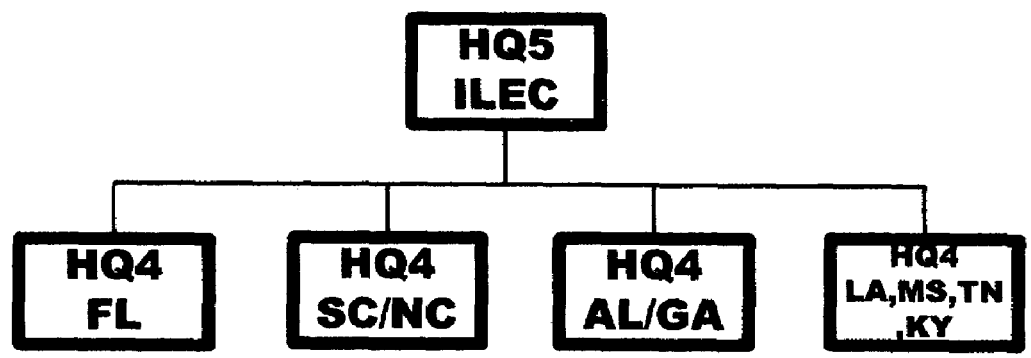
FIG. 110 ILEC Intelligent Switch Wireless

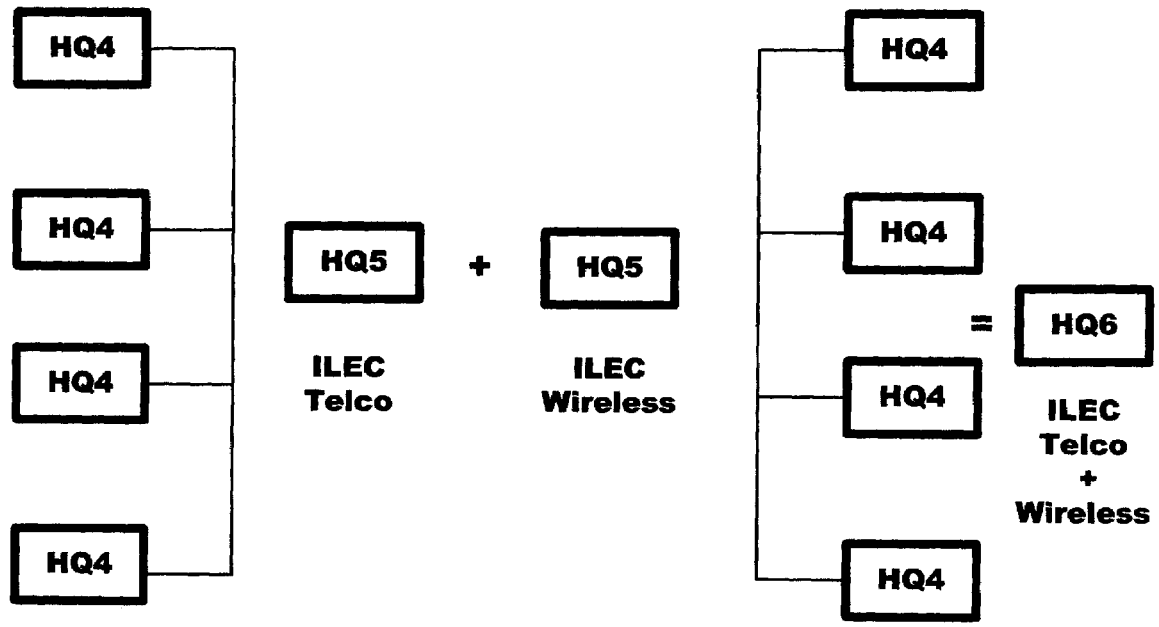
FIG. 111 Multi ILEC Intelligent Switch Combined
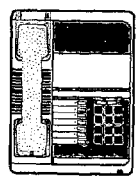 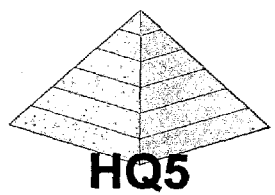 + 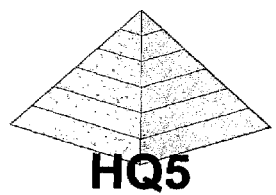 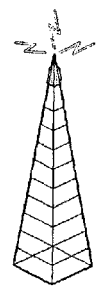
HQ5         HQ5
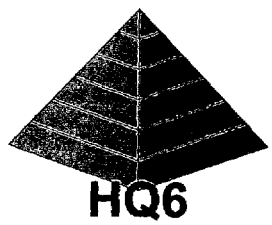  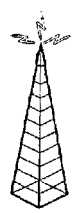
HQ6

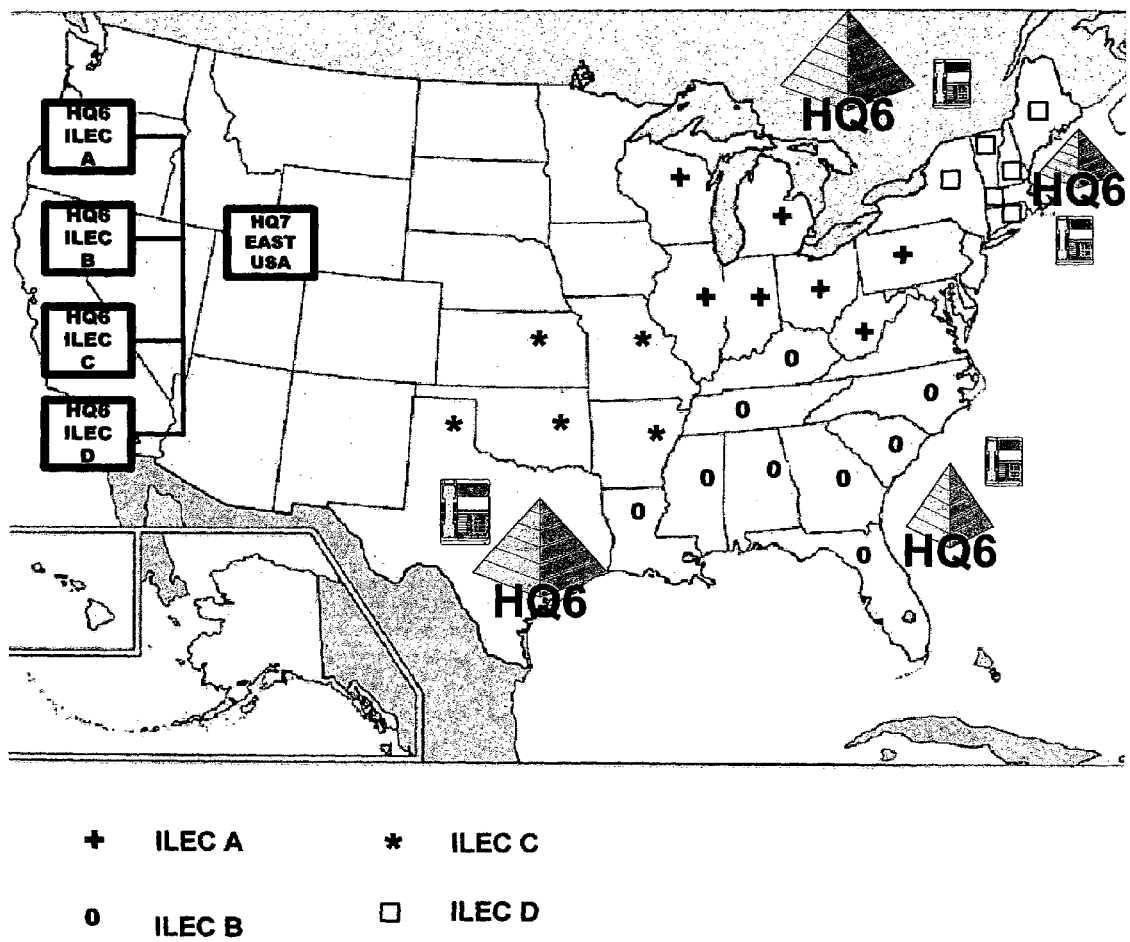

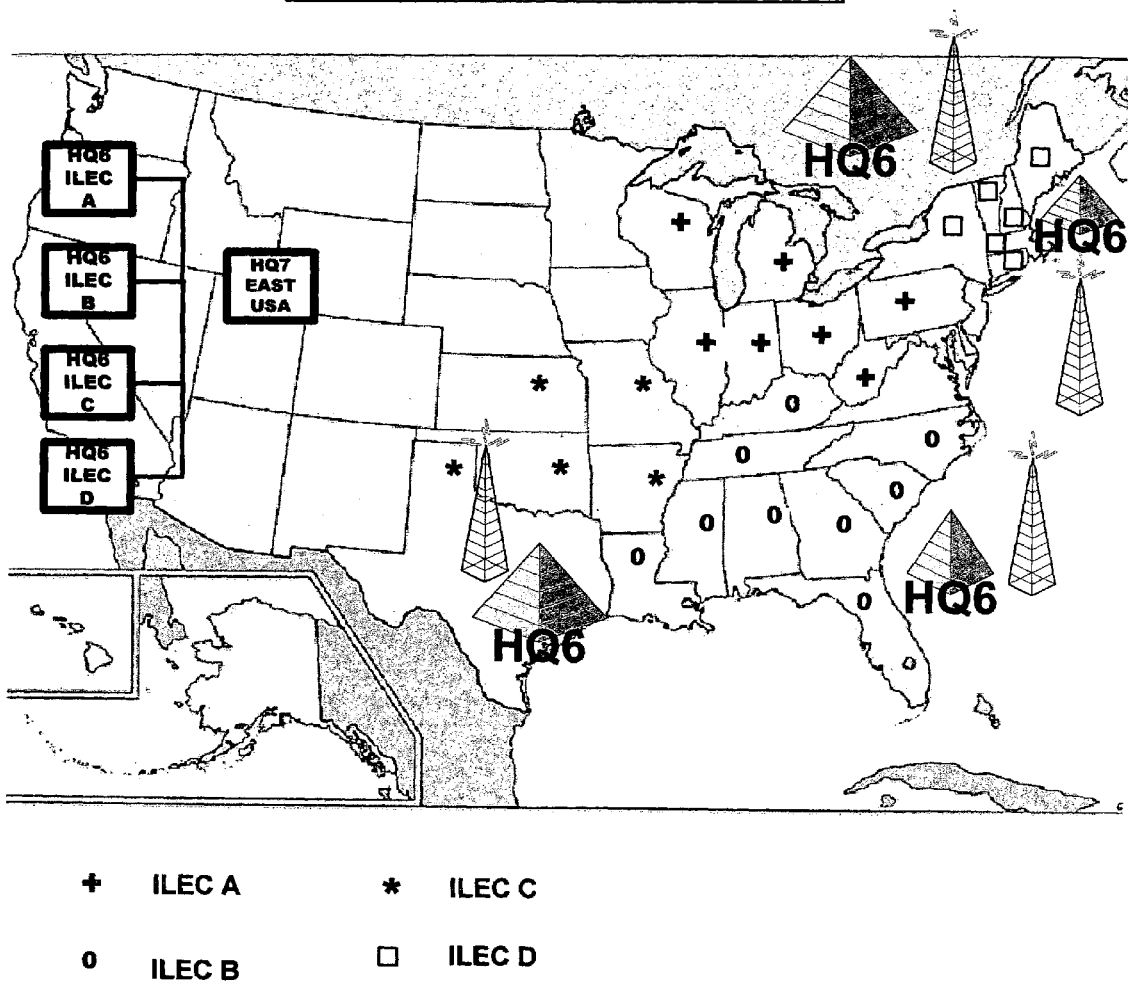
FIG. 113 EAST USA Wireless Switch

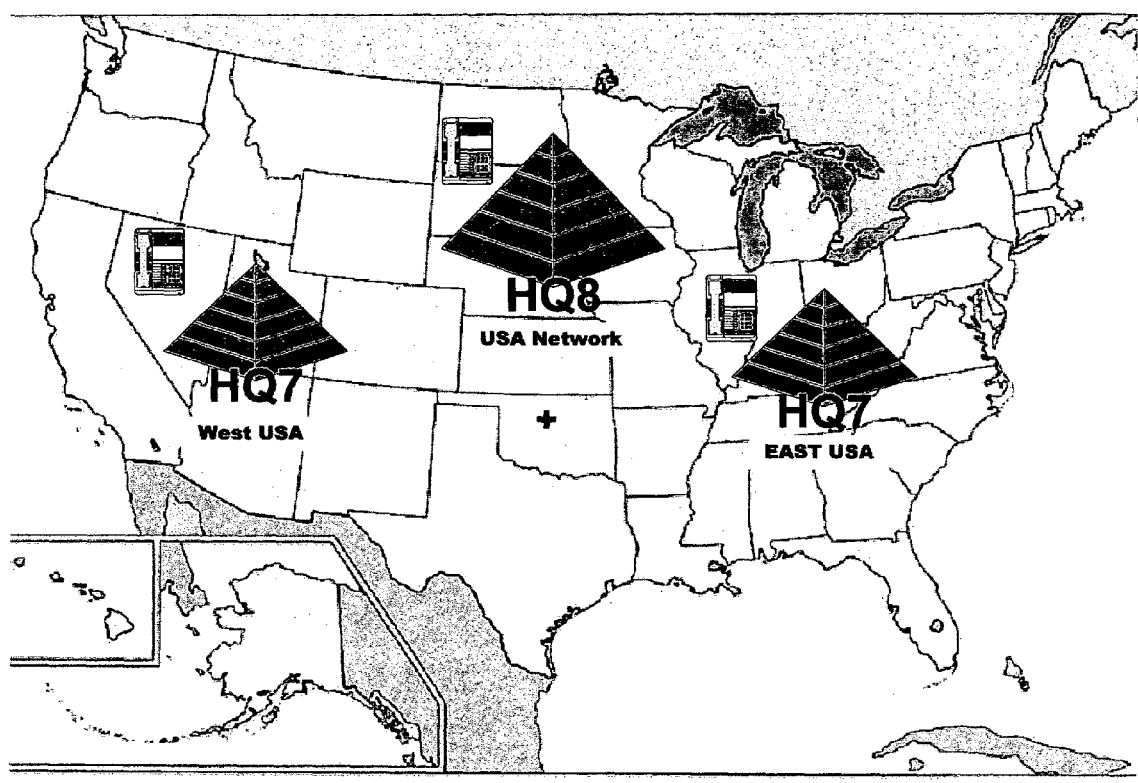
FIG. 114 National Telco Intelligent Switch

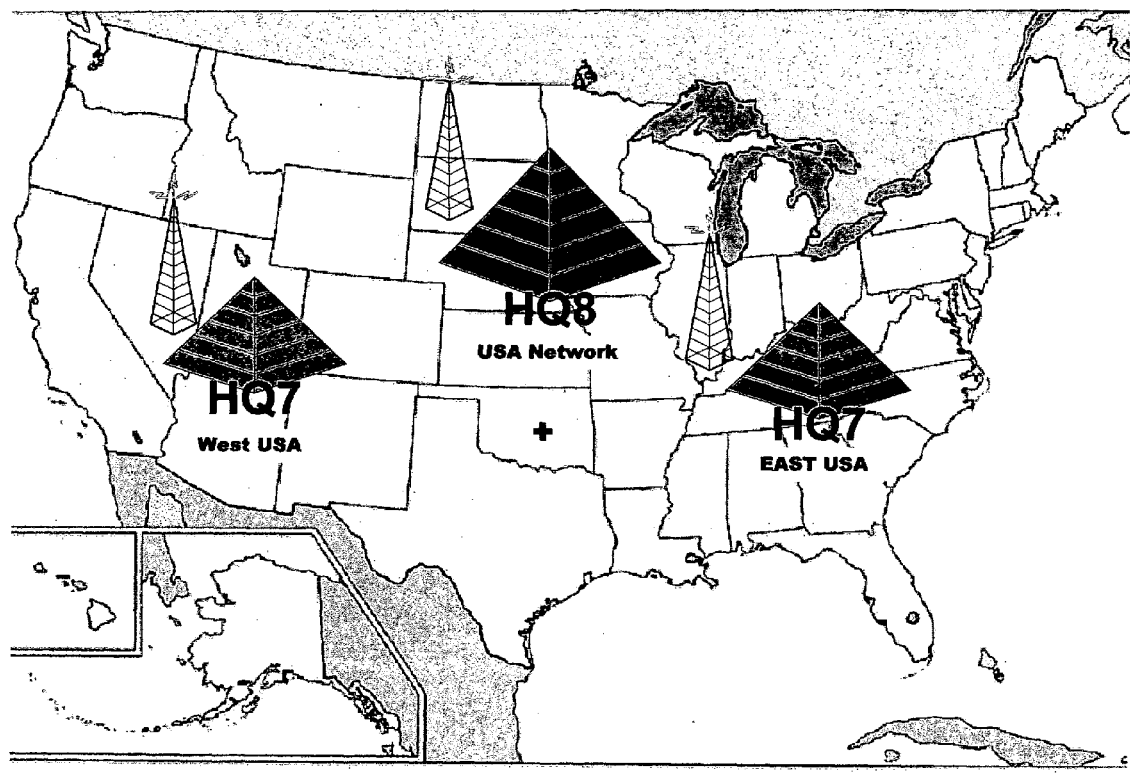

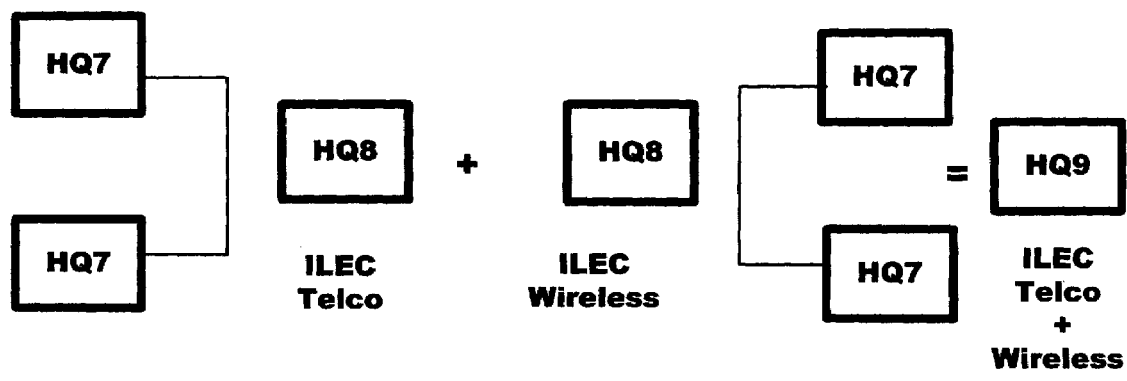
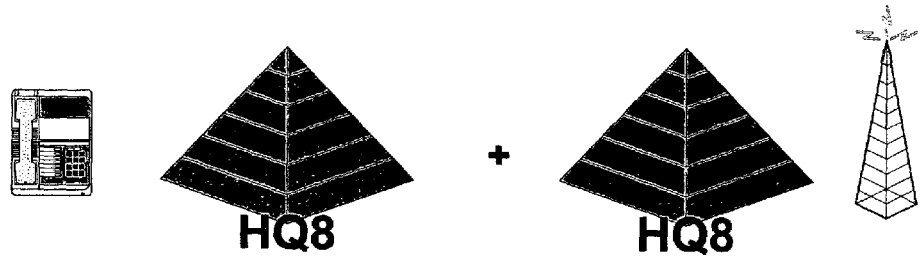
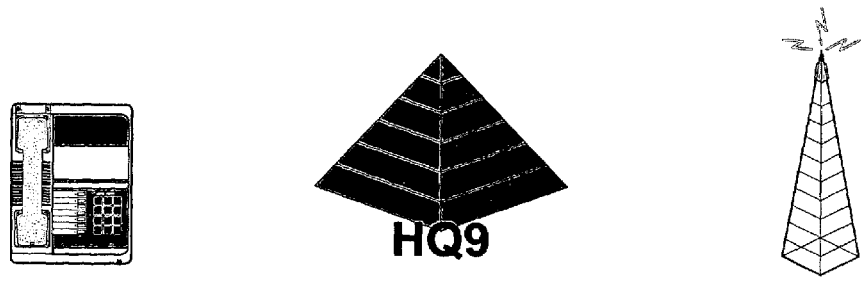
FIG. 116 Combined USA

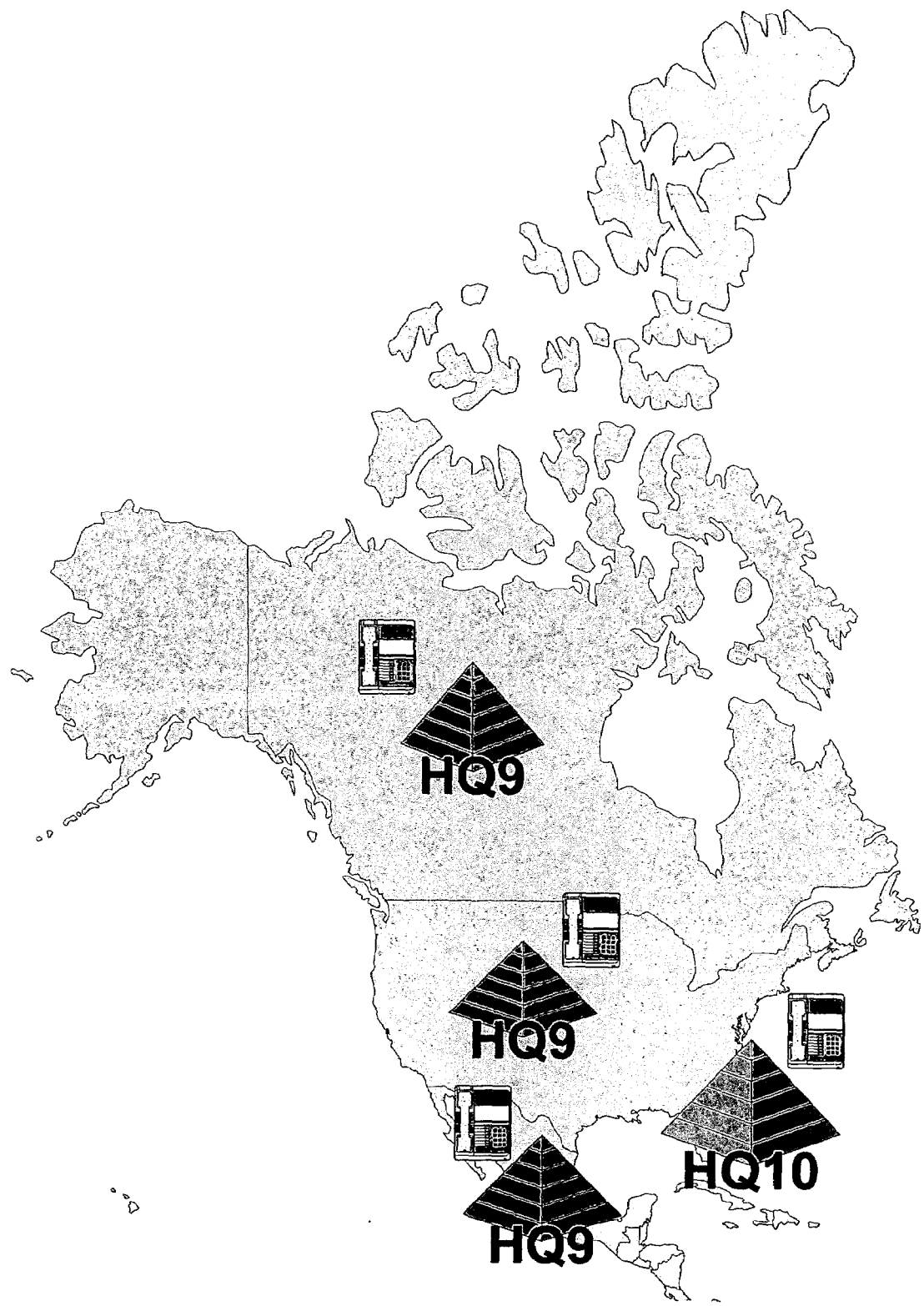
FIG. 117 North America Telco

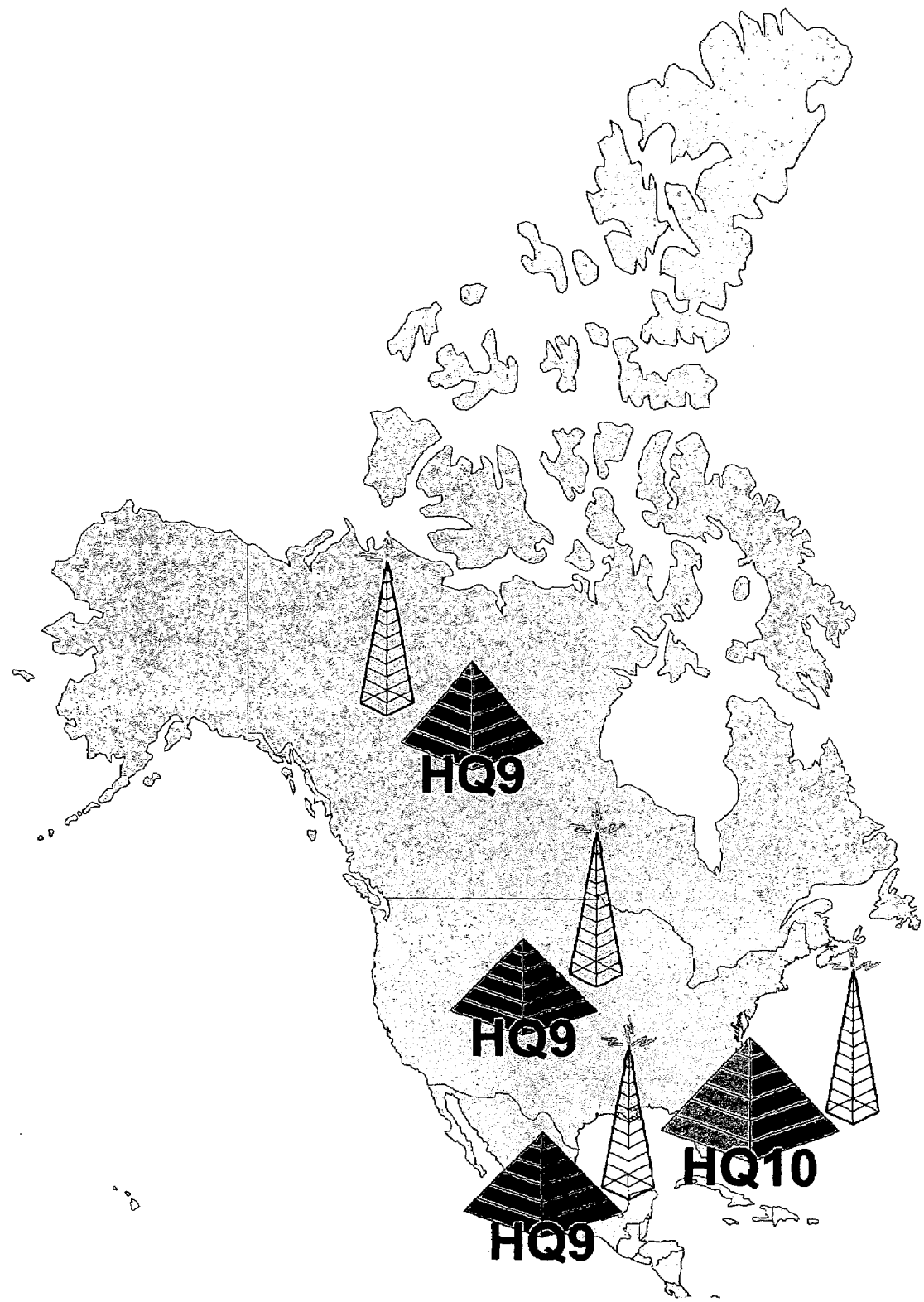

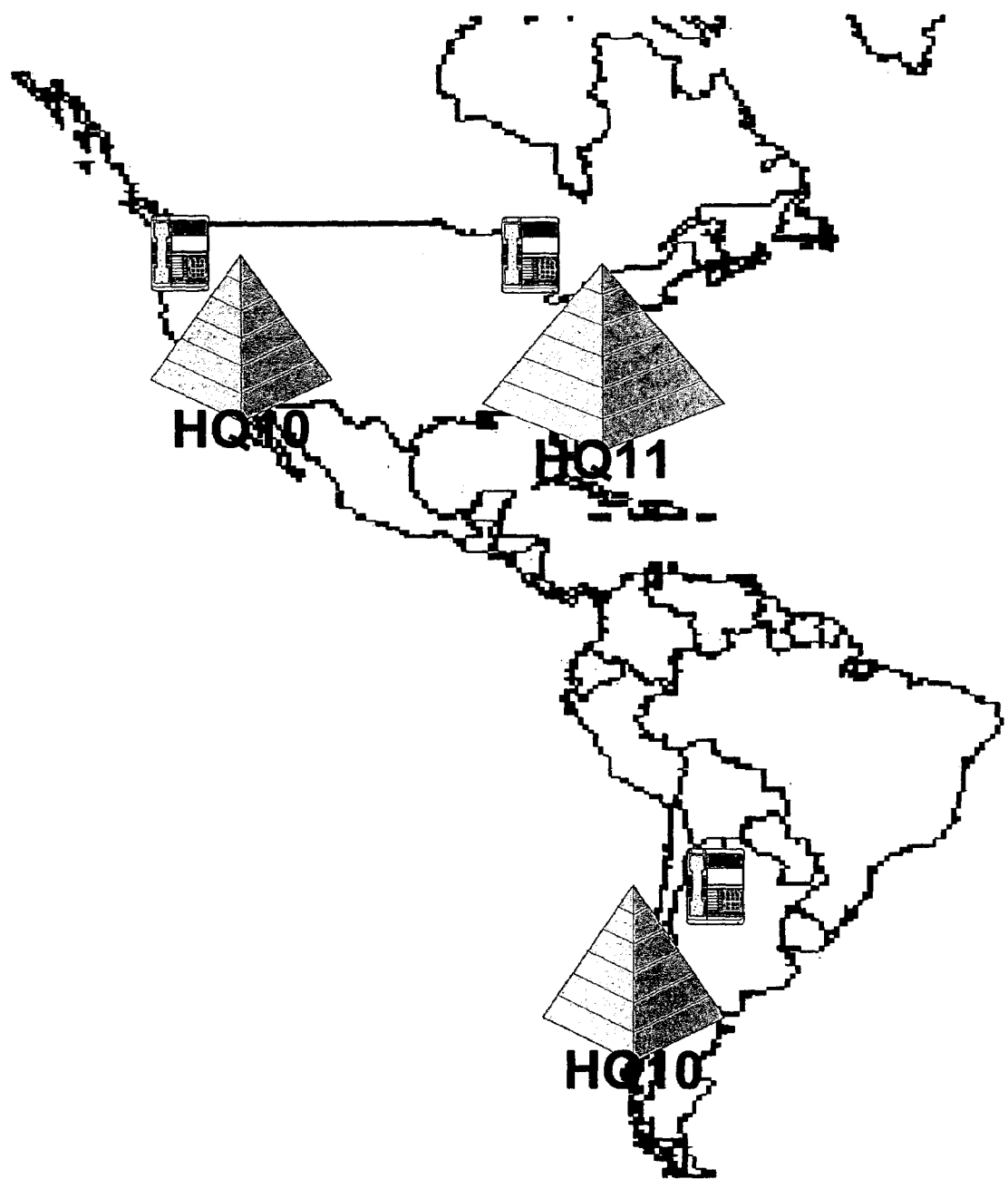
FIG. 119 America Telco

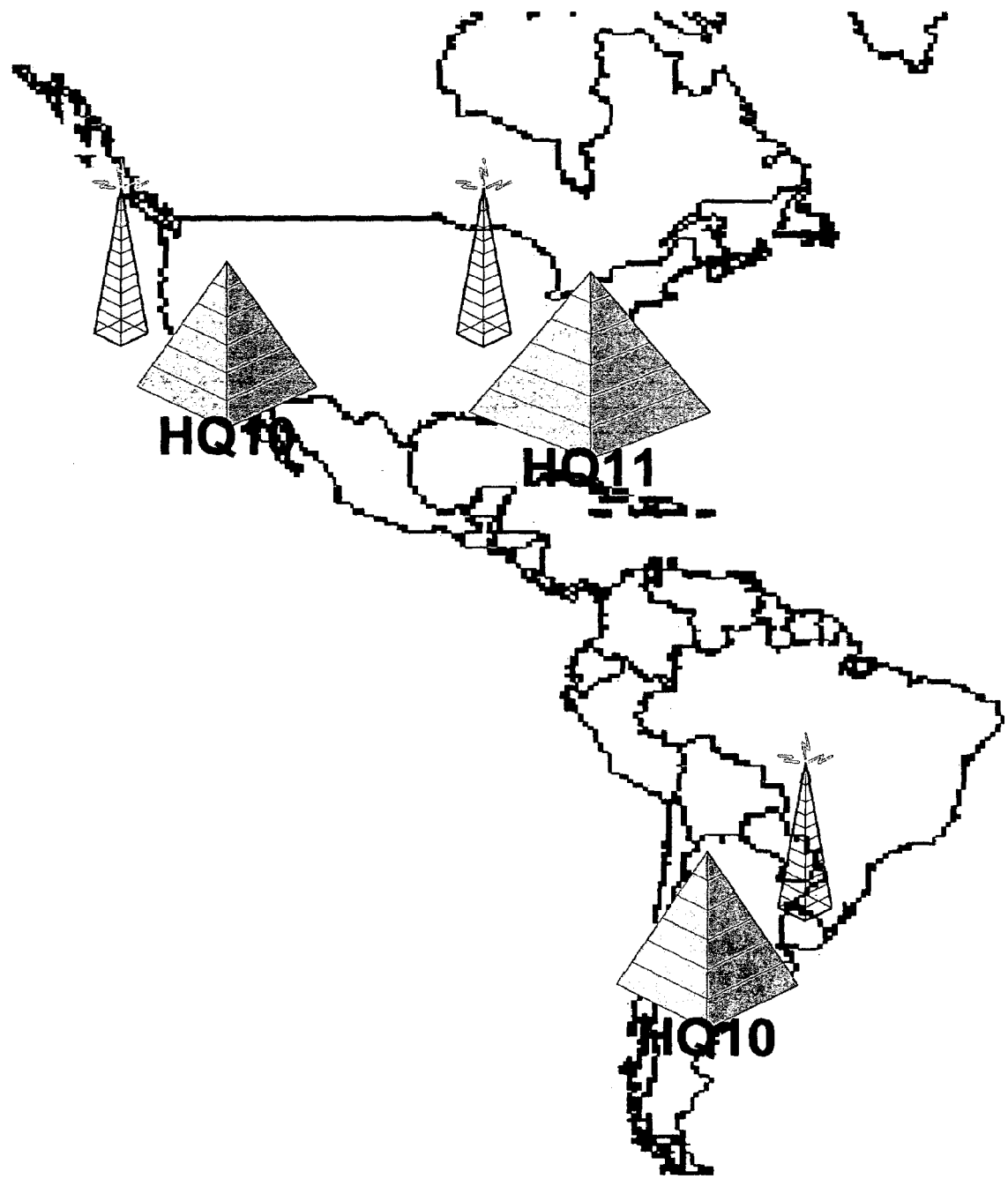
FIG. 120 America Wireless

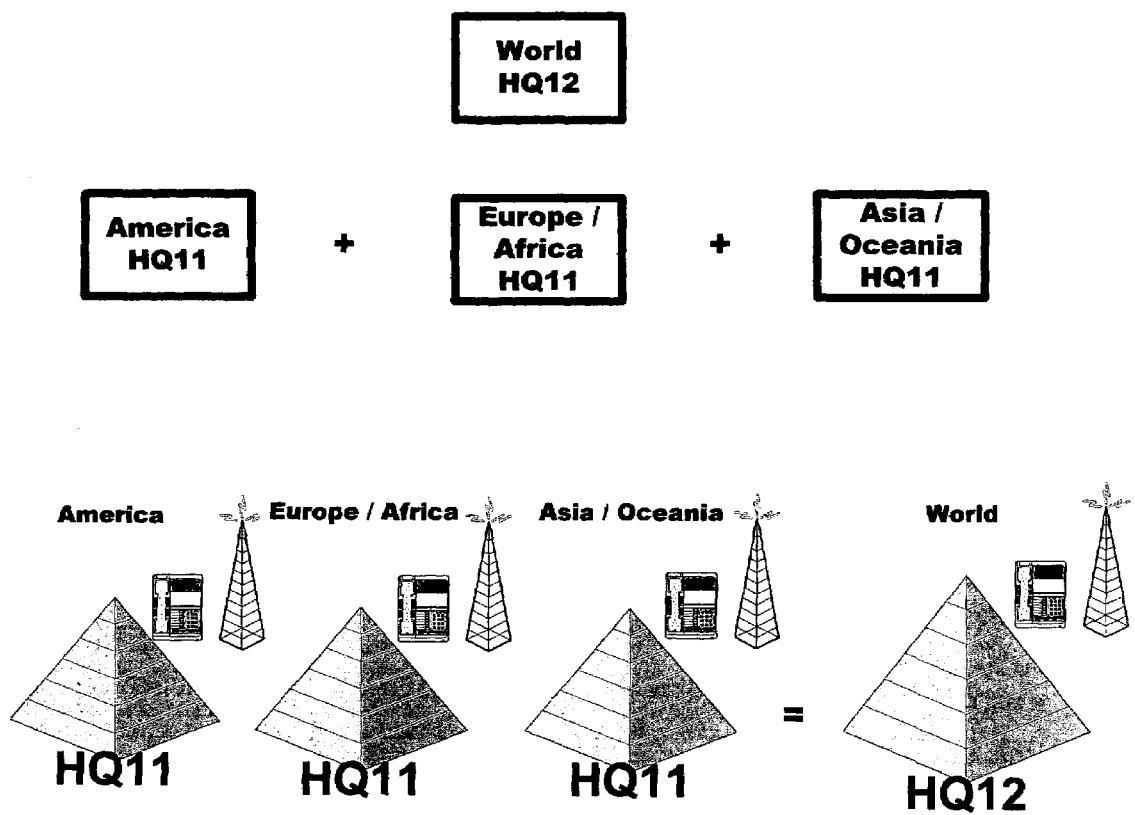

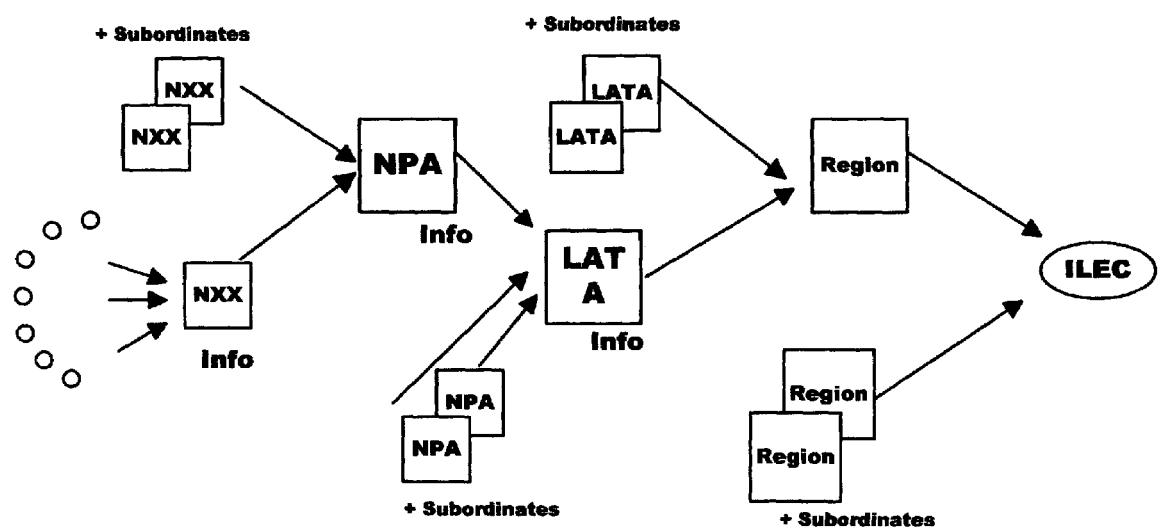
FIG. 122 Synchcronization of Resources

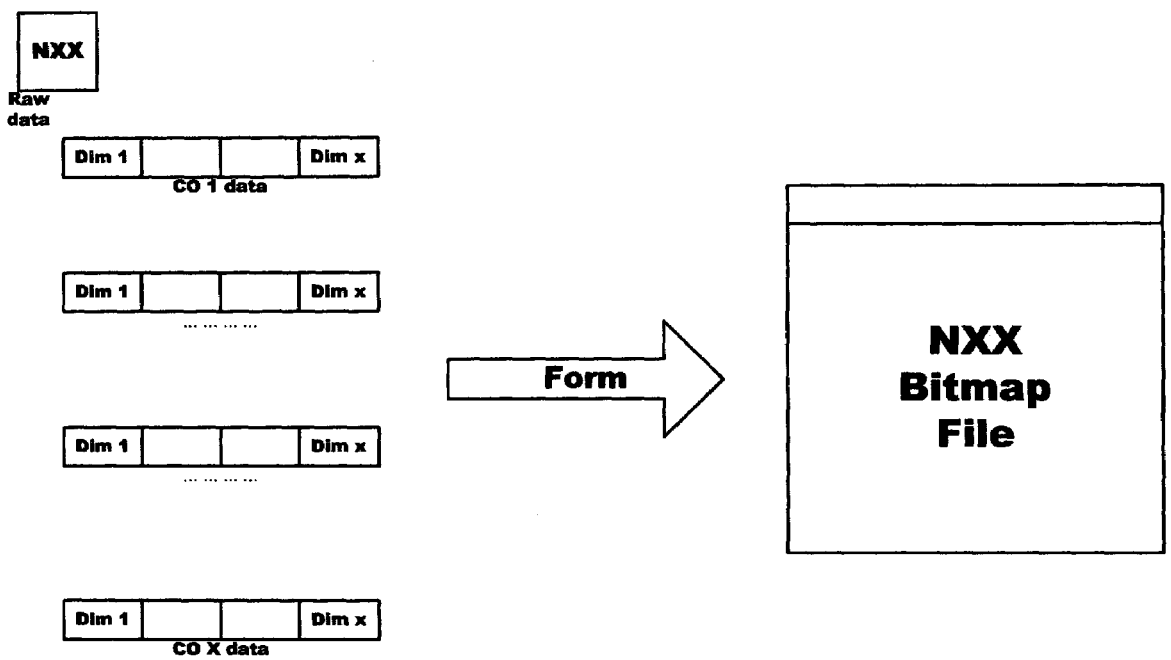

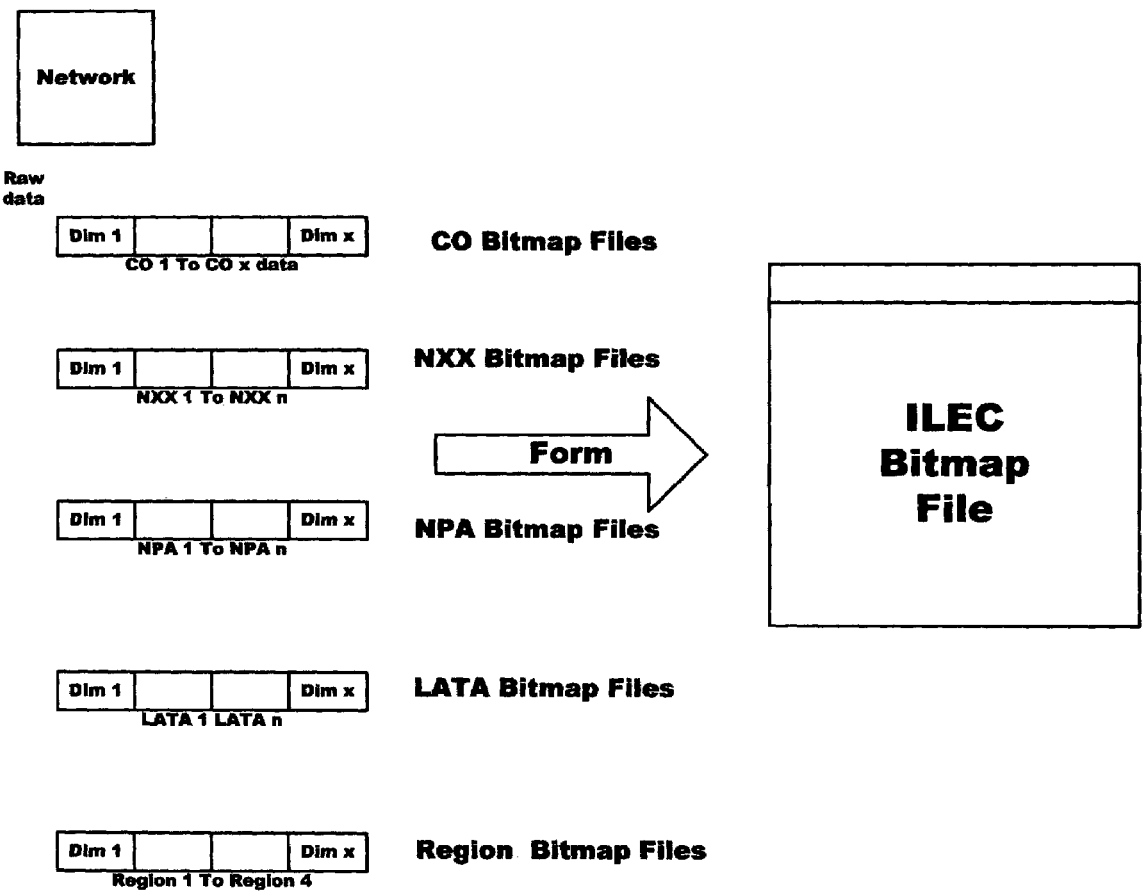

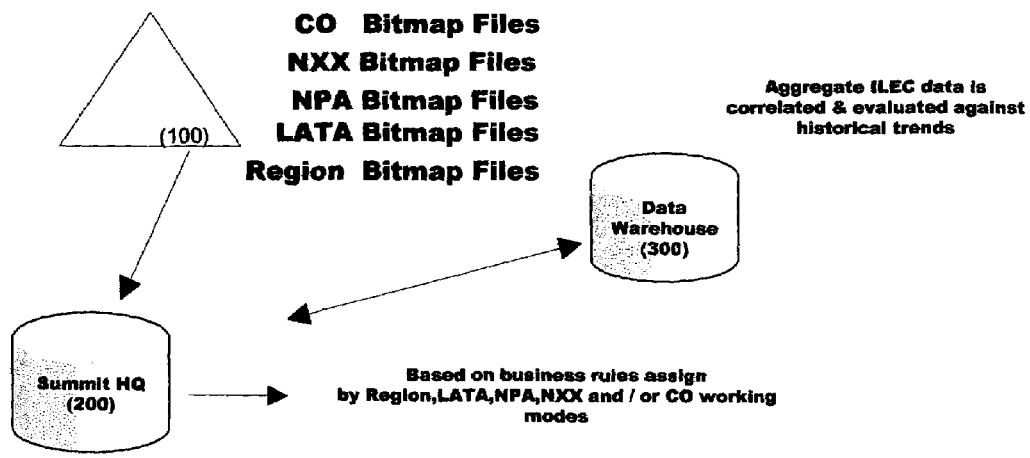

FIG. 125 Updating Envionment Data

- Network Platform Equipment or node that is included in the HDTV bitmap changes its fuzzy state of behavior.

- Nodes will use Best Cost Routing, Least Cost Routing, within valid resources availability and business rules parameters.

Note: to optimize the system only updates nodes that require fuzzy state changes otherwise they are blank.

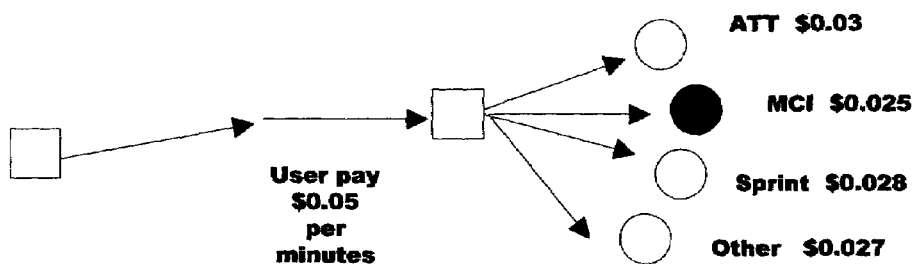
FIG. 126 Best Cost Routing Fishbone
System select most profitable route. In this case MCI is selected least Cost Routing Fishbone
Note: User pays per minutes

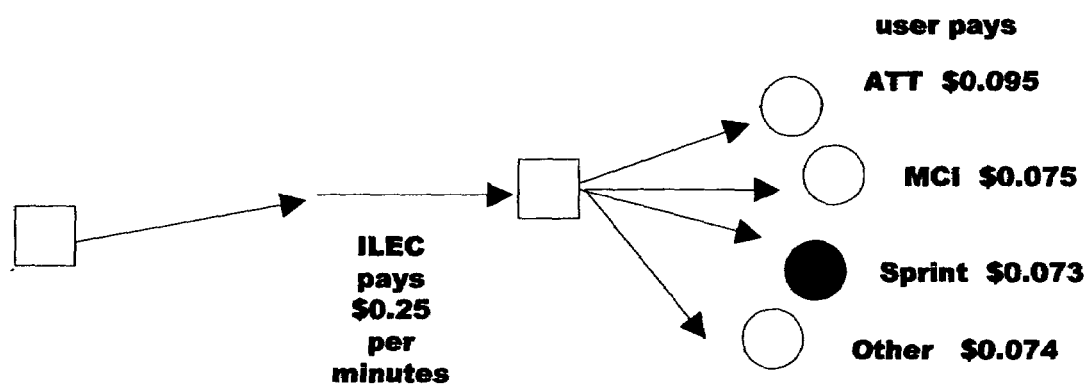

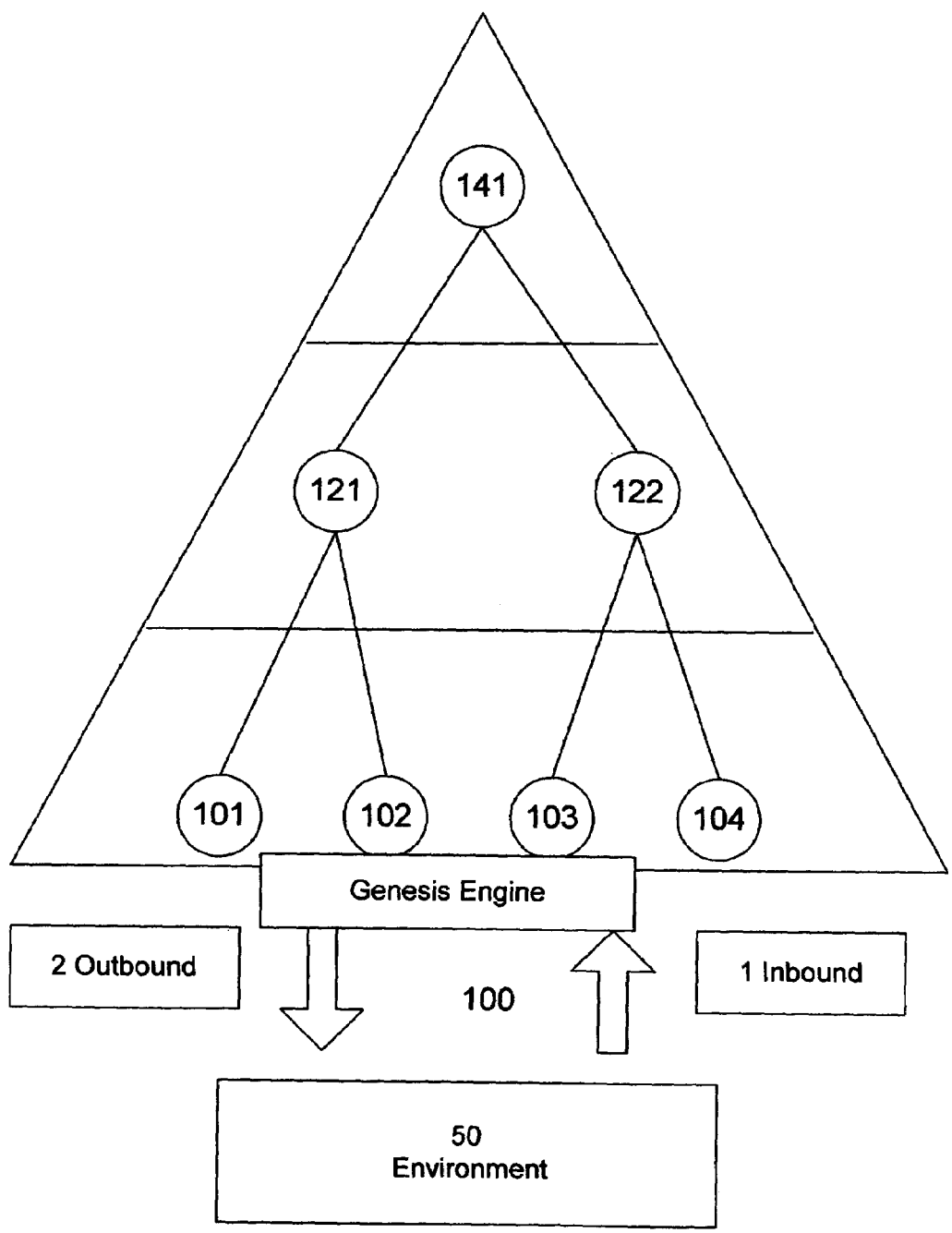

PARALLEL COMPUTER NETWORK AND
METHOD FOR TELECOMMUNICATIONS
NETWORK SIMULATION TO ROUTE
CALLS AND CONTINUOUSLY ESTIMATE
CALL BILLING IN REAL TIME

CROSS REFERENCE TO RELATED
APPLICATIONS

This application is a continuation-in-part of U.S. patent application Ser. No. 10/603,963, filed on Jun. 25, 2003 now U.S. Pat. No. 6,842,511, which is a continuation-in-part of U.S. patent application Ser. No. 09/544,238 (now U.S. Pat. No. 6,614,893), filed on Apr. 7, 2000, which relates to the same subject matter as provisional application Ser. No. 60/184,537, filed by the same inventor on Feb. 24, 2000.

BACKGROUND OF THE INVENTION

1. Field of the Invention

The present invention relates generally to the field of telecommunications networks and methods and, more particularly, to such a network utilizing parallel cluster computers that allow the integration of local, long distance, international and wireless calling within a plurality of independent ILEC, long distance carriers and wireless suppliers working concurrently.

2. Description of the Prior Art

Legacy systems at large are the main reason why large networks do not have real time Information Systems or Hot Billing Systems (HBS). Often, networks are comprised of multiple types of machines of new and old technologies. Networks with multiple vendors' machines do not create records that have the same data structure, file system, or operating system, and sometimes machine protocols are incompatible. Large networks quickly become complex networks just by having legacy systems that require special procedures to properly move data.

With the advent of the global satellite wireless networks, Internet and related technologies, real time billing has become one of the fast growing segments of the economy. Organizational data networks gather, validate, verify and exchange end user information in an effort to understand, for example, the kinds of products, services and qualities consumers value most, and how and why they make such determinations.

With regard to the telecommunications industry, there have long been individual computers loaded with programs for performing TQM data mining, provisioning and billing, which rely upon the processing power and data within the single stand-alone computer. A problem with these single computer applications has been that more processing power and data access capability are needed, as well as reduced bandwidth usage, coupled with web and virtual world access.

Another problem is that local, long distance, international calls and wireless calls due to federal regulation uses distinct networks making the problem of the correlation of billing entities for multinational telecom network virtual impossible. Solutions to these problems are presented in the published doctoral dissertation of the present inventor, entitled *Designing Hot billing Systems for Large Volume and or Complex Network submitted for the degree* of Doctor of Philosophy in Management for the present inventor at California Coast University in November of 1999, the contents of which are incorporated herein by reference. Also incorporated by reference are the contents of a provisional patent application filed by the present inventor on Feb. 24, 2000, Ser. No. 60/184,537, entitled Intelligent Component Billing System. "*Real Time Solutions for the Next Generation Internet*" © 2002 by Richard S. Paiz a book that furthers explains the Supercomputer technology.

Accordingly, there is an established need for real time billing that makes sure that all the transactions are rated in a timely manner to avoid fraud, and insures that the consumer at large get the best quality and service of product. This technology performs telecommunications transactions that overcome the drawbacks and limitations of the prior art by allowing multiple concurrently working nodes to convert the information in real time into a standardized method that enables the system to distribute the load and tasks within its available resources at the incipiency of a call anywhere in the world.

It is thus an object of the invention for the system to validate and verify each end user with accurate geographic locations, age of person, and other data mining demographics to make participating more effective and efficient and proactively avoid chum and fraud. Each call is validated and the actual end user's location at incipiency is identified so that the supplier system Leg A is immediately known at based on the call pattern a Vector and Leg B with tandem path can be assigned.

It is thus an object of the present invention to provide a computer network system that parallels and simulates a plurality of concurrently working sovereign telecommunication wireless and Telco networks service global end users.

It is another object of the present invention to provide such a computer network system having the capability to instantaneously generate, plot and update specific telecommunication data. To have multiple dedicated computers to identify patterns of behavior of Telco, Wireless, and global networks, and then have higher members of the supplier system hierarchy to correlate this information by using pre-calculated information of its subordinates to further verify the accuracy of the consolidation of the network information.

It is another object of this invention to create a system based on U.S. Pat. No. 6,614,893 that possess three concurrent hierarchies that will analyze and resolve the billing of calls. The lowest tiers are considered ILEC, the middle tiers national networks, and the summit tiers global international long distance networks.

It is still a further object of the present invention to provide such a network system, which maximizes network-processing power by shunting calls from computers momentarily operating at or near capacity, and thus having smaller buffers to less-taxed computers having larger buffers. Preferably, this process of sharing available resources between members of the systems mimics lateral and vertical synergy in human organizations.

It is still another object of the present invention to provide such a computer network system which concurrently converts real time data feed into optimized primed lingua franca Vector correlated CDR with patterns so that every node of the supplier system by using lateral and vertical synergy can process the work of another node. Global network resources of non-peak time networks will be used to avoid clogs and resource intensive transactions behaving as if nodes belonging to a geographic region the other side of the world where the actual peak time traffic is occurring.

It is yet another object of the present invention to provide such a computer network which minimizes bandwidth usage by performing schedule and synchronized activities with participating nodes. That is, wherein the Supercomputer based on historical data can accurately project future trends of resource needs to update end users software to avoid clogs in the system. Preferably, a Summit Tier updates all of the components by sending only summarized information packets to its organizational subordinates.

It is a yet a further object of the present invention to provide such a network system that assimilates whatever spaghetti each participating networks has which operates in conjunction with antiquated billing, provisioning and data warehouse suppliers technology, so that existing equipment is not wasted and the cost of updating is minimized.

It is yet another object of the present invention to provide such a network system, wherein the system performs network troubleshooting functions aimed at minimizing down time and platform failure, by warning a repair crew almost immediately of the nature and location of a problem. Preferably, in this manner, the system is maintained via a proactive preventative maintenance program.

It is still another object of the present invention to provide such a system, which is relatively redundant, standard, easily upgradeable and inexpensive to assemble and operate.

SUMMARY OF THE INVENTION

The present invention overcomes the aforementioned limitations of the prior art and accomplishes the above-stated objectives, as well as others, as may be determined by a fair reading and interpretation of the entire specification.

An expert system supercomputer is provided that incorporates a plurality of independent nodes, also referred to herein as intelligent components, which work together in an organized and hierarchical manner to represent all the network platform components, the human resources of an organization, and the consumers interactions with the plurality of concurrently working sovereign telecommunication organizations that form the system.

BRIEF DESCRIPTION OF THE DRAWINGS

The preferred embodiments of the invention will hereinafter be described in conjunction with the appended drawings provided to illustrate and not to limit the invention, where like designations denote like elements:

FIG. 1 Describes a Parallel Telecommunication and Simulation Networks derived from U.S. Pat. No. 6,614,893 that consists of (V) that consist of the Vector trajectory of a call from origin to destination through a telecommunications network (10). The system (10) maps each Telecommunications Network junction point computers (34) with its own junction point simulation computers (32) that work together as a (20) virtual rendition and simulation network (20) of the telecommunication network. The Simulation Computers consists of a plurality of tiers of computers (24 and 26) that allow end users (28) to interact with the system. The system first normalizes and simplifies the spaghetti of the existing infrastructure and then delegates specialized functions such as Data Mediation, Network Trending and Fraud Management to any node that belongs to the system eliminate the needs of bottlenecks that are created by Centralized designed architectures or those that depend of $3^{rd}$ party platforms.

FIG. 2 Describes several USA scope Networks parallel working Telco (1000) and Wireless (2000, 3000, 4000) long distance carriers that have United States network coverage. Where each Telco network is subdivided into a plurality of Incumbent Local Exchange Carriers (ILEC) MCI (100, 500, 900) that support local long distance and local traffic. In parallel the plurality of Wireless network cover ILEC geographical-network configuration Cingular (1100, 1500, 1900) and optionally Verizon (3100, 3500, 3900), and AT&T Wireless (4100, 4500, 4900). These national networks and their subordinate ILEC networks are independent organizations with their own autonomy.

FIG. 3 is a diagram that shows how a USA scope Telco (1000) is subdivided into a plurality of ILEC AT&T geographic-networks (100, 500, 900) that support long distance, local long distance and local traffic. In this case South Western Bell is further subdivided into smaller regions formed by a plurality of LATA (410, 430, 450, 470) that manages controls distributes all activities, which consists of residential and business local traffic.

FIG. 4 is a diagram that shows how a USA scope Wireless (2000) is subdivided into a plurality of ILEC Cingular geographic-network (1100, 1500, 1900) that support long distance, local long distance and local traffic. In this case South Western Bell is further subdivided into smaller regions formed by a plurality of LATA (1410, 1430, 1450, 1470) that manage control the bulk traffic, which consists of residential and business local traffic. Optionally Verizon (3000) and AT&T Wireless (4000) networks are wireless networks that exchange and interactive amongst live billable traffic throughout the entire Unit are States.

FIG. 5 is a sample USA organizational structure chain of command to divide task specific long distance traffic. At the top HQ9 controls the entire USA Domain traffic in particular multi-wireless traffic with roaming. HQ8 controls all regular Telco US long distance traffic and Wireless Network International traffic. HQ7 manages and control inter-ILEC traffic by dividing the US into two equal halves East and West. HQ6 and HQ5 consist of a plurality of ILEC geographic-network Telco and Wireless traffic. That is further divided into Regions, LATA, NPA, NXX, XO (Wireless Traffic Network Access Points) and CO.

FIG. 6 based on U.S. Pat. No. 6,614,893 consists of an updated BST organizational hierarchy structure of the Bell South Telecommunications Telco and Wireless network with the addition of the entire concurrently working Wireless ILEC geographic-network that is controlled by HQ6 that matches and merges inter LATA traffic that starts from a Telco networks and ends up in a Wireless networks or vice versa. To cover the same area the Wireless networks dynamic nature allows XO (Wireless Traffic Networks Access Points) to have a greater density of common subscribers using the same network equipment within geographical NPA subdivisions.

FIG. 7 is a schematic sample North Florida Telco Network.

FIG. 8 is a schematic sample Central Florida Telco Network.

FIG. 9 is a schematic sample South Florida Telco Network.

FIG. 10 is a schematic sample Alabama-Georgia Telco Network.

FIG. 11 is a schematic sample Tennessee-Kentucky-Mississippi-Louisiana Region.

FIG. 12 is a schematic sample South Carolina-North Carolina Network.

FIG. 13 is a schematic BST organizational hierarchy structure-Wireless network working concurrently with a Telco ILEC geographic-network that is controlled by HQ6 that matches and merges inter LATA traffic that starts from a Telco networks and ends up in a Wireless network or vice versa. To cover the same area the Wireless networks dynamic nature allows XO (Wireless Traffic Network Access Points) to have a greater density of common subscribers using the same network equipment within geographical NPA subdivisions. Wireless technological advantages and distribute schema allows 711 XO to perform the same workload that 1240 Central Office Switches (CO).

FIG. 14 is a schematic sample North Florida Wireless Network.

FIG. 15 is a schematic sample Central Florida Wireless Network.

FIG. 16 is a schematic sample South Florida Wireless Network.

FIG. 17 is a schematic sample Alabama-Georgia Wireless Network.

FIG. 18 is a schematic sample Tennessee-Kentucky-Mississippi-Louisiana Region.

FIG. 19 is a schematic sample South Carolina-North Carolina Wireless Network.

FIG. 20 consists to the new HQ9 to HQ7 2004 bitmap guidelines that are used in to build the Vector CDR to follow. HQ9 to HQ7 levels call require a point C and point D to further emphasis the Tandem points that are used to match and merge calls that travel through a plurality of networks across the United States.

FIGS. 21 through 27 shows how calls occur within a present telephone network, (11) Leg A dials (12) Leg B and connects. Where (21–22) represents Central Office switches (CO); (31–32) Tandem Switches (TO); (41–42) Area codes Points of Presence (POP) network platform equipment. These examples will be used as the basis to show how the system builds the Vector resultant, correlates and rates a billing entity, and then updates the organization of network activities and transactions in real time. Each network equipment generates a Call Detail Record once Leg A and Leg B disconnect the call;

FIG. 21 is a diagram of an Intra (21) Central Office (CO) Telco Call. The CO owns both Leg A and Leg B and determines that both are active, valid accounts and are off-hook;

FIG. 22 is a diagram of an Intra Exchange (NXX) Telco Call. The system requires three components platform equipment (21,23), and (22) Tandem Switch to build the call;

FIG. 23 is a diagram of an Intra Numbering Plan Area Intra (NPA) Telco call. The system requires at least four components two CO platform equipment (21,24) and two (22,23) Tandem Switches to build the call. When Leg A and Leg B disconnect four Call Detail Records are generated;

FIG. 24 is a diagram of an Intra Local Access and Transfer Area (LATA) Telco Call. The system requires at least six components (21,26) CO, (22,25) TO or Tandem, and (23,24) POP to build the call. When Leg A and Leg B disconnect six CDR are generated;

FIG. 25 is a diagram of an Intra Regional Telco Call. The system requires at least six components (21,26) CO, (22,25) TO or Tandem, and (23–24) POP to build the call. When Leg A and Leg B disconnects six CDR are generated;

FIG. 26 is a diagram of an Inter Regional Telco Call. The system requires at least six components (21,26) CO, (22,25) TO or Tandem, and (23–24) POP to build the call. When Leg A and Leg B disconnect six CDR are generated;

FIG. 27 is a diagram of an International Telco Call. Once the 011 digits are captured the CO determines the long distance carrier. When Leg A or Leg B disconnects four CDR are generated; one CDR for the (24) International Gateway POP; one for the (23) 305 Area Code or POP; one for the (22) TO or Tandem Switch; and the (21) platform equipment CO originating the call. Note: local and domestic long distance calls will behave in the same manner as International Long Distance calls. Local calls within the ILEC domain that are routed to other networks will possess 2 CDR if within the same Area Code. Otherwise the call will have 3 to 5 CDR. For simplicity the average of four CDR has been used;

FIGS. 28 through 34 show and describe how the billing entity is generated using multiple Call Detail Records (CDR) as the source of data, (11) Leg A dials (12) Leg B and the call connects. (21–26) represent network platform equipment and (31–37) represent components of the system. Each network equipment generates a Call Detail Record once Leg A and Leg B disconnects the call. All calls have 1111BST stamp;

FIG. 28 is a schematic representation of generating a correlated CDR from an Intra CO Telco call. The intelligent component (31) HQ0 Leg A owner generates the Vector CDR. 1 CDR must be correlated to make the billing entity. Vector Resultant looks like this 1134803----Call Owner system ID HQ0=1134803; Leg A segment N/A left blank; Leg B segment N/A left blank; Tandem segment N/A left blank. The unique ID for the call would be 11111134803----######## as assigned by the component that owns the call;

FIG. 29 is schematic representation of generating a correlated CDR from an Intra NXX Telco call. The Vector 11348 owns the call and generates the Vector Resultant CDR. 3 CDR must be correlated to make the billing entity by the call owner HQ1. Vector Magnitude looks like this 11348 HQ1 (32) Vector Owner; -03 Leg A Owner (31); -07 Leg B Owner (33); Tandem segment N/A left blank; 111111348-03-07--########. To determine the Leg A system ID just add the least common denominator parent HQ1 (32) 111111348 plus the 03 to get 11111134803. Leg B is 111111348 plus 07 to get 11111134807;

FIG. 30 is a schematic representation of generating a correlated CDR from an Intra NPA Telco call. The Vector 1134 owns the call and generates the Vector Resultant CDR. At least 4 CDR must be correlated to make the billing entity by the call owner HQ2. Vector Magnitude looks like this: 1134 HQ2 (33) Vector Owner; -803 Leg A Owner (31); -70F Leg B Owner (35); Tandem segment N/A left blank; 11111134-803-70F--########. To determine the Leg A system ID just add the least common denominator parent HQ2 (33) 11111134 plus the 803 to get 11111134803. Leg B is 1111134 plus 70F to get 1111113470F.

FIG. 31 is a schematic representation of generating a correlated CDR from an Intra LATA Telco call owner. The (34) HQ3 Vector 113 owns the call and generates the Vector Resultant CDR. At least 6 CDR must be correlated to make the billing entity by the call owner HQ3. Vector Magnitude looks like this: 113 HQ3 (34) Vector Owner; -4803 Leg A Owner (31); -1701 Leg B Owner (37); Tandem segment N/A left blank; 1111113-4803-1701--########. To determine the Leg A system ID just add the least common denominator parent 1111113 plus the 4803 to get 11111134803. Leg B is 1111113 plus 1701 to get 11111131701;

FIG. 32 is a schematic representation of generating a correlated CDR from an Intra Regional Telco call owner. The (34) HQ4 Vector 11 owns the call and generates the Vector Resultant CDR. At least 6 CDR must be correlated to make the billing entity by the call owner HQ4. Vector Magnitude looks like this: 11 HQ4 (34) Vector Owner; -34803 Leg A Owner (31); -21105 Leg B Owner (37); Tandem segment N/A left blank; 111111-34803-21105--########. To determine the Leg A system ID just add the least common denominator parent 111111 plus the 34803 to get 1134803. Leg B is 111111 plus 21105 to get 11111121105;

FIG. 33 is a schematic representation of generating a correlated CDR from an Inter Regional Telco call owner. The (34) HQ5 Vector 1 owns the call and generates the Vector Resultant CDR. At least 6 CDR must be correlated to make the billing entity by HQ5. Vector Magnitude looks like this: 1 HQ5 (34) Vector Owner; -134707 Leg A Owner (31); -211A03 Leg B Owner (37); Tandem segment ff left blank; 11111-134707-211A03-ff-########. To determine the Leg A system ID just add the least common denominator parent HQ5 (34) 11111 plus the 134707 to get 11111134707 or 1134707. Leg B is 11111 plus 211A03 to get 11111211A03 or 1211A03. This call uses the ff Tandem route to connect Miami, Fla. and Atlanta, Ga.;

FIG. 34 is a schematic representation of generating a correlated CDR from an International Telco call owner. The (34) HQ6 Vector 1111 owns the call and generates the Vector Resultant CDR. At least 6 CDR must be correlated to make the billing entity by HQ6. Vector Magnitude looks like this: 1111 HQ6 (34) Vector Owner; -1134707 Leg A Owner; Leg B segment N/A left blank; Tandem segment N/A left blank. 011 International prefix and ### Country Code. To determine the Leg A system ID just add the least common denominator parent 1111 plus the 1134707 to get 11111134707;

FIGS. 35 through 40 show and describe how the billing entity is generated using multiple Call Detail Records (CDR) as the source of data, (11) Leg A dials (12) Leg B and the call connects. (21–26) represent Wireless Network Access Points (XO) and (31–35) represent components of the system. Each network equipment generates a Call Detail Record once Leg A and Leg B disconnect the call. All calls have 2212 BST stamp; Phone calls that begin with 786 are Wireless in nature.

FIG. 35 is schematic representation of generating a correlated CDR from an Intra NXX Wireless call. The (32) HQ1 Vector 11348 owns the call and generates the Vector Resultant CDR. 3 CDR must be correlated to make the billing entity by the call owner HQ1. Vector Magnitude looks like this 11348 HQ1 (32) Vector Owner; -03 Leg A Owner (31); -07 Leg B Owner (33); Tandem segment N/A left blank; 221211348-03-07--########. To determine the Leg A system ID just add the least common denominator parent 221211348 plus the 03 to get 22121134803. Leg B is 221211348 plus 07 to get 22121134807;

FIG. 36 is a schematic representation of generating a correlated CDR from an Intra NPA Wireless call. The (32) HQ2 Vector 1134 owns the call and generates the Vector Resultant CDR. At least 3 CDR must be correlated to make the billing entity by the call owner HQ2. Vector Magnitude looks like this: 1134 HQ2 (32) Vector Owner; -803 Leg A Owner (31); -70F Leg B Owner (33); Tandem segment N/A left blank; 22121134-803-70F--########. To determine the Leg A system ID just add the least common denominator parent 22121134 plus the 803 to get 22121134803. Leg B is 22121134 plus 70F to get 2212113470F;

FIG. 37 is a schematic representation of generating a correlated CDR from an Intra LATA Wireless call owner. The (33) HQ3 Vector 113 owns the call and generates the Vector Resultant CDR. At least 5 CDR must be correlated to make the billing entity by the call owner HQ3. Vector Magnitude looks like this: 113 HQ3 (33) Vector Owner; -4803 Leg A Owner (31); -1701 Leg B Owner (35; Tandem segment N/A left blank; 2212113-4803-1701--########. To determine the Leg A system ID just add the least common denominator parent 2212113 plus the 4803 to get 1134803. Leg B is 2212113 plus 1701 to get 22121131701;

FIG. 38 is a schematic representation of generating a correlated CDR from an Intra Regional Wireless call owner. The (33) HQ4 Vector 11 owns the call and generates the Vector Resultant CDR. At least 5 CDR must be correlated to make the billing entity by the call owner HQ4. Vector Magnitude looks like this: 11 HQ4 (34) Vector Owner; -34803 Leg A Owner (31); -21105 Leg B Owner (35); Tandem segment N/A left blank; 221211-34803-21105--########. To determine the Leg A system ID just add the least common denominator parent 221211 plus the 34803 to get 22121134803. Leg B is 221211 plus 21105 to get 22121121105;

FIG. 39 is a schematic representation of generating a correlated CDR from an Inter Regional Wireless call owner. The (33) HQ5 Vector 1 owns the call and generates the Vector Resultant CDR. At least 5 CDR must be correlated to make the billing entity by the call owner HQ5. Vector Magnitude looks like this: 1 HQ5 (33) Vector Owner; -134707 Leg A Owner (31); -211A03 Leg B Owner (35); Tandem segment ff left blank; 22121-134707-211A03-ff-########. To determine the Leg A system ID just add the least common denominator parent 22121 plus the 134707 to get 22121134707. Leg B is 22121 plus 211A03 to get 22121211A03. This call uses the ff Tandem route to connect Miami, Fla. and Atlanta, Ga.;

FIG. 40 is a schematic representation of generating a correlated CDR from an International Wireless call owner. The (33) HQ6 Vector 1 owns the call and generates the Vector Resultant CDR. At least 6 CDR must be correlated to make the billing entity by the call owner HQ6. Vector Magnitude looks like this: 2212 HQ6 (33) Vector Owner; -22121134707 Leg A Owner; Leg B segment N/A left blank; Tandem segment N/A left blank. 011 International prefix and ### Country Code. To determine the Leg A system ID just add the least common denominator parent 2212 plus the 1134707 to get 22121134707;

FIG. 41 through FIG. 43 represents long distance calls that can be Inter-ILEC HQ7, Intra-US HQ8 or Inter-USA HQ9 for Telco and Wireless calls. All the wireless calls Leg A start from 786 Dade County, Florida and have in FIG. 40 Leg B 212 NYC, NY, and FIGS. 41–42 LAX, CA. In FIG. 41 both Leg A and Leg B belong to the same Wireless network organization in this case Cingular controlled by a HQ8. In FIG. 40 both Leg A and Leg B belong to the same Wireless network organization in this case Cingular controlled by a HQ7, whereas in FIG. 42 Leg A belongs to Cingular and Leg B to Verizon controlled by a HQ9. Applying FIG. 19 guidelines calls that are HQ7 or greater must comply with the following:

1) Calls that are within the domain of an ILEC have a standard Vector CDR possessing Leg A, Leg B and Leg T as per U.S. Pat. No. 6,614,893.
2) When Leg A and Leg B belongs to the same (POP) the OUTBOUND and INBOUND information are included in the standard Vector CDR.
3) US National calls: ILEC to ILEC, ILEC to CLEC and ILEC to CLEC follow U.S. Pat. No. 6,614,893 methodologies, whereas BST 1111 HQ9 to HQ6 is implied for the national calls USA domain (1) USA East-West (1) USA East (1) BST Telco (1)
4) International Calls: HQ12 to HQ10 AAA for calls within World (A)—America (A)—North America (A)
5) BST Telco (1) for HQ6 only or 1111 when using HQ9 to HQ6 nomenclature denotes that the half that is not owned by the ILEC is Telco.

6) BST Wireless (2) for HQ6 or 1112 when using HQ9 to HQ6 nomenclature denotes that the half that is not owned by the ILEC is a Wireless network call.
7) BST Wireless Roaming (3) for HQ6 or 1113 when using HQ9 to HQ6 nomenclature denotes that the half that is not owned by the ILEC is a Wireless Roaming network call.
8) BST CLEC (4) for HQ6 or 1114 when using HQ9 to HQ6 nomenclature denotes that the half that is not owned by the ILEC but instead by a CLEC Telco.

Applying FIG. 20 guidelines calls that are HQ10 or greater must comply with the following:

1) A new bitmap field has an A for regular wireless calls, and B for hybrid roaming (tagging two long distance calls) or C for hybrid complex international calls (tagging three long distance calls).
2) HQ7 to HQ9 and Hybrid roaming wireless calls consist of Leg A, Leg B, Leg T, point C, point D, and Leg TC or Leg TD if required. Leg A to Point C. Leg A denotes the point of origin within the hierarchy of nodes. Point C consists of the network access point (NAP) that is used as a reference to detect and make the call valid. All calls that have a Leg A that is wireless have a point C that helps build the wireless network Vector of the Call.
3) Leg T is the lookup route within the network to tie Leg A and Leg B
4) HQ9 to HQ7 Outbound Calls have the following characteristics
   XXXXX HQ0 Leg A
   XXXXX HQx Point C point where the Wireless device is connected outside its NPA. Where x is a number between 0 and 6.
   Leg TC is the lookup route within the network to tie Point C and Leg A.
5) HQ9 to HQ7 Inbound Calls have the following characteristics
   ####XXXXX HQ0 Leg B
   ####XXXXX HQx Point D point where the Wireless device is connected outside its NPA. Where x is a number between 0 and 6.
   Leg TD is the lookup route within the network to tie Leg B and Point D.
6) Leg A is the OUTBOUND side of the long distance calls and possesses the Vector information up to the point of presence (POP).
7) Leg B is the INBOUND side of the long distance calls and possessed the Vector information up to the point of presence (POP).
8) HQ12 to HQ10 and Complex Hybrid roaming wireless calls consists of Leg A, Leg B, Leg T, Leg X, Leg Y, Leg Tex., and Leg TY.
9) HQ12 to HQ10 Outbound Calls have the following characteristics
   AAA####XXXXX HQ0 Leg A place of billing origin.
   AAA####XXXXX HQ0 Leg X point where the Wireless device is connected outside its NPA and makes a long distance call to other party. Leg X signifies the actual location outside the local NPA that the party attempting making the call is actual located within a global-geography Wireless Network.
   Leg TX is the lookup route within the network to tie Leg A and Leg X.
10) HQ12 to HQ10 Inbound Calls have the following characteristics
   AAA####XXXXX HQ0 Leg B place of billing destination.
   AAA####XXXXX HQx Leg Y point where the Wireless device is connected outside its NPA and makes a long distance call to other party. Leg Y signifies the actual location outside the local NPA that the party receiving the call is actual located within a global-geography Wireless Network.
   Leg TY is the lookup route within the network to tie Leg B and Leg Y.
11) Leg X is the OUTBOUND side of the long distance calls and possesses the Vector information up to the point of presence (POP) from the standpoint of the actual geographic location of the party attempting to make the call.
12) Leg Y is the INBOUND side of the long distance calls and possessed the Vector information up to the point of presence (POP) from the standpoint of the actual geographic location of the party receiving the call.
13) Leg A is the OUTBOUND side of the long distance calls that has to be virtual created if necessary from NPA in the country of origin from the standpoint of the party attempting to make the call. Point of origin is necessary for final billing calculations.
14) Leg B is the INBOUND side of the long distance calls that has to be virtual created if necessary from NPA in the country of origin from the standpoint of the party receiving the call. Point of destination is necessary for final billing calculations.
15) HQ12 to HQ10 are billed from Leg A to Leg B even though the call can be optimized by networks to only travel from Leg X to Leg Y which represent the actual geographical locations of the person making the call and the person receiving the call.
16) Three way calling follow Complex Hybrid roaming for HQ12 to HQ 10 calls, and Hybrid roaming for HQ9 to HQ6 guidelines.

FIG. 41 is a schematic representation of generating a correlated CDR from an Inter ILEC Wireless call owner. The Cingular stamp is 2212. The (33) HQ7 Vector 221 owns the call and generates the Vector Resultant CDR. At least 5 CDR must be correlated to make the billing entity by the call owner HQ1 (31) that will be the primary choice to perform the task from the rated costs calculated by the HQ7. Vector Magnitude looks like this: 221 HQ7 (33) Vector Owner; -21134707 Leg A Owner (31); -43211A03 Leg B Owner (35); Tandem segment ff left blank; 221-21134707-43211A03-ff-########. To determine the Leg A system ID just add the least common denominator parent 221 plus the 21134707 to get 22121134707. Leg B is 221 plus 43211A03 to get 22143211A03. This call uses the ff Tandem route to connect Miami, Fla. and New York City, N.Y.;

FIG. 42 is a schematic representation of generating a correlated CDR from an Intra USA Wireless call owner. The Cingular common BST stamp is 2212 and PB stamp is 2284. The (33) HQ8 Vector 22 owns the call and generates the Vector Resultant CDR. At least 5 CDR must be correlated to make the billing entity by the call owner HQ1 (31) that will be the primary choice to perform the task from the rated costs calculated by the HQ8. Vector Magnitude looks like this: 22 Vector Owner; -121134707 Leg A Owner (31); -843211A03 Leg B Owner (35); Tandem segment ff left blank; 22-121134707-843211A03-ff-########. To determine the Leg A system ID just add the least common denominator parent HQ8 (33) 22 plus the 121134707 to get 22121134707. Leg B is 22 plus 843211A03 to get 22843211A03. This call uses the ff Tandem route to connect Miami, Fla. and Los Angeles, Calif.;

FIG. 43 is a schematic representation of generating a correlated CDR from an Inter USA Wireless call owner. The Cingular-BST stamp is 2212 and Verizon-PB is 2384. The (33) HQ9 Vector 2 owns the call and generates the Vector Resultant CDR. At least 5 CDR must be correlated to make the billing entity by the call owner HQ1 (31) that will be the primary choice to perform the task from the rated costs calculated by the HQ9. Vector Magnitude looks like this: 2 Vector Owner; -2121134707 Leg A Owner (31); -3843211A03 Leg B Owner (35); Tandem segment ff left blank; 2-2121134707-3843211A03-fff-001-########. To determine the Leg A system ID just add the least common denominator parent HQ9 (33) 2 plus the 2121134707 to get 22121134707. Leg B is 2 plus 3843211A03 to get 23843211A03. This call uses the ff (Cingular network) and 001 (Verizon network) Tandem routes to connect Miami, Fla. and Los Angeles, Calif.;

FIG. 44 through FIG. 53 deal with calls that the person making the call is a subscriber of a Telco and the person receiving the call belongs to a Wireless network or vice versa. The mixed network calls follow the following guidelines Telco side of the call CO, TO, and POP
Wireless side has X or MCU (Mobile Control Unit) and XO or MTSO (Mobile telephone switching office).
Telco calls use 1111 for BST
Wireless calls use 2212
Telco/Wireless calls use 1112 for BST and 2211 for Cingular.
Telco/Roaming calls use 1113 for BST and 3211 for Cingular.

FIG. 44 is schematic representation of generating a correlated CDR from an Intra NPA Telco/Wireless call. The BST-Cingular stamp is 1112. The Vector 11121134 owns the call and generates the Vector Resultant CDR. 4 CDR must be correlated to make the billing entity by the call owner HQ2. Vector Magnitude looks like this 11121134 HQ2 (32) Vector Owner; -803 Leg A Telco Owner (31); -7OF Leg B Wireless Owner (33); Tandem segment N/A left blank; 11121134-803-7OF--########. To determine the Leg A system ID just add the least common denominator parent HQ2 (32) 11121134 plus the 803 to get 11121134803. Leg B is 11121134 plus 70F to get 1112113470F;

FIG. 45 is schematic representation of generating a correlated CDR from an Intra NPA Wireless/Telco call. The Cingular-BST stamp is 2211. The (32) HQ2 Vector 22111134 owns the call and generates the Vector Resultant CDR. 4 CDR must be correlated to make the billing entity by the call owner HQ2. Vector Magnitude looks like this 22111134 HQ2 (32) Vector Owner; -803 Leg A Wireless Owner (31); -7OF Leg B Telco Owner (33); Tandem segment N/A left blank; 22111134-803-7OF--########. To determine the Leg A system ID just add the least common denominator parent HQ2 (32) 22111134 plus the 803 to get 22111134803. Leg B is 22111134 plus 70F to get 2211113470F;

FIG. 46 is schematic representation of generating a correlated CDR from an Intra LATA Telco/Wireless call. The BST-Cingular stamp is 1112. The Vector 1112113 owns the call and generates the Vector Resultant CDR. 6 CDR must be correlated to make the billing entity by the call owner HQ3. Vector Magnitude looks like this 1112113 HQ3 (33) Vector Owner; -4803 Leg A Telco Owner (31); -1701 Leg B Wireless Owner (33); Tandem segment N/A left blank; 1112113-4803-1701--########. To determine the Leg A system ID just add the least common denominator parent HQ3 (33) 1112113 plus the 4803 to get 11121134803. Leg B is 1112113 plus 1701 to get 11121131701;

FIG. 47 is schematic representation of generating a correlated CDR from an Intra LATA Wireless/Telco call. The Cingular-BST stamp is 2211. The (33) HQ3 Vector 2211113 owns the call and generates the Vector Resultant CDR. 6 CDR must be correlated to make the billing entity by the call owner HQ3. Vector Magnitude looks like this 2211113 HQ1 (31) Vector Owner; -4803 Leg A Wireless Owner (31); -17O1 Leg B Telco Owner (33); Tandem segment N/A left blank; 2211113-4803-1701--########. To determine the Leg A system ID just add the least common denominator parent HQ3 (33) 2211113 plus the 4803 to get 22111134803. Leg B is 2211113 plus 1701 to get 22111131701;

FIG. 48 is schematic representation of generating a correlated CDR from an Intra Regional Telco/Wireless call. The BST-Cingular stamp is 1112. The (33) HQ4 Vector 111211 owns the call and generates the Vector Resultant CDR. 6 CDR must be correlated to make the billing entity by the call owner HQ4. Vector Magnitude looks like this 111211 HQ4 (33) Vector Owner; -34803 Leg A Telco Owner (31); -21105 Leg B Wireless Owner (33); Tandem segment N/A left blank; 111211-34803-21105--########. To determine the Leg A system ID just add the least common denominator parent HQ4 (33) 111211 plus the 34803 to get 11121134803. Leg B is 111211 plus 21105 to get 11121121105;

FIG. 49 is schematic representation of generating a correlated CDR from an Intra Regional Wireless/Telco call. The Cingular-BST stamp is 2211. The (33) HQ4 Vector 221111 owns the call and generates the Vector Resultant CDR. 6 CDR must be correlated to make the billing entity by the call owner HQ4. Vector Magnitude looks like this 221111 HQ4 (33) Vector Owner; -34803 Leg A Wireless Owner (31); -21105 Leg B Telco Owner (33); Tandem segment N/A left blank; 221111-34803-21105--########. To determine the Leg A system ID just add the least common denominator parent HQ4 (33) 221111 plus the 34803 to get 22111134803. Leg B is 221111 plus 21105 to get 22111121105;

FIG. 50 is schematic representation of generating a correlated CDR from an Inter Regional Telco/Wireless call. The BST-Cingular stamp is 1112. The (33) HQ5 Vector 11121 owns the call and generates the Vector Resultant CDR. 6 CDR must be correlated to make the billing entity by the call owner HQ5. Vector Magnitude looks like. this 11121 HQ5 (33) Vector Owner; -134707 Leg A Telco Owner (31); -211A03 Leg B Wireless Owner (33); Tandem segment N/A left blank; 11121-134707-211A03--########. To determine the Leg A system ID just add the least common denominator parent HQ5 (33) 11121 plus the 134707 to get 11121134707. Leg B is 11121 plus 211A03 to get 11121211A03;

FIG. 51 is schematic representation of generating a correlated CDR from an Inter Regional Wireless/Telco call. The Cingular-BST stamp is 2211. The Vector 22111 owns the call and generates the Vector Resultant CDR. 6 CDR must be correlated to make the billing entity by the call owner HQ5. Vector Magnitude looks like this 22111 Vector Owner; -134707 Leg A Wireless Owner (31), -211A03 Leg B Telco Owner (33); Tandem segment N/A left blank; 22111-134707-211A03--########. To determine the Leg A system ID just add the least common denominator parent HQ5 (33) 22111 plus the 134707 to get 22111134707. Leg B is 22111 plus 21111A03 to get 22111211A03;

FIG. 52 is schematic representation of generating a correlated CDR from an ILEC Telco/Wireless call. The BST-Cingular stamp is 1112. The (33) HQ6 Vector 1112 owns the call and generates the Vector Resultant CDR. 6 CDR must be correlated to make the billing entity by the call owner HQ6. Vector Magnitude looks like this 1112 HQ6 (33) Vector Owner; -1134707 Leg A Telco Owner (31); -1211A03 Leg B Wireless Owner (33); Tandem segment N/A left blank; 1112-1134707-1211A03--########. To determine the Leg A system ID just add the least common denominator parent 1112 plus the 1134707 to get 11121134707. Leg B is 1112 plus 1211A03 to get 11121211A03;

FIG. 53 is schematic representation of generating a correlated CDR from an ILEC Wireless/Telco call. The Cingular-BST stamp is 2211. The (33) HQ6 Vector 2211 owns the call and generates the Vector Resultant CDR. 6 CDR must be correlated to make the billing entity by the call owner HQ6. Vector Magnitude looks like this 2211 HQ6 (33) Vector Owner; -1134707 Leg A Wireless Owner (31); -1211A03 Leg B Telco Owner (33); Tandem segment N/A left blank; 2211-1134707-1211A03--########. To determine the Leg A system ID just add the least common denominator parent 2211 plus the 1134707 to get 22111134707. Leg B is 2211 plus 1211A03 to get 22111211A03;

FIG. 54 through FIG. 65 represents different HQ7 or greater USA domain calls. Some calls are connected via unknown 3$^{rd}$ party routes.

FIG. 54 is schematic representation of generating a correlated CDR from an Inter ILEC Telco/Wireless call. The BST-Cingular stamp is 1112 and Cingular-Bell Atlantic is 2214. The (33) HQ7 Vector 111/221 owns the call and generates the Vector Resultant CDR. 6 CDR must be correlated to make the billing entity by the call owner HQ7. Vector Magnitude looks like this 111/221 Vector Owner; -21134707 Leg A Wireless Owner (31); -43211A03 Leg B Telco Owner (33); Tandem segment N/A left blank; 111/221-21134707-43211A03--########. To determine the Leg A system ID just add the least common denominator parent 111/221 plus the 21134707 to get 11121134707. Leg B is 111/221 plus 43211A03 to get 21143211A03;

FIG. 55 is schematic representation of generating a correlated CDR from an Inter ILEC Wireless call. The BST-Cingular stamp is 1112 and Cingular-Bell Atlantic is 2213. The (33) HQ7 Vector 221/111 owns the call and generates the Vector Resultant CDR. 6 CDR must be correlated to make the billing entity by the call owner HQ7. Vector Magnitude looks like this 221/111 HQ7 (33) Vector Owner; -33211A03 Leg A Wireless Owner (31); -21134707 Leg B Telco Owner (33); Tandem segment N/A left blank; 221/111-33211A03-21134707--########. To determine the Leg A system ID just add the least common denominator parent 221/111 plus the 33211A03 to get 2213321103. Leg B is 221/111 plus 21134707 to get 11121134707;

FIG. 56 is schematic representation of generating a correlated CDR from an Inter ILEC roaming call. The BST-Cingular stamp is 1112 and Cingular-Bell Atlantic Roaming is 3213. The (33) HQ7 Vector 321/111 owns the call and generates the Vector Resultant CDR. 6 CDR must be correlated to make the billing entity by the call owner HQ7. Vector Magnitude looks like this 321/111 HQ7 (33) Vector Owner; -33211A03 Leg A Wireless Owner (31); -21134707 Leg B Telco Owner (33); Tandem segment N/A left blank; 321/111-33211A03-21134707--########. To determine the Leg A system ID just add the least common denominator parent 321/111 plus the 33211A03 to get 32133211A03. Leg B is 321/111 plus 21134707 to get 11121134707;

FIG. 57 is schematic representation of generating a correlated CDR from an Intra USA Telco/Wireless call. The BST-Cingular stamp is 1112 and Cingular-Pacific Bell is 2384. The (33) HQ8 Vector 11/23 owns the call and generates the Vector Resultant CDR. 6 CDR must be correlated to make the billing entity by the call owner HQ8. Vector Magnitude looks like this 11/23 HQ8 (33) Vector Owner; -121134707 Leg A Wireless Owner (31); -843211A03 Leg B Telco Owner (33); Tandem segment N/A left blank; 11/23-121134707-843211A03--########. To determine the Leg A system ID just add the least common denominator parent 11/23 plus the 121134707 to get 11121134707. Leg B is 11/23 plus 843211A03 to get 23843211A03;

FIG. 58 is schematic representation of generating a correlated CDR from an Inter USA Wireless call. The BST-Cingular stamp is 1112 and Cingular-Pacific Bell is 2384. The (33) HQ8 Vector 23/11 owns the call and generates the Vector Resultant CDR. 6 CDR must be correlated to make the billing entity by the call owner HQ8. Vector Magnitude looks like this 23/11 HQ8 (33) Vector Owner; -843211A03 Leg A Wireless Owner (31); -121134707 Leg B Telco Owner (33); Tandem segment N/A left blank; 23/11-843211A03-121134707--########. To determine the Leg A system ID just add the least common denominator parent 23/11 plus the 843211A03 to get 23843211A03. Leg B is 23/11 plus 121134707 to get 11121134707;

FIG. 59 is schematic representation of generating a correlated CDR from an Intra USA Roaming call. The BST-Cingular stamp is 1112 and Cingular-Pacific Bell roaming is 3384. The (33) HQ8 Vector 33/11 owns the call and generates the Vector Resultant CDR. 6 CDR must be correlated to make the billing entity by the call owner HQ8. Vector Magnitude looks like this 33/11 HQ8 (33) Vector Owner; -841125807 Leg A Wireless Owner (31); -121134707 Leg B Telco Owner (33); Tandem segment N/A left blank; 33/11-841125807-121134707--########. To determine the Leg A system ID just add the least common denominator parent HQ8 (33) 33/11 plus the 841125807 to get 33841125807. Leg B is 33/11 plus 121134707 to get 11121134707;

FIG. 60 is a schematic representation of generating a correlated CDR from an Inter USA Telco/Wireless call. The 3$^{rd}$ party BST-CLEC stamp is 4112 and the Cingular-Wireless Stamp is 2384. The (33) HQ9 Vector 4/2 owns the call and generates the Vector Resultant CDR. 4 CDR must be correlated to make the billing entity by the call owner HQ9. Vector Magnitude looks like this 4/2 HQ9 (33) Vector Owner; -1121134707 Leg A by geographically approximating the closest point of access Telco Owner (31); -3843211A03 Leg B Telco Owner (35); Tandem UNKNOWN; 4/2 plus 1121134707-3843211A03-UNKNOWN-########.

FIG. 61 is schematic representation of generating a correlated CDR from an Inter USA Roaming call. The Cingular-BST roaming stamp is 3212 and Verizon-Pacific Bell roaming is 2384. The (33) HQ9 Vector 3/2 owns the call and generates the Vector Resultant CDR. 6 CDR must be correlated to make the billing entity by the call owner HQ9. Vector Magnitude looks like this 3/2 HQ9 (33) Vector Owner; -2121134707 Leg A Wireless Owner (31); -3843211A03 Leg B Telco Owner (33); Tandem segment Ouch1; 3/2-2121134707-3843211A03-Ouch1-########. To determine the Leg A system ID just add the least common denominator parent HQ8 (33) 3/2 plus the 2121134707 to get 32121134707. Leg B is 3/2 plus 3843211A03 to get 23843211A03;

FIG. 62 is schematic representation of generating a correlated CDR from an Inter USA Wireless/Telco call. The BST-CLEC stamp is 1114 and Verizon-Pacific Bell is 2384. The (33) HQ9 Vector 2/1 owns the call and generates the Vector Resultant CDR. 6 CDR must be correlated to make the billing entity by the call owner HQ9. Vector Magnitude looks like this 2/1 HQ9 (33) Vector Owner; -3843211A03 Leg A Wireless Owner (31); -1131134707 Leg B Telco Owner (33); Tandem segment CLEC7; 2/1-3843211A03-1141134707-CLEC7-########. To determine the Leg A system ID just add the least common denominator parent HQ9 (33) 2/1 plus the 3843211A03 to get 23843211A03. Leg B is 2/1 plus 1141134707 to get 11141134707;

FIG. 63 is schematic representation of generating a correlated CDR from an Inter USA Roaming call. The Cingular-BST stamp is 3212 and Cingular-Pacific Bell is 3384. The (33) HQ9 Vector 3/3 simplified to 3 owns the call and generates the Vector Resultant CDR. 6 CDR must be correlated to make the billing entity by the call owner HQ9. Vector Magnitude looks like this 3/3 or 3 HQ9 (33) Vector Owner; -2121134707 Leg A Wireless Owner (31); -3843211A03 Leg B Telco Owner (33); Tandem segment Ouch1 and Ouch2 3-2121134707-3843211A03-Ouch1-Ouch2-########. To determine the Leg A system ID just add the least common denominator parent HQ9 (33) 3 plus the 2121134707 to get 32121134707. Leg B is 3 plus 3843211A03 to get 33843211A03;

FIG. 64 is schematic representation of generating a correlated CDR from an Inter ILEC Wireless/Telco call. The Cingular-BST stamp is 3213 and BST-CLEC is 4111. The (33) HQ9 Vector 321/411 owns the call and generates the Vector Resultant CDR. 4 CDR must be correlated to make the billing entity by the call owner HQ9. Vector Magnitude looks like this 321/411 HQ7 (33) Vector Owner; -31134707 Leg A Wireless Owner (31); -111211A03 Leg B Telco Owner (33); Tandem segment CLEC 321/411-31134707-11211A03—CLEC-########. To determine the Leg A system ID just add the least common denominator parent 321/411 plus the 31134707 to get 32131134707. Leg B is 411 plus 11211A03 to get 41111211A03;

FIG. 65 is schematic representation of generating a correlated CDR from an Inter USA Wireless/Telco call. The Cingular-Pacific stamp is 2384 and BST is 1112. The (33) HQ9 Vector 2/1 owns the call and generates the Vector Resultant CDR. 4 CDR must be correlated to make the billing entity by the call owner HQ9. Vector Magnitude looks like this 2/1 HQ9 (33) Vector Owner; -3843211A03 Leg A Wireless Owner (31); -1121134707 Leg B Telco Owner (33); Tandem segment BSTOff 2/1-3843211A03-1121134707-BSTOff-########. To determine the Leg A system ID just add the least common denominator parent HQ9 (33) 2/1 plus the 3843211A03 to get 23843211A03. Leg B is 2/1 plus 1121134707 to get 11121134707;

FIG. 66 is schematic representation of generating a correlated CDR from a Hybrid LATA Roaming call. The BST stamp is 1113 and Cingular-BST roaming is 3211 but HQ3 calls are bound by U.S. Pat. No. 6,614,893 guidelines so only use BST Stamp. The (33) HQ3 Vector 1113113 or 113 owns the call and generates the Vector Resultant CDR. 6 CDR must be correlated to make the billing entity by the call owner HQ3. Vector Magnitude looks like this 113 HQ3 (33) Vector Owner; -4803 Leg A Wireless Owner (31); -1701 Leg B Telco Owner (33); Tandem segment BST0 ff 113-4803-1701-BSTOff-########. To determine the Leg A system ID just add the least common denominator parent HQ3 (33) 113 plus the 4803 to get 11131134803 or 1134803 Leg B is 113 plus 1701 to get 1131701 or 32111131701.

FIG. 67 is schematic representation of generating a correlated CDR from a Hybrid Intra Regional Roaming call. The BST stamp is 1113 and Cingular is 3211 but HQ4 calls are bound by U.S. Pat. No. 6,614,893 simplified guidelines so only use BST Stamp. The (33) HQ4 Vector 111311 or 11 owns the call and generates the Vector Resultant CDR. 6 CDR must be correlated to make the billing entity by the call owner HQ4. Vector Magnitude looks like this 11 HQ4 (33) Vector Owner; -34803 Leg A Wireless Owner (31); -21105 Leg B Telco Owner (33); Tandem segment BSTOff 11-34803-21105--BSTOff-########. To determine the Leg A system ID just add the least common denominator parent 11 plus the 34803 to get 11131134803 or 1134803 Leg B is 11 plus 21105 to get 1121105 or 31111121105.

FIG. 68 is schematic representation of generating a correlated CDR from a Hybrid Inter Roaming call. The BST stamp is 1113 and Cingular is 3211 but HQ5 calls are bound by U.S. Pat. No. 6,614,893 simplified guidelines so only use BST Stamp. The (33) HQ5 Vector 11131 or 1 owns the call and generates the Vector Resultant CDR. 6 CDR must be correlated to make the billing entity by the call owner HQ5. Vector Magnitude looks like this 1 HQ5 (33) Vector Owner; -134803 Leg A Wireless Owner (31); -211503 Leg B Telco Owner (33); Tandem segment BSTOff 1-134803-211503--BSTOff-########. To determine the Leg A system ID just add the least common denominator parent 1 plus the 134803 to get 11131134803 or 1134803 Leg B is 1 plus 211503 to get 1211503 or 11131211503.

FIG. 69 is schematic representation of generating a correlated CDR from a Hybrid Regional Roaming call. The BST stamp is 1113 and Cingular is 3211 but HQ6 calls are optionally bound by U.S. Pat. No. 6,614,893 simplified guidelines so only use BST Stamp. The (33) HQ6 Vector 1113 or 1113/3211 owns the call and generates the Vector Resultant CDR. 6 CDR must be correlated to make the billing entity by the call owner HQ6. Vector Magnitude looks like this 1113 HQ6 (33) Vector Owner; 1113-1134803 Leg A Wireless Owner (31); 1113-1211503 Leg B Telco Owner (33); Tandem segment Ouch1 113-1134803-1211503-Ouch1--########. To determine the Leg A system ID just add the least common denominator parent HQ6 (33) 1113 plus the 1134803 to get 11131134803 Leg B is 1113 plus 1211503 to get 11131211503.

FIG. 70 is schematic representation of generating a correlated CDR from a Hybrid Intra USA Roaming call. The BST stamp is 1113 and Cingular-Pacific Bell (PB) is 3213. The (33) HQ7 Vector 111/321 owns the call and generates the Vector Resultant CDR. 6 CDR must be correlated to make the billing entity by the call owner HQ7. Vector Magnitude looks like this 111/321 HQ7 (33) Vector Owner; 111/321-31134707 Leg A Wireless Owner (31); 111/321-33211A03 Leg B Telco Owner (33); Tandem segment ff 111/321-31134707-33211A03-ff--########. To determine the Leg A system ID just add the least common denominator parent 111/321 plus the 31134707 to get 11131134707 Leg B is 111/321 plus 33211A03 to get 32133211A03.

FIG. 71 is schematic representation of generating a correlated CDR from a Hybrid Intra USA Roaming call. The BST stamp is 1113 and Cingular-BST roaming is 3384. The (33) HQ8 Vector 11/33 owns the call and generates the Vector Resultant CDR. 6 CDR must be correlated to make the billing entity by the call owner HQ8. Vector Magnitude looks like this 11/33 HQ8 (33) Vector Owner; 11/33-131134707 Leg A Wireless Owner (31); 11/33-843211A03 Leg B Telco Owner (33); Tandem segment bb for Cingular roaming 11/33-131134707-843211A03-bb--########. To determine the Leg A system ID just add the least common denominator parent HQ8 (33) 11/33 plus the 131134707 to get 11133211A03 Leg B is 11/33 plus 843211A03 to get 33843211A03.

FIG. 72 is schematic representation of generating a correlated CDR from a Hybrid Inter USA Roaming call. The BST stamp is 1113 and Cingular-PB (Pacific Bell) roaming is 3384. The (33) HQ9 Vector 1/3 owns the call and generates the Vector Resultant CDR. 6 CDR must be correlated to make the billing entity by the call owner HQ9. Vector Magnitude looks like this 1/3 HQ9 (33) Vector Owner; 1/3-1131134707 Leg A Wireless Owner (31); 1/3-3843211A03 Leg B Telco Owner (33); Tandem segment bb for Cingular roaming 1/3-1131134707-3843211A03-bb--########. To determine the Leg A system ID just add the least common denominator parent 1/3 plus the 1131134707 to get 11133211A03 Leg B is 1/3 plus 3843211A03 to get 33843211A03.

FIG. 73 is schematic representation of generating a correlated CDR from a Hybrid LATA Wireless/Telco call. The BST stamp is 1112 and Cingular-BST is 2211 but HQ3 calls are bound by U.S. Pat. No. 6,614,893 guidelines so only use BST Stamp. The (33) HQ3 Vector 1112113 or 113 owns the call and generates the Vector Resultant CDR. 6 CDR must be correlated to make the billing entity by the call owner HQ3. Vector Magnitude looks like this 113 HQ3 (33) Vector Owner; -1701 Leg A Wireless Owner (31); -4707 Leg B Telco Owner (33); Tandem segment BSTOff 2211-113-1701-4707-BSTOff-######## or 113-1701-4707-BSTOff-########. To determine the Leg A system ID just add the least common denominator parent HQ3 (33) 113 plus the 1701 to get 22111131701 or 1131701 Leg B is 113 plus 4707 to get 1134707 or 11121134707.

FIG. 74 is schematic representation of generating a correlated CDR from a Hybrid Intra Regional Roaming call. The BST stamp is 1113 and Cingular-BST Roaming is 3211 but HQ4 calls are bound by U.S. Pat. No. 6,614,893 guidelines so only use BST Stamp. The (33) HQ4 Vector 111311 or 11 owns the call and generates the Vector Resultant. CDR. 6 CDR must be correlated to make the billing entity by the call owner HQ4. Vector Magnitude looks like this 11 HQ4 (33) Vector Owner; -21105 Leg A Wireless Owner (31); -34707 Leg B Telco Owner (33); Tandem segment BSTOff 1113-11-21105-34707-BSTOff-######## or 11-21105-34707-BSTOff-########. To determine the Leg A system ID just add the least common denominator parent 11 plus the 21105 to get 11131121105 or 1121105 Leg B is 11 plus 34707 to get 1134707 or 11131134707.

FIG. 75 is schematic representation of generating a correlated CDR from a Hybrid Inter Regional Roaming call. The BST stamp is 1113 and Cingular-BST Roaming is 3211 but HQ5 calls are bound by U.S. Pat. No. 6,614,893 guidelines so only use BST Stamp. The (33) HQ5 Vector 11131 or 1 owns the call and generates the Vector Resultant CDR. 6 CDR must be correlated to make the billing entity by the call owner HQ5. Vector Magnitude looks like this 1 HQ5 (33) Vector Owner; -211503 Leg A Wireless Owner (31); -134707 Leg B Telco Owner (33); Tandem segment BSTOff 1113-1-211503-134707-BSTOff-########. To determine the Leg A system ID just add the least common denominator parent 1 plus the 211503 to get 11131211503 or 1211503 Leg B is 1 plus 134707 to get 1134707 or 11131134707.

FIG. 76 is schematic representation of generating a correlated CDR from a Hybrid ILEC Roaming call. The BST stamp is 1113 and Cingular-BST Roaming is 3211 but HQ6 calls are bound by U.S. Pat. No. 6,614,893 guidelines so only use Cingular BST Stamp. The (33) HQ6 Vector 3211 instead of 3211/1113 owns the call and generates the Vector Resultant CDR. 6 CDR must be correlated to make the billing entity by the call owner HQ6. Vector Magnitude looks like this 3211 HQ6 (33) Vector Owner; -1211503 Leg A Wireless Owner (31); -1134707 Leg B Telco Owner (33); Tandem segment BSTOff 3211-1211503.1134707-BSTOff-########. To determine the Leg A system ID just add the least common denominator parent HQ6 (33) 3211 plus the 1211503 to get 32111211503 Leg B is 1113 plus 1134707 to get 1134707 or 11131134707.

FIG. 77 is schematic representation of generating a correlated CDR from a Hybrid Intra USA Roaming call. The BST stamp is 1113 and Cingular-BST Roaming is 3213 the (33) HQ7 Vector 321/111 owns the call and generates the Vector Resultant CDR. 6 CDR must be correlated to make the billing entity by the call owner HQ7. Vector Magnitude looks like this 321/111 HQ7 (33) Vector Owner; -33211A03 Leg A Wireless Owner (31); -31134707 Leg B Telco Owner (33); Tandem segment BSTOff 321/111-33211A03-21134707-BSTOff-########. To determine the Leg A system ID just add the least common denominator parent 321/111 plus the 31134707 to get 32131134707 Leg B is 321/111 plus 31134707 to get 11131134707

FIG. 78 is schematic representation of generating a correlated CDR from a Hybrid Inter USA Roaming call. The BST stamp is 1113 and Cingular-Bell Atlantic Roaming is 3213. The (33) HQ8 Vector 32/11 owns the call and generates the Vector Resultant CDR. 6 CDR must be correlated to make the billing entity by the call owner HQ8. Vector Magnitude looks like this 32/11 HQ8 (33) Vector Owner; -133211A03 Leg A Wireless Owner (31); -131134707 Leg B Telco Owner (33); Tandem segment BSTOff 32/11-133211A03-131134707-BSTOff-########. To determine the Leg A system ID just add the least common denominator parent 32/11 plus the 133211A03 to get 32133211A03 Leg B is 32/11 plus 131134707 to get 11131134707.

FIG. 79 is schematic representation of generating a correlated CDR from a Hybrid Inter USA Wireless/Telco. The BST stamp is 1112 and Cingular-Bell Atlantic is 2384. The (33) HQ8 Vector 23/11 owns the call and generates the Vector Resultant CDR. 6 CDR must be correlated to make the billing entity by the call owner HQ8. Vector Magnitude looks like this 23/11 HQ8 (33) Vector Owner; -843211A03 Leg A Wireless Owner (31); -121134707 Leg B Telco Owner (33); Tandem segment BSTOff 23/11-843211A03-121134707-BSTOff-########. To determine the Leg A system ID just add the least common denominator parent 23/11 plus the 843211A03 to get 23843211A03 Leg B is 23/11 plus 121134707 to get 11121134707.

FIG. 80 is schematic representation of generating a correlated CDR from a Hybrid Inter USA Roaming. The BST stamp is 1113 and Cingular-Bell Atlantic Roaming is 3384. The (33) HQ9 Vector 3/1 owns the call and generates the Vector Resultant CDR. 6 CDR must be correlated to make the billing entity by the call owner HQ9. Vector Magnitude looks like this 3/1 HQ9 (33) Vector Owner; -3843211A03 Leg A Wireless Owner (31); -1131134707 Leg B Telco Owner (33); Tandem segment BSTOff 3/1-3843211A03-1131134707-BSTOff-########. To determine the Leg A system ID just add the least common denominator parent HQ 9 (33) 3/1 plus the 3843211A03 to get 33843211A03 Leg B is 3/1 plus 1131134707 to get 11131134707.

FIG. 81 is schematic representation of generating a correlated CDR from a Hybrid Intra Continental Wireless/Telco. The Worldwide Nextel is AAA, BST stamp is 1112 and Bell Canada is 5211. The (33) HQ10 Vector AAA owns the call and generates the Vector Resultant CDR. 6 CDR must be correlated to make the billing entity by the call owner HQ10. Vector Magnitude looks like this AAA HQ10 (33) Vector Owner; -52113211A03 Leg A Wireless Owner (31); -52111134707 Leg B Telco Owner (33); Tandem segment BCOff and Nextel123 AAA-52113211A03-11121134707-Nextel123-BCOff########. To determine the Leg A system ID just add the least common denominator parent AAA plus the 52113211A03 to get AAA52113211A03 Leg B is AAA plus 11121134707 to get AAA11121134707 or 11121134707.

FIG. 82 is schematic representation of generating a correlated CDR from a Hybrid Intra Continental Wireless/Telco. The Worldwide AT&T Wireless is ADA, BST stamp is 1112 and Bell Canada is 5211. The (33) HQ10 Vector ADA owns the call and generates the Vector Resultant CDR. 6 CDR must be correlated to make the billing entity by the call owner HQ10. Vector Magnitude looks like this ADA HQ10 (33) Vector Owner; -52113211A03 Leg A Wireless Owner (31); -11121134707 Leg B Telco Owner (33); Tandem segment BCF00 and ATT777 ADA-52113211A03-52111134707-ATT777-BCf 00########. To determine the Leg A system ID just add the least common denominator parent HQ 10 (33) ADA plus the 52113211A03 to get ADA52113211A03 Leg B is ADA plus 11121134707 to get ADA11121134707.

FIG. 83 is schematic representation of generating a correlated CDR from a Hybrid Continental Wireless/Telco. The Worldwide Verizon Wireless is AGB, BST stamp is 1112 and Telecom, Argentina is 7324. The (33) HQ11 Vector AG owns the call and generates the Vector Resultant CDR. 6 CDR must be correlated to make the billing entity by the call owner HQ11. Vector Magnitude looks like this AG HQ11 (33) Vector Owner; -B73241421A03 Leg A Wireless Owner (31); -A11121134707 Leg B Telco Owner (33); Tandem segment TA1 and Verizon0 AG-B73241421A03-A11121134707-TA1-Verizon0########. To determine the Leg A system ID just add the least common denominator parent AG plus the B73241421A03 to get AGB73241421A03 Leg B is AG plus A11121134707 to get AGA11121134707.

FIG. 84 is schematic representation of generating a correlated CDR from a Hybrid Continental Wireless/Telco. The Worldwide Nextel Wireless is AAB, BST stamp is 1112 and Telecom, Argentina is 7324. The (33) HQ 11 Vector AA owns the call and generates the Vector Resultant CDR. 6 CDR must be correlated to make the billing entity by the call owner HQ11. Vector Magnitude looks like this AA HQ11 (33) Vector Owner; -B73241421A03 Leg A Wireless Owner (31); -A11121134707 Leg B Telco Owner (33); Tandem segment TA1 and Verizon0 AA-B73241421A03-A11121134707-TA1-Verizon0########. To determine the Leg A system ID just add the least common denominator parent AA plus the B73241421A03 to get AAB73241421A03 Leg B is AA plus A11121134707 to get AAA11121134707.

FIG. 85 is schematic representation of generating a correlated CDR from a Hybrid Inter Continental Wireless/Telco. The Worldwide Verizon Wireless is AHA, BST stamp is 1112 and Telecom, Argentina is 7117. The (33) HQ12 Vector A owns the call and generates the Vector Resultant CDR. 6 CDR must be correlated to make the billing entity by the call owner HQ12. Vector Magnitude looks like this A HQ12 (33) Vector Owner; -HA71173211A03 Leg A Wireless Owner (31); -GA11121134707 Leg B Telco Owner (33); Tandem segment Italia01 and Verizon0b A-HA71173211A03-GA11121134707-Italia01-Verizon0b########. To determine the Leg A system ID just add the least common denominator parent HQ 12 (33) A plus the HA71173211A03 to get AHA71173211A03 Leg B is A plus GA11121134707 to get AGA11121134707.

FIG. 86 is schematic representation of generating a correlated CDR from a Hybrid Continental Roaming. The Worldwide Nextel Wireless is AAB and the BST stamp is 1112 and Telecom, Argentina is 7324. The (33) HQ12 Vector A owns the call and generates the Vector Resultant CDR. 6 CDR must be correlated to make the billing entity by the call owner HQ12. Vector Magnitude looks like this A HQ12 (33) Vector Owner; -AB73241421A03 Leg A Wireless Owner (31); -AA11121134707 Leg B Telco Owner (33); Tandem segment Arg03 and Nextel99 A-AB73241421A03-AA11121134707-Arg03-Nextel99########. To determine the Leg A system ID just add the least common denominator parent HQ 12 (33) A plus the AB73241421A03 to get AAB73241421A03 Leg B is A plus AA11121134707 to get AAA11121134707.

FIG. 87 is schematic representation of generating a correlated CDR from a Hybrid Inter Continental Roaming. The Worldwide Verizon Wireless is AHA, the BST stamp is 1112 and Telecom, Italia is 7117. The (33) HQ12 Vector A owns the call and generates the Vector Resultant CDR. 6 CDR must be correlated to make the billing entity by the call owner HQ12. Vector Magnitude looks like this A HQ12 (33) Vector Owner; -HA71173211A03 Leg A Wireless Owner (31); -GA11121134707 Leg B Telco Owner (33); Tandem segment Italia0f and Verizon99 A-HA71173211A03-GA11121134707-Italia0f-Verizon99########. To determine the Leg A system ID just add the least common denominator parent HQ 12 (33) A plus the HA71173211A03 to get AHA71173211A03 Leg B is A plus GA11121134707 to get AGA11121134707.

FIG. 88 is schematic representation of generating a correlated CDR from a Hybrid Inter Continental Complex. The Verizon-Europe Wireless is AHA, Nextel South America AAB, Telecom Italia is 7117, Telecom Argentina 7324, Verizon-BST 2312, and Nextel-Pacific Bell 2584. The (33) HQ12 Vector A owns the call and generates the Vector Resultant CDR. 12 CDR must be correlated to make the billing entity by the call owner HQ12. Vector Magnitude looks like this A HQ12 (33) Vector Owner; -HA71173211A03 Leg A Wireless Owner (31); -AB73241134707 Leg B Telco Owner (33)-AA2312113590F Leg X Wireless Owner (34); -AA25841131201 Leg Y Wireless Owner (33); Tandem segment Italia0f and Verizon99 A-HA71173211A03-AB73241134707-AA2312113590F-AA25841131201-Italia123-Arg00f-VBST1-NPB3 ########. To determine the Leg A system ID just add the least common denominator parent HQ 12 (33) A plus the HA71173211A03 to get AHA71173211A03 Leg B is A plus AB73241134707 to get AGA73241134707, Leg X is A plus AA2312113590F to get AAA2312113590F, Leg Y is A plus AA25841131201 to get AAA25841131201.

FIG. 89 is a world domain chain of command to divide task specific international traffic. At the top HQ12 controls the entire World Domain traffic in particular multi-wireless traffic with roaming. HQ11 controls all Telco and Wireless Continental International traffic to divide North America and South America. HQ10 manages and control Telco and Wireless Intra Continental International traffic to divide USA, Canada, and Mexico. Each HQ10 was a plurality of HQ9 consists of a plurality of National geographic-network Telco and Wireless traffic. That is further divided into Regions, LATA, NPA, NXX, XO (Wireless Traffic Network Access Points) and CO.

FIG. 90 The World scope Networks describes several parallel working Telco (10000) and Wireless (20000, 30000, 40000) international carriers that have global network coverage. Where each Telco network is subdivided into a plurality of National long distance network such as (AT&T 1000, MCI 5000, Sprint 9000) that national long distance traffic. In parallel the plurality of Wireless network cover global geographical-network configuration AT&T (11000, 15000, 19000) and optionally Verizon (31000, 35000, 39000), and Nextel Wireless (41000, 45000, 49000). These global networks and their subordinate national long distance networks are independent organizations with their own sovereignty.

FIG. 91 is a schematic sample South America Scope Network.

FIG. 92 is a schematic sample USA National Network.

FIG. 93 is a schematic sample Common Market Network.

FIG. 94 is a diagram that shows the Genesis Engine Architecture (100) as a Virtual Mirror Telecommunication Network of the SS7 packets (1000) of an existing Telco and Wireless Network (200) and processes the information in real time. The existing network has a plurality of data capture node (1–19) that read the information from Network Platform Equipment. This information is then sent to NPA nodes (21–28), LATA nodes (31–34), Regional Nodes (41–42) and the Central Mainframe to process (50) billing after all the CDR are matched and merged within 2 hours of a call being released at peak time traffic. Legacy Systems such as Telecom Italia might take 60 days to process said information, since billing is done by a 3rd Party.

FIG. 95 is a diagram that represents the basic node of the Genesis Engine, that is an Intelligent Central Office Switch or (CO). Intelligent Wireless Network Points of Access are (XO). From a Telco network that has 33 million subscribers and represent Local and Wireless services for the Bell South geographical area you need XO (1–711) and CO (1000–2439) to process all the information. Node (1000) for example represents a Central Office Switch that might have Wireless or Business and Residential lines. Based on the type of equipment the class 5 switches can have from 4000 ports to 16,000 ports, and Wireless can have bundled configurations to cover 60,000 ports.

This node has all the wiring or the digital reception infrastructure to instantiate a call. Each system node can perform a mirror reflection of one or more class 5 switches and internally perform all the billing, fraud management, network traffic, fault management and identify what pattern of behavior each subscriber has that its owns by assignment or by physical owning POTS.

FIG. 96 is a diagram that shows in a SS7 or better network (100) each Intelligent Switch HQ0 (31–34) node (CO (11–14) or XO (21–24)) is continually scanning its assigned environment one or a plurality of class 5 switches. Each HQ0 node monitors the activities of all network platform equipment the following:
  (A) Billing Inbound and Outbound traffic;
  (B) Telco Network Services
  (C) CO nodes determine the type of call as Local, Long Distance, or International.
  (D) XO nodes determine the type of call as regular plan minutes, overtime minutes, long distance, international and roaming.
  (E) Blocking illegal or fraudulent activities.
  (F) Perform TQM monitoring provisioning, fault management and network traffic. This information is notified to the system (1000) Middle and Summit tier to create trouble tickets, identifying potential churn, metadata, and ad hoc queries for senior management.

FIG. 97 shows what Intelligent Switch functionality is for each Class 5 Central Office (1) that connects calls with data and voice, and then creates a Call Detail Record (1000) from INBOUND and OUTBOUND calls made by one of its POTS. The infrastructure of the Telco Network Spaghetti is simplified by using 3D GIS mapping to virtual know where each equipment is located. Each CO (11) of the system then converts IAM, ACM, ANM and REL SS7 messages to create Vector CDR (2000). The Vector CDR has four main components
  (A) Vector Owner.
  (B) Leg A owner.
  (C) Leg C owner.
  (D) Tandem routes.
  (E) Leg X Owner.
  (F) Leg Y Owner.
  (G) Complex Tandem routes.

FIG. 98 shows CO Spaghetti simplification where each Mobile Telephone Subscriber Office (1) connects calls with data and voice, and then creates a Call Detail Record (1000) from INBOUND and OUTBOUND calls made by one of its POTS. The infrastructure of the Wireless Network Spaghetti is simplified by using 3D GIS mapping to virtual know where each equipment is located by triangulating and approximating the origin and destination signal. Each XO (11) of the system then converts IAM, ACM, ANM and REL SS7 messages or Voice over IP messages to create Vector CDR (2000). The Vector CDR has four or eight main components (A) Vector Owner, (B) Leg A owner, (C) Leg B owner and (D) Tandem routes. Complex Vector CDR has eight components (E) Leg X Owner (F) Leg Y Owner (G–H) Complex Tandem routes.

FIG. 99 shows how to Simplifying a Telco Area Code to better control the flow of traffic and understand billing cost to each line, an Area Code geography (1000) is divided into six parts that is controlled by an Exchange or NXX. Two parts are residential; two are mixed neighborhoods and the remainder business areas. Each NXX has plurality of HQ0 CO (1–36) and HQ1 (100–600) that have control of each subscribers POTS.

FIG. 100 shows how to Simplifying a Wireless NPA Area to better control the flow of traffic and understand billing cost to each line, an Area Code geography (1000) is divided into six MTSO. Each MTSO has plurality of XO cells site (1–36) that have control of a plurality of Mobile Transceivers.

FIG. 101 is schematic representation of how by organizing NXX Spaghetti Infrastructure (100) an Intelligent Switch controls the flow of traffic within Telco Exchange SONET. By receiving a copy of each SS7 packet (1000) the system is able to create a Virtual Reality mirror of the actual physical networks and replicate its associated environmental conditions. Each subordinate CO (11–16) controls one or a plurality of class 5 central office switches (A–I). Each subordinate CO controls one or a plurality of class 5 central office switches. For simplicity each HQ1 controls approximately 250,000 ports.

FIG. 102 is schematic representation of how by organizing NPA Spaghetti Infrastructure (100) an Intelligent Switch controls the flow of traffic within Telco Exchange SONET. By receiving a copy of each SS7 packet (1000) the system is able to create a Virtual Reality mirror of the actual physical networks and replicate its associated environmental conditions. Each HQ2 structure has several subordinate HQ with their corresponding CO (11–66) that controls one or a plurality of class 5 central office switches (A–I). Each subordinate CO controls one or a plurality of class 5 central office switches. For simplicity each HQ2 controls approximately 1,000,000 ports.

FIG. 103 is a diagram of two Telco Rings (1000) using X.25, continuous bit rate (CBR), Frame Relay, variable bit rate (VBR) or asynchronous transfer mode (ATM) services which covers an Exchange or NXX and all its subscribers, that belongs to a Area Code or NPA (2000). The equipment controls all the POTS and its INBOUND and OUTBOUND traffic. Each subordinate CO controls one or a plurality of class 5 central office switches. For simplicity each HQ1 controls approximately 250,000 ports.

FIG. 104 is a diagram of two Wireless SONET rings (1000) using Switched Multimegabit Data Service (SMDS) or asynchronous transfer mode (ATM cell relay) or Synchronous transfer mode (STM) services which covers an Mobile Telephone Switch Office, with its corresponding Cell site and all its Mobile transceiver subscribers, that connect to Area Code or NPA (2000), which controls all the INBOUND and OUTBOUND traffic. Each subordinate XO controls one or a plurality of cell sites. For simplicity each HQ1 controls approximately 500,000 weighted mobile transceivers.

FIG. 105 is schematic representation of a plurality point of presence that make a LATA Intelligent Telco Switch that controls the flow of traffic within a plurality of point of presence of belonging to several Area Codes SONET. A LATA consists of a plurality of point of presences and their associated NPA Area Codes. Each HQ2 has several subordinate HQ1 that controls one or a plurality of class 5 central office switches. For simplicity each HQ3 controls approximately 2,000,000 ports.

For example on HQ2 can have control 305/786 Miami and 561 West Palm Beach whereas a second HQ2 can control 321 Cape Canaveral, 407 Orlando and 954/986 Fort Lauderdale. In reality these five area codes would be independent since within this LATA at least 5,000,000 subscribers.

FIG. 106 is schematic representation of a plurality point of presence that makes a LATA Intelligent Wireless Switch that controls the flow of traffic within several Wireless SONETS. Each HQ2 has several subordinate HQ1 that controls one or a plurality XO or MTSO switches. For simplicity each HQ3 controls approximately 2,000,000 mobile transceivers.

FIG. 107 is schematic representation of a plurality point of presence that makes a (Region) Multi LATA Intelligent Telco Switch that controls the flow of traffic within several Telco SONET. Each HQ3 and HQ2 subordinate has several subordinate HQ1 that controls one or a plurality of class 5 central office switches. For simplicity each HQ4 controls approximately 4,000,000 ports.

FIG. 108 is schematic representation of a plurality point of presence that makes a (Region) Multi LATA Intelligent Wireless Switch that controls the flow of traffic within several Wireless SONET. Each subordinate HQ3 and HQ2 has several subordinate HQ1 that controls one or a plurality XO or MTSO switches. For simplicity each HQ4 controls approximately 4,000,000 mobile transceivers.

FIG. 109 is schematic representation of a plurality point of presence that makes an ILEC Intelligent Telco Switch that controls the flow of traffic within several Telco SONET. Each HQ4, HQ3 and HQ2 subordinate has several subordinate HQ1 that controls one or a plurality of class 5 central office switches. For simplicity each HQ5 controls approximately 16,000,000 ports.

FIG. 110 is schematic representation of a plurality point of presence that makes a Multi ILEC Intelligent Wireless Switch that controls the flow of traffic within the area of several Wireless SONETS. Each subordinate HQ4, HQ3 and HQ2 has several subordinate HQ1 that controls one or a plurality XO or MTSO switches. For simplicity each HQ5 controls approximately 16,000,000 mobile transceivers.

FIG. 111 is schematic representation of a plurality Multi ILEC Intelligent Switch Wireless/Telco that makes up an ILEC region.

(A) HQ5 consist of a plurality of Multi LATA Intelligent Telco Switches.

(B) HQ5 consist of a plurality of Multi Wireless Switches LATA Intelligent (C) HQ6 consists of the merger of one or more independent and sovereign Wireless and Telco HQ5.

(D) Each subordinate HQ5, HQ4, HQ3 and HQ2 has several subordinate HQ1 that controls one or a plurality XO or MTSO switches. For simplicity each HQ6 controls approximately 32,000,000 mobile transceivers and Telco subscribers.

FIG. 112 is schematic representation of a plurality EAST USA Telco Switch that makes up a National region. HQ7 consist of a plurality of ILEC Regions Intelligent Switches such as EAST or WEST USA. Each subordinate HQ6, HQ5, HQ4, HQ3 and HQ2 has several subordinate HQ1 that controls one or a plurality XO or MTSO switches. For simplicity each HQ7 controls approximately 64,000,000 Telco.

FIG. 113 is schematic representation of a plurality EAST USA Wireless Switch that makes up a National region. HQ7 consist of a plurality of ILEC Regions Intelligent Switches such as EAST or WEST USA. Each subordinate HQ6, HQ5, HQ4, HQ3 and HQ2 has several subordinate HQ1 that controls one or a plurality XO or MTSO switches. For simplicity each HQ7 controls approximately 64,000,000 mobile transceivers.

FIG. 114 is a diagram of a National Telco Intelligent Switch that consists of the following:

(A) HQ6 consist of a plurality of Telco ILEC Intelligent Switches.

(B) HQ7 consist of a plurality of Telco Combined ILEC Intelligent Switches.

(C) HQ8 consists of the merger of EAST and WEST USA Telco or Wireless Intelligent Switches to cover the entire USA.

(D) Each subordinate HQ7, HQ6, HQ5, HQ4, HQ3 and HQ2 has several subordinate HQ1 that controls one or a plurality CO or Central Office class 5 switches. For simplicity each HQ8 controls approximately 128,000,000 Telco.

FIG. 115 is a diagram of a National Intelligent Wireless Switch that consists of the following:

(A) HQ6 consist of a plurality of Telco ILEC Intelligent Switches.

(B) HQ7 consist of a plurality of Telco Combined ILEC Intelligent Switches.

(C) HQ8 consists of the merger of EAST and WEST USA Telco or Wireless Intelligent Switches to cover the entire USA.

(D) Each subordinate HQ7, HQ6, HQ5, HQ4, HQ3 and HQ2 has several subordinate HQ1 that controls one or a plurality XO or MTSO switches. For simplicity each HQ8 controls approximately 128,000,000 Telco.

FIG. 116 is a diagram of a HQ9 that controls Combined USA or National, which consists of the merger of one or more independent and sovereign Telco and Wireless National HQ8.

FIG. 117 is a diagram of a HQ10 that controls North America Telco, which consists of the merger of one or more independent and sovereign Telco Combined National HQ9.

FIG. 118 is a diagram of a HQ10 that controls North America Wireless, which consists of the merger of one or more independent and sovereign Wireless Combined National HQ9.

FIG. 119 is a diagram of a HQ11 that controls America Telco (the Continent), which consists merger of one or more independent and sovereign Telco Combined National HQ10 (North and South America).

FIG. 120 is a diagram of a HQ11 that controls America Wireless (the Continent), which consists merger of one or more independent and sovereign Wireless Combined National HQ10 (North and South America).

FIG. 121 is a diagram of a HQ12 a schematic of a plurality of HQ11 Intelligent Telco/Wireless that make global regions or Combined World.
- (A) HQ9 consists of the merger of one or more independent and sovereign Wireless and Telco National HQ8.
- (B) HQ10 consist of a plurality of Continental Regions Intelligent Switches
- (C) HQ11 consist of a plurality of Inter Continental Intelligent Telco/Wireless Switches FIG. 122 is a schematic representation of how the system is able to have network wide environment information. Starting from left a plurality of Central Office Switch performs a statistical analysis of their traffic that is outside the norm to their parent NXX nodes. Each NXX node from their own perspective does the same analysis and communicates the results to the NPA. The process of moving information from a plurality of child nodes to the parent is continued until the summit tier is reached. Note if all the data is within the norm, the summit node will receive an empty message since there is no need to resubmit known information. Each node can send a plurality of different reports to the summit tier such as connection rates, error rates, faults, trunks bandwidth.

FIG. 123 is a graphical representation building a NXX bitmap file by allowing a plurality of Central Office Switches migrate several dimension of statistical information to NXX node. The NXX node analyzes, complies and normalizes the latest data. If any specific NXX bitmap field is beyond the norm it is notified otherwise the data is left blank.

FIG. 124 is a graphical representation building an ILEC bitmap file by allowing a plurality of Central Office Switches, Tandem Switches (NXX), Point of Presence (NPA), LATA and regions to migrate several dimension of statistical information to the summit tier. The ILEC node analyzes, complies and normalizes the latest data. If any specific ILEC bitmap field is beyond the norm it is notified otherwise the data is left blank.

FIG. 125 is a diagram that explains Updating Environment Data that is sent by the system (100) to the summit tier (200). The summit tier analyzes information gathered by all the subordinates and compares the information against the Data Warehouse (300) against historical trends of similar conditions. Based on the results of the comparison the summit tier assigns priorities, resources, and environment traffic condition. Nodes in the system receive the ILEC bitmap or equivalent message via rearward chaining and can use the latest updates to make informed decisions.

FIG. 126 is a diagram that shows a Best Cost Routing Fishbone where the end user pays a flat fee of $0.09 per minute for long distance calls. In this example the system based on available resources must select the lowest cost circuit. In this case the system selects MCI at $0.025 per minute that has the lowest cost.

FIG. 127 is a diagram that shows a Least Cost Routing Fishbone where the ILEC pays a flat fee of $0.025 per minute for long distance traffic. In this example the system based on available resources must select the lowest cost circuit. In this case the system selects Sprint at $0.073 per minute that has the lowest cost to the customer.

FIG. 128 shows how the multi-tiered components work together to build a (100) supplier system. The system can be consists of the summit tier (141) Intelligent Data Warehouse that is parent of all the components. The middle tier (121–122) manages and controls all the activities for Telecommunications networks, and help the parent (141) component to coordinate, and manage all available resources. Each middle tier (121–122) manages multiple lower tier Intelligent Components (101–104). Any of these elements can perform synergy (lateral and vertical) to finish pending tasks with unused bandwidth. Synergy consists of allowing components based on specified protocols to share the resources of lesser-taxed subordinates, group members or their parents. The supplier system (100) interacts with the environment in this case the Telecommunication Network and the $3^{rd}$ parties it interact with; In essence the summit tier (141) updates the latest inventory information of supply, whereas the Genesis Engine Drone (101–104) are the work horse of the system that read, scan, detect, prime and convert information into environmental data, Vector CDR billing entities. Alternatively through the end users can interact with the system via the Internet.

DETAILED DESCRIPTION OF THE PREFERRED EMBODIMENTS

Reference is now made to the drawings, wherein like characteristics and features of the present invention shown in the various figures are designated by the same reference numerals.

As described in "*Real Time Solutions for the Next Generation Internet*", 2002© the Genesis Engine Architecture is parallel cluster computer system where each independent node is an Intelligent Component that possesses the following characteristics and functions:

The supplier system is compliant with the fundamental concepts to make it a Next Generation Internet application:

(1) Communications: "In order to clarify how the NGI works, the sender will be called client or Leg A and in most cases reflects an end user, member and/or subscriber connecting to a supplier system. Whereas the receiver is the server or Leg B of a connected session, and is responsible to provide the highest levels of information, product quality and services to all the suppliers Leg A and/or $3^{rd}$ parties that actively participate with the supplier. The supplier is a corporate entity that is responsible for administrating, controlling and managing a next Generation Internet site that is responsible of delivering content, products and services to the consumer, while paying royalties to the copyright holders and intellectual property owners. For the purposes of this book the transmission medium is any form of telecommunications cable, satellite, or wireless and the Internet."

The traditional Internet is an open system that many experts says bring chaos and anarchy, whereas NGI uses client/server authentication, firewall, and snoop technology to identify each end users that interact with the system. It is mandatory to confirm the end user's profile so that the system can know to which areas of the supplier system it may grant access.

(2) Language: The supplier system follows the client/server system, where the Genesis Engine Architecture is the Server, and the end users Crusader Technology software are the clients. Today for example some companies are boosting that they are inventing faster file-sharing mechanisms, when we all know that the Record Industry Association sued a company like Napster and was able to force them to pay royalties to copyright holders. The significance of this lawsuit is a clear message from the courts that our society is based on law and order and not anarchy and chaos. Thus law and order in the Internet and international trade should be a key component when designing innovation for the next Generation Internet.

(3) Advanced Telecommunications Networks: this medium allows end users to interact with the supplier system in real time.

(4) Network Management: the ability to manage nodes and links to a network, this inventive system is a decentralized system that can work absent of a central mainframe. Thus each independent node controls a little part of the network and is responsible to assign, convert, delegate message that are within its network domain. For an example a server that controls all the end user in South Florida, is responsible of authenticating each end user at log time.

(5) Information Technology System: where system can be identified in one of three models:

First, Centralize Mainframes (Legacy Systems): system model around the need of a central processing unit that is responsible to performing all critical tasks. Note these systems do use subordinates to prime and preprocess information. Legacy Systems are based on Monitor Management methods and procedures that are based on classical centralized mainframe preprogrammed batches.

Second, Distributive Computing (Modem Systems): Systems of more than two computers that their main resources are distributed at different locations with one centralized resource being the parent mainframe server, responsible for updating and load balancing the content of the information. Clients are connected to the nearest available direct connection. A network that has distributed data warehouse server architecture with all the information of an organization would require a client to have to login, and connect directly any of the regionally distributed servers to get or send information. Modern Systems are based on Reactive Management methods and procedures that involve a plurality of software $3^{rd}$ party packages that are optimized for the detection of a rapid response to new request or transaction from the environment as they occur in the network.

Third, NGI Distributed Systems: Systems of more than two computers clients and servers that the main resources are distributed at different locations with several centralized resources being the parent mainframe server, responsible for updating, loading and balancing the content of the information. Clients are connected to the nearest available direct connection and become available resources that the server can use. A network that has distributed supplier architecture with all the information of an organization would require a client and server to both login, to connect directly, and to control, manage and validate all the requests and responses to get or send information from the environment. Genesis Engine nodes are based on Proactive Management method and procedures that are able to interact with the environment, and adjust according to change. The system behaves as an organism that does everything in its means to survive. Its Business Rules teach the organism that quality, reliability and speed of scanning, gathering, priming, distributing, and updating information in real time is the key to success. The system is based on simplification of the gather mechanism within a specific geographic area of the infrastructure so that the path of information as effective and efficient as possible.

At the incipiency of each new detected activity from the environment the system follows the trajectory route from beginning to end. The node that is owner of the subscriber's activities will decide the node will be responsible for gathering the information. This owner of call node will create a Vector CDR that will be updated as better information from the environment is obtained from other participating nodes. Once the call begins through dialing of digits the information is made available to the entire system.

To eliminate the problem of multiple protocols and manufacturers incompatible or proprietary bitmapped data structures, the system requires intellectual property owner to create a standard format interaction with the system removing the legal barriers. A common language or lingua franca is vital so that nodes can communicate freely without been taxed with translations.

Modern Systems are based on Reactive Management methods and procedures that involve a plurality of software $3^{rd}$ party packages that are optimized for the detection of a rapid response to new request or transaction from the environment as they occur in the network.

(6) Computer Hardware: the system is derived of internal, audio and video, and output devices that allow the end user to better interact with the system.

(7) Data Warehouses (DW) and Total Quality Management (TQM) Large organizations require large physical data facilities to store all the information in databases. The Data Warehouse is an example of a large repository that stores standard and valid data that all the users of supplier can use. The Total Quality Management of the organization to improve the product, quality and service supplied to the consumer can use the information that is obtained from the data warehouses. Finally ad-hoc queries, data mining, pattern recognitions, and trend reports of the networks, internal and external environment help identify what satisfies the client and what products and services they value.

(8) Supercomputers (Mainframe and PC Based) Consist of very fast computers that are able to process substantial large amounts of data in real time and allow many users to have direct access to the information. There are three types of supercomputers:

First, Mainframe Supercomputer retrieves and stores all the information from one centralized location that is responsible for handling all the information.

Second, PC Based Supercomputer that consists of many clustered computers working together and using shared resources by using technologies such as Beowulf and Hoard memory sharing. These supercomputers have all the information and task distributed amongst the available computers. The attraction of the PC Based versus the mainframe supercomputer is that it cost about $\frac{1}{10}$ and delivers the same processing power. The drawback is that PC computers are not well organized and robust as mainframes and are not designed to use all the available processing power, since the PC are sharing their resources. The more computers are linked together the more complex and inefficient the system becomes. Consequently, PC based Supercomputers required to be controlled and managed to be viable.

Third, Multi-tiered Parallel Clustered Supercomputer where each node is programmed to be part of a larger collective that is a hierarchal in nature and has the 3D graphical representation of a pyramid that administers, controls, coordinates, manage, validates and verifies the flow of information. As information is scanned from the Telecommunication network environment, messages are detected and each node is programmed with artificial intelligence to make decisions. Once a new message is detected from Platform Equipment a new Vector CDR is developed. By matching and merging the packets the system is able to determine the actual physical plot of the call through the network resources. Immediately the system places the lowest common denominator member of the hierarchy to control the activity. The Vector CDR consists of a plurality of call segments with carrier, cost, circuits, magnitude (Leg A and Leg B), switch manufacturer, trunks and vital switch information that are correlated into a multivariate equation with a bitmap or digital stamp so that nodes can dissemble the equation or pattern of a call into a simple data structure with several call segments.

This is done by organizing and simplifying the existing spaghetti infrastructure of the Telecommunication network equipment. As new data is received from the environment the system using logical Business Rules determine the node that control the activities or task.

Tasks are prioritized and synchronized by the node that is responsible for its execution. The system use management doctrines to the hierarchical structure to give each hierarchy managers or labor. By implementing the characteristics used by human within an organization to resolve a problem managers and labor can work as specialists or the manager can create a teams. As a guideline the node uses lateral synergy amongst sibling nodes, vertical synergy parent/child nodes or a combination of both when trying to obtain network wide statistical information.

(9) Multithreading Operating Systems and Beowulf clustered Supercomputers: system that allow true concurrent program execution and allow multiple computers to be connected together and share available resources to make an inexpensive and powerful system that solves resource-intensive and mission critical tasks.

(10) Geography: The system must be able to know where each end user is physical location.

(11) Real Time Solutions: This in a nutshell is the driving force behind entrepreneur taking the risks and often-tough scrutiny when creating Intellectual Property. When the entrepreneur wishes to sell their inventions for capital gain, then we have described the cornerstone in which Capitalism is based on. "The consumer demands in a market economy better products and services, and will ultimately reward those corporations and individuals that supply them." (This text has been paraphrased from Classical Keynesian Economists).

global Command Centre-international long distance

National Command Centre-national long distance network

ILEC Command Centre-local traffic network

Media Prophet regional tier

Genesis Engine local tier

Information Portal Server/Crusader Technology client software.

All the components work collectively and independently from each other, and still simultaneously perform the task analyzing, evaluating, gathering and processed information from the environment in real time or from the moment of incipiency of receiving the fuzzy logic piece of information that triggers new and updates pending activities or tasks.

An Intelligent component can programmed to belong any of the following multiple tiers.

(1) Each Intelligent Component is also an independent working entity.

(2) Genesis Drones: HQ2–HQ0 domain has control of all the users request and replies to the system.

Note: These servers coordinate and synchronize the entire billing, provisioning and TQM functionality request and replies.

The ability to interact with the human resources of the organization and supply them with a summary of all the data they have processed.

HQ2, HQ1 and HQ0 are designed to remove redundancy and to locally correlate and update information.

They share resources with parent, peers, and subordinates (lateral and vertical synergy) so that the system does not tax the capacity of the existing network in real time.

They immediately create, plot and update purchase orders as soon as the first message of the call or transaction are scanned in the network.

Intelligent Data Warehouse HQ3–HQ5

Virtually simulate Domain, Regional and Summit tier members of the organization to reduce the need of having to rely on the centralized mainframe. The must only be synchronized once every cycle, and then they will act virtual servers to which they belong. They will send updates to the machines they are virtually simulating so that the actual servers can make the proper adjustments as if they had received the entire traffic of transaction themselves (local virtual instances of the organization).

To request to members of the same group any excess buffer resources to complete a task (lateral synergy).

To coordinate available resources and activities of any parent node and their subordinates to work as team to complete a task (vertical synergy).

Node can work together to behave as a single Intelligent Component entity (parallel clustered computers).

The intelligent components reflecting the input and output of information from the environment of a computer network system:

Collectively multiple Intelligent Components work together to parallels and simulated an existing organization that possesses a supply chain logistical network.

Each message is converted to a lingua franca standard so that all the Intelligent Components can communicate amongst themselves, members of the organization and subscribers.

The components send request and replies via forward and rearward chaining. The parent Intelligent Component controls the rate of messages within their own organization and the duration of a next cycle based pre-established human resources criteria.

HQ3 and higher are also Intelligent Data Warehouses perform data warehouse functions are programmed to monitor and control multiple nodes. They act as virtual simulation of the organization.

Virtual Reality Servers VRS2–VRS0 are specialized nodes that operate through MPORPG computer software. Crusader allows end user to interact with the supplier in standalone mode, or to interact with other users by using MPORRG software. The Virtual Reality Server and Crusader Technology paradigm deals with the ability to be able to interact with a 3D world supplier and perform live financial transaction, interact with individuals and/or virtual animated characters and the ability to listen and view merchandise and works of copyright holders. Virtual Reality Servers are an integrated part of the Genesis Engine architecture clustered and connected together to model and recreate 3D Cyberspace Internet site. Crusader Technology computers also become part of the Genesis Engine Supercomputer while the member logins to the supplier's system.

Immediately after, Media Prophet and Command Centre transfer subscribers with the latest billing information even tracking live call billing.

The Genesis Engine architecture is also responsible for physical and programmatically distributing available bandwidth and available HQ0 drones. The Genesis Engine Intelligent Components can work in any of the different functions:

First, Genesis Engine Soldiers HQ2–HQ0 are responsible for filtering, priming, and converting all messages into a lingua franca.

Second, Genesis Engine Leader is responsible for controlling, coordinating and managing all available resources within their level of Command and Control.

Third, Virtual Reality Server gives each subscriber an interactive 3D virtual Reality of the Customer Service Center for the Telecommunication organization.

Fourth, Virtual Reality Client is a 3D interactive computer program that allows the member to have the feeling that he or she is physically present in the real world.

Fifth, The Virtual Reality Server interface is responsible for updating the billing information of each subscriber on the fly. Calls that are active will be a best guess estimate, since formal rating occurs once the call disconnects and the network wide information is validated.

Sixth, the summit tier HQ6 and HQ12 Intelligent Components after analyzing the latest traffic patterns determine routing Vectors for all request and replies, whether individually or for clusters of transactions, from point A to point B and monitor and change the priorities as necessary to avoid a network trouble area or to maximize available bandwidth usage. Thus, network traffic is analyzed, and the latest working conditions, which contains the latest network routing traffic patterns that the hive has chosen.

It is not obvious that a system in order to be a real time must also remove data redundancy, through a hierarchy of ownership that on its own identifies how the data feed is convert into real time primed technical and fundamental analysis patterns. Information System transactional statistics that are sent to the rest of the Intelligent Components to better optimize resources and available bandwidth. The lower management and platform foot soldiers tiers analyze, update, monitor, control, validate, verify and administer information on their own. This fact alone removes the need for a central mainframe and also reduces the raw workload and is not obvious in nature. This method, which removes redundant data at the point of attack and is what allows the system to be considered real time is the essence of the invention.

All the Intelligent Components coordinate their resources to function as a single unit. They process all the information forming a virtual instance organizational environment.

Where each Intelligent Component has is own location identification means, one said summit parent simulation computer being located at each of a plurality of subordinates. Depending on the size of the network the architecture of how computers are linked together might require a plurality of scopes each with its own parent and subordinates. For the purposes of this invention retail, wholesaler, supplier is available.

The system can have up to three concurrently working summit tiers

1) HQ6 for local and local long distance traffic
2) HQ9 for long distance traffic
3) HQ12 for international long distance Where said Intelligent Components Architecture provide such a computer network, which minimizes bandwidth usage by performing call routing calculations throughout the network.

They administer, coordinates, controls, mimics, and manage the live network and also reflect a concurrent and parallel working simulation of the live network call routing activities and transactions TQM functions make sure to predict when a customer becomes dissatisfied to immediately avoid churn.

The summit tier intelligent components update all of their subordinate components by sending only summarized information packets to its organizational subordinates. Consequently, these updates facilitate network wide information in real time to each intelligent component so that the decision or based on fact and not lookup tables or hard coded predefined routing patterns.

The intelligent component can avoid bottlenecks by temporarily avoiding bottlenecks finding and using available buffer resources by and reprogramming routing and trunk information to network equipment, once the human resource in charge gives permission. The system can only act on its own when the fault is serious enough to cause customer dissatisfaction and a human resource has not acted to the problem within the predefined time allocated for a response.

Where such a network system exists, which operates in conjunction, with available technology, so that existing equipment is not wasted and the cost of updating is minimized. Parent components are responsible for assigning tasks with time limitations to their subordinates.

The system can only place one Vector owner to a call. Unfortunately concurrently working Telco and Wireless global networks require the use of a hierarchy of nodes that allow rating of a billable call. The Vector owner is determines by the lowest common denominator HQ node that process a specific task. For the 10% of calls that where not covered by the guidelines described in U.S. Pat. No. 6,614,893 that only describes HQ0–HQ5 for ILEC sized networks.

HQ6 match and merge all the Telco and Wireless calls that occur within an ILEC or a plurality of defined LATA and/or NPA.

HQ7 match and merge all the Telco and Wireless calls within each of its HQ6 such East or West USA long distance traffic.

HQ8 match and merge all the Telco and Wireless calls within each of its HQ7 such USA long distance traffic.

HQ9 matches and merges all the Telco and wireless calls within each of its HQ8, which consists of a nation or plurality of nations such US national domain.

HQ10 matches and merges all the Telco and wireless calls within each of its HQ9, which consists of a continent such as North America domain.

HQ11 matches and merges all the Telco and wireless calls within each of its HQ10, which consists of a plurality continent such as Europe/Africa domain.

HQ12 matches and merges all the Telco and wireless calls within each of its HQ11, which consists of all the continents such as World domain.

Ideally once the Vector Owner information for HQ5 or more has been gathered and the correlation has been executed, the system will assigned the Leg A owner as the call owner.

VRS 2 to 0 broadcast to the end users the latest information that was derived by the Genesis Engine. The VRS possess a clone copy of the subscribers that each Crusader Technology is watching. When a change is identified the system automatically updates each end users using a reverse Ad Hoc Query mechanism, this is done to save considerable bandwidth that redundant query makes. Another advantage is that each server sends the information as soon as the supplier system has enough resources. Different versions of the software may exist based on the needs of each user. Furthermore, Crusader Technology is not a blind dummy that follows the trends obtained by the Genesis Engine; it uses the latest primed patterns of behavior to better identify conditions that the end user has customized. The end user customizations made to the software as data feed information and patterns of behavior are updated consist of the key decision making component. The computer responsibility is to read through the mountains of information, and give them to the end users the latest and most accurate billing information, product and service.

Wireless Networks switches differ from traditional Telco subscriber infrastructure. In order to converge the most amount of potential users to a specific data signal transmission center where microwave signals are received and the converted to light for distribution to the final destination. Monitoring directly a specific Central Office switch a CO node has been eliminated and instead several HQ0 nodes has been placed in the Tandem Access Areas XO node that monitor and control all the subscribers that that have wireless access to a specific network access point. Based on the inherit weakness that classical Telco switches possess that require direct cabling connectivity, which limits the sizes of Central Office switch to 16,000 subscribers. Multi signaling transfer points to Transfer Point access allows SS7 packets and a greater concentration of wireless end users that allows a cluster of nodes to handle 50K rural areas to 600K downtown areas. For this reason a cellular phone is directly assigned to an originating Number Plan Area so that any of the XO nodes can validate and verify any subscriber that belongs to a wireless network. Furthermore when multiple instances of wireless networks exist within the same NPA geographical boundary, the system will keep track of each competitor's mobile subscriber list.

Furthermore, the system will create a cost efficient method for determining the tandem cost from point X to point Y, to outbound link Leg A to a network and the inbound link from a network when a call connects. The system will simplify cost from point X to point Y with a specific cost. The computer does a summation of all the Vector components of the call to determine the total network cost, and the billable cost to the subscriber.

Wireless call that are outside of the local range are considered long distance and must confirmed to connect directly to the network or roaming charges apply. When a subscriber belongs to the system all the roaming criteria for wireless plans can be transmitted to any node that requires knowing if a roaming charge is applicable. When a subscriber is programmed to a network the number and its information is tagged to one member of each of the XO node within a NPA. When the Vector owner is determined and the call is long distance the Vector CDR will have the roaming information handy. Once the Vector CDR and all the correlation have been calculated the HQ owner can assign the task of database insertion and monitoring of the call to the lowest subordinate available, preferring to use Leg A when the call originates from a subscriber of the network. Leg B is used when Leg A belongs to a $3^{rd}$ party Telecommunications network. When both Leg A and Leg B subscribers do not belong to Telecommunication network once again Leg A is preferred to assist the Vector Owner in processing the transaction. If the lowest denominator is HQ2 or greater, these nodes can use vertical synergy to have a child node that is not part of the call to handle the call. The system will try to find the node that has the closest geographic access point to existing networking equipment.

The system in order to stop clogs and bottlenecks based on large network traffics, will move calls down in the hierarchy to HQ0 that have buffer resources. Once the call is terminated the acting Vector node notifies the real owner that the call has terminated. Upon receiving notification from the subordinate that the call has disconnect the Vector CDR owner terminates the call internally for billing purposes and knows how to retrieve the call information when required for later use.

When a HQ6 or greater identify that a wireless call is long distance within another NPA will assign the Leg A owner that connected the call to the wireless network to make the billing with appropriate billing information as determined by the Vector owner. Thus a person from Los Angeles 405 ### #### is in Miami and calls some from Miami 305 ### #### The Leg A XO node that originally detected the call will bill the call upon receiving the information of the HQ8 that monitors and controls traffic between USA East and USA West. If the call was determined to have roaming charges the call will be owned by the HQ8 or HQ9 based on pre configured decision of the system. HQ5 and HQ6 local, HQ8 and HQ9 long distance and HQ1 and HQ12 international calls are hierarchy levels that work collectively to resolve the traffic within their scope. After all the centralized feature of a system can be minimized but not eliminated in its entirety with network burden cost. HQ6, HQ9 and HQ12 can acts as a final centralized mechanism even though they belong to a system. Alternatively the HQ6, HQ9 and HQ12 only work during specific conditions triggered by peak time traffic allowing the system to still work absent of a central mainframe.

When a HQ10 or greater identifies that a wireless international call where Vector owner, Leg A and Leg B are different. The Vector owner of the most common network applies. Ex to people with Nextel worldwide services one from Japan and another from England both are in Miami, and call each other the call is considered an American call even though Leg A is in Asia, and Leg B is in Europe. The HQ12 can assign any node in any continent, but since both subscribers are in the USA (point C and point D) the system will prefer to use a node that is within the American network. The assigning of acting Vector CDR owners is based on available buffer resources and the node with point C and point D that has the most available resources to handle the call. In this case the US network was only used for transport. HQ5 nodes do the same when a call uses an ILEC and the Leg A and Leg B subscribers belong to CLEC. The ILEC network is only used for transport purposes.

At different HQ levels within the supplier system, the nodes will gather information of their subordinates to determines based on the latest environment information and historical trends what is the what is the mostly traffic pattern. Once this information is derived the system can also correlate case by case each subordinate node to verify their working conditions. The system will use demographic data, network equipment such as business, residential or wireless lines and network integrity to make decision on how to adjust the behavior of the subordinates and better adapt to the present conditions. Ideally the summit tier creates a logical hexadecimal bitmap that is stored in a HDTV screen shoot that consists of a multi dimensional group of data sets where the first dimension can include for example overall connection rate, error rate, fault rate, total international, local, local long distance, long distance, roaming, and hybrid, and complex calls. The second dimension can involve all the INBOUND and OUTBOUND information of a specific carrier with all the network traffic statistics. The third route can include Best Cost Routing, Least Cost Routing, and Best Connection Rate Routing, Least Connection Rate Routing from point X to Y.

Once each node receives via the Satellite transmission a copy of the latest HDTV screen shot in effect the simulating computer of the network platform equipment can now make human weighted decisions. As noted before Network Platform Equipment has been design to connect as effective and efficient as possible INBOUND and OUTBOUND circuits when subscribers place calls. Unfortunately, these expensive equipments have no clue what so ever of resource management of available network resources, clogged routes and network wide method for reserving system resources.

The System

This system expands from the limitations of U.S. Pat. No. 6,614,893 that made specific emphasis of self-contained single Telco ILEC network such as Bell South Telecommunications. This new system can perform the same activities and new method as described in this document for a plurality of concurrently working autonomous and competing Worldwide Telco and/or Wireless networks.

Voice over IP at the back end is still a classical call using SS7 packets and thus is redundant and behaves in the same manner as Wireless calls.

The essential element from which the system is constructed is a pair of network links that belongs to the Supercomputer (100), which monitors and controls the Telecommunication network, represented in FIG. 2 as (1) Inbound messages and (2) Outbound messages from the environment (50), meeting at a junction point in the form of an organization that has external contact with the outside world via the Internet. The Supercomputer is divided into several tiers for better distribution and efficiency of the workload. The system (100) includes the summit tier (141) Intelligent Data Warehouse that is parent of all the components. The middle tier (121–122) manages and controls all the activities for the supplier system Telco and/or Wireless network, and helps the parent (141) component to coordinate, and manage all available resources. Each middle tier (121–122) manages multiple lower tier Intelligent Components (101–104). Each element can perform the following Receive and send messages and transactions for all the activities performed by human resources and end users that interface with the system (100).

Update all end users that communicate with the system with the environmental bitmap files.

Ability and merge hybrid calls that are half Telco and half Wireless network calls.

Ability to bill complex call that consists of dynamic calls made by two wireless telephones where the call physical originates and terminates in a third country alternatively using a plurality $3^{rd}$ party network to connect.

Intelligent Components have a hierarchical structure level that explains their interaction with human resources, network platform equipment and their scope of influence. For example Summit and Middle Tier nodes interact with all the customers. The system monitors the Telecommunication network, and can interact with the outside world environment preferably via the Internet. Whereas a simple supplier system specific nodes can monitor and controls the flow of new data feed from the information. HQ0–HQ12 nodes monitor the environment but from a different perspective. Subordinate nodes are the workhorses that do most of the intensive processing power activities and forward chain the results to their superior. When the HQ12 processes a correlation it obtains from its HQ9 and all of its subordinates HQ6 to HQ0 the latest preprocessed Real Time Primed Data that has the network integrity and environmental conditions patterns available. By using the Real Time Bitmap Files parent nodes without doing any further calculation of the tasks done by its subordinates can now concentrate in correlating and validating the information of its subordinates. Upon a successful approval the information is notified to both the Summit tier so that they update their local copy of the end users portfolio and then distribute the latest information in the most efficient and effective manner to use available throughput.

Thus, not all the Intelligent Components are identical even though they have the same intrinsic characteristics and functions. The higher level an Intelligent Component is within the organization gives the more authority, power and responsibility.

Each CO of the system simplifies all the wiring and mess that a Telecommunications network has into a simple block. This block takes care of processing all the activities of each subscriber of the assigned CO and its subscribers. Then the system and its software create a virtual instance of the organization that behaves as mirror reflects, simplifies and transforms the complex infrastructure into a pyramid structure that has harmony, balance and proportion. These subordinate nodes representing the organization may use pre-established directives given to them by their corresponding hive supervisor that has delegated their authority and responsibility within the hierarchy to perform proactive management activities such as fraud blocking. For example a network has a major system failure and end users are unable to communicate with the rest of the organization to get the client's account information. The main system will request the summit tier to have the exact client's HQ0 node where all the activities are stored to create anew ad hoc account information and to synchronize the faulty nodes. Once the network communication is restored the client's HQ0 nodes notifies its supervisors of all their activities and then each supervisor reviews the activities validated to update end users interactions. The Intelligent Component interacts amongst each other until all the information has been successfully updated and validated.

Referring generally to FIG. 2, the present system (100) consists of a basic element Intelligent Component that belongs to larger system that has a plurality of these units. Collectively all of these nodes working in parallel are interlinked as a hierarchy and including parent and junction point simulation computers (141) summit tier and (121–122) middle tier, respectively, dedicated computers (101–104) lower tier, which are also known as Genesis Engine drone, for performing specific tasks and to provide processing power and still others at the peak of the command hierarchy to synchronize and delegate tasks among the various interlinked elements with continuous automatic reevaluation and redirection in real time. A parent computer (141) may be one computer or multiple computers working together in parallel using Beowulf-like technology, and this system (100) takes advantage of this technology to make supercomputers at a very low cost. In this way, these smaller simulation computers are spread throughout the network to better manage inbound (1) and outbound (2) messages that interact with the environment (50) preferably the Internet.

The supplier system network is divided broadly at certain junction points into geographic regions by continent, group of countries, countries, and national geographical subdivision for purposes of redundancy. The system must always is considered of independent working blocks that must be organized in an hierarchical structure to build a pyramid system so that parent/children nodes can enjoy the benefits to a well balanced supercomputer or parallel clustered architecture.

The Intelligent Components (141) monitor activity and buffer levels the securities brokerage network (51) and to make decisions which shunt resources from others (101–104) or (121–122) having larger buffers to process the activity. Furthermore, it is the task of the system (100) to define, which activities or messages are good, and which are redundant thus rendering them as obsolete. The hive supercomputer network (100) also saves bandwidth by making these requests and replies with the simulation child computers (101–104) at each junction point and sending only information about the result of each decision to a parent computer (121–122) or grand parent (141) within the simulation hierarchy, rather than sending all of the redundant information involved making each decision. Consequently each child (101–104) only sends a summary of all the processed activities.

System (100) integrity is monitored for rapid detention of malfunctions, so that proactive preventative maintenance is provided, thereby minimizing downtime. In this way, the inventive expert system intelligent components network (101–141) combines synergistically to minimize system (100) downtime, and cost. This permits the Supercomputer (100) to monitor and control the available equipment and human resources, to increase processing power, to minimize bandwidth usage, to permit forward and rearward chaining to maximize efficiency in organizational network computer operation and to permit real time environmental bitmap file statistics, financial information, raw data CDR and Vector CDR Data. The processing power and range of functions of the supercomputer is greater than the sum of the processing powers and range of functions of each individual computer making up the system.

The architecture consists of a multiple tier hierarchy of components, which is also used to determine ownership and scope of the transaction. HQ3 to HQ12 are IDW (Intelligent Data Warehouses) whereas HQ0 to HQ2 are Intelligent Components.

a) Summit Tier: HQ12, HQ9 and or HQ6 depending on the size of the network that communicates with the outside world of the organization via the Internet.

Coordinates the subscriber software driven request.

Analyzes, gathers, identifies consumer personal information and purchasing patterns of behavior.

Allows an organization to have a personalized yet secure interaction with the public.

Manages end users' requests and reply, while determining what they value and controls the TQM functions.

b) Middle Tier subordinates controls all the resources of the Telecommunication organization preferably at the LATA and NPA level. Note: the system can allow multiple Telecommunications to participate with the same system network. The system is an open system that permits each Telecommunication network to have its own proprietary and licensed version of the technology. These elements also coordinate the interaction of the end users and are responsible of disseminating the latest information. This "inverted or reverse" ad hoc query does not hog the resources of the network, since the system build the report on its own, by summarizing the reports of its subordinates and then sends to the user. Furthermore, the nodes can request subordinate nodes via vertical synergy to take over the resource intensive tasks of the dissemination process.

Manages the interaction and information exchanged via the Internet.

Merges multiple end users requests as one avoid making redundant message that burden the system unnecessarily.

Allow multiple Telecommunications network organizations to have their engineers, customer service representative, specialists and proprietary software to interact with the system and their own network.

c) The summit tiers controls all the resources of its subordinates and give values to Best Cost Routing and Least Cost Routing based on money resources or barter. These elements gather information, and study patterns of purchasing and production behavior and faults and then make on their own ad hoc optimized logistics reports that are submit to the managers of the carrier organizations. This information is rearward chain to all of its subordinates, so that each Intelligent Component has a clear and distinct understanding of what is going on the environment via this preprocessed information, and can concentrate in performing their assigned task.

Summit tier performs the final approval of Real Time global Environmental Bitmap Files.

Assigns routing resources by geographical area, and give instructions of how to determine the best routes, and how to instruct HQ0 to update Central Office Switch to changing trucking rules on the fly.

Notifies all subordinates with latest volatility and market conditions so that each node has a full knowledge of what is going on in the environment.

d) Middle tiers controls all the resources received from a given geographical network LATA or Region. These elements gather information, and study patterns of calls behavior and faults and then make on their own ad hoc optimized logistics reports that are submit to the managers of the Telecommunications organizations. This information is rearward chain to all of its subordinates, so that each Intelligent Component has a clear and distinct understanding of what is going on the environment via this preprocessed information, and can concentrate in performing their assigned task.

Middle tiers perform the final approval of Real Time regional Environmental Bitmap Files.

Based on the order of the summit tier assigns routing resources by geographical area, and give instructions of how to determine the best routes, and how to instruct HQ0 to update Central Office Switch to changing trunking rules on the fly.

Notifies all subordinates with latest volatility and market conditions so that each node has a full knowledge of what is going on in the environment.

e) "Genesis Engine Drone": HQ0 to HQ2

Process all the lingua franca messages and converts them in primed data that has fundamental and technical analysis patterns.

Each HQ0 assigns a time stamp and unique Social Security identification to each message.

Makes request to the system databases to update end users software with usable information.

Receives continuous updates from higher members of the hierarchy to receive network conditions, summit tier angry customers, HQ12, HQ9 or HQ6 domain level, HQ4 regional, and HQ2 local level alerts, priority levels, optimal mini and maxi cost for routing, and system failures. Since, HQ0 know exactly what is going on the organization network they remove the need of a centralized mainframe and are qualified to approve calls on their own.

System Business Rules

This is the scope of each HQ of the hierarchy:
HQ12 Combined plurality of sovereign global Networks
HQ11 Continental Network
HQ10 Continental Region Network
HQ9 Combined plurality of sovereign National Networks
HQ8 National Network
HQ7 National Regional Network
HQ6 Combined ILEC and Wireless Network
HQ5 ILEC
HQ4 Regions
HQ3 LATA Infrastructure
HQ2 NPA Infrastructure
HQ1 NXX Infrastructure or Cell Site
HQ0 CO Infrastructure Rule 0: Genesis Engine Drones or HQ0–HQ2 receives the raw feeds from the network platform equipment immediately via SS7 packets and after delay of several minutes CDR. The node scans through the data using a filtering mechanism to identify each call or Central Office Switch message.

Its converts the information into a format that any node can understand (lingua franca) and converts it into a message with a predefined data structure.

Rule 1: Genesis Engine Drones determines via a look up table the HQ0 responsible for analyzing a given call and immediately assign a call owner. HQ0 forward chain the message to the call owner that creates a new transaction message that has as a basis a SSN that includes the security seven digit alpha numeric codes, time stamp, owning node. A new transaction is built once the Genesis Engine Drone gathering information has enough updates that are significant from the environment to justify an event. Whenever the latest analyzed justifies an event a new environment Bitmap File is generated.

Rule 2: The Summit creates an environment Bitmap File message that includes variables reflecting current conditions for each market as reported by each of it subordinate. This node updates each of its subordinates with the system condition variables via a rearward chaining message. This message environment message based on the volume will remain in force until its replacement is received. The Summit Tier by default synchronizes the system every minute. If the Summit Tier evaluates the environment conditions and finds no distinct changes it will wait. During Peak hours of volume the maximum wait is two minutes, during non peak hours it is five minutes even when no environment change are justified think of it as network integrity pulse.

Rule 3: Once the environment message is broadcast to the entire hierarchy each Genesis Engine Drone to Middle Tier possesses the latest quantified and qualified environment condition information that is rich with carrier capacity, least cost routing, faults, etc. Each node uses the appropriate information to make its own decision to use its resources to an optimal without fear of become clogged from failing to prepare and plan how to execute (proactive management).

Rule 4: Capturing an echo of the messages of the Telecommunications is the mirror of data. The hierarchical manner in which the system has to be organized the networks activities with redundancy is the pyramid. The system or pyramid handles all the activities of the environment and over time request for reserves in the form of additional nodes to balance the system where potential clogs might exist.

Rule 5: Each HQ0 analyzes the data derived from the Central Office Switch and all of its subscribers. The system tries to plot the exact location of each subscriber within the infrastructure using GIS (X, Y, and Z) coordinates. Wireless subscribers are triangulated to the nearest Cell Site or network point of access. This real time environmental information is updated to parent when required. The SSN has the call owner, Leg A, Leg B, Leg X, Leg Y and Tandem A, B, X, Y to name a few info and is sent to the. Each HQ0 can monitor several CO if necessary and is the basis for a system block.

Rule 6: Each HQ1 analyzes and then correlates the information received by its subordinates. Based on the broader analysis of its subordinates and activities within the NXX (Exchange), the HQ1 can reevaluate the NXX Bitmap File and assign values for different conditions and update the statistical trend modeling information. Each HQ1 monitors several HQ0 blocks to simplify an Exchange infrastructure. The SSN has the HQ0–HQ1 info and notifies the appropriate HQ2.

Rule 7: Each HQ2 analyzes and then correlates the information received by its subordinates. Based on the broader analysis of its subordinates and activities within the NPA (Number Plan Area), the HQ2 can reevaluate the NPA Bitmap File and assign values for different conditions and update the statistical trend modeling information. The SSN has that has the subordinate HQ info and also notifies its parent HQ3. Each HQ2 monitors several HQ1 with their subordinates to simplify an Area Code infrastructure. The SSN has the HQ0–HQ2 info and notifies the appropriate HQ3.

Rule 8: Each HQ3 analyzes and then correlates the information received by its subordinates. Based on the broader analysis of its subordinates and activities within the LATA, the HQ3 can reevaluate the LATA Bitmap File and assign values for different conditions and update the statistical trend modeling information. The SSN has that has the subordinate HQ info and also notifies its parent HQ4. Each HQ3 monitors several HQ2 with their subordinates to simplify an LATA infrastructure. The SSN has the HQ0–HQ3 info and notifies the appropriate HQ4.

Rule 9: Each HQ4 analyzes and then correlates the information received by its subordinates. Based on the broader analysis of its subordinates and activities within the region, the HQ4 can reevaluate the Regional Bitmap File and assign values for different conditions and update the statistical trend modeling information. The SSN has that has the subordinate HQ info and also notifies its parent HQ5. Each HQ4 monitors several HQ3 with their subordinates to simplify a Regional infrastructure. The SSN has the HQ0–HQ4 info and notifies the appropriate HQ5.

Rule 10: Each HQ5 analyzes and then correlates the information received by its subordinates. Based on the broader analysis of its subordinates and activities within the ILEC, the HQ5 can reevaluate the ILEC Bitmap File and assign values for different conditions and update the statistical trend modeling information. The SSN has that has the subordinate HQ info and also notifies its parent HQ6. Each HQ5 monitors several HQ4 with their subordinates to simplify an ILEC infrastructure. The SSN has the HQ0 –HQ5 info and notifies the appropriate HQ6.

Rule 11: Each HQ6 analyzes and then correlates the information received by its subordinates. Based on the broader analysis of its subordinates and activities within the combined ILEC network, the HQ6 can reevaluate the Combined Network Bitmap File and assign values for different conditions and update the statistical trend modeling information. The SSN has that has the subordinate HQ info and also notifies its parent HQ6. Each HQ6 monitors a plurality of HQ5 with their subordinates to simplify a Combined Network infrastructure. The SSN has the HQ0–HQ6 info and notifies the appropriate HQ7. Telco/Wireless calls that have roaming charges are controlled by this node. The HQ6 can delegate ownership of a call to the lowest common denominator node for Leg A and Leg B preferably the HQ0 that owns Leg A.

Rule 12: Once a Vector CDR has been correlated with all its components via lateral and vertical synergy can delegate ownership to another node that has available resources. The node that performs the acting as Vector Owner sends the information to the true call owner once the transaction is completed and available resources permit the data migration.

Rule 13: Each HQ7 analyzes and then correlates the information received by its subordinates. Based on the broader analysis of its subordinates and activities within the National Region, the HQ7 can reevaluate the Combined Network Bitmap File and assign values for different conditions and update the statistical trend modeling information. The SSN has that has the subordinate HQ info and also notifies its parent HQ7. Each HQ7 monitors a plurality of HQ6 and HQ5 with their subordinates to simplify a National Regional Network infrastructure. The SSN has the HQ0–HQ7 info and notifies to the appropriate HQ8 and HQ9. The HQ7 can delegate ownership of a call to the lowest common denominator node for Leg A and Leg B preferably the HQ0 that owns Leg A.

Rule 14: Each HQ8 analyzes and then correlates the information received by its subordinates. Based on the broader analysis of its subordinates and activities within the Nation for example USA, the HQ8 can reevaluate the Telco/Wireless Network Bitmap File and assign values for different conditions and update the statistical trend modeling information. The SSN has that has the subordinate HQ info and also notifies its parent HQ9. Each HQ8 monitors a plurality of HQ7 with their subordinates to simplify a National Regional Network infrastructure. The SSN has the HQ0–HQ8 info and notifies to the appropriate HQ9. The HQ8 can delegate ownership of a call to the lowest common denominator node for Leg A and Leg B preferably the HQ0 that owns Leg A.

Rule 15: Each HQ9 analyzes and then correlates the information received by its subordinates. Based on the broader analysis of its subordinates and activities within the Combined Nation for example USA Telco/Wireless, the HQ9 can reevaluate the USA Network Bitmap File and assign values for different conditions and update the statistical trend modeling information. The SSN has that has the subordinate HQ info and also notifies its parent HQ9. Each HQ9 monitors a plurality of HQ8 with their subordinates to simplify a Combined Telco/Wireless National Network infrastructure. The SSN has the HQ0–HQ9 info and notifies to the appropriate HQ10. The HQ9 can delegate ownership of a call to the lowest common denominator node for Leg A and Leg B preferably the HQ0 that owns Leg A.

Rule 16: Each HQ10 analyzes and then correlates the information received by its subordinates. Based on the broader analysis of its subordinates and activities within the Continental Region for example North America Telco/Wireless networks, the HQ10 can reevaluate the North America Network Bitmap File and assign values for different conditions and update the statistical trend modeling information. The SSN has that has the subordinate HQ info and also notifies its parent HQ11. Each HQ10 monitors a plurality of HQ9 with their subordinates to simplify a Continental Regional Network infrastructure. The SSN has the HQ0–HQ10 info and notifies to the appropriate HQ10. The HQ10 can delegate ownership of a call to the lowest common denominator node for Leg A and Leg B preferably the HQ0 that owns Leg A.

Rule 17: Each HQ11 analyzes and then correlates the information received by its subordinates. Based on the broader analysis of its subordinates and activities within the Continent for example America Telco/Wireless networks, the HQ11 can reevaluate the America Network Bitmap File and assign values for different conditions and update the statistical trend modeling information. The SSN has that has the subordinate HQ info and also notifies its parent HQ12. Each HQ11 monitors a plurality of HQ10 with their subordinates to simplify a Continental Regional Network infrastructure. The SSN has the HQ0–HQ11 info and notifies the both the appropriate HQ11. The HQ11 can delegate ownership of a call to the lowest common denominator node for Leg A and Leg B preferably the HQ0 that owns Leg A.

Rule 18: The Summit tier HQ12 analyzes and then correlates the information received by its subordinates. Based on the broader analysis of its subordinates and activities within the World for example global Telco/Wireless networks, the HQ12 can reevaluate the World Network Bitmap File and assign values for different conditions and update the statistical trend modeling information. The SSN has that has the subordinate HQ info and also notifies its parent HQ12. Each HQ12 monitors a plurality of HQ11 with their subordinates to simplify a Continental Network infrastructure. The SSN has the HQ0-HQ11 info and stores a copy in a redundant Data Warehouse. The HQ12 can delegate ownership of a call to the lowest common denominator node for Leg A and Leg B preferably the HQ0 that owns Leg A.

Rule 19: All forward chain messages that belong to a system time cycle will be updated during the following time segment. Genesis Engine Drone instantiates new message notifications of changes in the environment that must transmitted up the chain of command until the summit tier is reached. HQ2+ that detect significant changes in the environment can also create environmental Network Bitmap Files rearward messages that can warns subordinates of immediate changing conditions of traffic patterns.

Rule 20: Employees of the Telecommunications networks can also request and make change in the environment that are based on the human's experience or knowledge of $3^{rd}$ party network conditions and will force all subordinate nodes to obey the commands. For example, for at least the next five minutes reroute all MCI calls to the Least Cost Route since the traffic will be down. After the five minutes the supplier system will check the traffic, once test calls are completed the end user will be notified that the MCI is once again operation. The end user can request further delay or approve traffic.

Rule 21: HQ5 analyzes the patterns of the outside environment and coordinate available resources to maximize throughput to give end users the best response time to any interaction.

Rule 22: HQ8 analyzes the patterns of the outside environment and coordinate available resources to maximize throughput to give end users the best response time to any interaction.

Rule 23: HQ11 analyzes the patterns of the outside environment and coordinate available resources to maximize throughput to give end users the best response time to any interaction.

Rule 24: HQ6+ informs all the subordinate nodes with the current conditions of the plurality of Telecommunications networks that are participating with the system.

Rule 25: Summit tier informs all the subordinate nodes of resource usage of the Virtual Reality World and assigns primary, secondary and tertiary node servers to each end user when at login.

Rule 26: HQ5+ is responsible for updating each end user's account information as transactions or updates are received from the plurality of Telecommunications. The HQ node will send the message to the controlling NPA node that will reroute to the HQ0 block that owns the subscriber's account information.

Rules 27 Genesis Engine Drone Nodes can block up to 50% of available resources for data mediation and creating billing entities during a given time cycle.

Rule 28 Genesis Engine Drone Nodes can block up to 20% of available resources for network trending and statistical calculations during a given time cycle.

Rule 29 Genesis Engine Drone Nodes can block up to 10% of available resources to respond to end user requests calculations during a given time cycle.

Rule 30 Parent nodes can increase any one of the resources described Rules 27–29 by 5%.

Rule 31 Grandparent can increase any one of the resources described Rules 27–29 by 5%.

Rule 32 Summit tier or HQ5+ can increase any one of the resources described Rules 27–29 by 10%.

Rule 33 HQ1 to HQ3 can perform tactical decision bitmap Files that can be updated every 5 seconds. HQ1 or NXX represents 1/100 while a HQ2 or NPA 1/10 of a percent of the network and HQ3 or LATA represents 1% of the act the entire traffic of the network. Notwithstanding for local and isolated problems these HQ can possess all the necessary subordinates and subscribers to make decisions with certitude.

Rule 34 HQ4 to HQ6 can perform hybrid decision bitmap Files that can be updated every 15 seconds. HQ4 or ILEC region represents 2–5% while a HQ5 and HQ6 or ILEC combined Telco/Wireless network represents 5–10% of the act the entire traffic of the network. Notwithstanding for regional problems these HQ can possess all the necessary subordinates and subscribers to make decisions with certitude.

Rule 35 HQ7 to HQ9 can perform hybrid decision bitmap Files that can be updated every 30 seconds. HQ7 or East or West USA represents 15–30% while a HQ8 and HQ9 or USA combined Telco/Wireless network represents 35–50% of the act the entire traffic of the network. Notwithstanding for Continental problems these HQ can possess all the necessary subordinates and subscribers to make decisions with certitude.

Rule 36 HQ10 to HQ12 can perform strategic decision bitmap Files that can be updated every 60 seconds. HQ10 or America represents 50–67% while a HQ10 and HQ12 or global combined Telco/Wireless network represents 100% of the act the entire traffic of the network. Empty messages are sent every minute if no significant change in the environment has been detected, and based on traffic conditions mandatory updates can be sent to synchronize all nodes to work in unison.

Rule 37 small countries can be bound by an HQ3 such as Guatemala, whereas medium countries within an ILEC region or HQ6 such as Argentina and large countries such as the USA within a HQ9 and global networks with HQ12 configuration. The scope decision has to be done based on throughput and available resources. Note some summit tier can behave in dual capacity if necessary, for example HQ12 can act as HQ12 and HQ11. As designed HQ12–HQ11, HQ9–HQ8, HQ6–HQ5 can be simplified by dual capacity nodes, The HQ12, HQ9 and HQ6 are nodes that are designed to resolve the roaming issues and handle calls that enter and exit the network in transit that quickly become complex issues, thus the additional nodes are cost justified since they add significant throughput and simplify the process of correlating billing entities in real time.

Rule 38 local calls in the United States nodes rating residential and business calls must apply Universal Service Order Code (USOC) constraints when rating. Each node when creating a billing segment trajectory must associated specific billable USOC constraints and then notify node the call owner.

EXAMPLES

Example 1

New information is received from the mirror echo of SS7 packets and the system immediately detects the changes. From FIG. 128 the supplier system receives the information from the Genesis Engine Drones and begins to convert the raw data into a Vector CDR and HQx Bitmap Files by applying the performing continual statistical checks against historical and system projected environmental conditions. HQ0 begin the process of forward chaining messages that are significant. The forward chaining of messages goes up the ladder of the hierarchy until a significant change is detected. At this point the HQ node that detects the abrupt changes in the environment can make and raise a warning flag that will modify the way subordinates nodes make their decisions, while continuing the process of forward chaining the message until the summit tier HQ is reached. To avoid unnecessary usage of resources messages superior nodes can notify only specific conditions in small streams of messages instead of one large bitmap stream since this method is faster.

Example 2

From FIG. 128 the supplier system (100) identifies changes in the environment and process the information into new HQx environmental that are sent to the Virtual Reality Server that in turn broadcasts the information to the end user's software (50) and employees of the organization to know the conditions of the entire network. From example 1 the raw information is gathered, parsed and primed into a lingua franca standard so that all the node and end user software can understand. Then the information gets recalculated tier by tier staring from Genesis Drones HQ0 until the Summit Tier HQx has validated the latest information as an HQx environment Bitmap File. The new environmental HQx Bitmap File information reaches the Virtual Reality Server cluster of nodes.

At this point the Virtual Reality Server now has the latest environmental HQx Bitmap File information will send the information to all of its subordinates. Once each server receives a new environmental data it determines to which users to send the latest information. The server determines that it has several end users that own or monitor a given security and update the end user software with the latest information.

The server signals the end user software that new data has been received. Upon a successful handshake signal from the end user client the server starts to update the computer with the latest information. As each new environment data is received each server determines available resources and makes decisions using FIFO to update and synchronize end users. Alternatively during peak time traffic each server can delegate the task exchanging information with end users to Genesis Engine Drones that will use buffer resources to behaves as a Virtual Reality Server with the purposes of exchanging information between the supplier system servers (100) and end users clients in the environment (50).

When a certain resource patterns or threshold are monitored by the summit tier Virtual Reality coordinator assigns Genesis Engine HQ0 to HQ2 to perform specialized tasks to assists the servers from clogging due to the burden created by updating and maintaining end users software current. Virtual Reality Server will prioritize available resources to keep end users with the requirements of interacting in to the system. Furthermore, and end user can use the system without connecting to the Virtual Reality Server and just use the system to review end users account information. End users working with the Virtual Reality component offline communicate with Genesis Engine Drone to receive the latest data.

Example 3

Using FIG. 88 we will describe a complex call. In this example Leg A subscriber has a global calling plan from Telecom Argentina, whereas the Leg B subscriber has one from Telecom Italia. For instance when both Leg A and Leg B subscriber are in the United States, a call between would require at least for segments.

Argentina to Miami INBOUND between Telecom Argentina (7324) and BST (2312)
Miami to Los Angeles INBOUND between Verizon (2312) and Pacific Bell (2584)
Miami to Los Angeles OUTBOUND between Verizon (2312) and Pacific Bell (2584)
Los Angeles to Rome OUTBOUND between Pacific Bell (2584) and Telecom Italia (7117)
Tandem Route Italia123 (Telecom Italia)
Tandem Route Arg00f (Telecom Argentina)
Tandem Verizon-BST (Verizon)
Tandem Nextel-PB (Nextel)

Each of these components will most likely have their own Tandem Route to connect the different long distance and international calls. For this reason the Vector CDR has been enhanced to allow for a plurality of call segments and Tandem routes to be able to create the most likely (or for simplicity the most logical path). Since the call travels physically from Miami to Los Angeles that would be a HQ8 type call. Unfortunately this call for billing purposes is a call from Italy to Argentina that would require a trajectory across two Continents and thus a HQ12 type call.

The system must identify the cost and rate each segment to correlate a billing entity that uses at least four Telecommunication Networks, with associated INBOUND and OUTBOUND. No roaming charges are expected, since both subscribers belong to worldwide plans.

What is claimed is:

1. In a telecommunications network system, a method for continuously analyzing, updating, monitoring, controlling, verifying, and validating interactions between subscribers and the system, the network system comprising multiple communication links meeting at a junction point describing the organization hierarchy of the network, the links in communication with lower tier and higher tier nodes, the method comprising the steps of:

organizing the computer nodes and data warehouses of the system to resemble the hierarchal structure of a worldwide telecommunication network and training the nodes to perform proactive management activities that assist human resources that monitor the organization;

gathering information from the computer nodes and data warehouses, the human resources of an organization, and live messages from the network;

providing a telecommunication network covering a plurality of geographical regions, each region comprised of a plurality of Local Access Transport Areas (LATAs), each LATA subdivided into a plurality of Number Plan Areas (NPA), each NPA controlling a plurality of NXX exchanges, and each NXX exchange controlling a plurality of central office (CO) switches;

integrating a parallel-distributed computer system into the telecommunication network to define a plurality of concurrently operating nodes distributed throughout the network in a hierarchical arrangement of tiered groups of nodes, a first tier group of said nodes strategically located within the network to monitor and control local traffic within a plurality of NXX and Wireless Cell Sites (XO) within a number plan area NPA, a second tier group strategically located within the network to monitor and control local long distance Telco and Wireless traffic within a LATA or a geographic region having multiple LATAs, and a third tier group of nodes strategically located to monitor and control long distance within one or more nations, and a fourth tier binding international traffic traveling through one or more continental regions of the world;

transforming said gathered information into a lingua franca standard gathered at said computer nodes and data warehouses to derive a virtual copy of the network in the form of an echo of all the packet traffic that is broadcast to the lower tiers of the hierarchy;

translating said gathered information and sending said information to the higher tier of said computers via a forward chaining node HQ (0 to 11) Bitmap File until a summit tier HQ 12 is reached;

converting said vector trajectory into a corresponding node-to-node billing trajectory bitmap;

identifying, at each node of said billing trajectory bitmap, which of the plurality of call carrier billing entities within a call billing segment associated with the node are being used and the associated call carrier costs;

alerting each node along the billing trajectory bitmap to generate a respective billing call segment and to send the information to a corresponding call owner node upon receiving a network release message, scanning and then parsing each message from the environment to determine whether the call is a billable call, and error, and whether wireless call roaming charges apply;

assigning a lowest common denominator node as a call owner;

manipulating a plurality of Call Detail Records (CDRs) reflecting the actual costs of billing call segments generated by the network;

comparing the billable call segments communicated to the assigned owner; and communicating and then confirming, to each participating node of a transaction, a unique identifier number that Vector trajectory segment has been verified and validated;

differentiating billable call segments further comprises identifying a cost differential between billable segments cost communicated to said assigned call owner node and a corresponding billing segment cost contained in said message so that call owner must recalculate the billing entity and make the appropriate changes; and propagating and disseminating environmental data derived from higher-tiered ones of said computers having the most recent instructions to all its subordinate tiers.

2. A method as recited in claim 1, further comprising, after the step of identifying, the step of assigning ownership to a call based upon a hierarchy system, wherein the system assigns the node that is closest to a first call leg (leg A) unless the call is identified as an inbound call originating from another network, in which case the node closest to a second call leg (leg B) owner is used.

3. A method as recited in claim 1, further comprising the step of creating a vector CDR by a call owner, wherein the vector comprises a single version of the truth since the system has all the components required to create the billing entity.

4. A method as recited in claim 1, further comprising, after the steps of identifying and assigning, the step of breaking down a call into a plurality of components and tandem routes to construct a complex call.

5. A method as recited in claim 1, further comprising, after the step of identifying which tier is the call owner, the step of requesting each node that is monitoring a portion of the call trajectory to validate the segment that resides within their domain.

6. A method as recited in claim 1, further comprising the step of monitoring and tracking, via said nodes, the activity of subscribers of competitor systems, and subsequently branding first and second legs (leg A and leg B) as belonging to a third party telecommunication entity that is sovereign and independent of the system and its organization.

7. A method as recited in claim 1, wherein the step of establishing ownership further comprises assigning local wireless telephone calls to exchange nodes within a first tier group of said system.

8. A method as recited in claim 1, wherein the step of establishing ownership further comprises assigning local long distance wireless telephone calls to LATA nodes within a second tier group of said system.

9. A method as recited in claim 1, wherein the step of establishing ownership further comprises assigning long distance wireless telephone calls to national nodes within a third tier group of said system.

10. A method as recited in claim 1, wherein the step of establishing ownership further comprises assigning international wireless telephone calls to continental nodes within a fourth tier group of said system.

11. A method as recited in claim 1, wherein the step of establishing ownership further comprises assigning long distance roaming wireless telephone calls to national nodes within the third tier group of said system.

12. A method as recited in claim 1, wherein the step of establishing ownership further comprises assigning Telco/Wireless local calls to NPA nodes within the first tier group of said system.

13. A method as recited in claim 1, wherein the step of establishing ownership further comprises assigning hybrid local long distance and hybrid roaming local long distance telephone calls to LATA nodes within the second tier group of said system.

14. A method as recited in claim 1, wherein the step of establishing ownership further comprises assigning hybrid long distance and hybrid roaming long distance telephone calls to national nodes within the third tier group of said system.

15. A method as recited in claim 1, wherein the step of establishing ownership further comprises assigning hybrid international telephone calls to continental nodes within the fourth tier group of said system.

16. A method as recited in claim 1, wherein the steps of establishing ownership further comprises assigning complex long distance telephone calls to national nodes within the third tier group of said system.

17. A method as recited in claim 1, wherein the steps of establishing ownership further comprises assigning complex international calls to continental nodes within the fourth tier group of said system.

18. A method as recited in claim 1, wherein the steps of establishing ownership further comprises assigning complex roaming calls to continental nodes within the fourth tier group of said system.

19. A method as recited in claim 1, further comprising the step of creating Forward Chain Bitmap Environmental Data files wherein each node proactively monitors The environment and detects a significant change that is in turn updated to a parent node.

* * * * *